United States Patent [19]

McGee

[11] 3,727,191

[45] Apr. 10, 1973

[54] ACCELERATION-DECELERATION FOR NUMERICAL CONTROL

[75] Inventor: John K. McGee, Houston, Tex.

[73] Assignee: Giddings & Lewis, Inc., Fond du Lac, Wis.

[22] Filed: Mar. 15, 1971

[21] Appl. No.: 124,356

[52] U.S. Cl. ............340/172.5, 235/151.11, 318/573
[51] Int. Cl. ..............................................G06f 15/46
[58] Field of Search...............................235/151.11; 340/172.5; 318/571, 573, 574

[56] References Cited

UNITED STATES PATENTS

| 3,617,715 | 11/1971 | Dummermuth | 235/151.11 |
| 3,518,513 | 6/1970 | Pomella et al. | 318/571 |
| 3,617,718 | 11/1971 | Dummermuth | 235/151.11 |
| 3,569,814 | 3/1971 | Rosenberg | 318/573 |
| 3,557,350 | 1/1971 | Proctor | 235/151.11 |
| 3,486,012 | 12/1969 | Burnett et al. | 235/151.11 |
| 3,422,325 | 1/1969 | Gerber et al. | 318/574 |
| 3,417,303 | 12/1968 | Reuteler | 318/571 X |
| 3,344,260 | 9/1967 | Lukens | 235/151.11 |

Primary Examiner—Paul J. Henon
Assistant Examiner—John O. Vandenburg
Attorney—Wolfe, Hubbard, Leydig, Voit & Osann, Ltd.

[57] ABSTRACT

Methods and apparatus for accomplishing fully automatic acceleration/deceleration in a numerical control system of the iterative computation type such that disclosed and claimed in applicant's copending U.S. application which issued on Apr. 11, 1972 as U.S. Pat. No. 3,656,124. Any step-change in the velocity called for by a multi-axis program of movement for a movable member is accomplished wholly automatically and at a predetermined rate $dV/dt$ (acceleration or deceleration) which is readily changed to be within the capability of driving servos and such that overshoot and undue time stretch are avoided. In particular, velocity is controlled by iteratively changing position servo command numbers $XSC$ and $YSC$ (for two axes) by amounts $\Delta X$ and $\Delta Y$ during each of very short, successive time periods $\Delta T$, where $\Delta X$ and $\Delta Y$ are computed during each period to be proportional to a desired velocity number $PVA$. Whenever a new velocity is to be put into effect, a second velocity number $PVC$ may be abruptly changed by a large amount, and thereafter the desired velocity number $PVA$ is incremented by a predetermined amount $\Delta V$ during each period $\Delta T$ until $PVA$ becomes equal to $PVC$, so that the acceleration or deceleration value is $\Delta V/\Delta T$. The quantity $\Delta V$ is preferably changed as a monotonic function of the velocity difference $PVC-PVA$, and to reduce time stretch may be made proportional to that difference. By "looking ahead" with computations which determine the distance which will be traveled by the movable member during deceleration from a given velocity to a lower one, the deceleration is started at an instant which results in the lower velocity being reached almost exactly at the time a given path segment is completed. The apparatus and methods are carried out with a data processing system which includes a time-shared arithmetic computer, and are equally effective whether the system is operating to perform linear or circular interpolation.

49 Claims, 45 Drawing Figures

PATENTED APR 10 1973    3,727,191

MACHINE AXES ARE X', Y' AND COORDINATES ARE
ALWAYS POSITIVE. PROGRAMMERS PART AXES
ARE X, Y AND COORDINATES MAY BE + OR -.

INVENTOR.
JOHN K. McGEE,
BY
Wolfe, Hubbard, Leydig, Voit & Osann
ATTORNEYS.

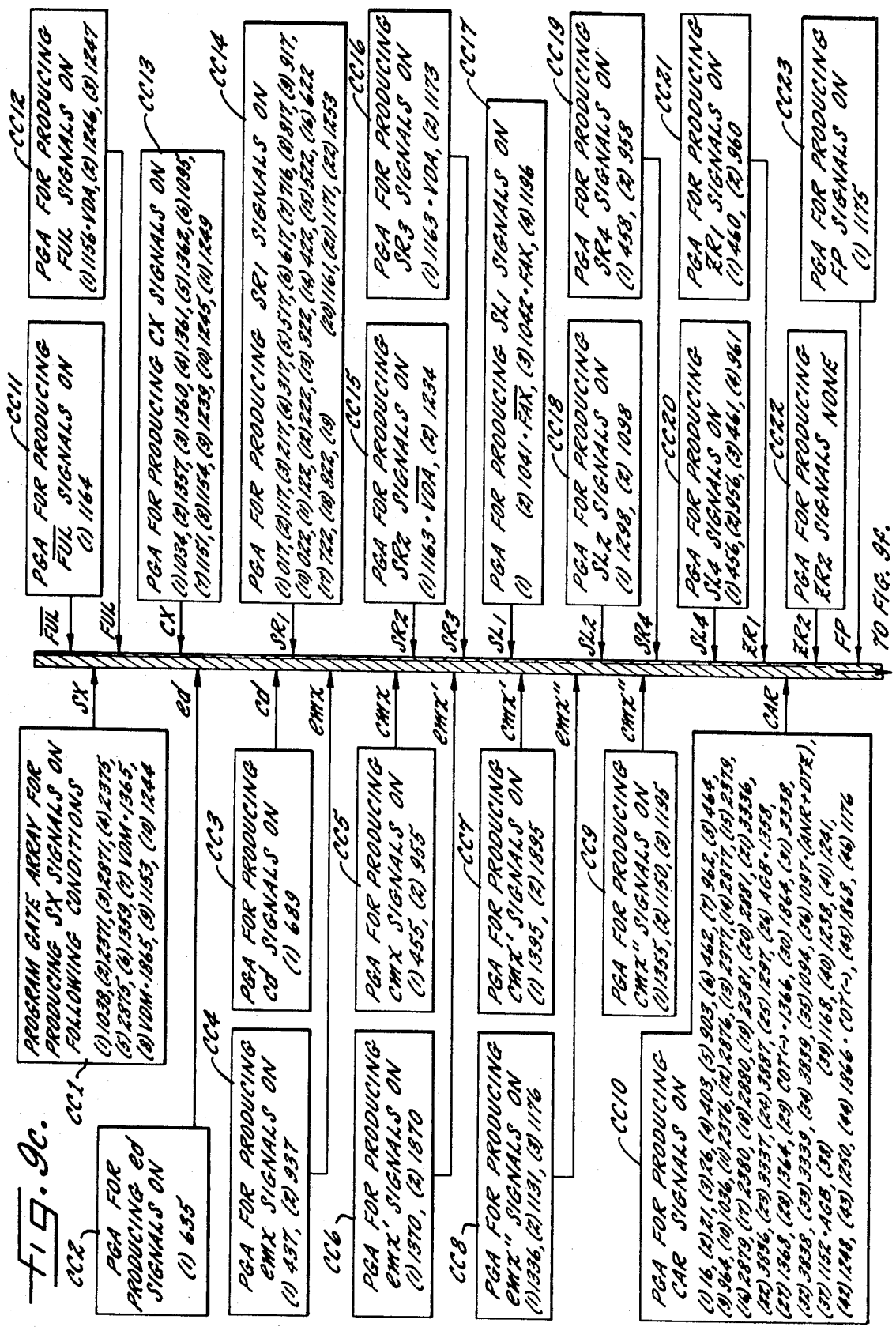

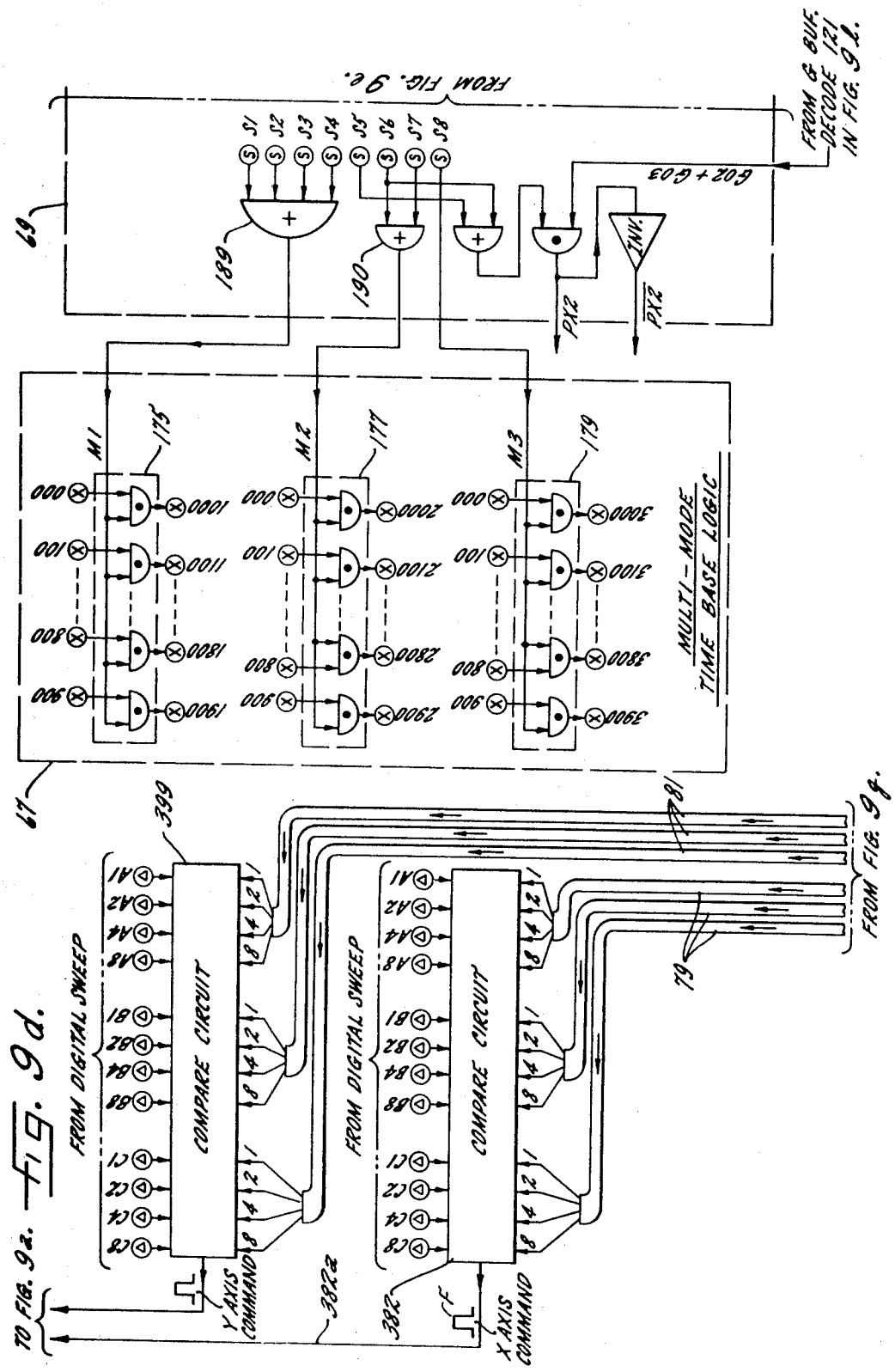

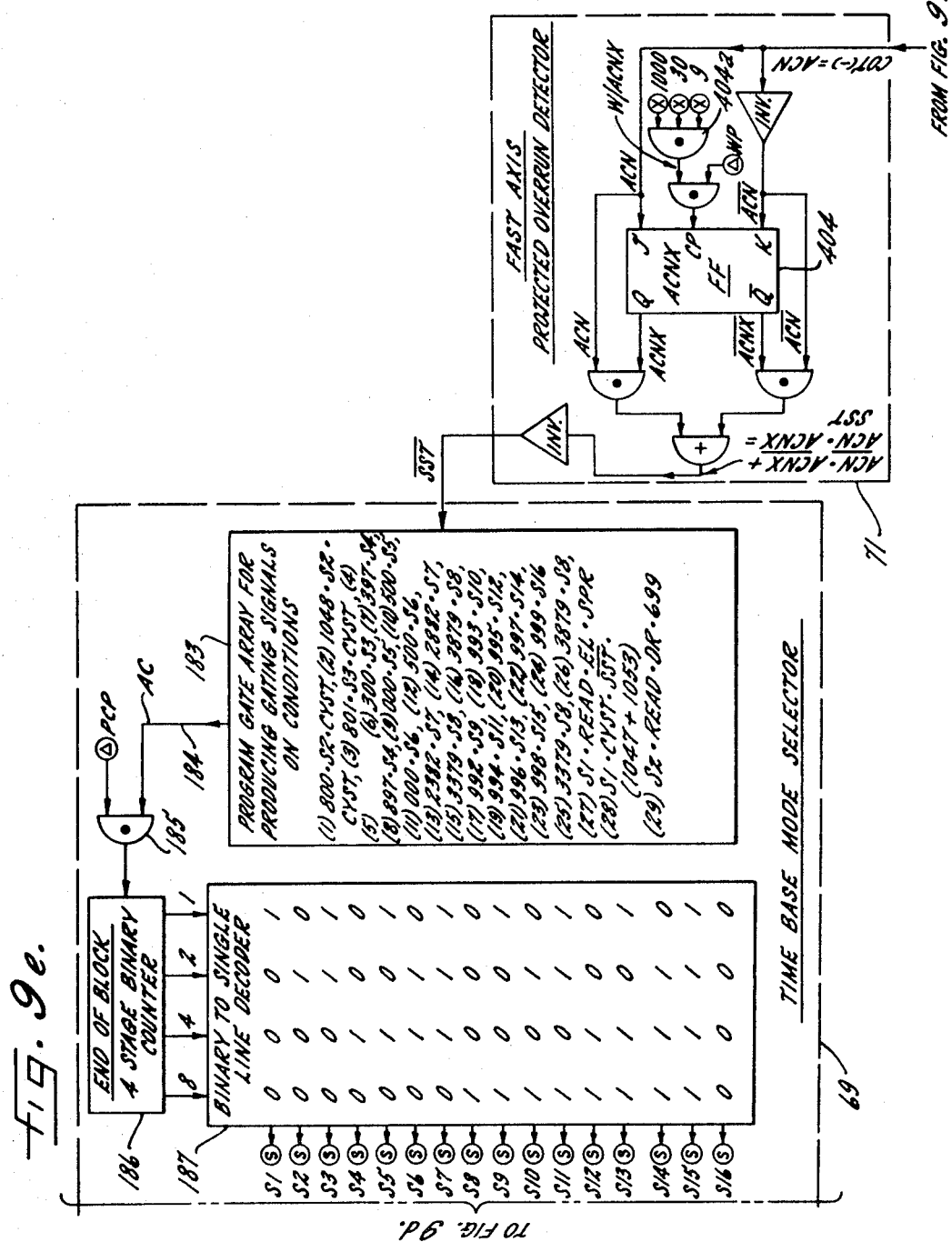

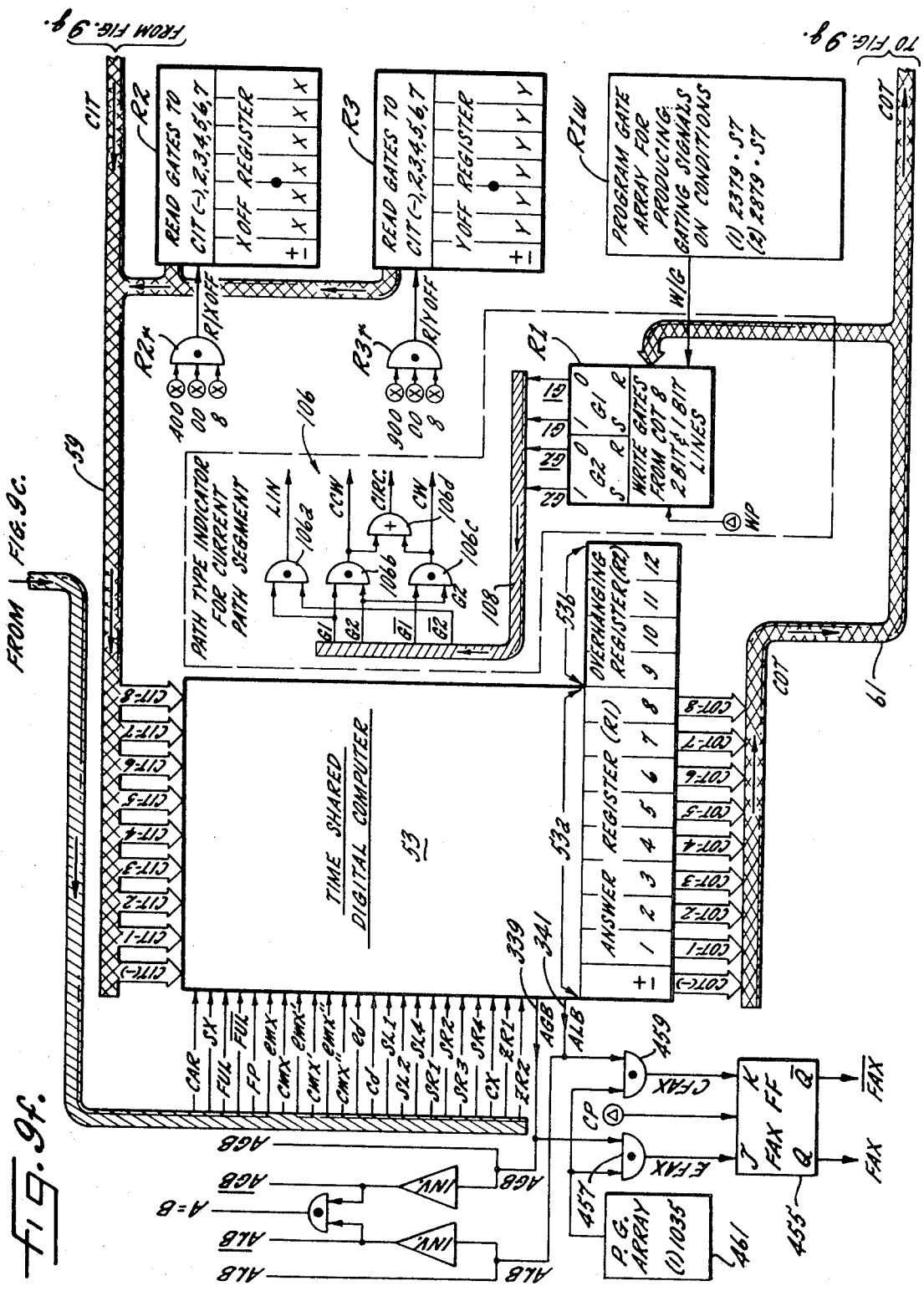

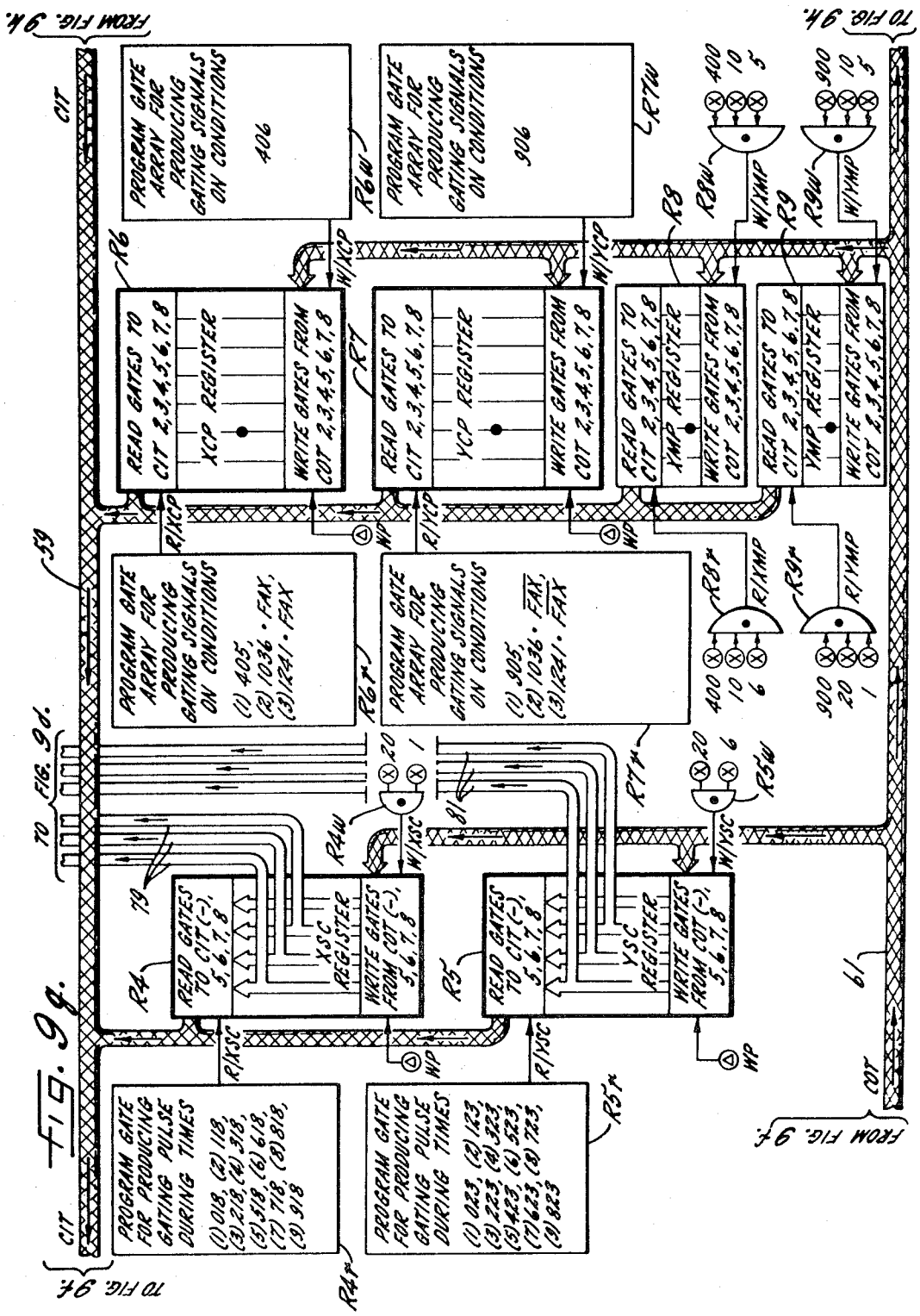

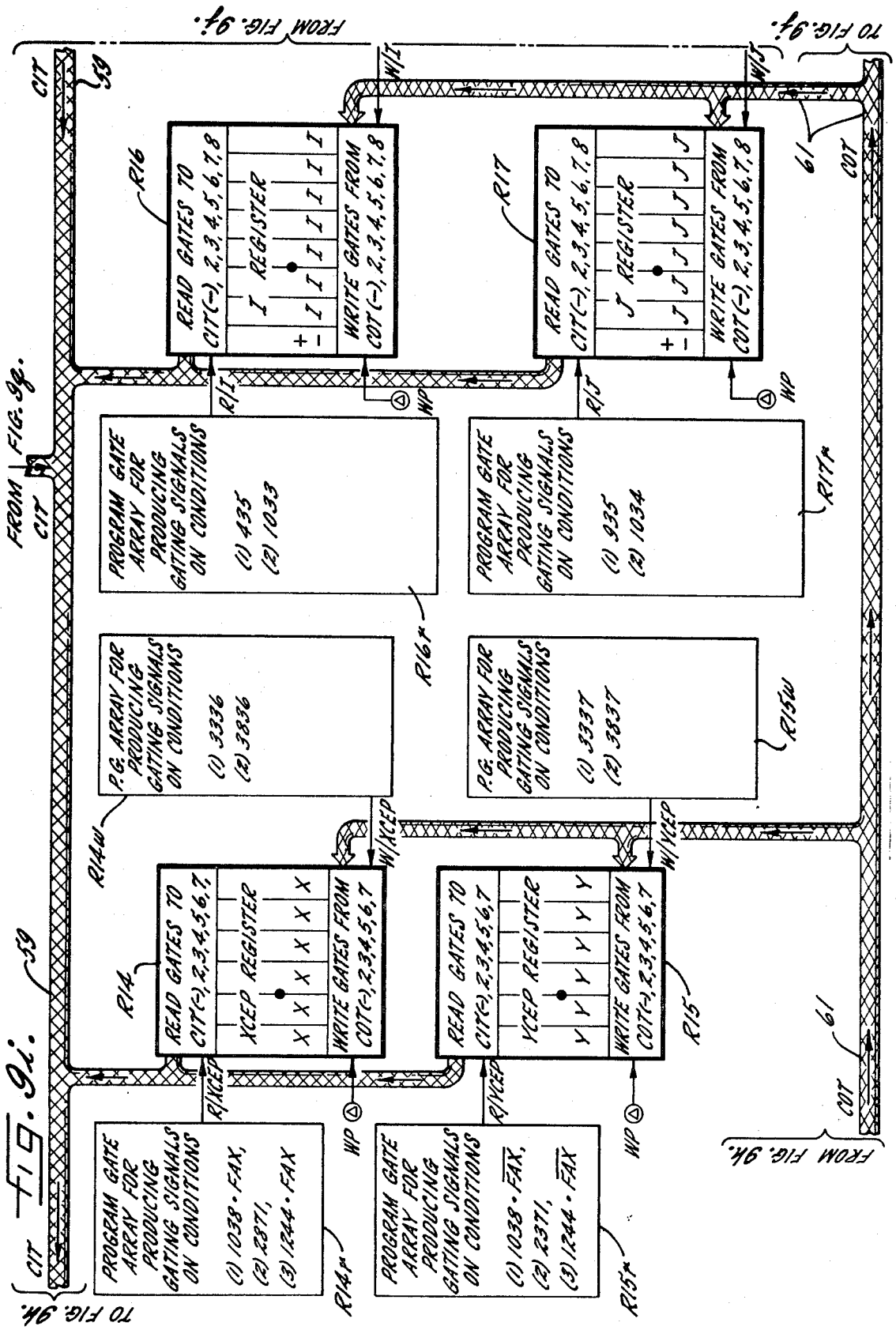

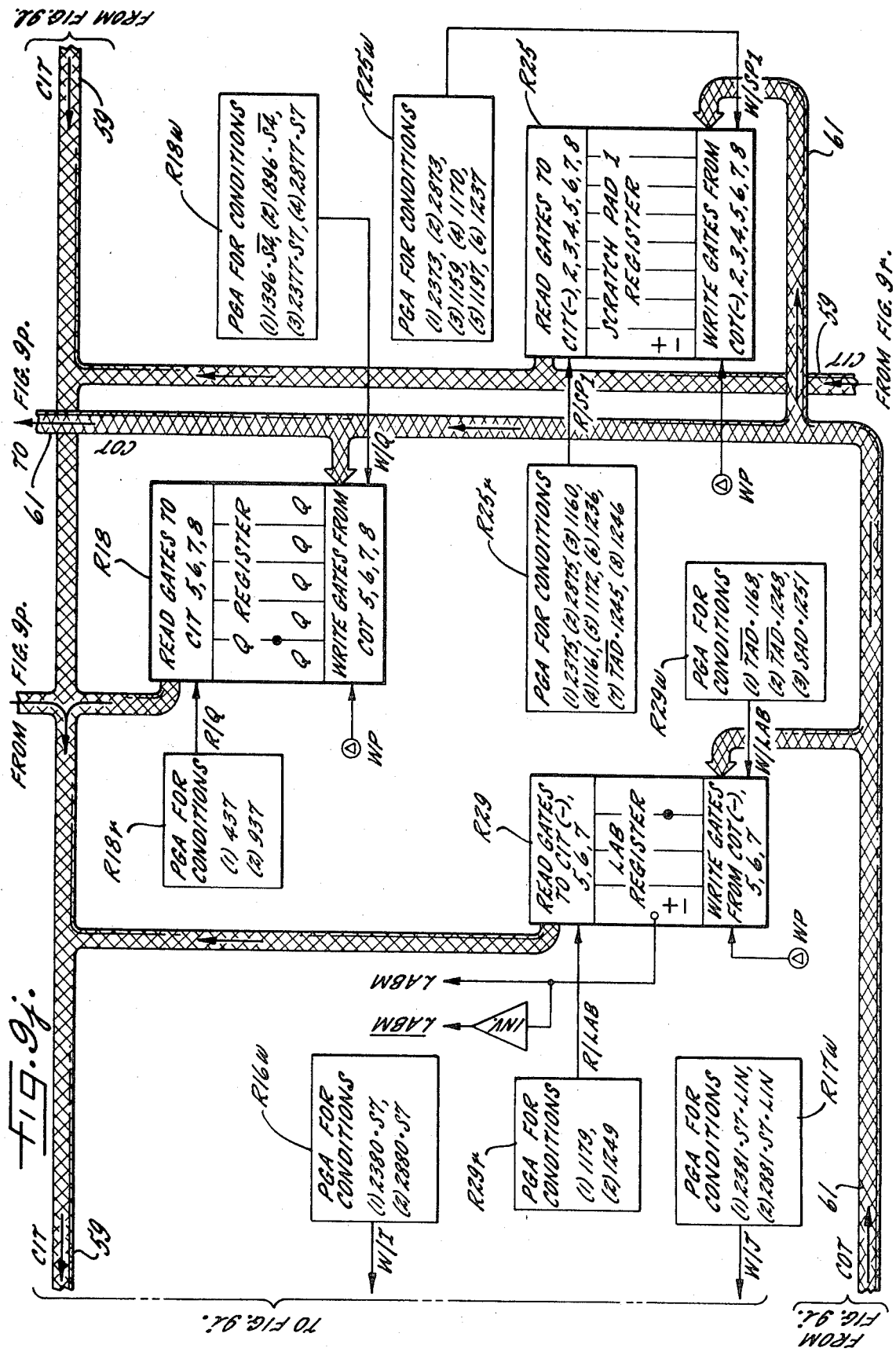

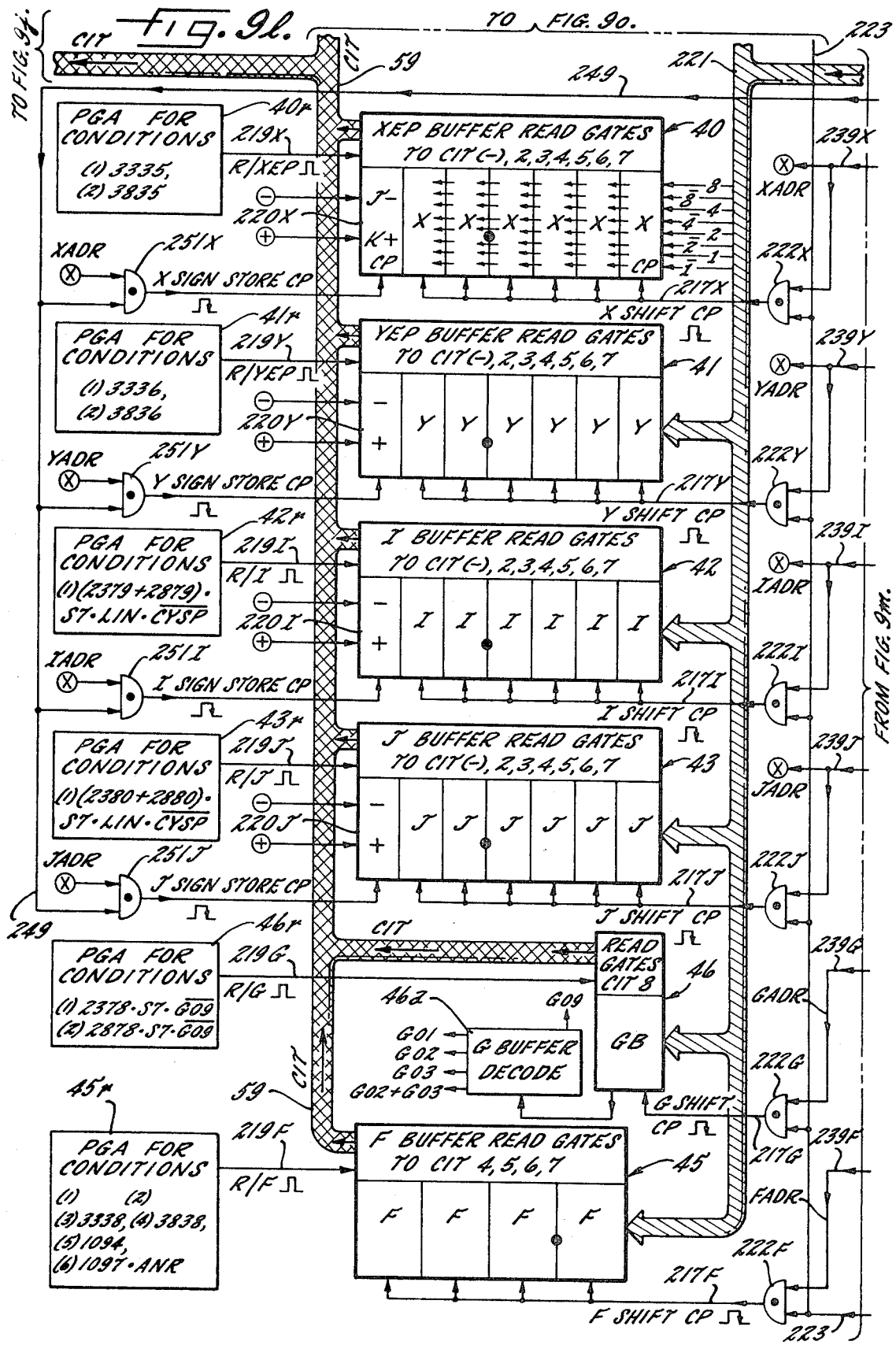

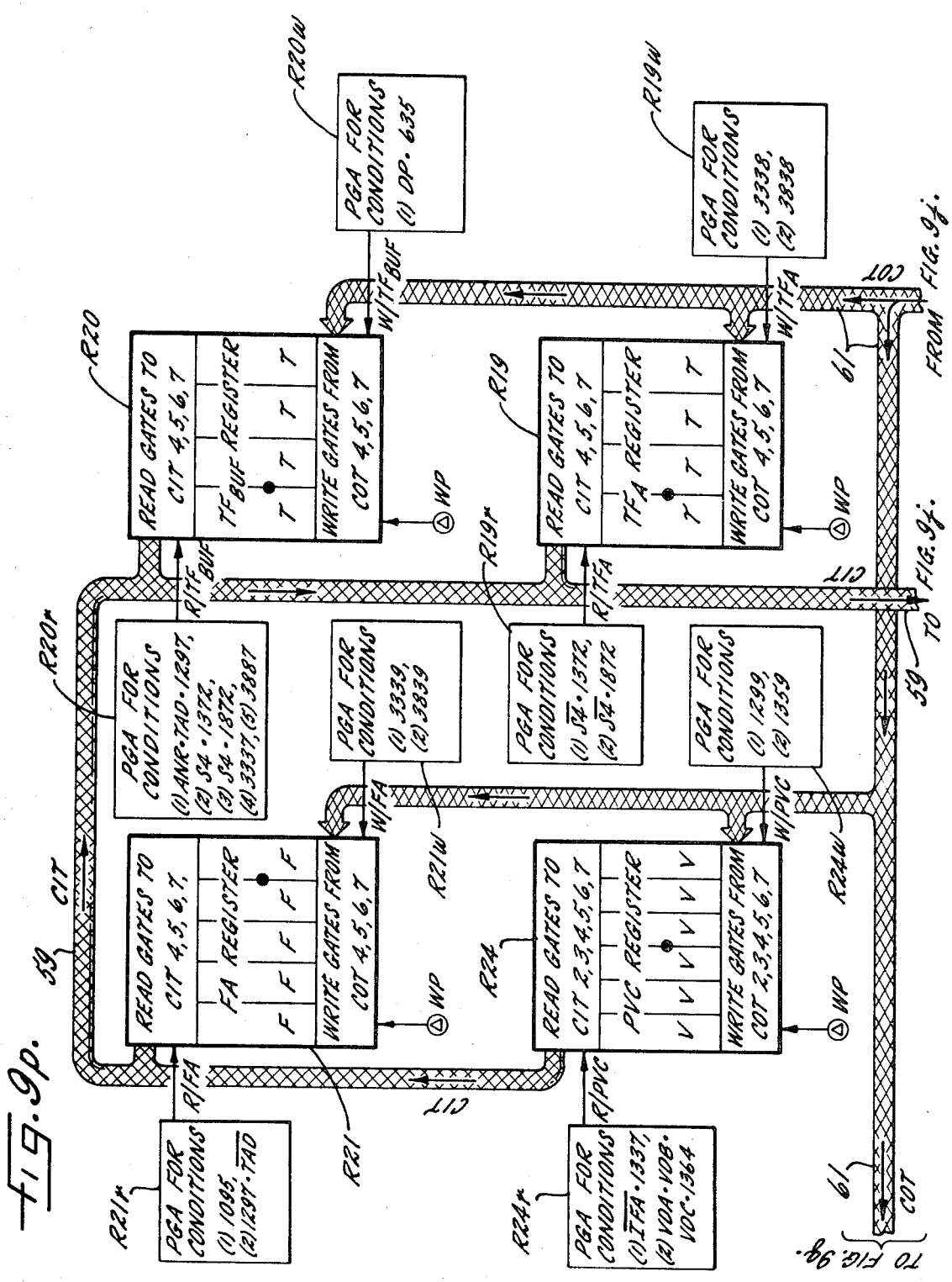

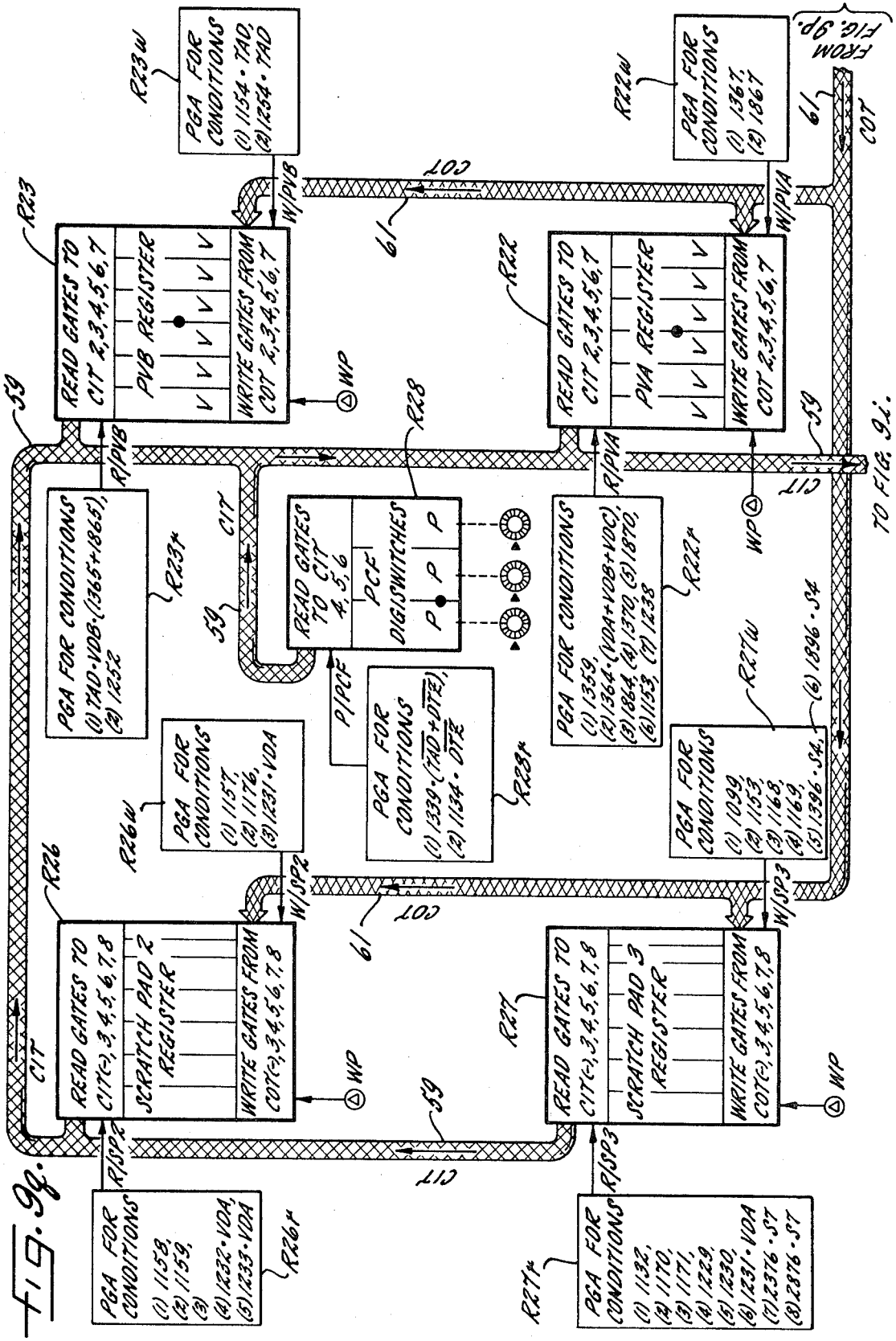

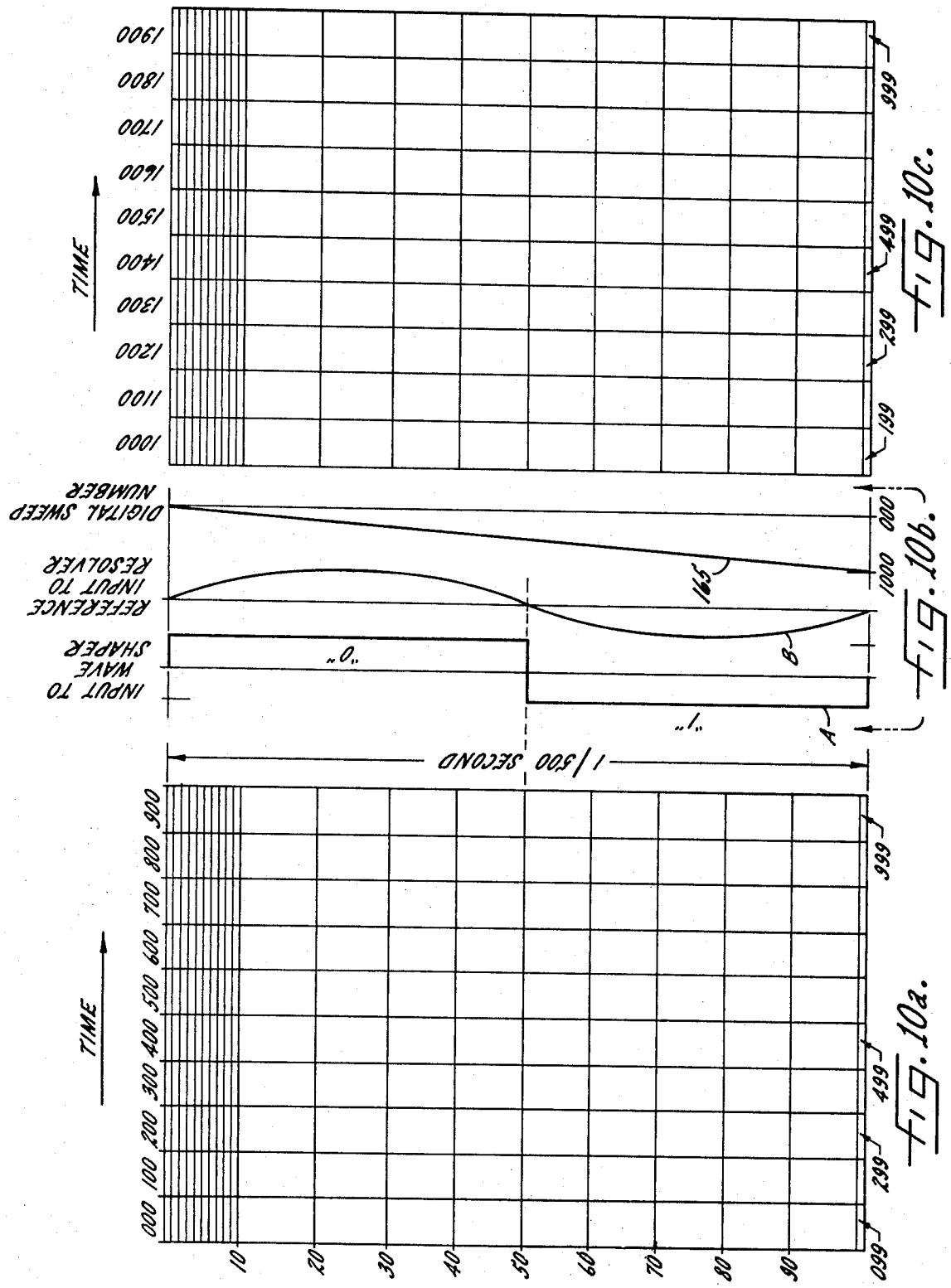

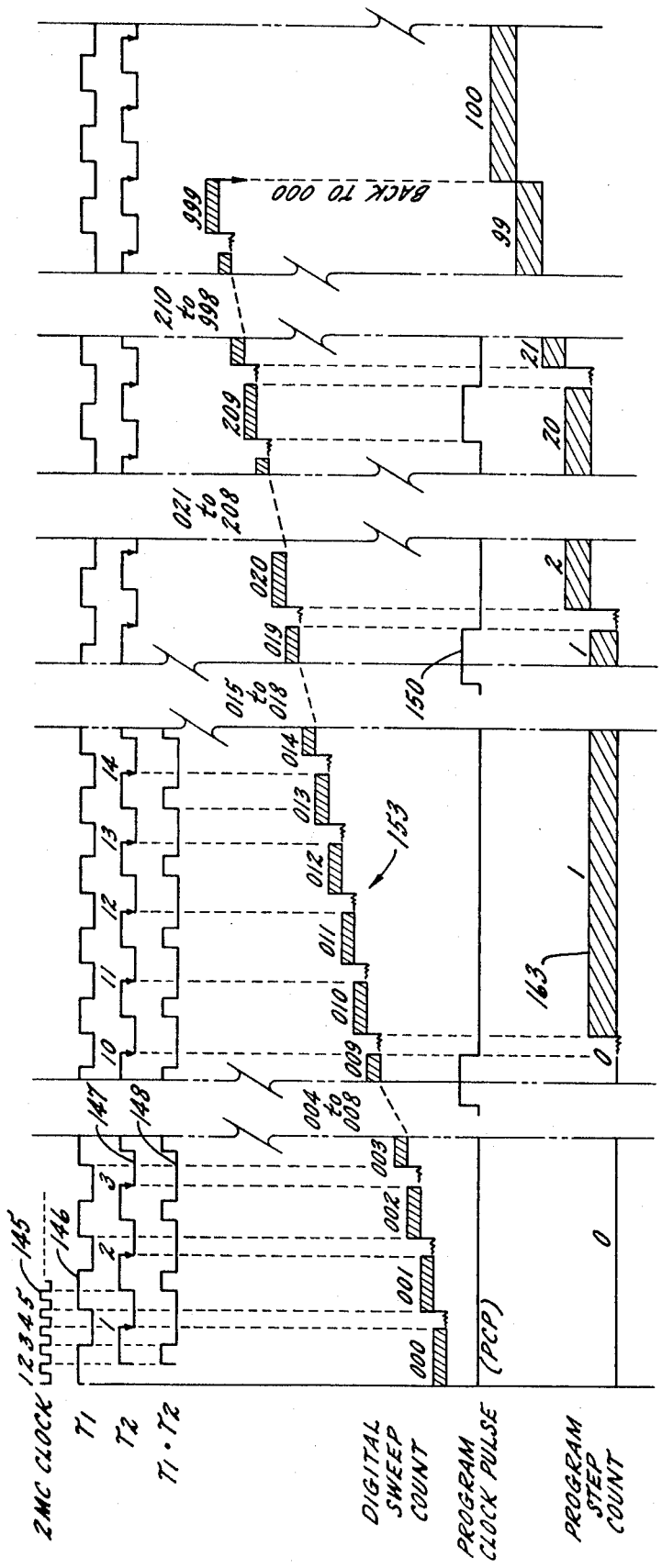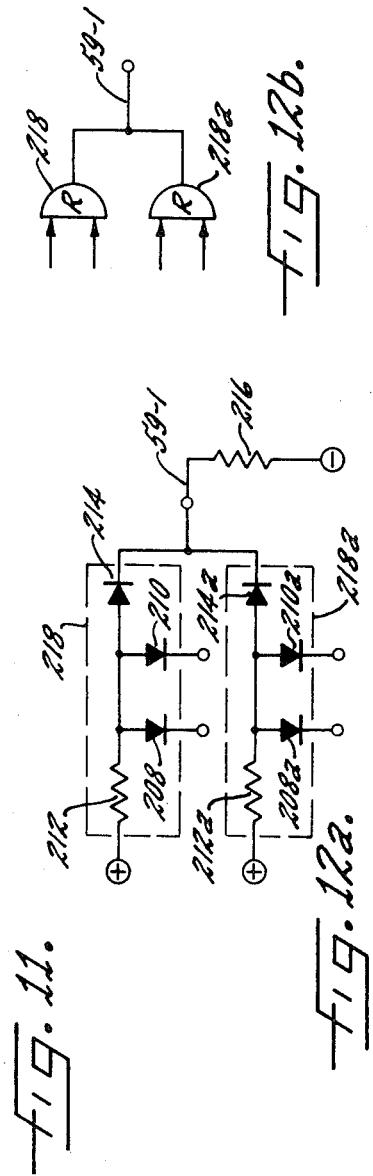
Fig. 11.
Fig. 12a.
Fig. 12b.

(CASE I)

(CASE II)

ACCELERATION-DECELERATION FOR NUMERICAL CONTROL

BACKGROUND OF THE INVENTION

The present application pertains to the incorporation of automatic acceleration/deceleration into a numerical control system of the general type disclosed in applicant's copending U.S. application which issued on Apr. 11, 1972 as U.S. Pat. No. 3,656,124. It is suggested that such earlier-filed, copending application be studied by the reader of this case to facilitate an understanding of the improvements to be described below.

The basic concept of automatic acceleration/deceleration, the reasons for its use, and the purposes which it serves have been recognized in the prior art. Although the invention here disclosed and claimed provides new and advantageous methods and apparatus for providing automatic acceleration/deceleration in an iteratively computing numerical contouring system, it may be noted here as a matter of background environment that the following patents contain disclosures which relate generally to automatic acceleration/deceleration:

| | |
|---|---|
| McDonough et al. | United States Patent 3,390,315 |
| Evans | United States Patent 3,173,001 |
| Burnett et al. | United States Patent 3,287,545 |
| Lukens | United States Patent 3,344,260 |
| Madsen et al. | United States Patent 3,411,058 |
| Reuteler | United States Patent 3,417,303 |
| Gerber et al. | United States Patent 3,422,325 |
| Burnett et al. | United States Patent 3,486,012 |

BRIEF SUMMARY OF THE INVENTION AND ITS OBJECTS

The present invention relates in general to numerical control systems wherein the movements of a movable member along one or more axes are controlled according to successive blocks of command data read sequentially into the system to cause displacement of the member along successive path segments, and at different commanded path velocities or feed rates. More particularly, the invention pertains to automatic acceleration/deceleration in such numerical control systems of the type wherein "command pulses" are not used, but instead iterative computations are performed to progressively change digitally signaled position-representing numbers which are utilized by digital servo means to keep the position of the movable member dynamically in substantial agreement with the changing numbers.

It is the general aim of the invention to make possible automatic acceleration/deceleration of the controlled member in a numerical control system of the iteratively computing type, and especially in such a system where the velocity of the movable member is determined and controlled by computing and changing the incremental displacements imparted to the member during each of successive short, identical time periods.

A more specific object of the invention is to achieve automatic acceleration/deceleration in a convenient and reliable fashion such that path program data need contain no special instructions to bring automatic acceleration/deceleration into play and yet wherein the servo drives for the movable member are never overtaxed, and overshoot of the member beyond a commanded end point is avoided.

Another object of the invention is to realize automatic acceleration/deceleration in an iteratively computing numerical control system by causing the velocity of the movable member to be controlled according to a digitally signaled velocity number, and by computing and effecting small incremental changes in that velocity number during each of successive equal short time periods whenever the velocity is to be changed from a first to a second, substantially different value.

In the latter connection, it is an object to effect either acceleration or deceleration automatically and very simply, by causing a velocity-determining number to be either incrementally increased or decreased according to the sign of the difference between an actually existing velocity and the next velocity to be reached.

It is a further object of the invention to accurately determine and control the magnitude of acceleration or deceleration ($dV/dt$) by selecting and changing the size of the incremental changes $\Delta V$ made in a velocity-controlling number PVA during successive time periods $\Delta T$. A related object is to make the magnitude of the acceleration/deceleration roughly proportional to the difference between the existing velocity and the final velocity to be reached by causing the $(\Delta V)/(\Delta T)$ value to change as a monotonic function of that difference. This reduces the time required to change from a first to a second velocity while nevertheless assuring that the desired total velocity change is not exceeded by overshoot.

Yet, another object of the invention is to make it possible for such acceleration/deceleration to be initiated either at the beginning of execution of a commanded path segment calling for a velocity different from that of the preceding segment, or at an anticipated point in the execution of a first commanded path segment where the succeeding path segment calls for a different velocity. Especially advantageous is the feature of "looking ahead" so as to initiate the acceleration/deceleration action at the instant required so that the second velocity is reached almost simultaneously with the completion of a given path segment — and this despite the fact that the actual values of acceleration/deceleration may be changed during the interval over which the total velocity change occurs.

It is a further objective to achieve a quasi-exponential rate of change of velocity (non-constant $dV/dt$) in obtaining such acceleration/deceleration, thereby making it possible to decelerate from a finite velocity to zero velocity without undue time stretch.

And it is a coordinate objective of the invention to cause a smooth deceleration of the movable member to zero velocity automatically wherever there is one of several possible conditions which require the member's motion to be stopped and even though a zero velocity has not been programmed.

These and other objectives, features and advantages of the invention will become apparent as the following detailed description proceeds with reference to the accompanying drawings which illustrate an exemplary embodiment of the methods and apparatus here claimed.

BRIEF DESCRIPTION OF THE DRAWINGS

FIGS. 9a through 9r (there is no FIG. 9k) when joined as indicated in FIG. 8 constitute a diagrammatic block diagram of an entire numerical control director system which is an exemplary embodiment of the present invention;

FIGS. 10a, 10b, 10c show how successive equal time periods $\Delta T$ (here, each one-fiftieth of a second) are subdivided into smaller time steps representable in columns and lines, and how certain related signals vary synchronously;

FIG. 11 is a graphic illustration of the operation of a timing generator shown in FIG. 9b;

FIGS. 12a and 12b illustrate details of suitable READ gates used in buffer shift registers shown in FIGS. 9l and 9o and in the arrangement of FIG. 13;

AN EXEMPLARY MACHINE TOOL

Figure 1:
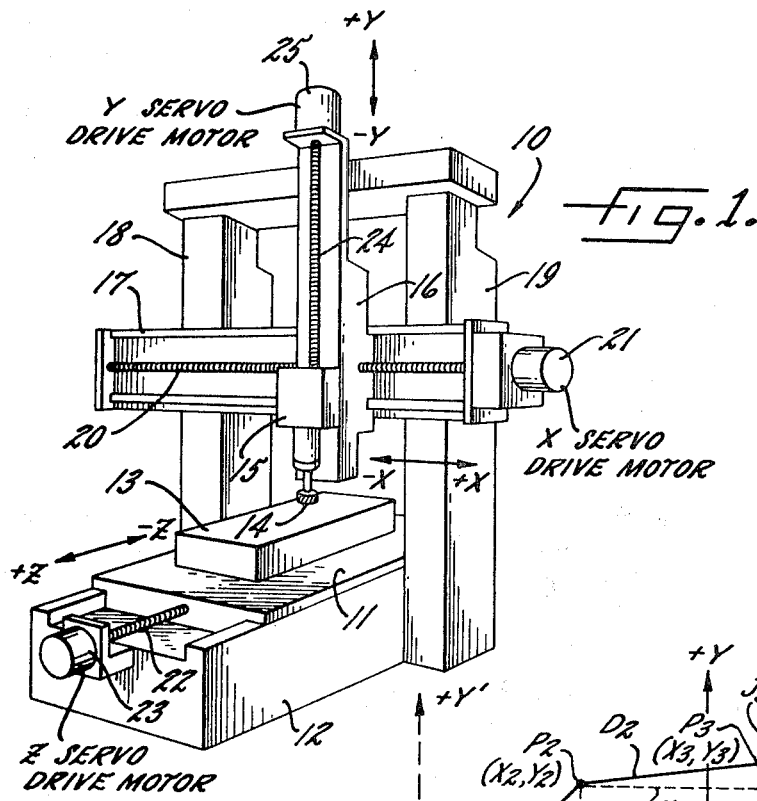
FIG. 1 is a simplified perspective view of a typical machine tool having a cutter element to be moved along multi-axis contour paths by the numerical control system.

In order to illustrate one particular environment in which the present invention will find especially advantageous use, it will be described here with reference to controlling paths described by an element of a numerically controlled milling machine along two mutually orthogonal axes. A milling machine 10 (shown in FIG. 1) is typical of the many different types of machine tools or other machines such as flame cutters, cloth cutters, drafting machines and the like which may be numerically controlled in response to digital command signals. The exemplary milling machine includes a work table 11 movable horizontally along a bed 12 and adapted to carry a workpiece 13 which is to be machined to a desired contour in the X-Y plane. A rotatably driven milling cutter 14 is mounted on, and vertically movable with, a ram 15 which is slidable within vertical ways (not shown) formed on a saddle 16, the latter in turn being movable horizontally along the ways of a rail 17 which is supported at its opposite ends by spaced columns 18 and 19. The cutting tool 14 may thus be moved along horizontal and vertical X and Y axes relative to the workpiece 13 which in turn may be moved along a Z horizontal axis at right angles to the X horizontal axis.

By proper proportioning of the X, Y and Z axis components of commanded movement and velocity, the milling tool 14 moves through the workpiece 13 along a path and at a depth to cut a desired contour thereon. To produce such controlled movement of the workpiece 13 and the cutter 14, the saddle 16 includes a nut (not shown) engaged with a lead screw 20 driven through suitable gears (not shown) by a reversible servomotor 21. As the latter motor is caused to rotate in one direction or the other at different speeds, the saddle 16 will be moved horizontally in +X or −X directions and at velocities determined by the speed of the motor. Corresponding, the ram 15 carries a nut (not shown) engaged with a vertically disposed lead screw 24 driven by a reversible servomotor 25 so that energization of that motor in one direction or the other moves the cutter 14 in +Y or −Y directions. Finally, the table 11 also carries a nut (not shown) which is engaged with a horizontally disposed lead screw 22 driven by a reversible servomotor 23 whereby the table 11 and the workpiece 13 thereon may be moved in +Z or −Z directions. To simplify the description which follows, only that part of the numerical control associated with the X and Y axis drive motors 21 and 25 will be illustrated. It will be understood by those skilled in the art, however, that such a control may be modified without departing from the scope of the invention to accommodate the third or Z axis servomotor 23, and indeed to control simultaneous motions along as many axes as might be desired.

THE GENERAL NATURE OF THE CONTOURING OPERATION

In order that the acceleration-deceleration features to be described below will be fully understood, it is necessary for the reader first to have in mind the basic operations and apparatus by which contouring is accomplished through iterative computations carried out during different time steps within successive equal time periods $\Delta T$. For this purpose an introductory description will here be presented in summary form, and it is suggested that the reader study applicant's above-identified copending application now issued as U.S. Pat. No. 3,656,124 (hereafter called "said copending application") for any supplemental details which are desired.

In general, contouring is accomplished by "parts programming" to define in numerical terms the successive connected motion segments which collectively constitute a desired path along two or more axes. Any segment may be defined in numbers appropriate to and then executed by linear, circular, or parabolic interpolation — and while the invention may be utilized with any of these, the present disclosure will, for brevity, be described in connection with successive segments of linear interpolation. Those skilled in the art will be able readily to apply the teachings here disclosed to circular or parabolic interpolation.

The successive segments of a path are designated in the first instance by successive "blocks" on a digital record medium, such as a punched paper tape. Each block contains a numerical representation of the X and Y axis departures which in vector combination make up the vector a segment D. Each block may further contain numerical representations of the desired path velocity or feed rate $F$, and different auxiliary function codes designating the type of path segment or certain different special modes of operation.

Figure 2:
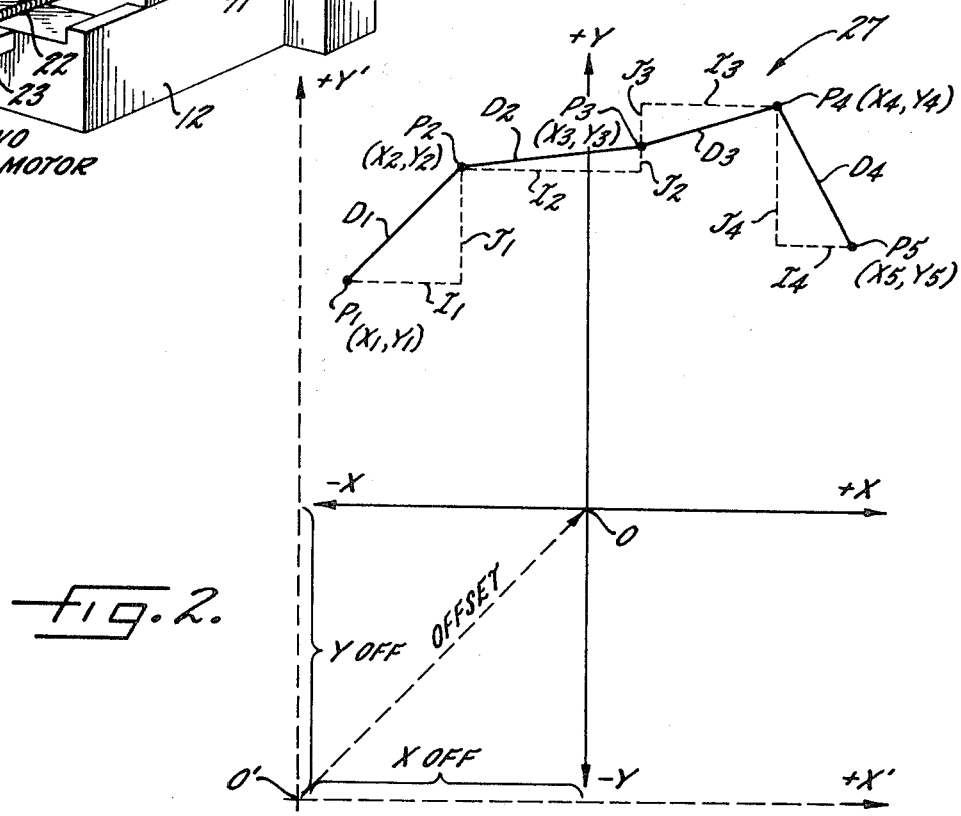
FIG. 2 is a graphical illustration of a typical path to be executed, by motions along two axes, through successive linear segments, and with reference to part coordinates and machine coordinates.
Figure 5:
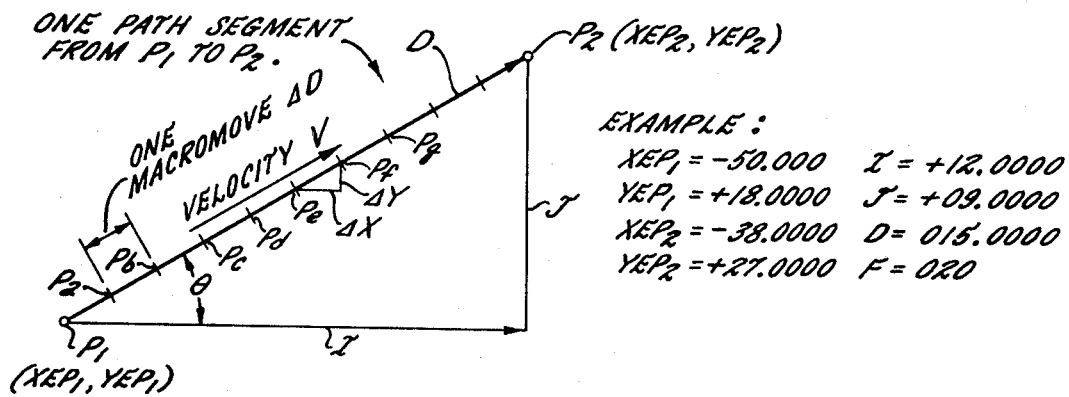
FIG. 5 is a vector diagrammatic illustration of how each path segment is made up of $I$ (X axis) and $J$ (Y axis) components and measured off by successive macromoves executed in successive equal time periods $\Delta T$.

As shown in FIG. 2, any desired arbitrary or mathematically definable curve may be approximated by a path 27 which is made up of connected linear path segments $D_1$, $D_2$, $D_3$, $D_4$ and the accuracy of approximation to a smooth curve may be achieved by choosing the lengths of the successive segments to be relatively small. These segments may each be defined numerically with reference to the X and Y axes having an origin O — and it is a well known technique for a "parts programmer" to make up successive blocks of numerical data to designate the successive commanded segments of motion. As shown in FIGS. 2 and 5, segments $D_1$, $D_2$, $D_3$, $D_4$ respectively lie between the points P1–P2, P2–P3, P3–P4, P4–P5. The X and Y axis components of any segment are designated I and J, and the segment thus lies at an angle $\theta$ (relative to the X axis) whose sine is $J/D$ and whose cosine is $I/D$. Frequently it will be desirable to program segments in terms of coordinates rather than $I$ and $J$ component distances, and (as shown in FIG. 5) if the coordinates of the starting and ending Points P1 and P2 of any segment are given, then the calculations $$XEP_2 - XEP_1 = I$$

$$YEP_2 - YEP_1 = J$$

$$\sqrt{I^2 + J^2} = D$$

may readily be performed either prior to making a punched tape record or within the "director" or control system which reads that record for its input data.

The part programmer's or part coordinates (measured relative to the origin O in FIG. 2) may not agree numerically with the machine coordinates which are numerically measured from a datum point or origin O' on the machine tool 10 (FIG. 1). Thus, FIG. 2 shows a second set of offset axes X' and Y' and the data processing system (i.e., "director") to be described automatically takes into account the offsets XOFF and YOFF. It will be clear that a point expressed in numerical coordinates XEP, YEP relative to the origin O may be expressed in corresponding coordinates $$XMP = XEP + XOFF$$

$$YMP = YEP + YOFF$$

relative to the origin O'. For the time being only the axes X, Y and the origin O need be considered, and the conversion to machine coordinates within the director will be described later.

Figure 3:
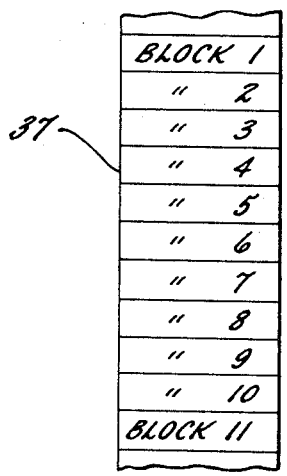
FIG. 3 is a general representation of a numerical record, such as a punched tape, containing successive blocks of program data corresponding to successive path segments.
Figure 4:
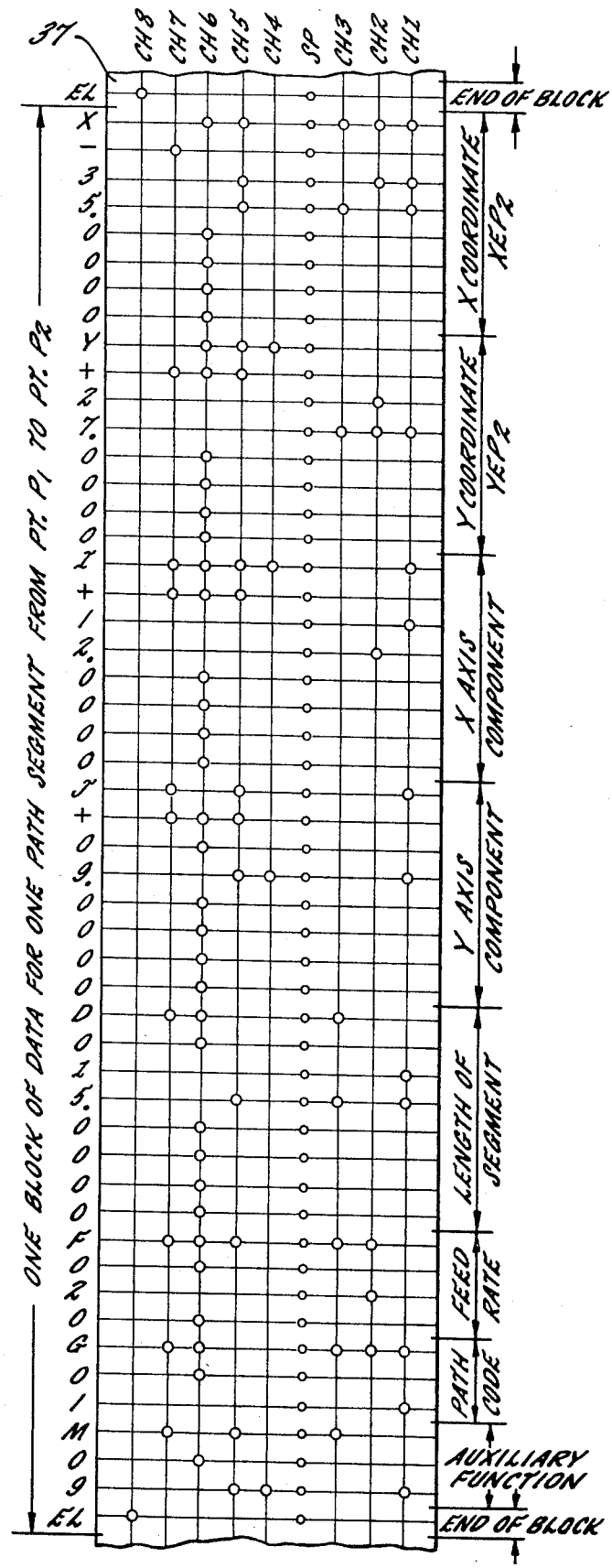
FIG. 4 is an illustration of one block of data for one path segment as represented by rows of punched holes in successive lines of a punched paper tape.

A source of digital input commands, defining the successive segments of a desired path, may be made in the form of a punched tape 37 (FIG. 3) wherein each segment is "commanded" by one block of data, and the successive segments are defined by the blocks which appear successively lengthwise along the tape. One typical "block" of data is shown in FIG. 4 on a punched paper tape having eight lengthwise columns (channels) plus a column of sprocket holes $Sp$, and wherein any alphanumeric character may be represented by the pattern of holes punched in one transverse row, according to the well-known EIA code. Although the tape format and word address characters may vary widely, FIG. 4 indicates that (for purposes of the present exemplary disclosure) a block of data includes the end point coordinates $XEP_2$, $YEP_2$ of (see FIG. 5) the defined segment, the X and Y axis components I and J for that segment, the segment length $D$, the desired path velocity or feed rate $F$, the path code G, and possibly an auxiliary code M. Each "block" ends with an "end of block" character EL. Each "word" within a block begins with an address character which designates the nature of the number defined by the decimal digit values immediately following, and where an appropriate algebraic sign character is included in the word. From inspection, the example of FIG. 4 shows a block of data comprising:

| | |
|---|---|
| X end point coordinate or $XEP_2 =$ | X − 35.0000 inches |
| Y end point coordinate or $YEP_2 =$ | Y + 27.0000 inches |
| X axis component or I = | I + 12.0000 inches |
| Y axis component or J = | J + 09.0000 inches |
| Segment Distance or D = | D 15.0000 inches |
| Velocity or Feed Rate F = | F 020 inches/min. |
| Path Mode (linear or circular) = | G01 (designates linear) |
| Auxiliary Function Code = | M09 |
| End of Block = | EL |

The commanded feed rate, path mode and auxiliary function data need not appear in every block, and if they are absent, the system will use those commands last read from a block in which such data appeared.

The punched tape 37 of FIG. 2 with the format of FIG. 4 may be read, one block at a time, by a conventional and well-known tape reader 39 (FIG. 9m) to create corresponding electrical signals digitally representing the successive alpha-numeric characters. The director system illustrated by FIGS. 9a–r then causes the servomotors 21 and 25 to move the controlled element (cutter 14) simultaneously along the X and Y axes to execute the command segments at the commanded composite feed rates, as will be more fully described.

ITERATIVE COMPUTATIONS FOR PATH GENERATION

Broadly speaking, the director to be described measures off a continuous succession of equal, recurring time periods which are of relatively short duration. Such time periods are here designated $\Delta T$ and will be assumed (merely by way of example) each to be 20 milliseconds, i.e., 1/50 second, in duration. During each such time period, servo command numbers $XSC$ and $YSC$ are updated or changed by computed amounts $\Delta X$ and $\Delta Y$. A digital-to-analog converter and a drive servo system act to energize the motors 21 and 25 such that the actual coordinate positions of the controlled member (cutter 14) are kept dynamically in substantial agreement with the instantaneous values of the rapidly changing $XSC$ and $YSC$ numbers. In other words, command numbers $XSC$ and $YSC$ are periodically updated by amounts $\Delta X$ and $\Delta Y$ such that the numbers successively represent X and Y axis positions which are to be reached during successive short periods $\Delta T$ in order to make the controlled element move at X and Y axis component speeds which make the resultant path velocity have the desired or commanded feed rate value.

Referring to FIG. 5, assume that the controlled element is to be moved through the segment $D$ at a path velocity $V$. For this purpose, the numerically signaled X and Y axis servo command numbers are changed respectively by amounts $\Delta X$ and $\Delta Y$ during each period $\Delta T$ such that the element moves at the velocity $V$ through a composite distance $\Delta D$, where $(\Delta X/\Delta D) = I/D$ and $(\Delta Y/\Delta D) = J/D$. The element thus, in effect, moves from point $P_1$ to point $P_a$ to point $P_b$ and so on during successive periods $\Delta T$, making what are here called "macromoves" $\Delta D$ from point to point during each such period. The quantities $\Delta X$ and $\Delta Y$ may be called macromove components, and the coordinates at successive points $P_1$, $P_a$, $P_b$ ...may be called macroposition coordinates.

Figure 6:
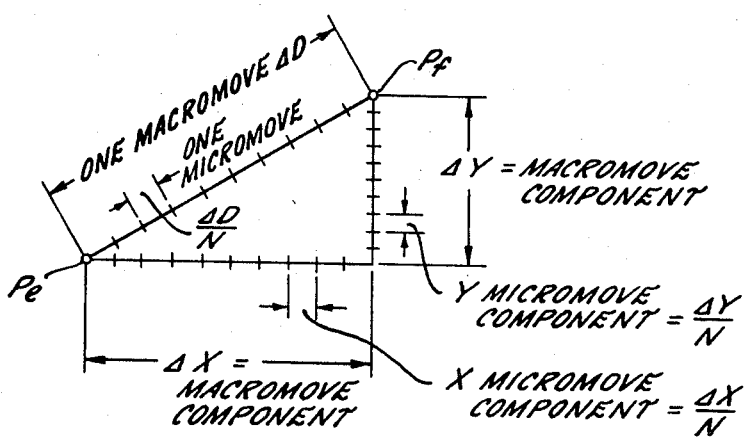
FIG. 6 is a corresponding vector diagram showing how each macromove is divided into micromoves.

In the preferred arrangement each macromove is subdivided into a predetermined number $N$ of micromoves which are respectively executed in shorter, regularly recurring time periods $(\Delta T)/N$. The single macromove $\Delta D$ between the points $P_e$ and $P_f$ is shown in FIG. 6 divided into ten micromoves $(\Delta D)/N$ where $N$ is assumed, for example, to be 10. Thus, in effect, the servo command number XSC and YSC mentioned above are changed by 0.1 $\Delta X$ and 0.1 $\Delta Y$ during each time period 0.1 $\Delta T$ so that the servo drive systems receive fresh information frequently to keep the movable element "on course." Assuming that $\Delta T$ is 20 milliseconds, then each microperiod of $(\Delta T/N)$ will be 2 milliseconds where $N = 10$.

From what has been said, it may now be seen with reference to FIGS. 5 and 6 that the length of the successive macromoves is determined solely by the values of the desired velocity $V$ and the time periods $\Delta T$, viz:

$$\Delta D = V \cdot \Delta T \quad (1)$$

Since the path segment triangle (FIG. 5) with hypotenuse $D$ is similar to the micromove triangle (FIG. 6) with hypotenuse $\Delta D$, it follows that $$(\Delta X/I) = (\Delta Y/J) = (\Delta D/D) \quad (2)$$

From substitution in equations (1) and (2), it may be seen that $$\Delta X = I \cdot (V \cdot \Delta T)/D \quad (3)$$

$$\Delta Y = J \cdot (V \cdot \Delta T/D) \quad (4)$$

Merely for convenience, the symbol $Q$ may be employed to represent the quantity $(V \cdot \Delta T/D)$, so that the last two equations may be written simply $$\Delta X = I \cdot Q \quad (5)$$

$$\Delta Y = J \cdot Q \quad (6)$$

with the understanding that $$Q = (V \cdot \Delta T)/D \quad (7)$$

Similarly, for convenience, the quantity $(\Delta T)/D$ may be called a "time factor" $TF$, and if the expression $$TF = (\Delta T)/D \quad (8)$$

is kept in mind, then $$Q = V \cdot TF \quad (9)$$

and $$\Delta X = I \cdot V \cdot TF \quad (10)$$

$$\Delta Y = J \cdot V \cdot TF \quad (11)$$

In the detailed description to follow, the desired or commanded velocity is designated by the symbol $PVA$, $PVC$ or $PVB$ (resulting from the words "path velocity actual," "path velocity computed" or "path velocity buffer"). Thus, equations (10) and (11) will sometimes hereinafter be referred to by the expressions $$\Delta X = I \cdot PVA \cdot TF \quad (12)$$

$$\Delta Y = J \cdot PVA \cdot TF \quad (13)$$

Incidentally, in the foregoing equations, it is assumed that the velocity $V$ is expressed in inches per minute. To provide consistency of units, the distances (such as $D$, $I$, $J$, $\Delta X$, etc.) are expressed in inches and the time period $\Delta T$ is expressed in minutes. The time period $\Delta T$ is selected by design choice and does not vary or change. Assuming each period $\Delta T$ to be one-fiftieth second, then each period is $(1/50) \times (1/60)$ minutes, which becomes a constant of $1/3{,}000 = 0.333 \times 10^{-3}$ minutes. Thus, equation (8) may be written $$TF = (0.333 \times 10^{-3})/D \qquad (8a)$$

if one assumes that $\Delta T$ is always one-fiftieth second.

To give a concrete example, and with $\Delta T = 1/50$ seconds, if a given block of data cells for a path velocity of 1.5 in./min. and a segment length $D$ of .5 inch with $I$ and $J$ components of .3 inch and .4 inch, then from equation (8)

$TF = \Delta T/D = (0.3333 \times 10^{-3})/0.5 = 0.666 \times 10^{-3}$ minutes/inch and from equation (9)
$Q = V \cdot TF = 1.5 \times .666 \times 10^{-3} = 10^{-3}$ (dimensionless) and from equations (5) and (6)

$$\Delta X = I \cdot Q = 0.3 \times 10^{-3} \text{ inches}$$

$$\Delta Y = J \cdot Q = 0.4 \times 10^{-3} \text{ inches}$$

This means that in the present example, the controlled element is to be moved 0.3 thousandths of an inch along the X axis and 0.4 thousandths of an inch along the Y axis during each one-fiftieth second. The micromoves of $$(\Delta X)/10 = (0.3 \times 10^{-3})/10 = 0.3 \times 10^{-4} \text{ inches}$$

$$(\Delta Y)/10 = (0.4 \times 10^{-3})/10 = 0.4 \times 10^{-4} \text{ inches}$$

will thus be executed in each successive microperiod of one five-hundredths second. The average velocity along the X axis will be:
$0.3 \times 10^{-4} \ 1/(500)$ inches/sec. $= 0.3 \times 10^{-4} \times 500 \times 60 = 0.9$ inches/min. and the average velocity along the Y axis will be
$0.4 \times 10^{-4} \ 1/(500)$ inches/sec. $= 0.4 \times 10^{-4} \times 500 \times 60 = 1.2$ inches/min. The composite velocity V along the path will be $$V_d = \sqrt{V_x^2 + V_y^2} = \sqrt{(.9)^2 + (1.2)^2} = 1.5 \text{ inch/min.}$$

This checks and confirms the originally assumed path velocity of 1.5 in./min. for the present example. It may be observed as a matter of interest that in executing a path segment of .5 inch at a rate of 1.5 inch/min., a total of one-third minute or 20 seconds will be required. This means that there will be 1,000 macroperiods of one-fiftieth second each, so that the distance of .5 inch will be divided into 1,000 macromoves and a total of 10,000 micromoves. Because such small and frequent "updates" to the servo command numbers are used, the servos may operate with relatively high instantaneous accuracy.

Figure 7:
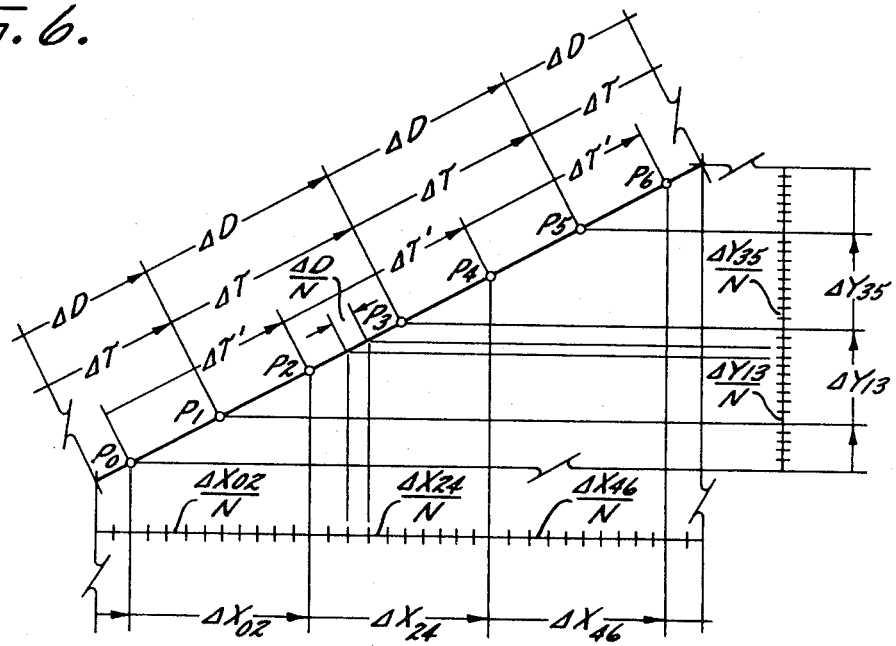
FIG. 7 is a diagram depicting how successive macromove components along the X and Y axes are staggered in time relative to one another.

In the preferred arrangement here to be described, the servo command numbers $XSC$ and $YSC$ are not updated simultaneously to new macroposition numbers. Rather, as described in said copending application, and as illustrated by FIG. 7, the two updating instants are "staggered" so that one occurs midway through a time period $\Delta T$ and the other occurs substantially at the end of such time period. As a convenient way of discussing such staggering, it may be considered (although it is not in fact the actual practice) that two separate series of time periods $\Delta T$ and $\Delta T'$ are measured off with each $\Delta T$ staggered to overlap half of a $\Delta T'$ period (see FIG. 7). During each period $\Delta T'$ the X axis commanded position number $XSC$ changes in N micromoves $(\Delta X)/N$ from one X axis macroposition to the next along a series of spaced points $P_0, P_2, P_4$, etc. During each of the periods $\Delta T$, the Y axis command position number YSC changes in N micromoves $(\Delta Y)/N$ from one Y axis macroposition to the next along a second, interlaced series of spaced points $P_1, P_2, P_5$, etc. The macromove target points thus are alternated along the desired path segment, but the composite velocity along the path is unaffected and all of the equations set forth above remain valid.

The foregoing general explanation of the iterative calculations will become more clear as the director system and its operation are described.

THE DIRECTOR ORGANIZATION

Figures 8, 9A:
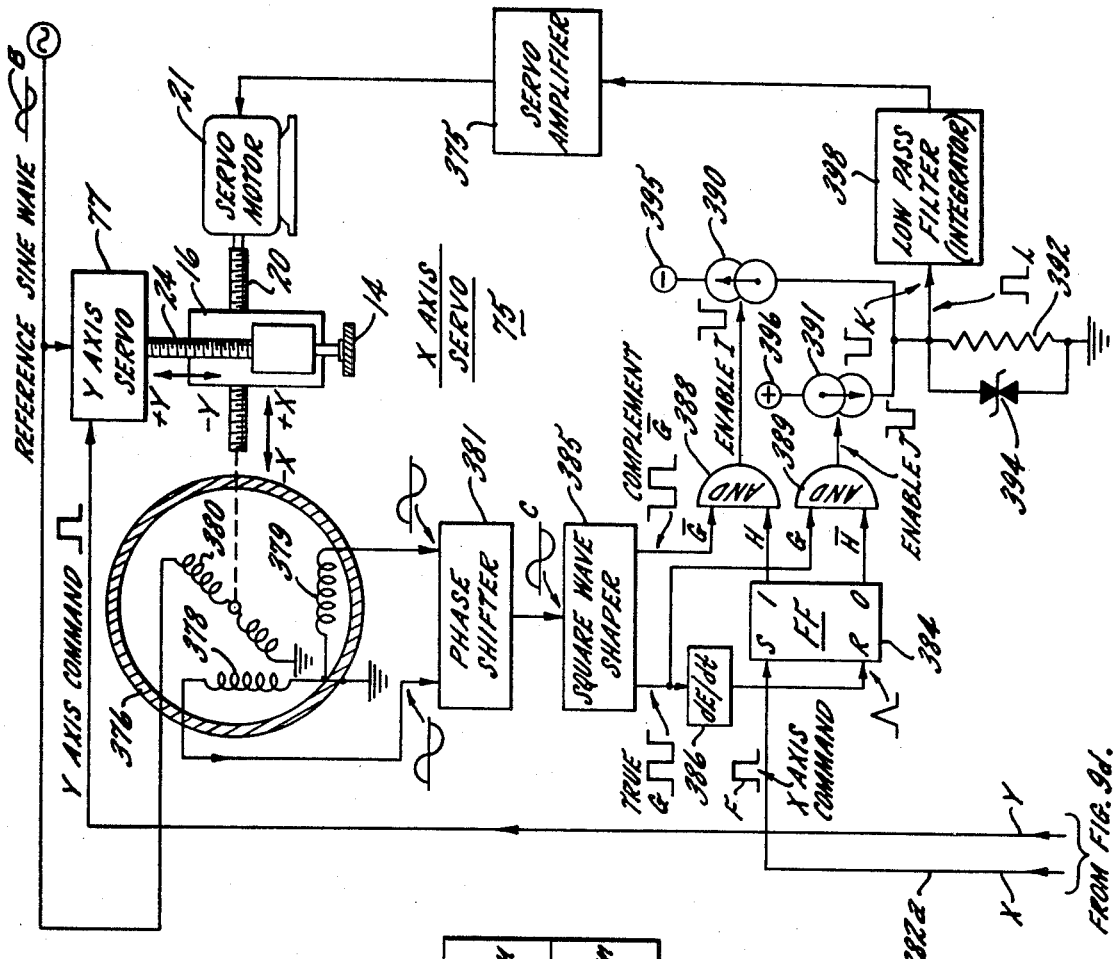
FIG. 8 is a chart which indicates how the several
FIGS. 9a through 9r are to be joined together to form a composite FIG. 9.
Figure 9B:
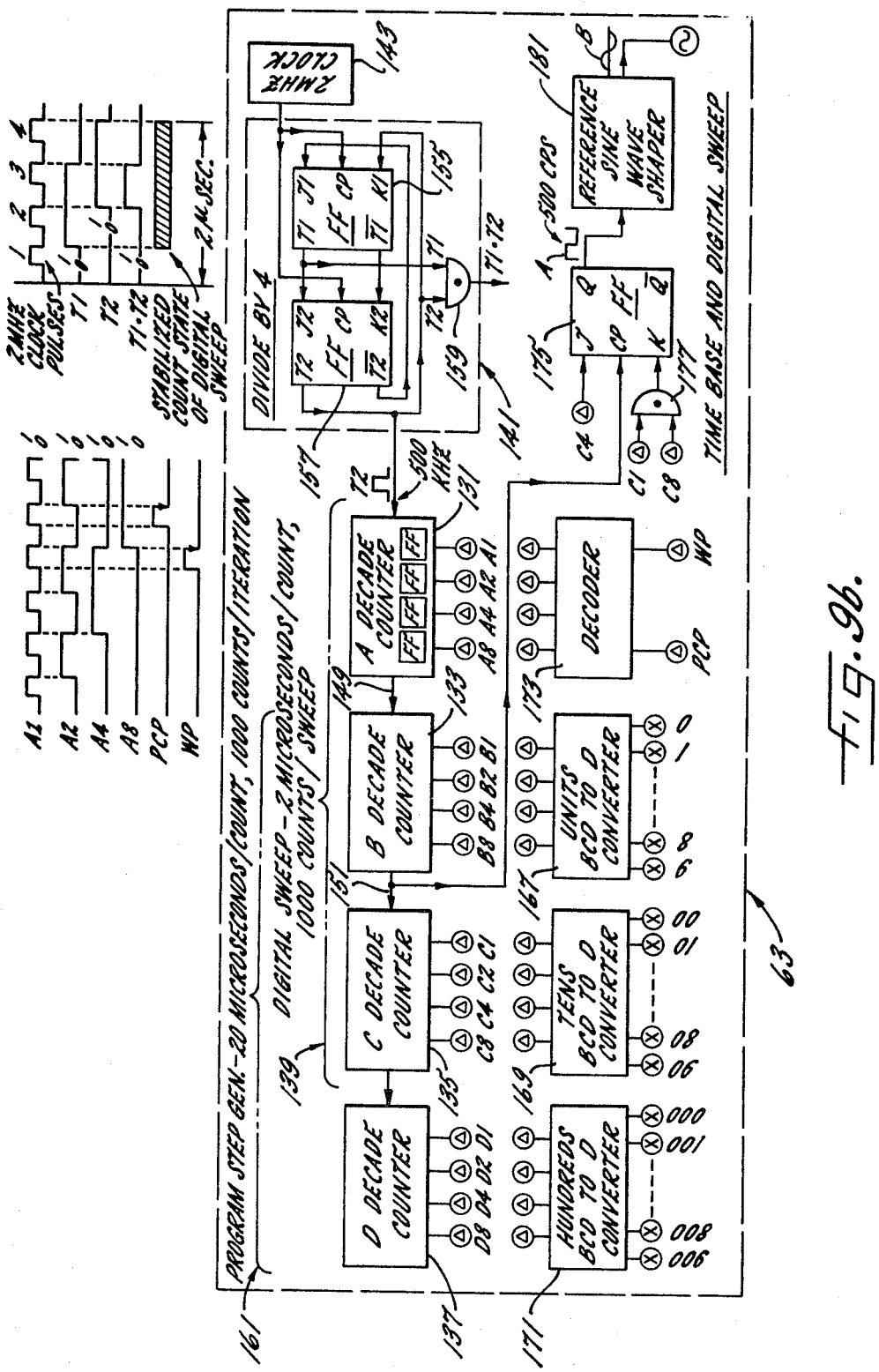
Figure 9H:
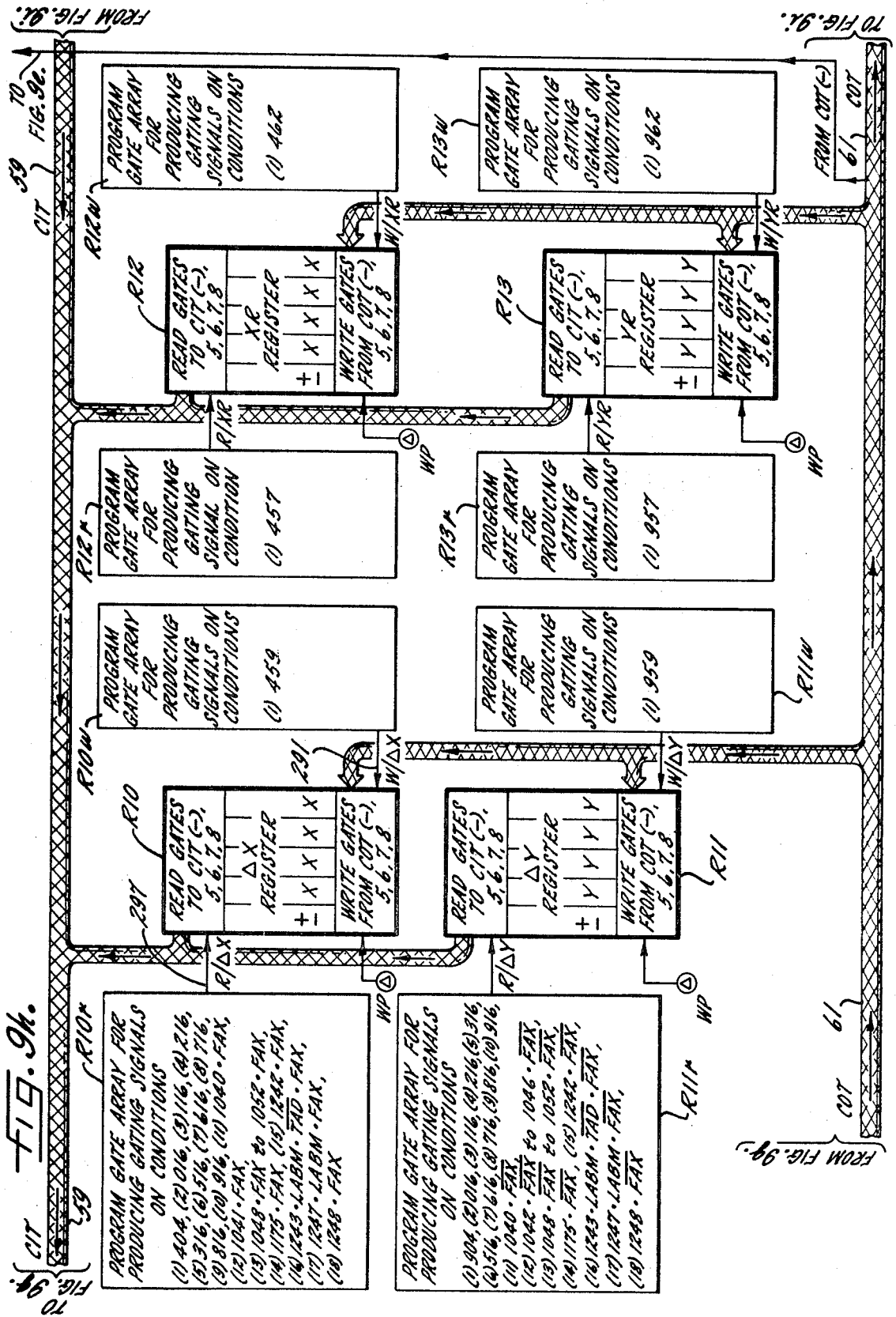
Figure 9M:
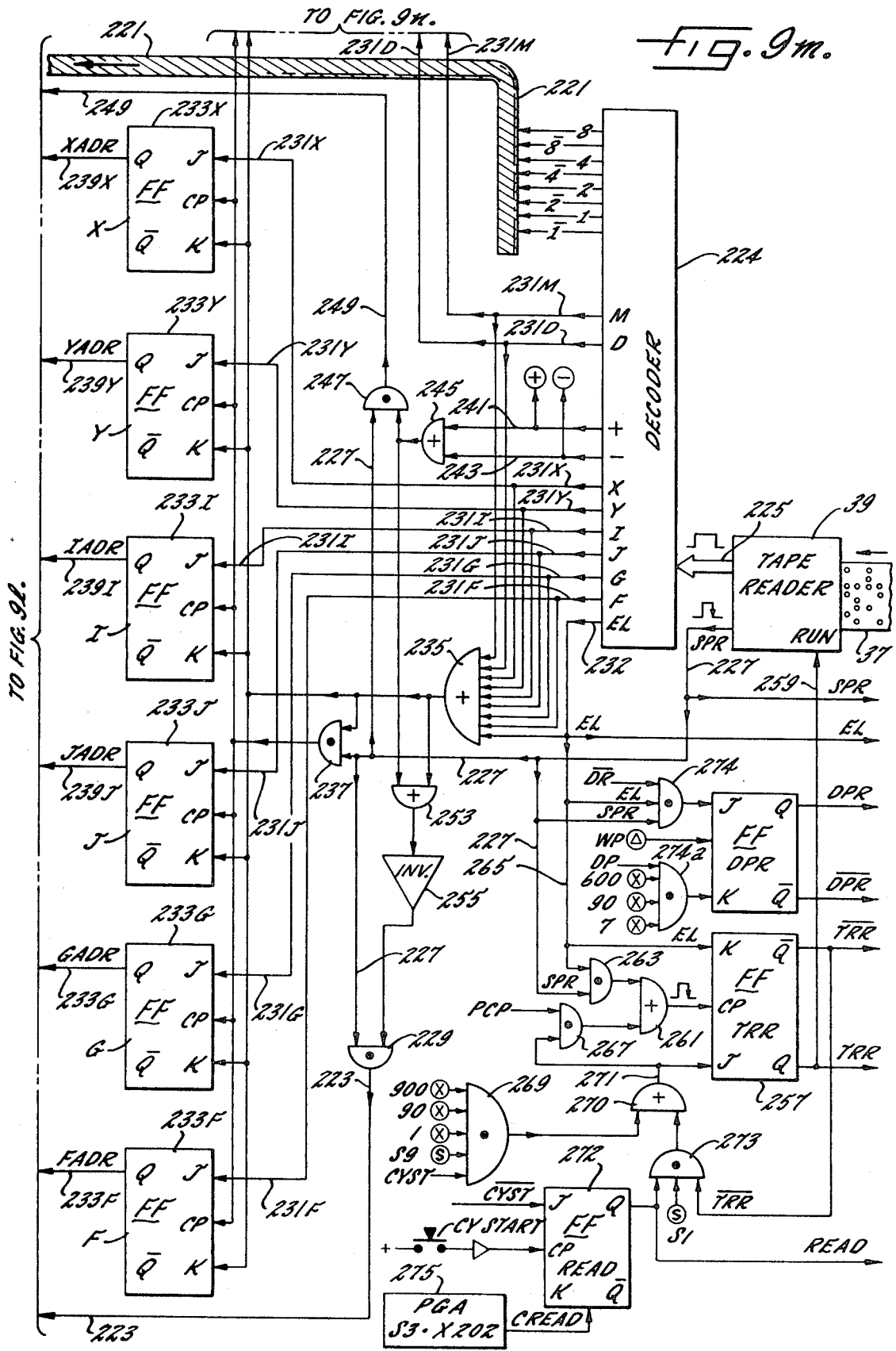
Figure 9N:
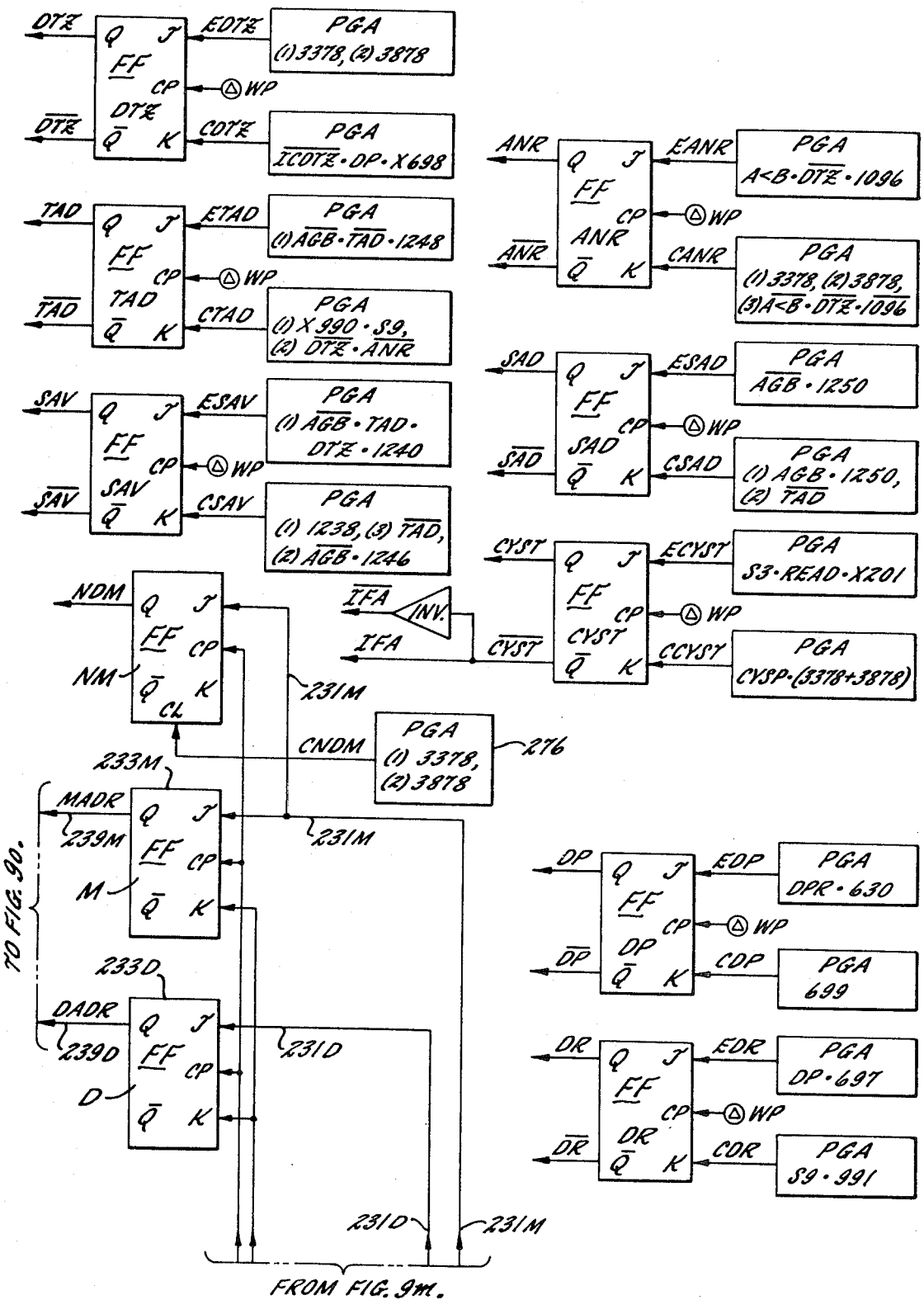
Figure 90:
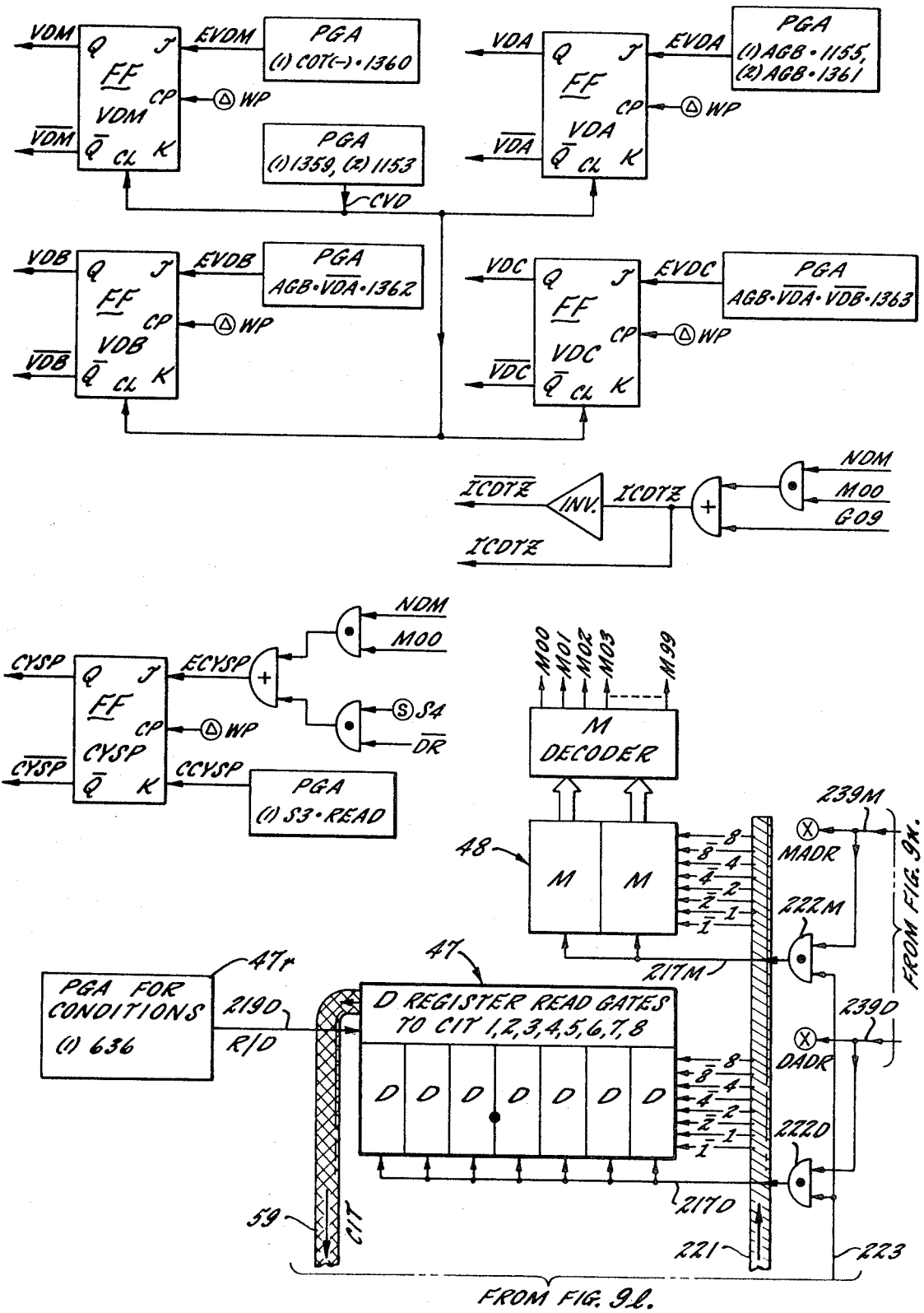
Figure 9R:
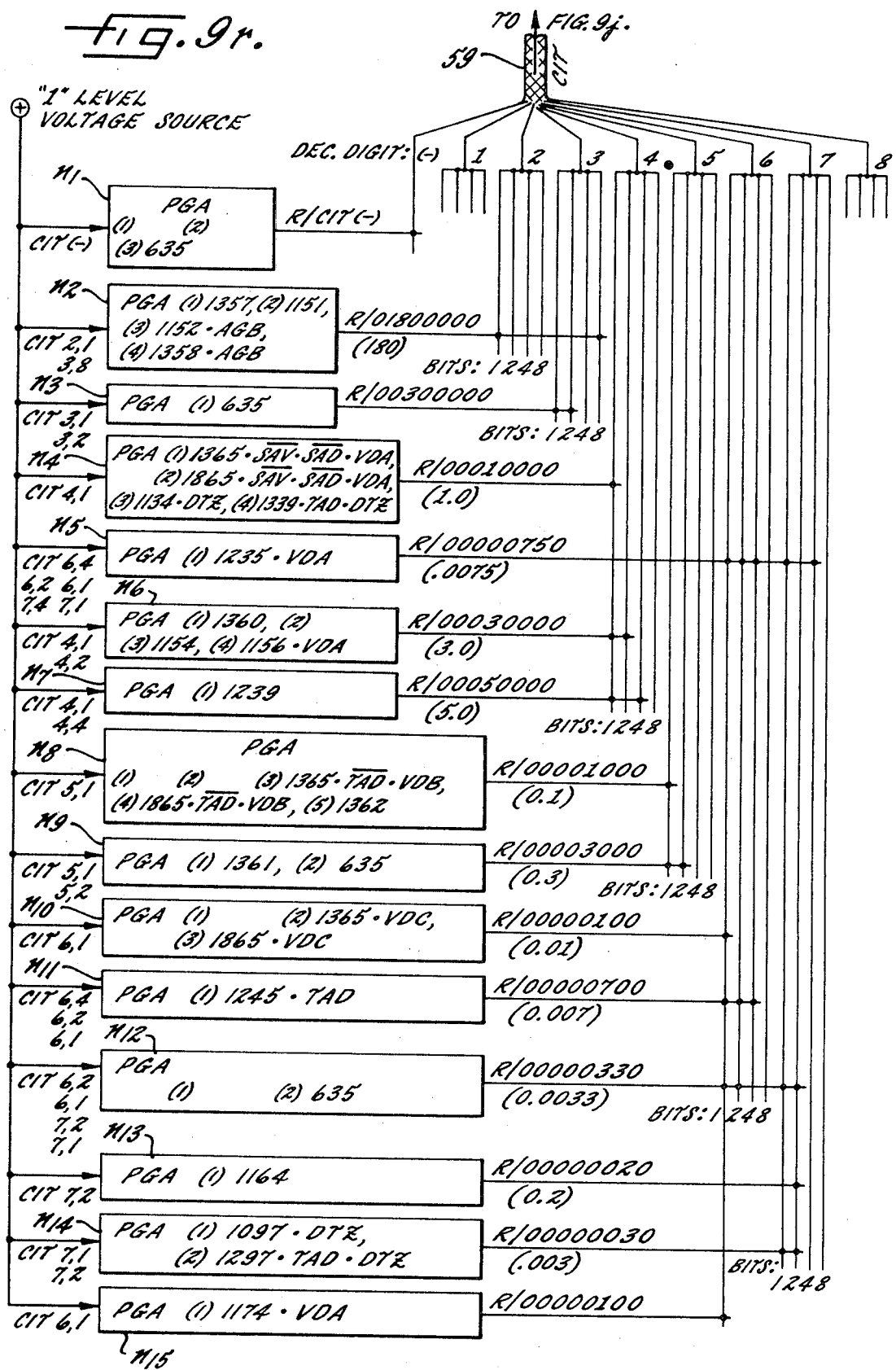

To view the director or data processing system in its entirety, the several FIGS. 9a–r should be joined together in a composite group, as shown by FIG. 8. This system is constructed to control the X and Y axis motors 21 and 25 (FIG. 1) and thus the motions of the cutter tool 14 according to any desired path program represented on a punched tape (FIGS. 3 and 4) by an iterative computation and updating procedure —and in a fashion such that not only the path velocity of the tool is controlled to have a desired value but also the velocity is gradually changed from one value to another even though the parts program may call for abrupt and large changes in velocity.

The director may be viewed as comprising four major groups of apparatus components. The first group includes a record (punched tape) reader 39 and buffer storage devices to receive and store the data signals produced from the reading of one block of command data. These components appear generally in FIGS. 9l, m, n and o. When the tape reader 39 is started to read one block of data, the X and Y end point coordinate numbers are routed to and stored in buffer end point coordinate registers 40 and 41 which are here labeled the XEP and YEP registers. The $I$ and $J$ component numbers are routed into registers 42 and 43 here labeled I Buffer and J Buffer. The D number is sent to a D register 47 whose output terminals thereafter have potential levels which represent that number in binary coded decimal notation. The commanded feed rate number F is routed to a buffer register 45 (FIG. 9l), whereas the G and M code numbers are sent for storage in one and two place registers 46 and 48. Generally speaking all of these registers are of the shift-register input type, and they signal the numbers stored therein in parallel binary coded decimal form on output terminals which can be selectively connected to a main input trunk CIT 59 by the opening of associated "READ" gates.

The second major group of apparatus components includes a time-shared digital computer 53 (FIG. 9f) and an associated plurality of computer function PGA's (FIG. 9c) which supply control signals to the computer at appropriate time instants. The computer 53 may perhaps be designated more aptly as an arithmetic unit capable of addition, subtraction, multiplication, division and certain related functions such as comparing the magnitudes of two numbers. It is analogous to what is often called the "central processing unit" of a general purpose computer and it may take any of a variety of forms well known *per se* to those skilled in the art.

Associated with the computer 53 is a series of "active" binary coded decimal storage registers, so called because the data in them is more or less continuously being used or changed by the computer. These registers appear throughout FIGS. 9f, g, h, i, j, p and q. They include (as labeled) registers here designated as R1 through R29 for storing numbers respectively designated by the symbols G, XOFF, YOFF, XSC, YSC, XCP, YCP, XMP, YMP, $\Delta X$, $\Delta Y$, XR, YR, XCEP, YCEP, I, J, Q, TFA, TFB, FA, PVA, PVB, PVC, SP1, SP2, SP3 and LAB. A three decade digi-switch serves as a register R28 (FIG. 9g) to signal in BCD notation a number PCF which is selected by manually positioning three 10-position knobs. The output of each of the active registers is selectively connected through READ gates (to be described) via a common computer input trunk CIT 59 to the inputs of the digital computer 53, and each of the active registers receives through WRITE gates (to be described) at its inputs the signals produced by the digital computer 53 through a common computer output trunk COT 61. In addition to serving as a path for transferring signals stored in the active registers into the computer 53, the computer input trunk line 59 also carries the signals which are stored temporarily in the buffer registers to be transferred to the active registers by first entering them in the computer 53 over the computer input trunk line 59, and then transferring the signals from the computer 53 to the active registers through the computer output trunk line 61.

It is the principal function of the computer 53 to process the digital data stored in the active registers and to deposit the resulting data in appropriate ones of those registers. This operation is performed in a regularly recurring cyclical manner to be described below. In general, information may be thought of as circulating counterclockwise, out of the active registers through the input trunk line 59 into the computer 53, and out of the computer 53 through the output trunk line 61 back into different active registers. The selection and timing of the operations of the computer 53 necessary to perform this processing cycle is determined by the computer control PGA's in FIG. 9c which are respectively designated CC1 through CC23. Specifically, each of the control arrays applies to a respective control input of the computer 53 a control signal at the instant when the computer is to perform the operation associated with the particular control array involved.

Just as the functioning of the digital computer must be timed, so must the flow of data from the active registers onto the computer input trunk line 53. It is by selecting a particular one of the active registers to feed data onto the input trunk line 59 that the data to be processed at a particular instant is selected. For this reason, each of the active registers is provided with a set of READ gates which, when enabled, apply the signals then stored in the register to the computer input trunk line 53. Each of the READ gates is controlled by a Program Gate Array (here labeled and subsequently designated by the shortened symbol PGA). When it is desired to transfer the data stored in a particular one of the active registers into the digital computer 53 for processing, the PGA associated with that register is caused to apply an enabling signal to the READ gates which are provided for that register. It is also desirable to have control over the particular one of the active registers into which a particular group of signals produced by the computer 53 is to be deposited. Toward this end, each of the registers is provided with a set of WRITE gates which are operative, when enabled, to enter the signals, then existing on the computer output trunk line 61 into their associated register. Associated with each set of WRITE gates is a Program Gate Array (PGA) similar to those associated with the READ gates so that when it is desired to transfer the numbers produced by the computer 53 into a particular one of the registers, the Program Gate Array associated with that register is caused to apply an enabling signal to the WRITE gates provided for the register. Each PGA for enabling the reading of a number from a particular register is designated by the reference number for that register with the lower case suffix $r$ added (see PGA R11$r$ associated with the $\Delta Y$ register R11 in FIG. 9h). Likewise, each PGA for enabling the writing of a number into a particular register from the computer output trunk 59 is designated by the reference character for that register, but with the lower case suffix $w$ added (see PGA R11$w$ in FIG. 9h).

Different fixed or constant numbers may be "read in" to the computer by selectively applying a binary 1 level voltage to the individual conductors at desired time instants, and a plurality of PGA's for this purpose are shown in FIG. 9r.

To provide a time base for the operation of the entire system a third major group of components includes a Time Base and Digital Sweep 63 (FIG. 9b), which in the exemplary embodiment, is capable of producing at a plurality of outputs, a thousand different signal combinations, each representing a different one of a thousand cyclically repeating time periods. This basic set of timing signals is applied through interconnected terminals marked ⊗ to a Multimode Time Base Logic 67 (FIG. 9d) which in effect, converts the single set of timing signals capable of producing a thousand different time periods into any selected one of three different groups of timing signals, each group representing the same series of a thousand time periods, but under different conditions. These conditions are determined in the third component 69 of the timing system, labeled the Time Base Mode Selector. The Time Base Mode Selector 69 responds to signals produced by the fourth component 71 of the timing system labeled Fast Axis Projected Overrun Detector which in turn, receives the information upon which it acts from the digital computer 53. The Overrun Detector 71 in combination with the Time Base Mode Selector 69 is operative to change the timing signals being produced at the outputs of the Multimode Time Base Logic 67 when the X and Y axis positions represented by the servo command signals being generated are near to the end of the segment represented by the particular block of data then stored in the active registers. The purpose of this feature is to cause the system to operate in different modes as the end of the data block being processed is approached, and different operations become necessary.

The timing signals which appear at the outputs of the Multimode Time Base Logic 67 are transmitted to various components throughout the rest of the system. To avoid the confusion raised by showing the actual wire connectors in the drawings, the terminals of Time Base Logic 67 are represented by the symbol ⊗ and are numbered, and connected points are correspondingly designated. All of the PGA's receive timing signals, but the input terminals for most of them are not shown, such input connections being made clear by the example of FIG. 17 to be described. Thus, these timing signals are applied to the computer control arrays CC1 through CC23 (FIG. 9c) which are simply special PGA's, to the PGA's associated with the active registers, to the PGA's associated with the buffer registers, and to various other parts of the system.

Comprising the last major group of components forming the director system of composite FIG. 9 are the X and Y axis servo controls 75 and 77 (FIGS. 9d and 9a). Since the X and Y servo systems are identical, only the X servo 75 is illustrated in detail by FIG. 9a but the X and Y axis compare circuits are both shown in FIG. 9d. Over a pair of trunk lines 79 and 81, the servos 75 and 77 continuously receive regularly the microposition signals which are recomputed at frequent and regularly spaced intervals of time and which are periodically stored in two of the active registers (XSC and YSC) as the end result of the data processing operation carried out by the digital computer 53. These servos control the energization of the X and Y axis motors 21 and 25 (FIG. 1).

The foregoing is intended to constitute only a preliminary introduction to the organization of the data processing director system, and more specific details will be set out under the sub-headings which follow and as a part of the narration of operational sequences.

THE CENTRAL TIMING SYSTEM

The function of the timing system is to repeatedly measure off in real time the successive, equal time periods $\Delta T$ which have been described above and to measure off and signal within each such time period a plurality of timed intervals (herein called "steps" for brevity). Assuming as a specific example that the periods $\Delta T$ are by design choice made one-fiftieth second in length, then each may be sub-divided into one thousand equal intervals or steps with each step lasting for 1/50,000 second (20 microseconds). The steps can be identified by designating numbers 000 through 999 signaled by a counter which receives pulses at a frequency of 50 KHz and has a three decade counting capacity. The timing system produces not only a changing number which represents "program steps" but also a "digital sweep" number employed in a digital-to-phase analog converter. Further, a sinusoidal wave of reference frequency and phase is produced to excite resolvers or Inductosyn (trademark) devices employed to sense the actual positions of the movable element along the X and Y axes. An exemplary and particularly effective timing system for these purposes is shown in FIGS. 9b and 9e as the Time Base and Digital Sweep 63 and the Time Base Mode Selector 69.

PRODUCING THE DIGITAL SWEEP

Forming part of the Time Base and Digital Sweep 63 is a series of four cascaded binary coded decimal pulse counters 131, 133, 135, and 137. The digital sweep is derived from the outputs of the first three stage, 131, 133, and 135, respectively labeled the A, B and C decade counters and collectively identified as the Digital Sweep Generator 139. The decade counters 131 – 137 are of similar construction and are well known to those skilled in the art. A typical unit of this type includes four cascaded flip-flops interconnected so that the decade repeatedly counts from 0 to 9 in response to successive input pulses, being reset to 0 by every tenth input pulse and signaling its contents on four output lines, or terminals, in 8, 4, 2, 1 binary code. Additionally, each time the unit is reset to 0, it produces a signal on a fifth or "carry" line.

The A decade counter 131 is stepped by output pulses produced at a repetition frequency of 500 kiloherz by a Divide by 4 circuit 141 which in turn is driven by pulses from a 2 megahertz clock 143. The output pulses produced by the clock 143 and the Divide by 4 circuit 141 are shown in FIG. 11 as the waveforms 145 and 147 respectively. The units digit of the digital sweep is signaled on output terminals of the A decade counter 131, labeled A1, A2, A4 and A8 to signify the binary weight of the signals appearing on the respective terminals. Since the pulse repetition frequency of the pulses applied to the A decade counter 131 is 500 kiloherz, or a pulse every 2 microseconds, the A decade counter cycles through its ten count states every 20 microseconds. Through line 149 the "carry" output of the A decade counter 131 is applied to the input of the B decade counter 133 and consequently that counter cycles through its ten count states every 200 microseconds and on its four output terminals, labeled B1, B2, B4 and B8 is signaled the tens digit of the digital sweep. The "carry" output of the B decade counter 133 is applied to the input of the C decade counter 135 through the line 151, causing that counter to cycle through its ten count states every 2 milliseconds. It is on the output terminals C1, C2, C4, and C8 of this counter that the binary coded decimal signals representing the hundreds digit of the digital sweep are derived.

Collectively, the cycling decade counters 131, 133, and 135 produce a digital sweep formed of signals representing a reference number which repeatedly cycles during successive time intervals from a first predetermined value (here 000) to a second predetermined value (here 999) by uniform increments (here 1) and at uniformly time-spaced instants (here 2 microseconds). The signals produced by the Digital Sweep Generator 139 are applied to other components of the system and in order to maintain clarity in the drawings, their connections are not indicated by lines. Instead the output terminals of the Digital Sweep Generator 139 contain the symbol $\Delta$ and terminals of devices elsewhere in the system, such as the compare circuits in FIG. 9d, which are connected to terminals of the Digital Sweep Generator, contain similar symbols, with an additional indication of the particular Digital Sweep Generator terminal to which they are connected.

PRODUCING GATING PULSES TO ASSURE UTILIZATION OF THE DIGITAL SWEEP WHILE ITS COUNT STATES ARE STABLE

The progression of the reference number collectively signaled by the cycling decade counters of the Digital Sweep Generator 139 is shown in FIG. 11 as the staircase shaped waveform. It will be seen that each new count state begins with the negative going edge of the waveform 147 and lasts until the next such negative going edge. The wave line during the initial portion of each count state represents an instability period during which the counters are tumbling from their previous count states. It is the principal function of the Divide by 4 circuit 141 to produce a gating pulse which occurs during the central portion of the stable period of each count state so that units in the system which utilize the output of the Digital Sweep Generator may be gated open to receive the outputs of the Digital Sweep Generator during its stable count states.

The Divide by 4 circuit 141 (FIG. 9b) includes two gated flip-flops 155 and 157. The flip-flop 155 has a pair of inputs J1 and K1 for receiving gating signals and a third input labeled CP for receiving clock pulses. The flip-flop also has a pair of outputs labeled T1 and $\overline{T1}$ characterized by the fact that when a logic 1 level signal appears at one of the outputs, a logic 0 level signal is produced at the other. The flip-flop 157 has inputs and outputs corresponding to those of flip-flop 155 and are labeled J2, K2, CP, T2 and $\overline{T2}$. Flip-flops of the type illustrated for use in the Divide by 4 circuit are commonly referred to as J-K flip-flops and are well known to those skilled in the art. It will therefore suffice here to describe the manner in which they operate under four possible conditions.

Condition 1: if neither the J input nor the K input receives a logic 1 level signal, i.e., if neither J nor the K input is "qualified," while a clock pulse is applied to the flip-flop, then the clock pulse does not change the state of the flip-flop. Condition 2: if the K input is qualified during application of a clock pulse, the negative-going edge of the clock pulse following qualification of the K input of the flip-flop will reset it to its "0" state, in which state its T out produces a logic 0 level and its $\overline{T}$ output produces a logic 1 level. Condition 3: if the J input is qualified, application of a clock pulse will set the flip-flop to its "1" state, that is, to that state in which its T output produces a logic 1 signal and its $\overline{T}$ output produces a logic 0 signal. With respect to the last two conditions, it will be understood that, if the flip-flop is already in the "0" state when its K input is qualified, it will simply stay in that state after a clock pulse is applied to it. Similarly, if the flip-flop is already in the "1" state when its J input is qualified, it will simply stay in that state after receiving a clock pulse. Condition 4: if both the J and K inputs of the flip-flop are qualified at the time when a clock pulse is applied to the flip-flop, application of a clock pulse to the flip-flop will cause it to reverse its state from which ever state it had been in prior to application of the clock pulse.

With this basic understanding of the J-K flip-flops which form the Divide by 4 circuit 141, operation of the circuit in FIG. 9b can be simply described. It is the well-known switch tail or Johnson counter and is basically a two-stage serial shift register connected in a loop with the outputs cross-connected to the inputs. The T1 and $\overline{T1}$ outputs of flip-flop 155 are connected to the J2 and K2 inputs of flip-flop 157 respectively and the T2 and $\overline{T2}$ outputs of flip-flop 157 are connected to the K1 and J1 inputs respectively of the flip-flop 155. The clock pulse inputs of both flip-flops 155 and 157 receive pulses from the 2 megaHz clock 143. Assuming that initially both flip-flops are in the reset condition, logic 1 signals are applied by the $\overline{T1}$ and $\overline{T2}$ outputs of the flip-flops to the K2 and J1 inputs of the two flip-flops. This is indicated by the waveform diagrams shown above the Divide by 4 circuit 141. Consequently, upon receiving the negative going or switching edge of the first clock pulse, the first flip-flop 155 becomes set but the second flip-flop 157 remains in the reset condition.

With the flip-flop 155 set, when the negative-going edge of the second clock pulse occurs, the T1 output of the flip-flop 155 will be qualifying the V2 input of flip-flop 157 while the $\overline{T2}$ output of the flip-flop 157 will continue to qualify the J1 input of flip-flop 155 so that the negative-going edge of the second clock pulse will leave the flip-flop 155 in the set state but will also cause the second flip-flop 157 to switch from the reset to the set state. Thus, when the third clock pulse arrives, the T1 and T2 outputs of flip-flops 155 and 157 will qualify the J2 and K1 inputs of flip-flops 155 and 157. Since the K1 input of flip-flop 155 and the J2 input of flip-flop 157 are qualified when the trailing edge of the third clock pulse occurs, that trailing edge will cause flip-flop 155 to be reset while leaving flip-flop 157 in the set condition. This last change causes the $\overline{T1}$ output of flip-flop 155 to qualify the K2 input of flip-flop 157 and the T2 output of flip-flop 157 to qualify the K1 input of flip-flop 155. With this set of conditions existing, arrival of the trailing edge of the fourth clock pulse resets the flip-flop 157 while leaving the flip-flop 155 reset. This was the initial condition of the two flip-flops. From this point, the cycle repeats. The T1 and T2 waveforms are shown at 146 and 147 in FIG. 11.

The T2 pulse train produced by the flip-flop 157 at a frequency of 500KHz is the one used to drive the Digital Sweep Generator 139, which is advanced by one count with each negative-going edge of the T2 waveform. Thus, the time which elapses during the four clock pulses represents one count state of the Digital Sweep Generator 139. Specifically, the A decade counter 131 changes its count state on the trailing edge of the T2 pulse, delayed by the propagation delay of its flip-flops. Decade counter 133 changes its count state, as signaled at its output terminals, on the trailing edge of the carry output of decade counter 131, delayed by the delays of the flip-flops in counter 133. Thus the delays in successive counters 131 – 137 cumulate. In the diagram above the Divide by 4 circuit 141, the shaded area spanning the second, third, and fourth clock pulses begins at the instant when the C decade counter 135 has stabilized and ends when the A decade counter 131 begins to change. Thus the shaded area represents the approximate time period during which all of the counters 131 – 135 of the Digital Sweep Generator 139 are in a stable state. The unshaded area, coinciding approximately with the first clock pulse, represents the brief time period during which some of the individual counters of the Digital Sweep Generator are tumbling to their new count states. The successive count states of the Digital Sweep Generator are represented at 153 in FIg. 11.

To produce a gating pulse which falls approximately during the mid-portion of the shaded area representing the stable state of the Digital Sweep Generator, the T1 output of flip-flop 155 and the T2 output of flip-flop 157 are applied to an AND gate 159. From the waveforms related to the Divide by 4 circuit 141, it is seen that the T1 and T2 outputs of flip-flops 155 and 157 are concurrently at a logic 1 level during the mid-portion of the shaded area so that during this time period a logic 1 or enabling voltage level appears at the output of AND gate 159. This signal is represented by the logic symbol T1 · T2 and is shown by waveform 148 in FIG. 11.

GENERATING A BASIC SERIES OF PROGRAM STEPS

The Time Base and Digital Sweep 63 also includes means for producing timing signals during different predetermined states of the Digital Sweep Generator so as to time the operation of various elements in relation to particular count states of the Digital Sweep Generator 139. The particular arrangement used here comprises a Program Step Generator 161 (FIG. 9b) formed of the B and C decade counters 133 and 135 of the Digital Sweep Generator 139, and the D decade counter 137, the latter being driven by the carry output of the C decade counter 135. Just as the ABC decade counters 131, 133, and 135, when taken together, comprise a Divide by 1,000 counter which cycles through a thousand count states 500 times per second, so that the BCD decade counters 133, 135, and 137, when taken together, comprise a Divide by 1,000 counter which cycles through a thousand different count states 50 times per second. Stated differently, the count signaled by the ABC decade counters 131, 133, and 135, which comprise the Digital Sweep Generator 139, changes 10 times for every change in the count signaled by the BCD decade counters 133, 135, and 137 which comprise the Program Step Generator 161.

The relationship just described is graphically illustrated in FIG. 11 wherein the waveform 163 illustrates the steps through which the Program Step Generator 161, formed of the BCD decade counters 133, 135, and 137, progresses. Each of these steps is a program step, and it is seen from the figure that, during the same period in which the program steps progress from 000 to 099, the Digital Sweep Generator 139 goes through a complete cycle from 000 to 999 as represented at 153.

The relationship between digital sweep numbers and program steps is also illustrated in FIG. 10a. A rectangular chart is vertically divided into 10 columns, each column divided into 10 equal zones and each zone being further divided into 10 equal steps. Thus, the chart is divided into 1,000 equal steps, and each step represents one count state of the Program Step Generator 161. The top step in the first column is labeled 000 and represents the initial count state of the Program Step Generator 161. The bottom or last step of the first column is labeled 099 and represents the 100th count state of the Program Step Generator. Steps in the remaining nine columns have a similar significance; thus, the top step of the second column represents count state number 100, the bottom step of that column the 200th count state (number 199), and so on through the entire chart until the last step of the last column is numbered 999, representing the 1,000th count state of the Program Step Generator.

As pointed out earlier, for each step or count state of the Program Step Generator 161 the Digital Sweep Generator 139 goes through ten steps or count states of its own. Thus, during each 100 steps represented by successive columns of the programming chart, the Digital Sweep Generator cycles through a thousand different count states from 000 to 999 and this is indicated in FIg. 10b by the sloping line 165 which is an approximate representation of the count states of the Digital Sweep Generator 139.

Continuing with the consideration of the Program Step Generator 161, it is seen that it generates a series of one thousand potential program steps from which any step may be selected by means which are responsive to the particular set of signals existing on the outputs of the Program Step Generator during that step. This selection might be performed by devoting a separate set of AND gates to each program step that is to be selected. Obviously this would require quite a large number of such AND gates since each program step is signaled on twelve output terminals, B1-B8, C1-C8, and D1-D8 (FIG. 9b). Consequently, to reduce the complexity of the equipment required to select various program steps for performance of differently timed functions, a series of three binary coded decimal to decimal code converters 167, 169 and 171 are provided for reducing the number of signals by which different program steps are represented. Each of the three code converters has four input terminals for receiving a binary coded decimal digit from one of the three decade counters of the Program Step Generator 161, and ten output terminals. The units converter 167 signals the units digit of the program step on one of 10 terminals labeled 0 through 9; the tens converter 169 signals the tens digit of the program step on one of 10 terminals labeled 00 through 90; and the hundreds converter 171 signals the hundreds digit of the program step on one of its ten outputs labeled 000 through 900.

Through the use of the code converters, each of the one thousand program steps shown in the programming chart in FIG. 10a is represented by signals on a different combination of three output terminals among the 30 output terminals of the code converters 167, 169, and 171. As an example, assume that the Program Step Generator is in its count state number 746, or with reference to the programming chart of FIG. 10a, in the 47th step of the eighth column. This count state and program step will be represented at the output terminals of the Program Step Generator 161 by logic 1 signals appearing on terminals B2 and B4, C4 and D1, D2 and D4. In contrast, the same count state and program step is represented at the outputs of the binary coded decimal to decimal converters 167, 169, and 171 by logic 1 signals on three output terminals: the 700 terminal of the hundreds converter 171, the 40 terminal of the tens converter 169, and the 6 terminal of the units converter 167. Thus, if it were desired to initiate operation of some part of the system during count state 746, it could be accomplished by use of means such as an AND gate responsive to concurrent signals on the three code converter output terminals just listed. This is indeed the way in which many of the timing signals are produced in the system, and the AND gates used for this purpose are referred to as "program gates."

The Time Base and Digital Sweep 63 also includes a decoder 173 (FIG. 9b) for producing a program clock pulse (PCP) and a WRITE pulse (WP). Each of the PCP and WP pulses occur once during each cycle of the A decade counter 131 and their relative times of occurrence during the ten counts of each cycle of the A decade counter 131 are shown in the waveform diagrams directly above the counter in FIG. 9b. The PCP pulse (see 150 in FIG. 11) initiates each program step and the WP pulse signals the instant when data is to be stored in a storage register during a particular program step. The details of the decoder 173 will be obvious to one skilled in the art and will not be described. It uses the outputs A1, A2, A4 and A8 of the decade counter 131 and may also use T1, T2 of the Divide by 4 circuit 141. The decoder 173 may include suitable inverters, AND gates, and flip-flops arranged in accordance with the logic required to produce the PCP and the WP pulses so as to avoid marginal timing problems. In particular, the PCP pulse should end before the count state of the Program Step Generator changes.

GENERATING ALTERNATIVE SERIES OF PROGRAM STEPS

The Program Step Generator 161 as thus far described can produce one thousand timing signals, each defining a different 20 microsecond time period within each cycle time (here called $\Delta T$ and equal to one-fiftieth second) of the Program Step Generator. It has been stated that, to initiate a certain operation during a given count state of the Program Step Generator 161 such as count state 746, three inputs of a program gate would be connected to the 700, 40, and 6 output of the converters 171, 169, and 167 (FIG. 9b). Let it be assumed, however, that a certain operation is to be initiated during count state 746 only if a given condition exists, a different operation only if another condition exists, a third operation only if a third condition is met and yet another operation only if a fourth condition has been reached. Let it be assumed also, that a fifth operation is to be carried out during count state 746 regardless of whether or not any of the first, second, third and fourth conditions have been met. This is the function of the Multimode Time Base Logic 67 shown in detail in FIG. 9d. It includes three groups of AND gates 175, 177 and 179. Each group includes ten AND gates of which only the first and last two are shown. Within each group, successive ones of the individual AND gates have one of their inputs connected to successive ones of the individual outputs 000 to 900 of the converter 171 in FIG. 9d.

The output terminals of the 10 AND gates 175 are identified as 1000, 1100 .... 1900, and may be caused to receive the signals present on the outputs 000, 100, . . . 900 of the converter 171 by an enabling signal on the input line M1. The remaining AND gate groups 177 and 179 have outputs identified as 2100 – 2900 and 3100 – 3900, respectively. Signals corresponding to those on the outputs 000 – 900 may be placed on the outputs 2100 – 2900 or 3100 – 3900 by enabling signals on respective ones of the input lines M2 or M3. If the first of the three conditions is signaled by an enabling signal on the line M1, and the second and third conditions are signaled on the lines M2 and M3, then to produce a timing signal during the count state 746 of the Program Step Generator 161 only when the first condition exists, two of the three inputs of a program gate will be connected to the 40, and the 6 outputs of the converters 169 and 167 but the third input will be connected to the 1700 output of the AND gates 175. In this way, a timing signal will be produced at the output of the program gate during count state 746 only if the first condition is in fact signaled on the M1 line. When the M1 line is at a logic 1 level, it is said that the system is in "Mode 1," and the applicable mode is represented by a fourth digit at the right in a step-designating number. In the preceding example, the program gate can thus be said to be activated on step 1746—meaning step 746 during periods when Mode 1 is in effect. By similar reasoning, to produce a timing signal during count state 746 only if the second or third conditions have been fulfilled, the third input to a program gate will be connected to the 2700 or 3700 output terminals of the AND gates 177 or 179. If on the other hand, a timing signal is to be produced during count state 746 of the Program Step Generator 161 regardless of the different conditions of Modes, then the inputs of the program gate may be connected directly to the 700, 40 and 6 outputs of the converters 171, 169, and 167. In the latter case, the gate is said to be activated on step 746 or x746 —meaning on any time step 746 regardless of any existing Mode.

Thus the generation of a timing signal during any one of the one thousand different count states of the Program Step Generator 161 may be conditioned on the existence of one of three conditions, and for each one of the three conditions there exist one thousand potential timing signals which may be derived with the aid of respective ones of the AND gates 175, 177, and 179. The thousand potential time periods or program states that may be derived directly from the outputs of the converters 171, 169, and 167 were shown in FIG. 10a in the form of a programming chart. Similar time programming charts may be visualized for the three different groups of thousand timing signals which can be derived in response to signals on the lines M1, M2 and M3. One such programming chart is shown in FIG. 10c. It is identical to the programming chart of FIG. 10a except that its 10 columns are numbered 1000 – 1900 and its steps numbered 1000 through 1999, where the leading digit value "1" indicates Mode 1 and signifies that the AND gates 175 are enabled by a signal present on Line M1.

Summarizing, the programming chart shown in FIG. 10a represents a thousand different time periods corresponding to the thousand successive count states of the Program Step Generator 161 during which a timing signal may be derived by means of a program gate connected to selected outputs of the converters 171, 169, and 167. Each of the thousand different timing signals represented by the programming chart on FIG. 10a may be thought of as requiring a single program gate connected to an appropriate three of the 30 output terminals of the converters 171, 169, and 167. Thus, if it were desirable to produce a timing signal during each of the thousand program steps of the Program Step Generator 161, one thousand program gates, each connected to a different combination of three output terminals of the converters might be used. In such a case, one thousand different timing signals would be produced, one during each of the count states of the Program Step Generator 161, regardless of the presence of a signal on the lines M1, M2 or M3. If, in a similar manner, one thousand program gates were connected to the AND gates 175, and to the outputs of the converters 169 and 167 so as to generate the one thousand possible timing signals represented by the Mode 1 programming chart in FIG. 10c, these timing signals would be produced only if an enabling signal were received by the AND gates 175 over the input line M1. Further, if the timing signals thus produced were used to initiate one thousand different operations in the system in succession, these operations too would occur only when the M1 input line was energized. In actual practice and as explained, three groups of programming gates (or equivalent devices) are provided, each for producing a series of timing signals under a different one of the three conditions referred to. A different series of operations is initiated by each of the three series of timing signals, each series being repeated with each cycle of the Program Step Generator 161. In this manner, the system of FIG. 9 may be caused to carry out any one of three series of operations, or to operate in any one of three different "-modes," by energizing an appropriate one of the input lines M1 – M3. But of course, some operations can be made "modeless" by connecting programming gates to a selected terminal of the decoder 171 rather than to one of the output terminals in the multi-mode logic device 67.

The three different modes in which the system of FIG. 9 is capable of operating are utilized to perform three different types of operations as a path consisting of linear and circular segments is generated. In its first mode of operation the system generates either a linear or a circular path segment (for brevity only linear path generation will be described). This mode of operation is typically repeated a large number of times in the course of generating a path, each repetition being called an iteration, extending over a period of time period $\Delta T$ which is equal to the cycling time of the Program Step Generator 161, and resulting in the generation of a new pair of macropositions for the X and Y axes.

Modes 2 and 3 are used for the transfer of a fresh set of data into active storage during the last few iterations associated with the generation of a linear path segment, and are designed to terminate the processing of one block of data so as to begin the processing of the next block of data. These are called "transition" modes because they are involved in transitions from one segment to the next.

It can be stated generally that in a typical operational sequence the system operates through a large number of Mode 1 iterations in generating a path segment. It is toward the end of the path segment that a relatively rapid change occurs in the operating mode of the system. This rate of change may be so rapid as to shift the system through different modes of operation within one iteration, or within less than 20 milliseconds. To cause the system to step through its successive operating modes at appropriate instants is the function of the Time Base Mode Selector 69 (FIG. 9e).

THE TIME BASE MODE SELECTOR

Generally, the Time Base Mode Selector 69 responds to certain pre-selected conditions, determined by a PGA 183, occurring in the system to take a step toward changing the operating mode of the system in a prearranged manner. One condition to which the Time Base Mode Selector 69 responds is the nearing of the end of the path segment being generated by the system. This condition is sensed by the Fast Axis Projected Overrun Detector 71, and is indicated on its output line by a signal SST forming one input to PGA 183. In all, in the exemplary system of FIG. 9 there are 29 different conditions to which the Time Base Mode Selector 69 is designed to respond. Each of these conditions is detected by the PGA 183 shown in block form with the conditions listed therein. The internal details of the PGA 183 will become apparent from the example described below with reference to FIG. 17, and the effect of each response (occurring upon conditions listed in the block 183) is to advance the count state of an end of the block (EOB) counter 186. In response to each condition, an output signal (here labeled AC and signifying "advance counter") is produced by the PGA 183 on a line 184 forming one input of an AND gate 185 whose input is energized by the PCP output of the Time Base and Digital Sweep 63. Therefore, every time the output signal AC is produced by the PGA 183, a program clock pulse is gated through the AND gate 185. These gated program clock pulses are applied to the four stage binary counter 186 whose outputs in turn are decoded by a binary-to-single line decoder 187. Binary counters and decoders of the type suitable for use in the Time Base Mode Selector 69 are well known to those skilled in the computer arts and in fact the combination illustrated in the FIG. 9e is shown and explained in Digital Computer Principles by the Burroughs Corporation, McGraw-Hill Book Company, Inc., 1962, at page 327. The decoder 187 is provided with a series of sixteen outputs numbers S1 through S16. In combination, the binary counter 186 and the decoder 187 operate in a manner analogous to a stepping switch such that, in response to each pulse received from the AND gate 185, the binary counter is stepped to its next higher count state, signaled at its outputs in binary coded decimal form. These output signals in turn appear at successive ones of the 16 state-representing outputs S1 through S16 of the decoder 187. The binary counter 186 has a count capacity of sixteen and is cyclic in operation. Thus, a program clock pulse gated through the AND gate 185 causes an output signal to appear on the S2 output terminal of the decoder 187 if an output previously existed on terminal S1, and a gated pulse results in a signal on the S1 decoder output terminal if a signal previously existed on terminal S16.

The output terminals S1 through S16 of the decoder 187 are operatively connected in three groups to the three control lines M1 – M3 of the Multimode Time Base Logic 67. The first four output terminals S1 – S4 are connected through an OR gate 189 to the input line M1. The sixth and seventh output terminals S6 and S7 connected through an OR circuit 190 to the second control line M2. The eighth terminal S8 is connected directly to the control line M3. Thus, the system is placed in Mode 1 when the EOB counter 186 is in its S1, S2, S3 or S4 states; is placed in Mode 2 when the counter is in its S6 or S7 states; and is placed in Mode 3 when the counter is in the S8 state. The terminals S5 and S6 are connected to other logic apparatus but the terminals S9 through S16 are not used in the embodiment here to be described.

PRODUCING A REFERENCE SIGNAL FOR THE SERVO DRIVES

A third function performed by the Time Base and Digital Sweep 63, is to provide a sinusoidal reference signal for the servo drives 75 and 77. By means of a flip-flop 175 (FIG. 9b) a square wave which is in phase with the cycling periods of the digital sweep is generated. The flip-flop 175 may be of the same type as those described in connection with the Divide by 4 circuit 141 and it is so shown. To drive the flip-flop 175 in phase with the digital sweep, its J input is connected to the C4 output of the C decade counter 135 and the "ANDed" C1 and C8 outputs of the same decade counter are applied by means of an AND gate 177 to the K input. The clock pulse (CP) input of the flip-flop is connected to carry output line 151 of the B decade counter 133. Consequently, in accordance with the operation of the J-K flip-flop as explained previously, the flip-flop 175 is set every time the Digital Sweep Generator 139 changes from its 499th count state to its 500th count state and is reset every time the Digital Sweep Generator changes from its 999th count state to its 000 state. The desired square wave voltage appears at the Q output of the flip-flop 175 and is shown in FIG. 10b as the waveform A to the immediate right of the programming chart. The 500Hz output of the flip-flop 175 is applied to a reference sine wave shaper 181 and is converted thereby into a 500Hz sinusoidal reference voltage B which, as seen in FIG. 10b is in phase with the square wave A. Suitable sine wave shapers are well known in the art and need not be described here. It will be seen from FIGS. 10a and 10b that the sine wave A is equal in frequency to the time intervals occupied by the successive "columns" of program steps (i.e., the periods during which the C decade counts from 0 to 9) and is fixed in phase relatively to those periods.

IDENTIFICATION OF SYMBOLS

At this point in the description it will be helpful to observe that shorthand symbols have been adopted as a matter of convenience in designating the changeable numbers held in the various registers of the director system, as well as the various signals produced by flip-flops and by different operations of the computer 53. As a rule, the letters chosen for each symbol are the initials of an appropriate name which calls to mind the nature of the number or signal so designated. For example, the symbol *XEP* is derived from the words "X end point" coordinate, and the number so designated is the X coordinate of the end point to be reached along the path at the end of a segment represented by one block of data. As another example, the symbols XSC and YSC are derived from the words "X servo command" and "Y servo command." To identify each of the many symbols, the words from which they are derived, and the significance of each, reference may be had to the following glossary.

GLOSSARY OF SYMBOLS

Buffer Registers and Numbers Therein

| | | |
|---|---|---|
| XEP | X segment end point coordinate | |
| YEP | Y segment end point coordinate | Read from one block |
| $I_B$ | X component of segment | of punched tape for |
| $J_B$ | Y component of segment | one segment |
| $F_B$ | Feed Rate along Path | |
| D | Distance along Path Segment | |
| $G_B$ | G code number | |
| M | M code number | |

Active Registers and Numbers Therein

| | |
|---|---|
| XCEP | X computed segment end point coordinate |
| YCEP | Y computed segment end point coordinate |
| XCP | X computed macroposition end coordinate |
| YCP | Y computed macroposition end coordinate |
| ΔX | X macromove component |
| ΔY | Y macromove component |
| XR | X remainder |
| YR | Y remainder |
| I | X segment component (active) |
| J | Y segment component (active) |
| FA | Feed Rate, Active |
| XSC | X servo command coordinate |
| YSC | Y servo command coordinate |
| X OFF | X offset |
| Y OFF | Y offset |
| XMP | X machine coordinate, macroposition |
| YMP | Y machine coordinate, macroposition |
| TFB | Time factor for next block [Char. + Maintissa Form] |
| TFA | Time factor, active [Char. + Maintissa Form] |
| Q | Q FACTOR [Char. + Maintissa Form] |
| PVA | Path Velocity, Actual |
| PVB | Path Velocity, Buffer |
| PVC | Path Velocity, Computed |
| LAB | Look Ahead Balance |
| SP1 | Scratch Pad One |
| SP2 | Scratch Pad Two |
| SP3 | Scratch Pad Three |
| PCF | Per Cent Feed (override) |
| G | Function Code Number |

Numbers Used Without Permanent Storage

| | |
|---|---|
| PVD | Path Velocity Difference (PVA-PVC) |
| PVN | Path Velocity Next |
| DLAP | Distance from Look-Ahead Point |

Control Signals From Storage Flip-Flops

| | | |
|---|---|---|
| FAX | Fast Axis X | |
| VDA | Velocity Difference >3.0"/min. | |
| VDB | Velocity Difference >0.3"/min. | |
| VDC | Velocity Difference >0.1"/min. | |
| VDM | Velocity Difference Minus (negative) | |
| TAD | Time for Acc./Dec. | |
| DTZ | Decelerate to Zero | |
| ANR | Another New Rate | |
| CYST | Cycle Start | |
| CYSP | Cycle Stop | |
| READ | Read One Block From Tape | |
| SAD | Start Alternate Deceleration | |
| SAV | Save Deceleration Time | |
| DPR | Data Process Required | |
| DP | Data Process in Progress | |
| DR | Data (from tape) ready | |
| NDM | New Data, M code | |
| TRR | Tape Reader Run | |
| XADR | X coordinate address | Control Routing of Information |
| YADR | Y coordinate address | From Tape Reader |
| IADR | I address | |
| JADR | J address | |
| GADR | G address | |
| FADR | F address | |
| MADR | M address | |
| DADR | D address | |

NOTE: Any of foregoing symbols preceded by letter E or letter C designate that the flip-flop is respectively "enabled" or "cleared" to make the signal a "1" or a "0".

| | |
|---|---|
| EL | End of Block (from tape reader) |
| SPR | Sprocket Hole |
| AC | Advance End of Block Counter |
| ICDTZ | Inhibit Clear of DTZ |
| LABM | LAB number minus (negative) |
| AGB | A greater than B |
| ALB | A less than B |
| A = B | A equal to B |
| SST | Not same sign twice |

IFA     Inhibit Feed Active
(IFA = $\overline{CYST}$

Arithmetic Computer Control Signals

| | |
|---|---|
| CAR | Clear Answer Register |
| sx | subtract incoming number |
| $\overline{FUL}$ | force unlike sign addition |
| FUL | force like sign addition |
| FP | force positive |
| emx | enable multiply - TYPE II |
| cmx | clear emx operation |
| emx' | enable multiply - TYPE III |
| cmx' | clear emx' operation |
| emx'' | enable multiply - TYPE I |
| cmx'' | clear emx'' operation |
| ed | enable divide |
| cd | clear divide operation |
| SL1 | Shift answer left, one place |
| SL2 | Shift answer left, two places |
| SL4 | Shift answer left, four places |
| SR1 | Shift answer right, one place |
| SR2 | Shift answer right, two places |
| SR3 | Shift answer right, three places |
| SR4 | Shift answer right, four places |
| cx | classify first number A relative to second number B |
| ZR1 | zero Main Answer Register |
| ZR2 | zero Overhanging Answer Register |

It is to be observed that any particular symbol may be used to identify a number which is represented (in BCD) by a particular set of electrical signals, or to identify the particular device which either creates or stores those signals. Thus for example, the register 40 (FIG. 9l) may sometimes herein be referred to as the "XEP register" because it stores and signals what is here called the *XEP* number. Similarly, the active register R14 (FIG. 9i) may sometimes be called the XCEP register because it stores and signals the active computed X end point coordinate number *XCEP* for the segment which is being actively processed by the system. As a further example, a flip-flop used as a bi-state device $\overline{VDA}$) as shown in FIG. 9n may be called simply the *VDA* flip-flop — and the *VDA* =1 signal produced by that flip-flop in the "set" condition has the significance of indicating that the difference between the then existing actual velocity (*PVA*) of the element and the next steady state velocity value (*PVC*) to be reached is greater than 3.0 in./min.

Reference will be made to the foregoing Glossary as the description of the system and its operation proceeds.

TAPE READER AND BUFFER REGISTERS

Attention will next be directed to the input portion of the system (FIGS. 9l, m, n, o) whereby information is read from the punched tape 37 and stored temporarily in the buffer registers of the system. The XEP register 40 (FIG. 9l) is exemplary of all the buffer registers with exceptions which will be noted in connection with particular ones of registers. It consists of two parts, a six stage shift register for storing six binary coded decimal digits of a number, and a seventh stage for storing the sign of that number. Each digit stage of the shift register is made up of four J-K flip-flops which are identical to the flip-flops 155 and 157 described with reference to the Divide by 4 circuit of FIG. 9b, with the sole difference that the letters Q and $\overline{Q}$ are used in place of the letters T and $\overline{T}$ to denote the outputs. Input signals are applied to the register 40 on a set eight input lines labeled $8, \overline{8}, 4, \overline{4}, 2, \overline{2}, 1$ and $\overline{1}$. Successive pairs of eight input lines are applied to the J and K inputs of successive ones of the four flip-flops comprising the lowest order digit position of the register. The two lowest order positions are shown in detail in FIG. 13.

Flip-flops 201, 203, 205 and 207 comprise the lowest order digit stage, and the second stage includes another four flip-flops 209, 211, 213, and 215, each of which receives at its J and K inputs the Q and $\overline{Q}$ outputs of the corresponding flip-flop of the preceding stage. The first two digit stages are exemplary of the other four stages which are not shown. They too contain four flip-flops per stage and the flip-flops comprising each stage are connected to the flip-flops comprising the preceding stage in the same manner in which the second stage flip-flops 209–215 are connected to the first stage flip-flops 201–207.

To enter data into the shift register, groups of binary coded signals are periodically applied to its eight input lines and synchronously with these signals clock pulses are applied at regular intervals over an "X shift" input line 217 X to the CP inputs of all the flip-flops of the shift register. With each shift clock pulse the binary signals on the eight input lines are stored in the lowest order stage of the shift register. With each succeeding clock pulse, the signals are shifted to the next higher order stage and a new group of signals is entered into the lowest order stage of the shift registers until after the sixth clock pulse and the sixth group of signals, the first group of signals has been transferred all the way to the last or highest order stage of the register and the last group of signals has been stored in the first, or lowest order, stage of the register.

Figure 13:
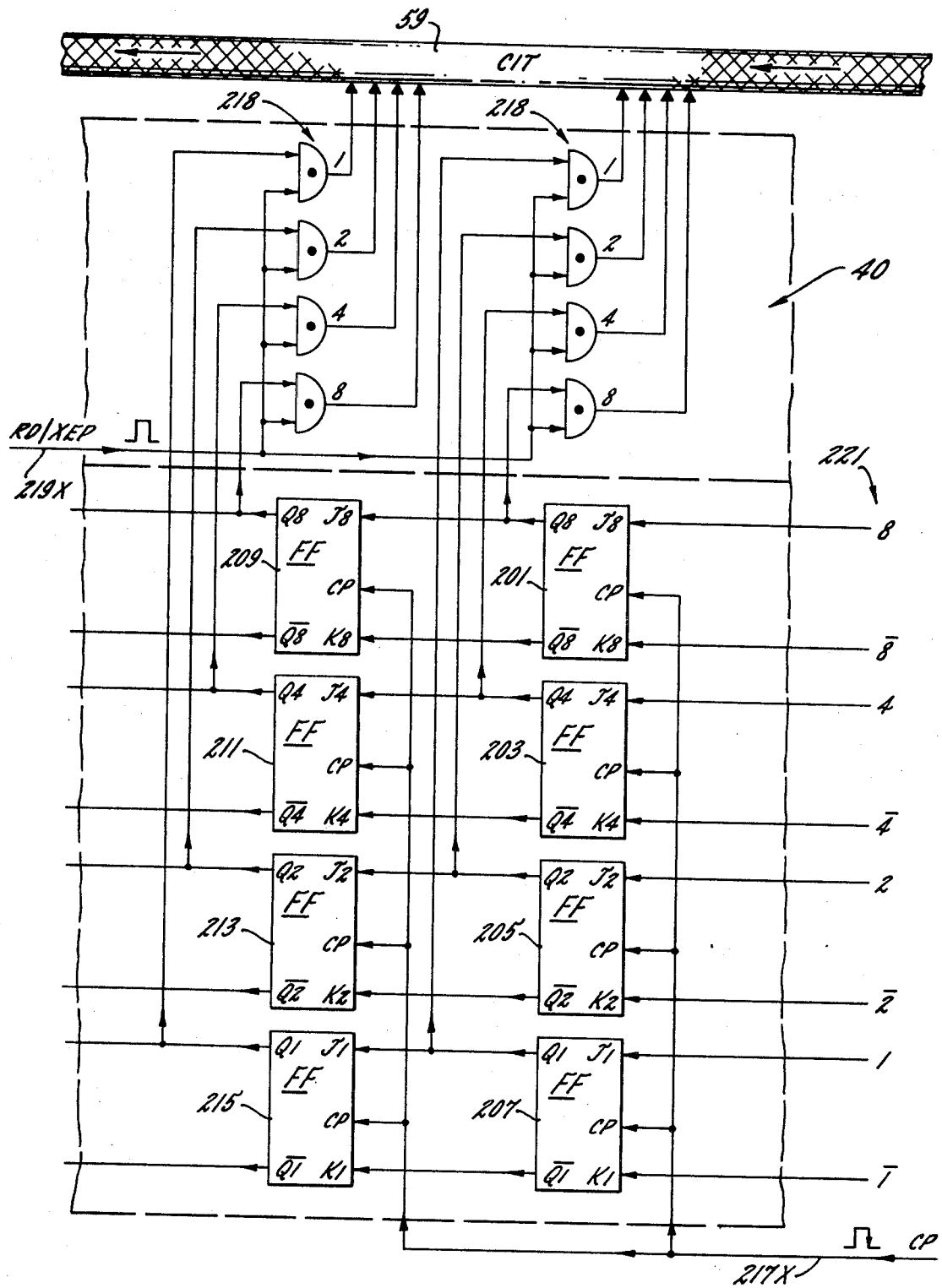
FIG. 13 is a detailed block diagram of the last two stages of a buffer shift register such as those shown in FIGS. 9l and 9o.

In the operation of the system of FIG. 9 it is desirable to transfer simultaneously all of the signals which have been entered serially into the digit stages of the *XEP* buffer register 40. For this purpose, a group of READ gates have been shown in block form as a part of the register 40 in FIG. 9l, and the details of such gates are shown in FIG. 13. In particular, four READ gates 218 are provided for each digit stage of the register and each of them receives one of the eight outputs of the stage. Thus, a total of 24 READ gates 218 comprise the group of gates for simultaneously transferring or "reading" the contents of the six digit stages of the register 40 onto the computer input trunk line 59.

Each READ gate is comprised of a standard two-input positive logic AND gate, plus an isolating diode, as illustrated in FIG. 12a. As shown in FIG. 12a, a typical two-input READ gate includes a pair of diodes 208 and 210 whose cathodes receive the two logic input signals applied to the gate and whose anodes are connected together and through a resistor 212 to the positive terminal of a voltage source. The output of the AND gate is applied to one of the conductors 59 1 of the trunk 59 through an isolating diode 214. The other end of the trunk line conductor 59-1 is typically connected to the negative terminal of the voltage source through a path within the computer 53, represented in FIG. 12a by the resistor 216.

The READ gate, comprised of the components 208–214 just described and connected to the trunk line conductor 59-1 may be assumed to be one of those shown in FIG. 13 as part of the buffer register 40. Several other buffer registers have corresponding READ gates whose outputs are also connected to the same trunk conductor 59-1. One of these READ gates 218a is shown in FIG. 12a as being comprised of the resistor 212a, a pair of diodes 208a and 210a, the foregoing three components comprising the AND gate portion of the READ gate, and an isolating diode 214a. The isolating diodes 214 and 214a serve to prevent the interaction of the several READ gates which are part of different registers but whose outputs are connected to the same trunk conductor.

To clarify the correspondence between the symbol used for a READ gate and the actual circuit represented by that symbol, the two READ gates 218, 218a which are drawn in FIG. 12a in detail are shown in FIG. 12b with the READ gate symbols being substituted for the individual components of the gates.

To time the simultaneous transfer of data from the buffer register 40, a gating signal is applied over a line 219X labeled "RD/XEP" (FIGS. 91 and 13) to a second input of each of the READ gates 218 (FIGS. 91 and 13).

In addition to the six digit stages of the register 40, it also includes a seventh stage (shown in FIG. 91 to the left of the highest order digit stage) for storing the sign of the number whose digits are stored in the other six register stages. This sign storage is not shown in the detailed representation of the register in FIG. 13. It comprises a single J-K flip-flop 220X with the J and K inputs of the flip-flops receiving signals respectively representing a negative and a positive sign. To time the entry of the sign signal into the sign flip-flop 220X, a sign store clock pulse is applied to its CP input. And to permit transfer of the sign information stored in the flip-flop 220X along with the digit data stored in the six digit stages of the register 40, its group of READ gates 218 includes an AND gate connected between an output of the sign store flip-flop and the sign-carrying wire of the trunk line 59 and gated concurrently with the other gates in the group from the line 219X.

The foregoing description of the XEP buffer register 40 applies equally to the buffer registers 41, 42, 43, 45, 46, 48 and also to the shift register 47 which receives the D number. All of these (except 46, 47, 48) include a single stage for storing a sign signal and one or more digit stages for storing a decimal number. Due to the much smaller number to be stored therein, the G BUF register 46 has fewer stages than the buffer registers. From the discussion related to FIG. 4 it will be recalled that the G number comprises three characters, the first designating the letter G and the second and third designating a two digit number. Only the second, lowest order digit of the number is actually used in the present case. Consequently the G BUF register 46 comprises a single digit stage of four flip-flops connected exactly as the flip-flops 201–207 in FIG. 13. The first digit to be entered in the register is simply destroyed when the second number is subsequently entered and this second number is then converted into a control signal by means of a G BUF decoder 221.

The decoder 221 has five control outputs respectively labeled G01, G02, G03, G02+G03, and G09 and is operative to produce a logic 1 signal at those of its outputs which correspond to the number stored in the G BUF register 46. If the number stored in the register is 1, a logic 1 signal is produced at the G01 output of the decoder and this indicates to the rest of the system that the numbers stored in the registers 40, 41, 42, 43, 47, represent a linear path segment. If the number stored in the register 46 is 2, a logic 1 signal appears on the G02 output of the decoder 221, indicating that the path segment to be generated is circular, progressing clockwise. A counterclockwise progressing circular path segment is indicated by a logic 1 signal on the G03 output of the decoder and this occurs when the number stored in the register 46 is 3. And, if a 2 or a 3 is stored in the register 47G, the G02+G03 line of the decoder 221 is energized with a logic 1 signal, indicating that the path to be generated is circular but that it may be either clockwise or counterclockwise. These latter signals will be used in systems which are intended to carry out circular interpolation, as explained fully in the said copending application. An output on the G09 line may represent an auxiliary function which directs that the element be automatically brought to a substantial stop at the end of one segment before proceeding automatically through the next segment.

To provide individual control over the stepping of data in different ones of the buffer registers, each is provided with an individual shift control line for supplying clock pulses. In addition to the X shift clock pulse line 217X associated with the register 40, five other clock pulse lines 217Y, 217I, 217J, 217F, 217G, 217D and 217M are associated with respective ones of the registers 41, 42, 43, 45, 46, 47, 48. Each of the six clock pulse lines 217 receives clock pulses through an individual one of six clock pulse control AND gates 222X, Y, I, J, F, G, D, M from a common shift clock pulse line 223 connected to a first input of each of the AND gates. Means are provided individually to enable each of the AND gates 222 thereby passing shift clock pulses only to a selected one of the buffer registers. The clock pulses are derived directly from the sprocket holes on the punched tape 37, thus insuring that they will be in synchronism with the numbers being read from the tape. Specifically, the tape reader 39 (FIG. 9m) includes a nine channel photoelectric hole detector, eight channels for the eight information channels on the tape 37 and a ninth channel for the sprocket holes of the tape. As each row of holes is transported past the detector, it produces data channel pulses on eight output lines, shown collectively in FIG. 9m as a trunk line 225, and a timing pulse on a ninth output line 22 Since 227. sprocket hole is smaller than the data holes, the timing pulse produced in response thereto is shorter in duration than the data channel pulses as indicated by the waveforms to the left of the tape reader 39. This assures that any shifting operation initiated by the clock pulses will occur between the leading and lagging edges of the data channel pulses.

The sprocket hole pulses are applied to the shift clock pulse line 223 through an AND gate 229 which is part of a logic gating arrangement for permitting only those pulses that are derived from sprocket holes in digit data rows to reach the line 223.

The data channel pulses of the tape reader 39 are applied over the tape reader output trunk line 225 to a decoder 224 which is shown in block for only, since decoders are well known to persons skilled in the art of data processing. It need only be noted that the decoder 224 is provided with eight inputs connected to receive the signals on the trunk line 225 and with a first group of eight outputs labeled 8, $\bar{8}$, 4, $\bar{4}$, 2, $\bar{2}$, and 1, $\bar{1}$. As row after row of the indicia on the tape 37 are read by the tape reader 39, the decoder 224 is operative to produce at its first group of eight outputs electrical signals representing the decimal digit value of each row of indicia in binary coded decimal form. The aforesaid eight outputs comprise an eight-conductor decoder output trunk line 221 leading to the inputs of the several buffer shift registers, as made clear by the example in FIG 13.

A principal function of the decoder 224 is to generate over individual ones of a second group of output lines 231 signals in response to those rows of indicia on the tape 37 which represent the address characters X, Y, I, J,, D, F, G and M. Thus by means of appropriate logic gating devices signals are produced on the corresponding one of output lines 231X, 231Y, 231I, 231J, 231D, 231F, 231G and 231M of the decoder 224 as a data row representing the characters X, Y, I, J, D, F, G or M is sensed by the tape reader 39. At a seventh output 232, marked EL, the decoder also produces a signal when the last, or EL character of a block is read. The signals which are produced at the output lines 231 are called the "address" signals and are used to control the flow of clock pulses to that particular one of the buffer-registers which is to receive the particular number which will next be read from the tape. Thus, eight J-K flip-flops 233 (FIGS. 9m and 9n) are provided, one for each of the buffer registers which may receive data from the tape reader. Each of the address output lines 231 of the decoder 224 is connected through a common OR gate 235 to the K inputs of all of the flip-flops 233 so that all (except one) of the flip-flops are reset each time any address character is read from the tape. Furthermore, respective ones of the eight address output lines 231 are individually connected directly to the J input of a corresponding one of the eight flip-flops 233 so that, as successive ones of the address characters X, Y, I, J, F, D, M and G are decoded, successive ones of the flip-flops 233X, Y, I, J, F, D, M and G receive a signal at their J inputs. The sprocket signal SPR on line 227 and the output of OR gate 235 are applied to the two inputs of an AND gate 237 so that each time an address character is read from the tape and an address signal is produced on one of the eight lines 231, a sprocket hole pulse is gated through the AND gate 237 to the CP inputs of all of the flip-flops 233, thereby setting that one of the flip-flops which is then receiving an enabling signal on its J terminal.

As the tape 37 transported through the tape reader 39, each time an address row of indicia is read and decoded, all eight of the flip-flops 233 receive a pulse at their K inputs and also at their CP inputs. Furthermore, one of the flip-flops will also receive a signal on its J input directly from one of the eight address outputs 231 of the decoder 224. Only those seven flip-flops which receive signals at their CP and K inputs will be reset, and the eighth flip-flop, receiving signals at all three of its inputs, will be caused to reverse its state from a reset to a set condition, i.e., from its "0" to its "1" state. Consequently, as each address row on the tape is read and decoded, a different one of the flip-flops 233 will be set. Thus in response to the X address row, containing holes in channels 1, 2, 3, 5 and 6, a signal will be produced by the decoder 224 on its output line 231X and this signal will be fed to the J input of the flip-flop 233X causing that flip-flop to be the only one whose state is reversed and leaving the flip-flop in its set or "1" state. As a result, a logic 1 signal appears at the Q output of the flip-flop. This output, labeled the "XADR" (X address) is connected by a line 239 X to the second input of the shift clock pulse control AND gate 222X. The logic 1 signal thereon permits shift clock pulses to pass from the line 223 onto the X shift clock pulse line 217X.

The Q outputs of the other flip-flops 233Y, I, J, D, F, G and M are similarly connected by lines 239Y, I, J, G, Q to supply enabling signals to the AND gates 222Y, I, J, G, Q through which sprocket hole pulses are fed to the other buffer registers holding the numbers YEP, I, J, D, F, G and M.

The next row of indicia after the X address row represents a minus sign (See FIG. 4) and is presented by the decoder 43 on the second of a pair of special "+" and "−" output lines 241 and 243. The + and − lines 241 and 243 are connected to the J and K inputs of the sign flip-flops of the buffer registers 40, 41, 42, 43. The lines 241 and 243 are also connected to the inputs of an OR gate 245 whose output is connected to one input of an AND gate 247. The other input of the AND gate 247 receives sprocket hole pulses through the line 227 from the tape reader 39 and the output of the AND gate is connected over a line 249 to one input of each of four AND gates 251X, 251Y, 251I, and 251J (FIG. 9l). Respective ones of the AND gates 251X, Y, I, J, have their outputs connected to the CP inputs of the sign store flip-flop 220X. flip-flops I, J and their second inputs connected to the Q outputs of respective ones of the address flip-flops 233X, Y, I, J. By means of the gates 245 and 247, sprocket hole pulses are passed to the inputs of the AND gates 251 only when a sign signal is present on one of the decoder output lines 241 or 243, and by means of the AND gates 251, the sprocket hole pulses are applied to the sign store flip-flop 220 of that particular register which should receive the digits associated with the sign signal. Thus the sign signal on the lines 241 or 243 will entered in the proper sign store flip-flop 220.

To prevent shift clock pulses from reaching the register 40 before the first X digit has been read from the tape, the AND gate 229 which controls the supply of sprocket hole pulses to the clock pulse line 223 is disabled while the X sign is read from the tape and is enabled only when a digit is being read from the tape. For this purpose, the output of the OR gate 235 is fed to an OR gate 253 whose output, in turn, is applied through an inverter 255 to a second input of the AND gate 229. As a result, whenever the OR gate 135 receives a logic 1 signal from one of the address lines 231 of the decoder 224, that signal is applied through the OR gate 253 to, and is inverted by, the inverter 255 to be applied as a logic 0 signal to the AND gate 229. A sprocket hole pulse is thus prevented from being passed through the AND GATE 229 whenever the character being read from the tape is an address symbol.

Further, to prevent a sprocket hole pulse from passing through the AND gate 229 when a sign signal or an EL row is being read, the output of the OR gate 245 is connected to a second input of the OR gate 253, and the EL output 232 of the decoder 224 is connected to an input of the OR gate 235.

Following the reading, decoding and storing of the sign of the X coordinate number (see the example of FIG. 4) the next row of indicia, representing the first digit of the X coordinate, a 3, is read and decoded. Since the row represents a digit, none of the input lines to the OR gates 235 or 245 carries a logic 1 signal so that a logic 0 voltage level appears at the output of the OR gate 253. This signal level is inverted by the inverter 255 and is applied as a logic 1 signal level to the AND gate 229, enabling it. As a result, a sprocket hole pulse SPR is passed through the AND gate 229 onto the digit store clock pulse line 223. This sprocket hole pulse is gated through the AND gate 222X by the signal XADR from the address flip-flop 233X, causing the data appearing on the digit output lines of the decoder 224 to be shifted into the lowest order digit stage of the register 40. As successive digit rows are read, five more sprocket hole pulses are applied through the AND gate 222X and over the line 217X as shift clock pulses to the register 40, causing the other five digits of the X coordinate to be shifted into the register. After the last shifting operation, the first read digit will be stored in the highest order stage of the register and the last read digit will be stored in the lowest order stage. In the same manner, the sign and digit rows of the Y, I, and J numbers are stored in the registers 41, 42, and 43.

The storage of the D, F, G and M numbers in the registers 47, 45, 46 and 48 differs from the foregoing process only in that none of these numbers needs a sign. Consequently, the step associated with the reading and storing of the sign of the number is omitted.

When the last row or character EL in a block on the punched tape is read, the tape reader 39 is automatically stopped until the next block of data is to be transferred from the tape 37 to the buffer registers. The starting of the tape reader is synchronized with the remainder of the system of FIG. 9 by means of the tape reader start control arrangement shown in FIG. 9m. This includes a J-K flip-flop 257. The tape reader 39 is provided with a RUN input 259 connected to the Q output (carrying the signal TRR) of the flip-flop 257 and is operative to transport the tape 37 and read the data thereon so long as the signal TRR is at a logic 1 voltage level. The clock pulse input (CP) of the flip-flop 257 is connected to the output of an OR gate 261 and one of the inputs of the OR gate is, in turn, connected to the output of an AND gate 263. One input of the AND gate 263 and the K input of the flip-flop 257 are both connected to the EL output of the decoder 224 through a line 265. The other input of the AND gate 263 is connected to the sprocket hole pulse line 227. Consequently, assuming that the flip-flop 257 was set to start the tape reader 39 reading of a block, when the last row of data in the block, representing the end of line symbol EL is read by the tape reader 39, a logic 1 signal is applied to the K input of the flip-flop and shortly thereafter a sprocket hole pulse is gated through the AND gate 263 and the OR gate 261 to the CP input of the flip-flop. As soon as the EL symbol has been read, the flip-flop 257 is reset and applies a logic 0 voltage level to the RUN input 259 of the tape reader, causing the latter to stop just short of reading the first row of data in the following block.

The OR gate 261 receives at a second input the output of an AND gate 267. One input of the AND gate 267 is connected to the PCP output of the decoder 173 in FIG. 9b and the other input of the AND gate is connected to the output 271 of an OR circuit 270 which leads also to the J terminal of flip-flop 257. A logic "1" signal on output 271 will thus set flip-flop 257 to the "1" state and start the tape reader. The line 271 receives an output in response to any of several conditions. First, if a new punched tape 37 has just been inserted into the tape reader 39 and the system is to be initially started to begin processing of a program, the Cycle Start flip-flop CYST (FIG. 9n) will have been reset at the end of the previous program, so the signal $\overline{\text{CYST}}$ will be at 1 level. The EOB counter 186 (FIG. 9e) will have been returned to its S1 count state, so the signal at terminal S1 will be "1." A READ flip-flop 272 (FIG. 9m) will be in the reset state. But if the human attendant merely depresses momentarily a normally open switch CY START, then a pulse will be applied to the CP input of that flip-flop and the latter will be "set" to make the signal READ a "1." All these inputs to an AND gate 273 will thus be qualified, and it will produce an output which passes through OR circuit 271 to set flip-flop 257 and actuate the tape reader. While the reader is operating, the signals TRR and $\overline{\text{TRR}}$ are respectively at 1 and 0 levels. When the EL character is read from the first block of data, the EOB counter 186 (FIG. 9e) is stepped from its first to its second state, so the signal S1 goes to a 0 level and the gate 273 is disqualified to prevent the tape reader from restarting when the signal $\overline{\text{TRR}}$ returns to a 1 level. Thereafter, the first block of data is transferred from the buffer to the active registers and the READ flip-flop is cleared by a signal CREAD from a PGA 275 (as hereafter described). The tape reader is thereafter started to read the second block of data by operation of an AND gate 269. The latter gate produces an output—which sets flip-flop 257 to start the tape reader—when time step 991 occurs and the signals S9 and $\overline{\text{CYST}}$ are both "1." This happens, as explained below, each time after a block of data has been transferred from buffer to active storage, so that one block of data is read and ready to use after the preceding block has been taken into the system for processing.

It may be noted here that the flip-flop NDM (FIG. 9n) is used to signal when "new M data" is brought into the system by reading of any block which contains an auxiliary function M word. This flip-flop is set by a signal on the line 231M each time an M address character is read, and it is reset or cleared by a signal CNDM from a PGA 276 before the tape reader is restarted to read any block. Thus, when NDM is a "1" it signifies that the last-read block contained an M word. This will be of significance in the later description of operations to stop the system in response to reading of the code M00.

THE ACTIVE REGISTERS

Figure 14:
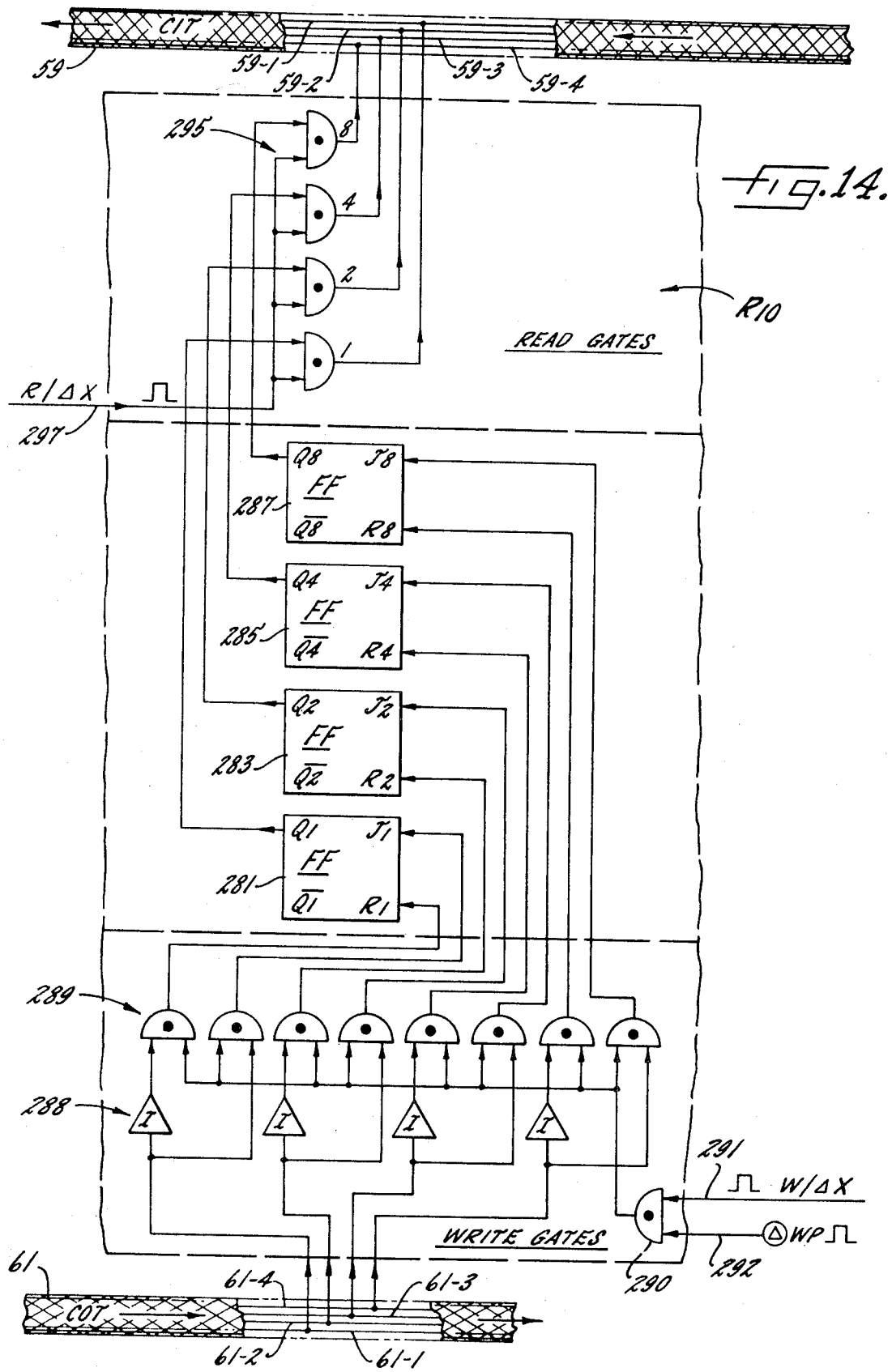
FIG. 14 shows in detail one stage of a storage register and makes clear the detailed organization of the several storage registers shown by block representation throughout FIGS. 9a through 9r.

In contrast to the serial transfer of data from the decoder 224 to the buffer registers, the flow of data from the buffer registers and the digital computer 53 is characterized by parallel, or simultaneous transfer. Transfer of a word or number from the computer 53 to an active register or from an active register to the computer is also parallel in the present exemplary embodiment. Generally, as one of the first operations in the process performed by the system of FIG. 9, the data stored in respective ones of the buffer registers is read in parallel into the computer 53 on different program steps by enabling the READ gates of the respective buffer registers. The data so placed on the computer input trunk line CIT 59 is temporarily stored in the computer 53 without removing it from the register from which it was read and is then put by the computer on the computer output trunk line COT 61 during the following program step to be stored in a designated one of the active registers. The trunks 59 and 61 each contain four conductors for each digit of the number to be sent over them and an additional line for the sign of the number. The exemplary system has a capacity for processing numbers with up to eight digits and therefore each of the trunks 59 and 61 includes a total of 33 conductors. FIG. 14 shows the trunks 59 and 61 in greater detail, illustrating the four conductors associated with the lowest order digit to be carried on the output trunk 61 as the conductors 61–1, 61–2, 61–3, and 61–4. Similarly, the four conductors associated with the lowest order digit to be carried from the buffer or active registers to the computer 53 are shown as the conductors 59–1, 59–2, 59–3, and 59–4. In FIG. 9r all 33 of the conductors in the CIT trunk 59 are shown, each set of four being respectively labeled 1, 2, 3, 4, 5, 6, 7 or 8 to designate the corresponding descending "-places" of a decimal number. The four conductors within each set are respectively assigned the weighted values of 1, 2, 4, 8 for a conventional binary code. Any particular conductor may be designated by a shorthand symbol which identifies the set and the weighted value of that conductor within the set. For example, the symbol CIT 42 means the fourth from the highest digit place and the "2" valued conductor. Assuming for the moment that the decimal point is located after the fourth place, then a binary "1" level on CIT 42 would represent the decimal number 0002, 0000. It will thus be seen that the several PGA's in FIG. 9r may be used to "read in" to the computer trunk different predetermined numerical values. For example, if a PGA n12 produces an output voltage at a 1 level, then the conductors CIT 62; CIT 61; CIT 72; and CIT 71 receive that voltage and the number 00000330 is represented on the conductors of the trunk. The sign of a number so signaled is taken as positive or negative if a 0 or 1 level voltage is present on the sign conductor which is called CIT(−) for trunk 59 and COT(−) for trunk 61.

Returning to the various active registers R–1 through 29, these may all be understood from a detailed description of a typical one. Observe from FIG. 9h that the $\Delta X$ active register R10 includes as a part thereof a plurality of decimal digit storage stages (here, four) plus a sign storage stage as well as associated READ and WRITE gates. Shown in FIG. 14 is the lowest order digit stage of the $\Delta X$ register R10. The register stage illustrated in FIG. 14 is representative of all of the other three digit stages of the register R10. The sign stage of the register is similar to one quarter of the digit state. Thus, the $\Delta X$ register has a total of seventeen flip-flops, and is representative of all of the other active storage registers, except that some of them have more digit stages, others may have fewer digit stages, and others yet do not have a sign stage.

Referring to FIG. 14, the lowest order digit stage of the $\Delta X$ register R10 includes four well known type R-S flip-flops 281, 283, 285 and 287. There is no provision for shifting the data stored in the flip-flops 281-287 to a higher stage. Rather, data is "written" over the four trunk line conductors 61–1, –2, –3 and –4 to the flip-flops 281-287 and is subsequently "read" from the flip-flops over the four trunk line conductors 59–1, –2, –3 and –4. To permit simultaneous "writing" transmission of signals over the trunk line 61, a group of seventeen inverters and seventeen pairs of AND gates collectively comprise the WRITE gates associated with the register. Those of the inverters and AND gates that are associated with the lowest order digit stage of the register are shown in FIG. 14 as the inverters 288 and the AND gates 289 connected between the trunk line conductors 61–1, –2, –3 and –4 and the "set" and "reset" inputs of the flip-flops 281-287. One input of four of the AND gates 289 is connected to a respective one of the conductors 61–1, –2, –3 and –4 and the output of each of these four AND gates is connected to the S input of a different one of the four flip-flops 281-287. The second group of four AND gates are connected to the outputs of the four INVERTERS 288, which in turn are connected to respective ones of the lines 61–1, 61–2, 61–3 and 61–4.

The second group of four AND gates have their outputs connected to respective ones of the R inputs of the four flip-flops 281-287. With the common input to the eight AND gates 289 held at logic "0," the four R-S flip-flops 281-287 are held in their existing states. When a number is to be written into the flip-flops of the $\Delta X$ register, the line 291 is brought to the logic 1 level by appropriate program gating which provides a $W/\Delta X$ signal. At the appropriate time within the program step thus selected, the formerly blocked WP pulse is allowed to pass through an AND gate 290 to the common input of the eight AND gates 289. When this occurs, the common inputs are enabled, and the R-S flip-flops 281 through 287 acquire the data (i.e., are set or reset) from lines 61–1, 61–2, 61–3 and 61–4. A logic "1" presented at the S input sets an R-S flip-flop; a logic "1" presented at the R input resets the R-S flip-flop. When a logic "0" is presented on both inputs, the flip-flop does not change. The combination of logic "1" on both inputs is prevented from occurring by inverters 288.

To transfer a stored number from the register R10 to the computer 53, a group of seventeen READ gates, one for each of the seventeen flip-flops of the register R10 is provided. Each READ gate is a coincidence responsive logic device, four of which are shown in FIG. 14 as the READ gates 295, each having one input connected to the Q output of a respective one of the four flip-flops 281-287 and all of them having a second input connected to a common READ control line 297. The outputs of the four READ gates 295 are individually connected to respective ones of the trunk line conductors 59–1, –2, –3 and –4 so that, when a READ control signal ($R/\Delta X$) is applied over the conductor 297 to all of the READ gates 295, the information stored (i.e. "0" or "1" voltage levels) in the four flip-flops 281-287 is simultaneously applied via the READ gates to the aforesaid conductors.

The active register R28 (FIG. 9q) is, more accurately, a device for signaling a manually adjustable decimal number. Thus, it includes no WRITE gates, and may comprise three four-stack, 10 position manually settable switches which (in a fashion known *per se*) can signal in binary coded decimal notation any decimal digit value from 0 to 9. As shown, the register R28 signals a three digit number PCF which can be changed from any value of 0.00 to 1.99 by setting three associated selector knobs. The PCF ("percent feed") number is a feed rate override number, and as will be explained, it serves to cause the feed rate read from a block of data (F number) to be multiplied by the PCF value to establish the actual velocity at which the movable element will be translated along the path.

The active registers R2 and R3 (FIG. 9f) for the numbers X OFF and Y OFF are shown without associated WRITE gates. Fixed or changeable numbers may be stored in these registers by any appropriate means (not shown). The active register R1 for the G number does not include any READ gates, because its output may be directly decoded in the path indicator 106, the output of which for purposes of the present description will always be $LIN = "1."$

AN EXEMPLARY TIME SHARED DIGITAL COMPUTER

The destination as well as the source of almost all of the signals stored in the active registers is the time shared digital computer 53 (FIG. 9f). Such computers (sometimes called arithmetic central processing units) are well known and a discussion of their details would overburden this description. Instead, there will be described here the functions that are performed by the computer 53 and the times during which those functions are performed.

To satisfy the varied demands of the system of FIG. 9 in its different modes of operation, the computer 53 is capable of performing different arithmetic operations such as algebraic addition and subtraction, multiplication and division. The basic operating mode of the computer 53 is that of addition and all other operating modes are brought about by special control signals (see the preceding Glossary for the nature of those signals). The computer receives its inputs from the computer input trunk line 59 over eight branches of four conductors each, respective branches being labeled in FIG. 9f as CIT–1 through CIT–8 and representing successively lower order digits of a multidigit decimal number. In addition to the 32 conductors in the eight branches, a 33rd input conductor CIT (–) is provided for carrying the sign of the number signaled on the other conductors, and this is made clear in FIG. 9r. The output of the computer 53 is stored in an Answer Register 53a (sometimes called an Accumulator) which includes stages 1 through 8 corresponding to the eight numerical digits received by the computer over the trunk line 59 and a sign stage corresponding to the sign signal received by the computer.

Each of the eight digit stages includes means for storing four binary signals representing a decimal digit and these may be four J-K flip-flops such as those used in the buffer storage registers in the system. The sign stage includes means for storing a single binary signal representing the sign of the number (a "1" level designates a negative sign) stored in the other stages of the register and may comprise a single J-K flip-flop. The numbers stored in the Answer Register 53a appear on the conductors of the computer output trunk 61 which are connected to the Q outputs of the respective flip-flops comprising the answer register through eight output line branches COT–1 through COT–8 and an extra output line COT (–). Each of the eight branches COT–1 through COT–8 has four conductors, and respective ones of the groups are connected to successive ones of the stages 1 through 8 of the Answer Register 53a. The single COT (–) line is connected to the single flip-flop comprising the sign stage of the Answer Register.

A digit signaled on a particular one of the input line branches CIT–1 through CIT–8 is processed in the corresponding stage of the Computer Register 53a. Thus, a digit signaled on branch CIT–5 will be processed in stage 5 of the Computer 53. In performing addition, the computer 43 adds to each digit stored in the Answer Register 53a that digit of the next succeeding number which is signaled on the corresponding branch of the trunk line 59. Each decade of the computer, except the last, also includes means for carrying any excess over 9 of the sum developed therein to the next higher order stage. Thus, for instance, if an augend of +346 is stored in stages 6, 7, and 8 of the Answer Register 53a and subsequently an addend of +778 is applied over branches CIT–6, –7, and –8 to the computer, the result of +1, 124 will appear in stages 5, 6, 7 and 8 of the Answer Register and will be signaled on the conductors of the output trunk COT 61.

The computer 53 is time-shared and performs each operation very rapidly so that many different operations upon data received by it from diverse sources in the system may be repeated on a rapidly repeating cycle. Toward this end, the computer is synchronized with the rest of the system, receiving timing signals (by conductors not shown) from the time generator of FIG. 9b. The inputs supplied to and the outputs taken from the computer 53 as a part of the system of FIG. 9 will be best understood by recalling the concept of program steps explained with reference to FIGS. 10 and 11. As explained there, certain operations of the system may be timed to occur during selected ones of a plurality of time periods, called program steps, each of which is 20 microseconds long. For example, a number stored in a particular active storage register may be caused to be transferred to the computer input trunk line 59 in response to a gating signal applied to the READ gates of that register during a particular one of the program steps. The point to observe is that in the exemplary system the time during which such a gating signal is being applied to the READ gates of the storage register coincides with the program step involved.

Figure 15:
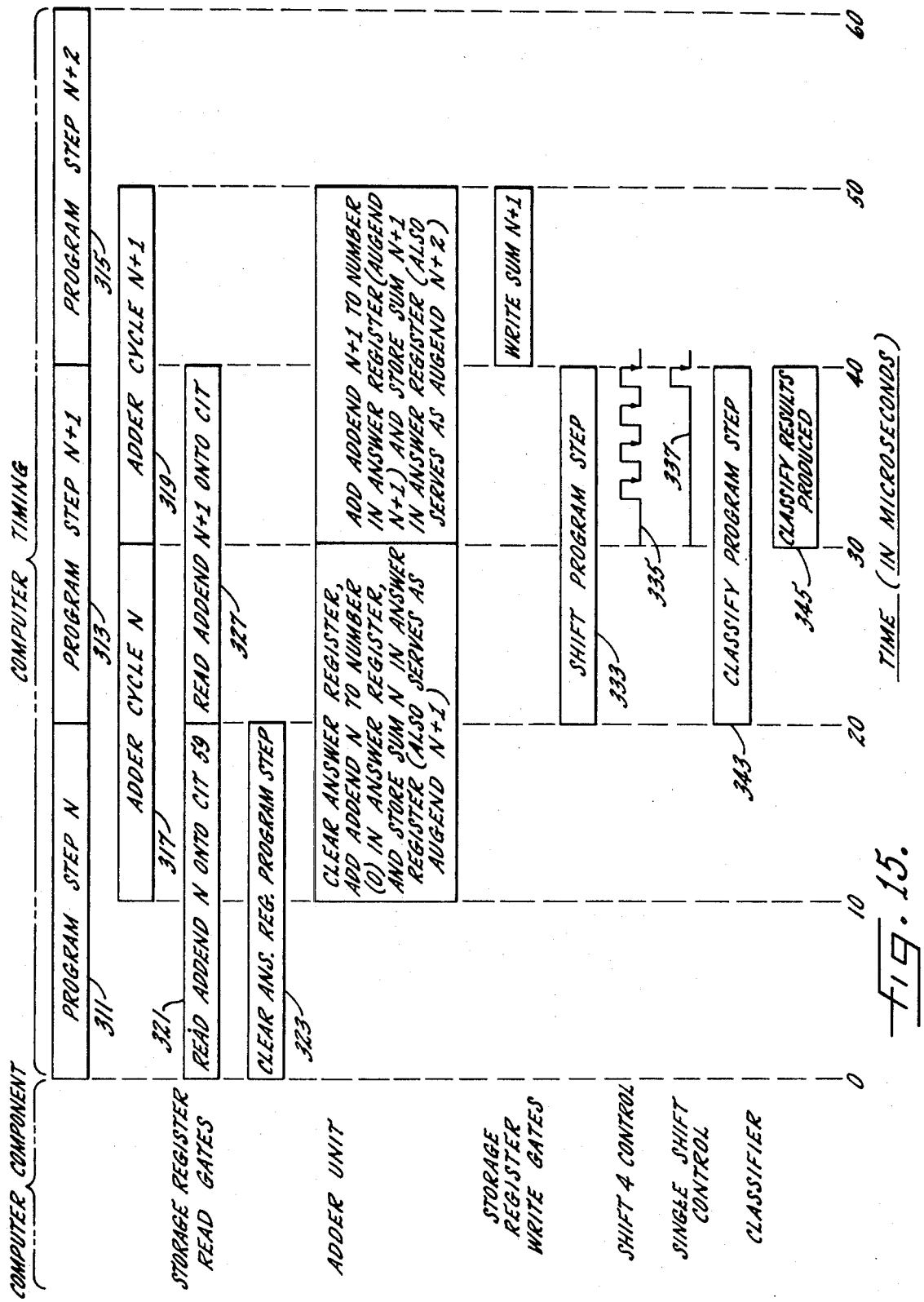
FIG. 15 is a timing diagram which illustrates the operation of the arithmetic computer shown in FIG. 9f.

Each operation of the computer 53 is also performed in response to a control signal produced during a particular program step. But the operating cycle of the typical computer here illustrated does not directly coincide with that program step. Instead, the operation begins during the middle of the program step in which that operation is initiated and ends at the middle of the following program step. The particular operation of the computer to which reference is being made is that of addition. Thus, the computer is so timed that, in response to a control signal during a given program step, it commences its operation for performing addition, called the Adder Cycle, halfway through that program step and terminates that adder cycle halfway through the following program step. Since the time periods during which numbers from various ones of the buffer and active storage registers are gated onto the trunk line 59 coincide with the various program steps, the adder cycles are staggered relative to the time periods during which data is supplied to the computer 53. This staggered time relationship is illustrated in FIG. 15. Shown against a time scale extending from 0 to 60 microseconds are three program steps N, N+1, and N+2 represented by a continuous row of three blocks 311, 313, and 315. The adder cycles N and N+1 corresponding to the first two program steps are shown staggered therewith, as the second row of blocks 317 and 319.

An example will serve to illustrate how the exemplary computer 53 would add two numbers stored in different registers of the system. Let it be assumed that a number stored in the $\Delta X$ register R10 is to be added to the number stored in XCP register R6. During program step N the XCP number is read from the register R6 over the trunk line 59 into the digital computer 53 over its input branches CIT-2 through CIT-8. During the same program step the computer is instructed by means of a control signal over its CAR control input to clear its Answer Register 53a and its Overhanging Register 53b of any number that might have been stored in it. These events are indicated in FIG. 15 by the blocks 321 and 323. Addition begins during the adder cycle N and is represented in FIG. 15 by the block 325.

During this period the Answer Register 53a is effectively "cleared" by supplying zeroes at the augend input terminals of the computer 53 in place of the numbers in the Answer Register which are normally used as the Augend, while supplying the XCP number at the addend input terminals of the computer from the trunk line 59. Since the Answer Register 53a has thus been made to appear empty, the result of the first adder cycle N is that only the XCP number will be stored therein. The above operation for causing the Answer Register to appear empty will be referred to throughout this specification simply as "clearing the Answer Register" and designated by the symbol CAR. Furthermore, since the result of "clearing" the Answer Register is to prevent the number which had been stored in it from being, in effect, re-entered in the same register as the augend of the next addition, clearing the Answer Register, in effect, "removes" the number which had been stored in it, and for this reason throughout the specification the step of clearing the Answer Register 53a, or the Overhanging Register 53ab, will be referred to as "removing" a number from those registers.

During the next program step N+1 (FIG. 15) the sign and four digits of the $\Delta X$ number are read onto branches CIT (−), and CIT-5, −6, −7, and −8 of the trunk line 59 and through them to the computer 53. This operation is shown to occur during program step N+1 and is represented by the block 327. Notice from FIG. 9h that the $\Delta X$ register R10 is labeled to indicate the decimal place branches into which the four stored digits are transferred when the associated READ gates are opened. This format is followed throughout FIG. 9.

To complete the addition, the computer 53 is signaled halfway through the program step N+1 (FIG. 15) to commence its next adder cycle N+1. In its normal, "add mode" operation within the system, the computer receives such a signal during each program step. In response to the signal indicating commencement of the adder cycle N+1, and with the computer operating in the ADD mode, the number signaled on the trunk line 59 is algebraically added by the computer to the previously stored XCP number and the resulting sum is substituted in place of the previously stored XCP number in the Answer Register 53a, as indicated by the block 329. In the actual operation of the system of FIG. 9, after the addition just described has been performed, the sum is substituted for the number previously stored in the XCP register R6. This occurs during the second half of the program step N+2, as indicated by the block 331, and is effected by opening the WRITE gates associated with register R6 during the program step N+2.

In the foregoing example the seven digits of the XCP number were entered into the computer 53 over its input line branches CIT-2 through CIT-8 and the four digits of the $\Delta X$ number were then entered over the input line branches CIT-5 through CIT-8. Entry of the $\Delta X$ number into the computer caused it to be added immediately so as to produce the correct sum of the two numbers in the Answer Register 53a. The reason why the addition was performed so directly is that the digits stored in corresponding stages of the registers 117 and 109 from which the numbers XCP and $\Delta X$ were taken have the same significance. In the case of the XCP register R6, the significance of the digits residing in its various stages can be readily seen in FIG. 9g by observing that a decimal point has been placed between the second and third highest order digit positions. Thus, the digit stored in the highest order stage of the register R6 in the exemplary system represents tens of inches. The next lower order stage represents units inches and successively lower order stages to the right of the decimal point represent tenths, thousandths, ten thousandths, and one hundred thousandths inches. Since the $\Delta X$ register R10 has only four digit stages in the exemplary system, its highest order stage represents hundredths of inches, so that the largest possible $\Delta X$ number that can be stored therein is 0.09999. This simply means that all macromove numbers are assumed to be less than 0.1 inches when the time period $\Delta T$ during which such a macromove is carried out is 20 milliseconds. This is a reasonable assumption since an excursion of 0.1 inches during 20 milliseconds would be the equivalent of 5 inches per second or 300 inches per minute.

Figure 16:
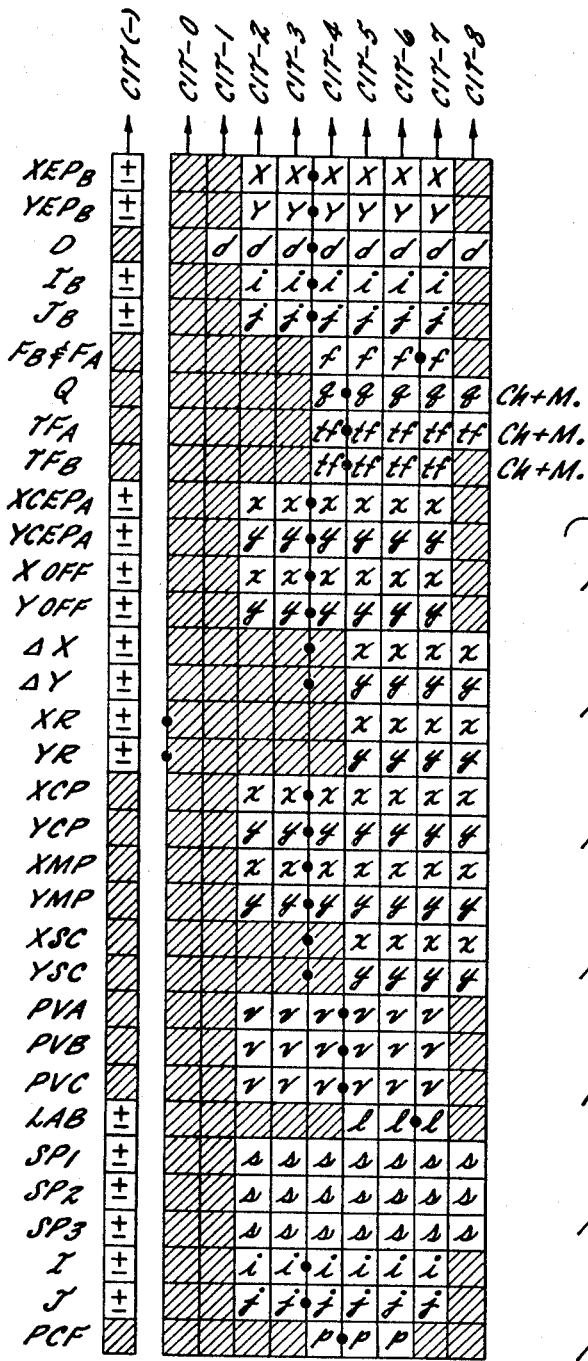
FIG. 16 is a chart showing the number of digits and the decimal place locations of the several changeable numbers stored and signaled within the system of FIG. 9, in relation to the decimal orders of the computer input and output trunks.

Unlike the XCP register R6, the $\Delta X$ register R10 does not carry an indication of the decimal point, because its highest order digit stage is one place removed therefrom. Instead, this information, as well as the placement of the decimal point and the digital significance of numbers in all of the other registers, is shown in FIG. 16. The registers of the system are shown in FIG. 16 as stacked upon one another, with each register being represented as a row of squares and identified by appropriate symbols to its left. FIG. 16 readily shows that the decimal points of the numbers XCP and $\Delta X$ coincide and that they may be added to one another in the manner explained hereinabove. This is not always the case, however, since FIG. 16 shows that not all of the numbers have their decimal points in the same place. When two numbers with differently placed decimal points are to be added, the first number is usually shifted in the Accumulator Register 53ab to bring its decimal point into alignment with that of the second number and only then is the addition performed.

So long as the computer continues to operate in the ADD mode, every time a number is read from one of the registers onto the computer input trunk line 59 during a program step, that number will be automatically added during the following adder cycle to the number previously stored in the Answer Register 53a. Usually the resulting sum will be sent to another location by enabling the WRITE gates of a selected one of the active registers during the particular program step in which the desired sum is available in the Answer Register 53a, but "writing" of a number held in the Answer Register leaves the latter still storing and signaling that number.

If it is desired that the computer 53 subtract a number signaled on the input trunk line 59 from a number stored in its Answer Register, a control signal $sx$ is applied to its input concurrently with the reading onto the trunk line 59 of the number that is to be subtracted. The difference then appears in the answer register prior to the start of the next program step.

The computer is also capable of performing multiplication of different types, the operation being initiated by an enabling control signal and terminated by a clearing signal. A TYPE I multiplication operation is effected by an enabling signal $emx''$ after which two numbers in common decimal format are read in via CIT 59. The computer operates through a series of automatic additions and decimal place shifts requiring several time steps, and at the end of the last time step the product number appears in the Answer Register in common decimal form. A $cmx''$ (clear multiply, type I) signal is then applied to the computer to take it out of the multiplication mode.

In some cases it is desirable to work with numbers which are expressed in "characteristic plus mantissa" form. A multidigit number is represented by a sign followed by a single digit called the "characteristic," which is in turn followed by a series of digits which are collectively called the "mantissa." The characteristic digit serves to indicate where the decimal point should be placed. If the characteristic digit is zero, the decimal point should be placed immediately before the first digit of the mantissa. If the decimal point should be placed after the first digit of the mantissa, the value of the characteristic will be +1. If there should be zero between the decimal point and the first digit of the mantissa, the characteristic digit will be a −1. Furthermore, if the decimal point should appear after the second, third, or fourth digit of the mantissa, this will be indicated by a characteristic digit of +2, +3, and +4 respectively. Similarly, if there should be 2, 3 or 4 zeros between the decimal point and the first digit of the mantissa, respective ones of these conditions will be indicated by the characteristic which is −2, −3, and −4. The common decimal numbers 23.654 or 0.00333 can thus be expressed in characteristic plus mantissa form as +2.23654 or −2.333. As noted in the preceding Glossary, the numbers Q, TFA, and TFB are signaled and stored in characteristic plus mantissa form.

A TYPE II multiplying operation is one in which the multiplicand is read into the accumulator in straight decimal form, but the next number, i.e., the multiplier applied to the computer input trunk CIT is expressed in characteristic plus mantissa form. After a certain number of program steps, the product appears in the Answer Register as a common decimal number. This type of multiplication is initiated by a control signal $emx$ and terminated by a "clearing" signal $cmx$.

A TYPE III multiplying operation is like TYPE II, but the resulting product is signaled by the Answer Register in characteristic plus mantissa format. This TYPE II multiplication is "enabled" by a control signal $emx'$ and is terminated or "cleared" by a control signal $cmx'$.

Division is also carried automatically when appropriate control signals are applied. Assuming that the Answer Register has been cleared, a first number in decimal format may be read into the computer along with an "enable division" control signal $ed$. A second number in characteristic plus mantissa form is read in on the next program step; and after a succession of time steps the quotient of the first number divided by the second number appears in the Answer Register in characteristic plus mantissa form. The division mode is "cleared" then by a "clear divide" signal $cd$.

To store the digits which are shifted toward the right from stage 8 of the Answer Register 53a, an "overhanging" register 53b is provided. This register is shown as including four digit stages and forms a continuation of the Answer Register 53a. Indeed, the Answer Register 53a and the overhanging register 53b will be considered as a single twelve stage accumulator register 53ab. However, only the first eight stages of this twelve stage register receive sum data from the computer 53 and only those eight stages feed the sum data to the output trunk line 61. The Accumulator Register 53ab has means for shifting its contents both toward the right and toward the left. The shifting operations performed during multiplication are internally initiated by the computer and these are not individually described herein. During certain other operations carried out by the computer, however, it is instructed to shift a number stored in its Accumulator Register 53ab to the right or to the left, and by different numbers of places. These shifting operations are externally initiated by application of control signals during designated program steps. The timing of such control signals and shifting operations initiated thereby is shown by block 333 and waveforms 335 and 337 (FIG. 15). Control signals SL1, SL2 or SL4 (from PGA's CC17, CC18 or CC20) will result in shifting of the number then in the Accumulator 53ab one, two or four places to the left; and the signals SR1, SR2, SR3, SR4 (from PGA's CC14, CC15, CC16, CC19) will result in shifting one, two, three or four places to the right.

Provision is also made in the computer 53 for selectively clearing either the Answer Register 53a or the Overhanging Register 53b. Such selective clearing operations are performed by the computer in response to control signals on the ZR1 (zero register portion 1) and the ZR2 (zero register portion 2) control inputs.

Another operation performed by the computer 53 is that of comparing two numbers and signaling the nature of their relative values. In carrying out this operation, the first of the two numbers to be compared is read onto the trunk line 59 during program step N (or has already been placed in the accumulator prior to step N) and the second of the two numbers is read onto the trunk line during the program step N+1, concurrently with a "classify" control signal $xc$ (from PGA CC13). The first number is considered the "A" number and the one read in last is considered the "B" number. The result of the comparison operation appears on one of the two outputs 339 and 341 in time to be used during the following program step (see blocks 343 and 345 in FIG. 15). If the first number $A$ is less than the second number $B$, a logic 1 signal appears on the output line 341 and signifies $A<B$ (here designated by the symbol $ALB$). If the first number $A$ is greater than the second number $B$, this is indicated by a logic 1 signal on the output line 339, indicating that $A<B$ (called $AGB$). By the use of inverters and an AND gate as shown in FIG. 9f, the complement signals are developed such that $ALB = 1$, $\overline{AGB} = 1$, $\overline{ALB} = 0$, and $AGB = 0$ when A is less than $B$; and $AGB = 1$, $\overline{ALB} = 1$, $\overline{AGB} = 0$, and ALB $= 0$ when $A$ is greater than $B$. When $A$ equals $B$, the signal $A = B$ is a 1 and all the others are 0.

Another mode of operation performed by the computer 53 is referred to as "force positive." In this mode of operation the computer treats the number which is entered into it as a positive number, regardless of what its sign is. To cause the computer to operate in this mode, a control signal is applied (from PGA CC23) to the FP control input of the computer concurrently with the reading of the number onto the input trunk line 59.

Finally, the computer can be caused to perform unlike sign addition (by a force unlike signal $\overline{FUL}$) or like sign addition (by a force like signal FUL which means "force not unlike sign addition"). In unlike sign addition the second number brought in is treated as opposite in sign to the first number existing in the Answer Register and the sum retains the sign of the first number [e.g., $(-7)+(-3) = -4$]. In like sign addition, the second number brought in always increase the magnitude of the first number existing in the Answer Register, and the sum retains the sign of the first number [e.g., $(-7)+(+10) = -17$]. The signal FUL or $\overline{FUL}$ is applied (from PGA CC12 or CC11) to the computer during the program step when the second number is read in via the input trunk CIT.

PATH TYPE INDICATOR FOR THE CURRENT PATH SEGMENT

In describing the buffer registers, reference was made to the G register 46 and to the G decoder 221 (FIG. 9l). It was stated that the decoder 221 is operative to produce at its outputs a signal indicative of the type of path represented by the signals stored in the other buffer registers. This information is useful because it can be used to control the type of operations to be performed on the data stored in the other buffer registers, in accordance with the shape of the path segment represented by them. Such a path indicative signal is also useful during the continuous processing of data in the active registers which occurs while the path is being executed, that is, while the controlled machine element is being moved along that path. It is for this reason that the G number residing in the buffer register 46 is transferred along with the numbers in the other buffer registers to the active registers and in particular to the path mode G register R1 (FIG. 9f).

The G register R1 appears immediately to the right of the computer 53 in FIG. 9f, and is comprised of two R-S flip-flops each for storing a binary signal. When the G number is transmitted from the G BUF register 46 to the computer 53, it is carried to the computer on the CIT−8 branch of the trunk line 59 and, in particular, on the one and two bit lines of that branch. When the number is subsequently sent from the computer to the G register R1, it is carried on the one and two bit lines of the COT−8 branch of the output trunk line 61 to the WRITE gates associated with the flip-flops of the register 105. In this manner, the digitally signaled G number, whether it be 1, 2 or 3, is transferred from the G BUF register 46 to the G active register R1. To convert the binary coded representation of the G number in the active register R1 into a single line representation, a decoder 106 (FIG. 9f) is provided. That decoder 106 includes an array of three AND gates 106a, 106b and 106c, connected to one another and through a trunk line 108 to the outputs of the G register R1 so that a logic 1 voltage level appears at the output of respective ones of the AND gates 106a, 106c and 106b, in response to a logic 1, 2 and 3 stored in the register. The decoder also includes an OR gate 106d connected to the outputs of the AND gates 106b and 106c so that a logic 1 signal appears at its output when either of the AND gates 106b and 106c is enabled. Since G numbers of 1, 2, and 3 signify paths which are linear, clockwise circular, and counterclockwise circular respectively, logic 1 signals on the outputs of the AND gates 106a, 106c, and 106b are respectively designated as LIN, CW, and CCW. Finally, a logic 1 signal at the output of the OR gate 106d is designated CIRC, meaning that a logic 1 signal appears at the output of the OR gate 106d when operations which are to be performed involve a circular path, be it clockwise or counterclockwise. These control signals LIN, CW, CCW and CIRC may be used as described in the said copending application, but for the sake of brevity in the present case, it will be assumed that linear operations are involved.

THE PROGRAM GATE ARRAYS (PGA)

The type of operation to be performed by the computer 53 and the particular program step during which that operation is to occur depends on several factors. Among these is the stage to which the generation of a path segment has progressed, the approach to the end of a segment, and the need to accelerate to or decelerate from a velocity in effect to the next desired, different velocity. Such factors are detected by means of a large number of program gates, each of which is connected to respond to the particular condition that is to initiate a particular computer operation. In most cases, a given type of computer operation will be required to be performed in response to a unique combination of several different conditions, each combination being detected by an individual program gate. All of the program gates associated with a given operation are collected in a group, and are referred to as a Program Gate Array, or PGA for short. All of the PGA's used to create control signals for the computer 53 are shown in FIG. 9c.

Program gate arrays are also used to time the reading of numbers into the computer input trunk line 59 from the active and buffer registers, and also to time the writing of numbers from the computer output trunk line 61 into the active registers. Each buffer register has a PGA associated with its READ gates and each active register (excepting R1, R2, R3 and R28) is seen to have two such PGA's, one connected to the WRITE gates and the other to the READ gates of the register. The different conditions under which a signal is produced by a particular PGA are listed therein. The significance of the conditions listed (and individually numbered parenthetically) in the PGA's represented by blocks throughout FIG. 9, and the actual internal structural details of any one of the several PGA's, will be made clear to those skilled in the art by the specific and concrete illustration in FIG. 17 of a typical PGA, i.e., the PGA R22r associated with the PVA register R22 shown in FIG. 9q. This particular PGA produces the "read PVA" signal R/PVA which opens the PVA read gates at certain time steps and under certain conditions, as labeled in FIG. 9q, namely:

1. 1359
2. 1364·(VDA+VDB+VDC)
3. 1864
4. 1370
5. 1870
6. 1153
7. 1238

Figure 17:
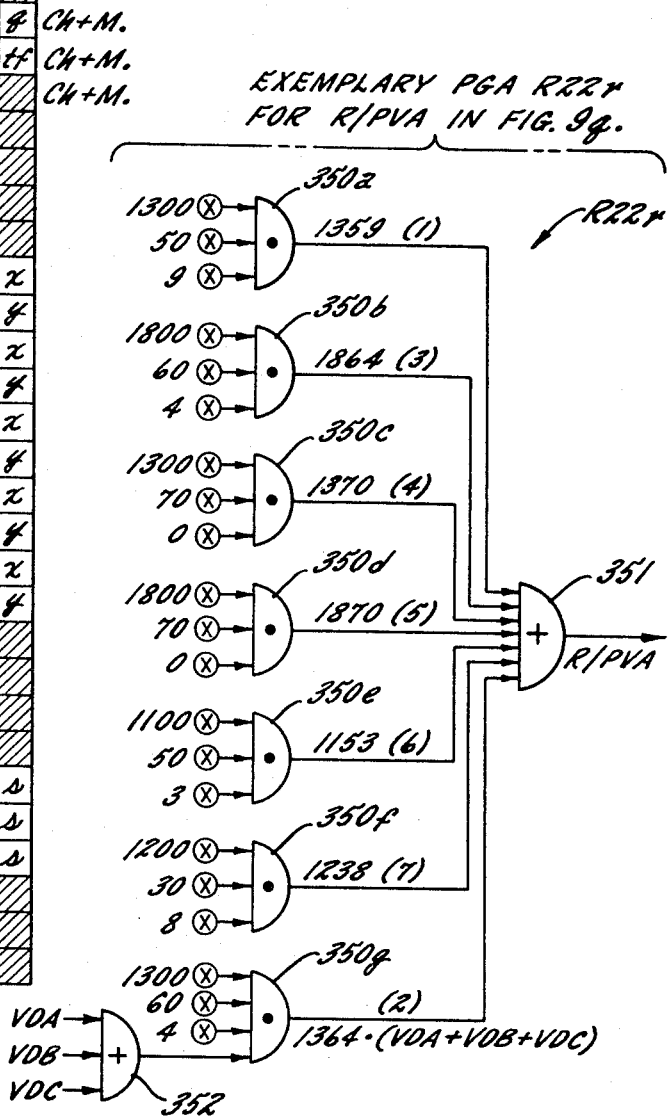
FIG. 17 shows the detailed organization of a typical one of the many Program Gate Arrays (PGA's) appearing in FIGS. 9a through 9r, and thus makes clear the organization of each PGA illustrated in block form with labeled response conditions.

Referring to FIG. 17, it will be seen that seven AND gates 350a–g have their outputs coupled through an OR circuit 351 to the single output line R/PVA. The first six of these AND gates have inputs connected to different combinations of the timing generator terminals which are shown in FIGS. 9b and 9d. Thus, the gate 350a receives three coincident "1" inputs on its terminals 1300, 50 and 9 only when the system is in Mode 1 (line M1 in FIG. 9d) and when the Program Step Generator (i.e., the counter formed by decades B, C, D in FIG. 9b) is in its count state of 359. Thus, on program step 359 during Mode 1, that is, condition (1) as shown in FIG. 17, the gate 350a will produce a "1" output level and the R/PVA signal will become a "1." In like fashion, the R/PVA signal will be placed at a "1" level at program steps 1864, 1370, 1870, 1153, 1238 (all requiring Mode 1) due to the operation of gates 350b–f. The gate 350g, by contrast, has a fourth input leading from an OR circuit 352 —which has inputs connected to the terminals VDA, VDB, VDC shown in FIG. 9n as the Q outputs of flip-flops VDA, VDB, VDC. Therefore, at least one of these flip-flops must be in the "set" or "enabled" state to make its Q output terminal have a "1" level in order to provide a "1" signal at the output of OR circuit 352, —and the program step 1364 must be occurring —before the gate 350g is fully qualified to produce a condition (2) output signal which makes the signal R/PVA have a "1" level. In identifying condition (2) and other conditions to be treated hereafter, Boolean notation is employed wherein a dot stands for "and" and a + stands for "or." As shown in FIG. 17, the gate 350g produces a "1" output only if the signals at terminals 1300, 60 and 4 are "1"'s and if the signal VDA or signal VDB or VDC is a "1." So condition (2) results in a R/PVA signal when "Program Step 1364 occurs and PVA or PVB or PVC exists." From this example, the PGA's shown throughout the drawings and the program tables may be readily understood.

THE SERVOMECHANISMS FOR PRODUCING ACTUAL X AND Y MOTIONS

As stated previously and as will be made clear below, the present contouring system processes part program data to produce digitally signaled final servo command numbers XSC and YSC representing the X and Y machine coordinates at which the movable element is supposed to be located at any instant. These numbers are periodically "updated" by microwave amounts ($\Delta X/N$) and ($\Delta Y/N$) at predetermined time intervals which are here measured off to be ($\Delta T/10$), and by way of example 2 milliseconds. The numbers are thus "updated" by macromove amounts $\Delta X$ and $\Delta Y$ at intervals of $\Delta T$, where $\Delta T$ is here assumed to be 20 milliseconds in duration. Since rate of change of position is velocity, the velocity of movement along the X and Y axes will be proportional to and determined by the values of $\Delta X$ and $\Delta Y$ which are being used to update the coordinate numbers XSC and YSC.

As an example, if the X and Y coordinate values are initially 2.00 and 3.00 and the update quantities $\Delta X$ and $\Delta Y$ are 0.01 and 0.02, respectively, then the XSC number will change from 2.00 to 2.01 to 2.02 to 2.03 and so on during successive periods $\Delta T$ of 20 milliseconds; and the YSC number will change from 3.00 to 3.02 to 3.04 and so on during successive periods $\Delta T$ of 20 milliseconds. If the actual X and Y coordinates of the movable element are kept in agreement with the commanded coordinates, then the element will move at a velocity of $0.01/0.020 = 0.5$ in./sec. $= 30$ in./min. along the X axis and at a velocity of $(0.02/0.020) = 1.0$ in./sec. $= 60$ in. min. along the Y axis. This result is produced by the servo systems 75, 77 shown in FIGS. 9a and 9d (only the X axis system is detailed) which continuously receive the XSC and YSC number representing signals via conductor trunks 79 and 81 from the registers XSC and YSC in FIG. 9g. Details of servo systems are described in McGee U.S. Pat. No. 3,539,895 issued Nov. 10, 1970 and will thus here be treated briefly.

As indicated in FIG. 9a, the X axis motor 21 (which appears also in FIG. 1) is drivingly coupled to the lead screw 20 so that the latter is turned in one direction or the other at a speed proportional to the energizing voltage applied to that motor. Thus, the direction and velocity of X axis translation of the element 14 are determined by the polarity and magnitude of the voltage applied from an amplifier 375 to the motor. That voltage is an "error" signal representing the difference between the phase of a feedback signal indicative of the actual position along the X axis and a variable phase analog command signal which by its phase represents the instantaneously commanded position along the X axis.

Stated briefly, a comparison is made between the actual position of the movable element 14 and the phase vaiable command signal. Based on this comparison an error voltage is produced whose sense and magnitude correspond to the sign and extent of the error which exists between the instantaneous directed and the actual positions of the element. The error voltage is applied to the motor 21 and, in this manner, the velocity of the element is made to correspond to the rate of change in the commanded instantaneous position.

Provision is made to generate a feedback signal whose phase relative to a reference signal is indicative of the actual instantaneous position of the movable machine element 14. In the exemplary arrangement shown in FIG. 9a, the 500 Hz output B of the sine wave shaper 181 (FIG. 9b) is used.

To provide an indication of the actual instantaneous position of the movable element 14, a resolver 376 is provided for producing a recurring feedback signal which is indicative by the sense and magnitude of its phase angle, relative to the reference signal B, of the sign and extent of the displacement of the movable element from a datum position. It comprises a stator with stator windings 378 and 379 associated with a rotor carrying a rotor winding 380. The resolver rotor is mechanically coupled through suitable gearing (not shown) to the lead screw 20, so that as the latter is turned by the servomotor 21, the resolver rotor turns with it. As a specific example, the resolver rotor may be geared to the lead screw 20 so that it makes one revolution for each 0.1 inch of travel along the X axis by the movable element 14.

The resolver 376 is excited by the sinusoidal reference signal B fed to its rotor winding 380. The resulting pulsating magnetic field induces a pair of sinusoidal signals in the stator windings 378, 379 with the amplitude of the output signals varying as sine and cosine functions of the angular position of the movable rotor winding 380 relative to the stator windings.

By means of a phase shifter 381 the variable amplitude sinusoidal signals appearing across the resolver stator windings are converted into a sinusoidal voltage of constant amplitude but whose phase relative to that of the sinusoidal reference signal B shifts 360° with each complete rotation of the resolver rotor. In the illustrated example, for each 0.1 inch movement of the machine element 14, the resolver rotor winding 380 is rotated 360° so that with each such movement of the element the feedback signal C is shifted by 360° relative to the reference signal B. As the machine element 14 continues to move, the feedback signal C is brought into phase with the reference signal B at successive "-datum" positions spaced 0.1 inches apart. When the element 14 is moved to the left or to the right of such a datum position, the sense and magnitude of the phase angle between the mid-cycle points of the feedback signal C and the reference signal B reflects the sign and extent of the displacement of the element from that datum position.

The phase relationships just described are illustrated in FIGS. 38a-c of said copending application, now Patent 3,656,124, to which reference may be made for details. If the feedback signal C lags the reference wave B by an angle $\phi$, this indicates that the movable element 14 is on one side, say to the right, of one of the datum points and by a distance proportional to the phase angle. If the feedback signal C leads the reference wave B by an angle $\phi$, this indicates that the element 14 is on the opposite side of a datum position, and by a distance proportional to the phase angle.

As explained previously with reference to FIGS. 9b and 10, provision is made in the system to produce signals digitally representing a reference number (digital sweep) which during successive time intervals repeatedly and cyclically changes in small uniform increments from a first to a second predetermined value. The signaled reference number itself thus undergoes successive cycles of variation at a cycle frequency of 500 c.p.s., relative to which a repeating signal may vary in phase.

More particularly, digital sweep generating means, shown in FIG. 9b as the cycling binary counters 131, 133, 135, are provided to produce binary coded decimal signals which change to signal a reference number that increases linearly in uniform steps at uniform time intervals during each cycle of the reference wave B. The reference number thus cyclically increases from a minimum value (e.g., 000) to a maximum value (e.g., 999) and then repeats, in synchronism with the full cycles of reference wave B. In effect, therefore, each increment of the reference number corresponds to one time portion of a cycle of the reference wave, the latter being divided up into many small time intervals equal in number (here, one thousand) to the number of counts or increments within each reference number cycle.

The phase relation here assumed between the reference wave B and the number signaled by the cycling counters 131, 133 and 135 is such that the sign wave B passes through a positive-going zero crossing at the instant the reference number passes through the value of 499. During a complete cycle of the reference wave B, the reference number signaled by the cycling counters 131–135 increases from 000 to 999 at a uniform rate, and the mid-point of the reference wave (i.e., its 180° angle) occurs at the instant when the cycling counters are just turning 500, the middle of their total range.

Provision is made to produce a repeating signal F (called "compare signals") at each instant when the cyclically changing and digitally signaled reference number is equal to the digitally signaled command number XSC. In this way, the phase angle or phase modulation of the repeating signal F varies in sign and magnitude (relative to the cycling intervals of the reference number signaled by the digital sweep counters 131–135) according to the sense and extent of the changes in the microposition command number XSC. Specifically, the repeating signal F is produced by comparing the cyclically changing reference number, or digital sweep, against the dynamically changeable command number XSC, so that the phase angle of that repeating signal F changes in sense and extent (relative to the recurring reference wave B, which is fixed in phase relative to the cycling intervals of the reference number) according to the sense and extent of the difference between (a) the mid-point value (e.g., 500 as here described) of the cyclically changing reference number and (b) the instantaneous value of the updated command number XSC. Thus, the digital intelligence of the dynamically changing command number XSC is converted into a corresponding phase analog variation, since the phase angle between the repeating signal F and the reference wave B changes by amounts, in a sense, and at an average rate which corresponds respectively to the amount, sense and average rate of change of the command number. Although the X axis coordinate position in the present example may have any value between −99.9999 inch and +99.9999 inch, the change ($\Delta X/N$) in coordinate value will never exceed ±0.006 if it is assumed that the maximum X axis velocity is 180 inches per minute. Thus, it is unnecessary to represent the position command number XSC as a six digit number; only the four digits 0.0xxxx are signaled as the XSC number and the actual X coordinate value will "track" up to 99.9999 inches as the XSC number varies or "rolls over" many times through the limited range of 0.0000 to 0.9999.

As shown in FIG. 9d, the comparison of two digitally represented but changing numbers is effected by connecting the 12 outputs lines of the cycling counters 131–135 and the twelve output lines of the updated XSC register to the respective inputs of a fast-acting multi-digit comparing device 382. The comparing device operates to produce a compare signal F in the form of a short pulse on its output line 382a only at those instants when the reference number digitally represented in binary code on the output lines of the counters 131–135 is equal to the updated command number digitally represented in binary code on the output lines of the XSC register R4.

At some value of the reference number, during each cycle thereof (from 000 to 999) it will become equal to the digitally signaled XSC microposition command number because the latter, being a three-digit decimal number (ignoring the lowest order digit place in the XSC register), will always fall within the range spanned by the cyclically changing reference number. Thus, a compare signal F will be produced at some instant during each cycle of the digital sweep counters 131–135 and the train of pulses F recurring at a nominal rate of 500 per second will by their variation in phase, relative to the reference wave B, represent the corresponding changes in the XSC command number.

Since the digital sweep reference number increases from its minimum to its maximum value once during each cycle of the reference signal B, the instant, or phase, during the cycle of the reference signal B when the compare signal F occurs is unambiguously determined by the amount to which the reference number has increased when it becomes equal to the command number XSC. Hence, the phase of the compare pulse F relative of the reference wave B is determined by the magnitude of the command number XSC, so that the compare signal F is itself a time phased analog command signal.

To cause the movable element to advance at uniform velocity in small "micromove" increments in conformance with the larger generated "macromove" increments generated by the system, the number in the XSC storage register R4 is periodically updated in a manner to be explained, the updating being by the amount ($\Delta X/N$) and occuring at time step xx21 in every column of every time period $\Delta T$. Thus, the number XSC is updated by the amount ($\Delta X/10$) every 2 milliseconds or 500 times a second.

If $\Delta X$ is positive the number XSC will progressively increase, and if $\Delta X$ is negative the number XSC will progressively decrease, causing the compare pulses F to become respectively more lagging or leading in phase relative to the reference wave B —with the result that the motor 21 is energized to move the element 14 in a +X or −X direction to dynamically keep the feedback wave C substantially in phase with the compare pulses F. It is important to note that the instant of occurrence of the compare signal F is determined by the magnitude of the updated command number XSC.

The time phased command signal F and the variable phase feedback signal C are caused to operate a single bistate device or flip-flop 384 whose outputs are then used to produce a polarized error signal which is indicative of the magnitude and the sense of the error phase angle between the command and feedback signals. The flip-flop 384, has two stable states which will be referred to as "0" and "1" states. It is set into its "1" state by the compare signal F fed to its "set" input terminal S from the output of the comparing device 382 at the instant when the reference number becomes equal to the command number XSC. Means are also provided for resetting the flip-flop 384 into its "0" state at the instant of each positive-going zero crossing of the feedback signal C which is applied to a square wave shaping circuit 385. At one of its output terminals the square wave shaper 385 produces a first square wave G which is in phase with the feedback signal C. The square wave G is fed to a unipolar differentiating circuit 386 whose output is connected to the reset input terminal R of the flip-flop 384. In response to each positive-going wave front of the square wave G, and hence at the positive-going zero crossings of the feedback signal C, the differentiating circuit 386 produces a triggering pulse which resets the flip-flop.

The flip-flop 384 has a pair of output terminals labeled "1" and "0." When the flip-flop is in its "1" state, the "0" output produces a logic signal which is at the logical "0" level and the "1" output produces a logic signal at the logical "1" level. In the embodiment illustrated in FIG. 9a, the logical "0" level is positive relative to the logical "1" signal level. When the flip-flop is reset into its "0" state, the logic signals at its outputs are reversed with a logical "1" signal appearing at the "0" output and a logical "0" signal appearing at the "1" output.

At a second output terminal, the square wave shaper 385 produces a complement of the square wave G, such complement being labeled $\overline{G}$. Thus, at all times, the square wave shaper produces at its two outputs a pair of bi-valued logic signals, one signal $\overline{G}$ being at a relatively low, binary logic "1" level during each positive half cycle of the feedback signal C and at a binary "0" level during each negative half cycle of the feedback signal. The other square wave signal G is at a low, binary logic "1" level during each negative half cycle and at a binary "0" level during each positive half cycle of the feedback signal.

In order to produce a polarized dc. signal which is indicative of the sign and magnitude of the error phase angle between the feedback signal C and the compare signal F, the complement output $\overline{G}$ of the square wave shaper 537 and the output H of the flip-flop 384 are applied to a first AND gate 388, and the G output of the square wave shaper 537 and the output $\overline{H}$ of the flip-flop 535 are applied to a second AND gate 389.

The outputs of the AND gates 388 and 389 are connected to enabling control terminals of two current generators 390 and 391 respectively. The generators work into a common load resistor 392 but are oppositely poled so that when the negative current generator 390 is turned on, current flows from ground through the resistor 392 and through the generator 390 into a negative terminal 395, thus establishing a negative voltage K across the resistor. Conversely, when the positive current generator 391 is turned on, current flows from a positive terminal 396 through the generator 391 and the resistor 392 into ground, causing a positive voltage L to appear across the resistor. Regardless of which current generator is turned on, the size of the signal across the resistor 392 is kept at a predetermined magnitude by a bipolar Zener diode 394, having the same Zener voltage in both directions.

When the compare signal F leads the negative-going zero crossing point of the feedback signal C, the first AND gate 388, controlled by the $\overline{G}$ and H signals produces a pulse, labeled "Enable I." "l" The "Enable I" pulse turns on the "negative" current generator 390 so as to produce a negative signal K across the resistor 392 for a time interval which is directly proportional to the amount of the phase lead.

Similarly, when the compare signal F lags the negative-going zero crossing point of the feedback signal C, the second AND gate 389 under the control of the signals G and $\overline{H}$ produces a pulse shown as "Enable J" and turns on the "positive" current generator 391 to produce a positive signal L across the resistor 392, again for a time interval directly proportional to the amount of the phase lag.

The manner in which the square wave shaper 385, the flip-flop 384, the AND gates 388, 389 and the current generators 390, 391 cooperate to produce the bipolar K and L signals is more fully described in U.S. Pat. No. 3,539,895 and will not be described here. Suffice it to say that, with the compare signal F leading the negative-going zero crossing point of the feedback signal C, a negative voltage $K$ is generated during a period which begins with the compare signal F and which ends with the next negative-going zero crossing of the feedback signal C.

If the compare signal F lags behind the same zero crossing point of the feedback signal C, a positive signal L is generated during a period which commences with the negative-going zero crossing of the feedback signal C and ends with the occurrence of the compare signal F.

As the movable element 14 is being translated, the compare signal F representing the desired position and rate of change of position of the element 14 will lead or lag the negative-going zero crossing point of the feedback signal C depending upon whether the element is to be driven in the +X or −X direction. To convert the variable width, constant amplitude pulses K or L into a smoothly variable control signal, e.g., a polarized variable dc. voltage suitable for application to the servoamplifier 375 and thence to the servomotor 21, they are averaged by a low-pass filter 398. The output of the low pass filter is thus a polarized dc. signal representative of the sense and magnitude of the average error phase angle between the compare signal F and the negative-going zero crossing of the feedback signal C over several cycles. After amplification by the servoamplifier 398, the dc. error signal is applied to the servomotor 21 causing it to drive the movable element 14 in a direction and at a velocity which conforms with the direction and rate of change in the phase of the compare pulse F, that is, in a sense and at a rate directed by the progressively changing XSC microposition command signals developed by the system. When the phase angle of the command phase pulse F begins to change, and the error phase angle departs from zero, the servomotor 21 begins to move, so that the phase of the feedback signal C is shifted by the resolver 376 in a direction to restore the error phase angle to zero. The instantaneous position error cannot become large due to the high gain, and the single fine resolver 376 is sufficient to keep the system tracking the dynamically changing directed position along the X axis.

What has been described in the foregoing paragraphs is a particularly suitable filtering servo drive for moving the element 14 along the X axis in accordance with the frequently updated signal command signal XSC developed by the system. The means for driving the movable element 14 along the Y axis in accordance with the Y axis microposition command number YSC include a second compare circuit 399, shown in FIG. 9d, which may be identical to the compare circuit 382 also shown in that figure. In response to the YSC command signal received over the trunk lines 81, the compare circuit produces a compare pulse shown as the "Y axis command" pulse. This pulse is applied to the Y axis servomechanism 77, shown in 9a as a single block. Its construction may be identical to that of the X axis servomechanism 75, as shown in FIG. 9a in detail. Thus, the Y axis servomechanism 77 includes the motor 25 (FIG. 1) which is operative to move the element 14 vertically with the ram 15 through the drive screw 24 and thus along the Y axis in dynamic agreement with the frequently updated Y axis servo command number YSC.

OPERATION OF THE SYSTEM

In the generalized description of the physical components which make up the system of composite FIG. 9, all of the individual components have not been specifically treated. But the presence and functions of these components will be noted during the description of the system operation, which can best be set forth as a narrative of the events which occur in certain sequences by virtue of the organization and interconnections of the several components. Such a narrative of operational sequences can be understood by periodic references to be made to the Tables and Charts which appear at the end of and which form an integral part of the present specification. These tables and charts utilize a "language" which, when understood, make it possible to follow the sequential operations during successive time steps with exactness, especially when reference is made to the registers, PGA's, flip-flops and the computer 53 with its input and output trunks CIT and COT, as shown in composite FIG. 9. It will be helpful to note that:

Chart A shows in functional words the operations which take place during different groups of time steps within every repeating time period ΔT —regardless of the "mode;" and Table I is a time chart (similar to FIG. 10a) which details each operation during each time step ΔT which occurs regardless of "mode." The operations of Chart A and Table I are always cyclically repeating, i.e., recur 50 times a second.

Chart B shows in functional words, and Table II shows in detail for each time step, the operations which are peculiar to, and which occur only when the system is in, Mode 1. Of course, the operations illustrated in Table I also take place during any period ΔT when Mode 1 is in effect.

Chart C shows in functional words, and Table III indicates in detail for each time step the operations which are peculiar to and which occur only when the system is in Mode 2. But again, the operations shown in Table I also occur during every ΔT period when the system is in Mode 2.

Chart D shows in functional words, and Table IV indicates in detail for each time step, the operations which are peculiar to, and which occur only when the system is in, Mode 3. Again, the operations of Table I will take place during any Mode 3 period ΔT. In the Charts and Tables, those "columns" of time and individual time steps when no operations of significance take place have simply been omitted completely or left blank. These times here shown as unused may be occupied to perform operations appropriate to circular interpolation or other functions which have been omitted for the sake of brevity in the present case, but which are described in said copending application. In any event, the Tables permit one to identify any time step within a period ΔT which is significant; for example, the fifth line (labeled 31 at the left) in Column 1200 of Table II represents time step 1231.

The appended Tables and the PGA's throughout FIG. 9 are written in Boolean form as a sort of shorthand. The manner in which they are to be read will become apparent from only one or two examples.

Consider, as a random example, the third through the ninth lines in the 1200 Column of Table II. These represent the time steps 1229, 1230, 1231, 1232, 1233 and 1234 (or stated another way, time steps 229, 230, 231, 232, 233, 234 when the system is in Mode 1). The legend for step 1229 is "R/SP3" which means simply that during step 1229 the number then stored in the "scratch pad three" register R27 (FIG. 9g) is to be read onto the computer input trunk CIT and thus transmitted into the computer 53 (FIG. 9f). This is accomplished because the PGA R27 in FIG. 9q produces a signal R/SP3 to enable the READ gates associated with register R27 during any time step 1229, as indicated by condition (4) in PGA R27r. Since the Answer Register prior to step 1229 has been cleared, the number SP3 then in register R27 is added to zero and appears in the Answer Register during the first half of the next step 1230.

On time step 1230, the SP3 number is again read into the computer 53. See condition (5) labeled in PGA R27r in FIG. 9q. The computer receives no special control signal, so it adds the incoming number to that existing in the Answer Register, and the sum (i.e., equal to twice the SP3 number) appears in the accumulator during the first half of time step 1231.

The legend in Table II for time step 1231 is "W/SP2 and R/SP3 ? VDA." This means that the number in the accumulator (and then signaled on the output trunk COT) is to be "written" into and stored in the "scratch pad 2" register R26 (FIG. 9q) but only if (the symbol ? is used for the word "if") the signal VDA is then at a "1" level by virtue of the flip-flop VDA (FIG. 9n) being in the "set" state. Assuming the latter to be true, then condition (3) in PGA R26w (FIG. 9q) is satisfied and that PGA produces a signal W/SP2 to enable the WRITE gates associated with the register R26. Thus, a number equal to twice the number originally held in the SP3 register is stored as the SP2 number in register R26. But on the other hand, if the signal $\overline{PVA}$ had been at a "0" level (i.e., $\overline{PVA} = 1$) then the WRITE gates for register R26 would not have opened and no data entry into the latter register would have been made.

The second part of the legend for step 1231 in Table II is "R/SP3 ? VDA." See condition (6) in PGA R27r (FIG. 9q). If VDA is at a "1" level the SP3 number will be read into the computer again, and added to the existing number (twice the SP3 number) in the accumulator, so that the new sum (equal to three times the SP3 number) appears in the accumulator at the beginning of step 1232. If VDA had been "0," no "read" would have occurred, and the accumulator would still be signaling the original number (equal to twice the SP3 number) at the start of step 1232.

The legend for step 1232 in Table II is "R/SP2 ? VDA" —and this means that the number then in the SP2 register R26 is read onto the input trunk CIT if signal VDA is a "1." See PGA R26r (condition 4) in FIG. 9q. The number read from register R26 will thus be added to the number then in the accumulator 53 and the sum signaled on the output trunk COT at the beginning of step 1233.

The legend for step 1233 is "R/SP2 ? VDA" —and again the number then in register R26 will be read in by action of PGA R26f (condition 5) if VDA = 1; and it will be added to the number in the Computer Answer Register.

The legend for step 1234 in Table II is "SR2" and from FIG. 9c it can be seen that PGA CC15 by condition (2) provides an SR2 signal to the computer 53 on that time step the number existing in the accumulator 53 is therefore shifted two decimal places to the right.

To pursue the foregoing example, assume that the number SP3 at the beginning of step 1229 was 10.410. After step 1230 this number has been added to itself and the accumulator holds the number 20.820. If VDA is not a "1," no operations, in effect, are produced during time steps 1231, 1232 and 1233, —so that after time step 1234 and the two place shift to the right, the accumulator holds the number .20820.

On the other hand, if VDA is a "1" then on time step 1231, the number 20.820 is written into the SP2 register and the SP3 number of 10.410 is brought in and added to the accumulator number 20.820 to make the accumulator then signal the sum 31.230. Then on time step 1232, the number then in the SP2 register (which is 20.820) is read into the computer and added to 31.230 to produce the new sum 52.050 at the beginning of time step 1233. On step 1233, the number 20.820 is again read in from the SP2 register and added to the previous sum 52.050 to produce a new sum 72.870. After two place shifting to the right the accumulator holds the number .72870 at the end of step 1234.

In overall result, therefore, these sequences result in the original SP3 number N being converted into a number .02N signaled on the COT at the end of step 1234 if VDA is not a "1;" and being converted into a number .07N signaled on the COT if VDA is a "1."

Similar rationale may be used to understand all of the Charts A–D and Tables I–IV as the operations of the system are hereafter described. Shifting to the left or right in the accumulator is usually performed for the purpose of alining digits of corresponding order on the COT and CIT branches for two numbers to be processed. This will be readily apparent to the reader, and the numbers will be described hereafter without reference to the locations of decimal points. A shift to the left or right in the accumulator may in some cases be performed to multiply or divide the accumulator number by 10.

TRANSFER OF DATA FROM BUFFER TO ACTIVE

Let it be assumed initially that one block of data has been read from the punched tape 37, processed and stored in the active registers. A second block of data has been read into the buffer registers and the tape reader 39 is at rest. It will be understood that normally when a given block B1 of data is in active storage (and is being used) the next successive block B2 of data will be in buffer storage. When the first block B1 of data has served its purpose, it is replaced in active storage by block B2 by transfer from buffer storage, and the tape reader is started to read block B3 into buffer storage. Later, block B3 is transferred to active storage and the reader is started to read block B4 into buffer storage. The successive blocks of data are processed, and the successive segments are traveled, in substantially instantaneous succession. The present description will, for purposes of generality, refer to the block of data in active storage as $B_n$, the block of data in buffer storage as $B_{n+1}$, and the block next to be read from the punched tape as $B_{n+2}$.

To begin, it will be assumed that the active registers hold numbers representing data from block $B_n$.

| | |
|---|---|
| XCEP | (Register R14, End Point Pn) |
| YCEP | (Register R15, End Point Pn) |
| I | (Register R16, Block $B_n$ X displacement) |
| J | (Register R17, Block $B_n$ Y displacement) |
| FA | (Register R26, Block $B_n$ Feed Rate) |
| PVA | (Register R22, Block $B_n$ Path Velocity Actual) |
| PVC | (Register R24, Bock $B_n$ Path Velocity Computed) |
| TFA | (Register R19, Time Factor Active, Block $B_n$) |
| TFB | (Register R20, Time Factor Buffer, Block $B_{n+1}$) |

At this time, it may be assumed that the execution of a given path segment has almost been completed, and the time has come to transfer a new set of data for block $B_{n+1}$ into active storage. The coordinate number registers at this time hold coordinate numbers, as follows:

| | |
|---|---|
| XSC | (X command position, four decimal places) |
| YSC | (Y command position, four decimal places) |
| XCP | (X macroposition, now substantially = XCEP) |
| YCP | (Y macroposition, now substantially = YCEP) |
| XMP | (X position, machine coordinates) |
| YMP | (Y position, machine coordinates) |

When (and for reasons to be explained) one active block of data has been fully used, the EOB counter 186 (FIG. 9e) will be advanced to its state S7, so the system will be placed in Mode 2 due to a "1" signal on line M2 in FIG. 9d. Although all of the operations "common to all modes" as shown in Chart A and Table I will continue to be carried out during each time period, those illustrated in Chart C and Table III will be in effect during at least a part of a period ΔT before the system changes into Mode 3. Table III is a time chart just like that shown in FIG. 10a, but only those time steps of significance are shown in the table to indicate what occurs during a Mode II time period ΔT. It will be seen from Table III that on time steps 2376 (the 300 column, 76 line for Mode 2) the Answer Register is cleared, as indicated by the symbol CAR. Reference to the PGA CC10 in FIG. 9c confirms that a CAR signal is sent to the computer 53 on time step 2376 (condition 11). On that same time step, the legend "R/SP3 ? S7" and this means that a new number called QB based on block $B_{n+1}$ data and previously stored in the scratch pad 3 register (as hereinafter described) will be read into the computer Answer Register (see PGA R27r, condition 7 in FIG. 9q). Then, on time step 2377, the number in the Answer Register is "written" into the Q register R18 (see PGA R18w, condition 3 in FIG. 9j), so that the new block Q factor replaces the old in the Q register. Next, Table III says "R/GB ? S7 · $\overline{GO9}$" for time step 2378. This means in words "Read the signals from the G Buffer Register Number onto the CIT 59 and into the computer 53 when time step 378 is reached in Mode 2 if the EOB counter 186 is in state S7, providing a GO9 is not then being signaled by the decoder 46a in FIG. 9l." And from FIG. 9l it will be seen that PGA 46r produces a R/GBUF signal under the condition (1) when 2378 and S7 and $\overline{GO9}$ are simultaneously signaled.

On time step 2379 (when the GB number has been added to zero and thus identically is signaled on the output trunk COT 61), the number then on the output trunk is first written into the G active register R1 by a signal W/G from PGA R1w (Condition 1) which opens the WRITE gates therefor. The EOB counter S7 is, of course, still producing an S7 signal. Then, in that same time step (PGA CC10, condition 15) the Answer Register is cleared and again holds zero. In this fashion, the G number (if it is GO1, GO2 or GO3 but not if it is GO9) has been transferred from G Buffer Register 46 to the G Active Register R1 (and any number previously in register R1 is flushed or wiped out).

From Table III and in similar fashion, it will be apparent that On step 2379, the I Buffer number is read from register 42 (note that the signal LIN is in this case assumed always to be a "1" and the cycle stop flip-flop CYSP will under normal running conditions hereafter described always be set to make its signal $\overline{CYSP}$ a "1");

On step 2380, the I Buffer number then in the Answer Register is written into the active I register R16 and the Answer Register is then cleared;

On step 2380, the J Buffer number is read from register 43 into the Answer Register;

On step 2381, the latter number is written from the Answer Register into the active J register R17, and the Answer Register is cleared;

On step 2382, the symbol "Adv. S8 ? S7" means advance EOB counter 186 to state S8 if it is then in state S7. Since the latter state has here been assumed to exist, (and from PGA 183, condition 14) it will be seen that the counter advances to state S8 so that the line M3 (FIG. 9d) receives a "1" signal and the system is placed in Mode 3. Thus, the G, I, J and newly computed Q data are transferred from buffer to active registers when the system goes into Mode 2 and the EOB counter reaches state S7. The system then goes into Mode 3. Observe from Table III and Chart C that this same transfer may occur in either of two time columns. It can happen in the 800 column of a Mode 2 period $\Delta T$ if counter 186 reaches state S7 after column 300 but before Column 800 (see Columns x000 and x500 in Table I).

Table IV and Chart D illustrate the operations peculiar to Mode 3. By the same procedure for understanding the "shorthand" in the tables as explained above, Table IV shows that On steps 3335 and 3336, the buffer coordinate number XEP is transferred from register 40 (FIG. 91) to the active register XCEP R14 (FIG. 9a);

On steps 3336 and 3337, the coordinate number YEP is transferred from the Buffer Register 41 to the active YCEP register R15;

On steps 3337 and 3378, the number TFB is transferred from buffer register R20 to the active register R19 where it is stored as the active number TFA;

On steps 3338 and 3339, the number F is transferred from Buffer Register 45 (FIG. 91) to the active register R21 (FIG. 9p) where it becomes the number FA;

On step 3378, the symbols "CNDM" and "CANR" signify that the flip-flops NDM and ANR (FIG. 9n) are "cleared" by signals applied to their K terminals of these flip-flops by associated PGA's (condition 1). The symbol "EDTZ" means enable or set the flip-flop DTZ and this is effected by condition 1 of a PGA connected to the J terminal of that flip-flop (FIG. 9n). The symbol "CCYST ? CYSP" means that the cycle start flip-flop CYST is cleared or reset if at that time the cycle stop flip-flop CYSP is set, and this is accomplished by the clearing PGA associated with the CYST flip-flop in FIG. 9n. Under normal running conditions, the cycle start and cycle stop flip-flops CYST and CYSP will reside respectively in set and reset states.

On step 3379, the EOB counter 186 is stepped to count state S9 (PGA 183, condition 16) —so that the system is taken out of Mode 3. The foregoing may occur during either the first half (column 3300) or the second half (column 3800) of a Mode 3 period $\Delta T$ as shown in Table IV, depending upon whether the EOB counter 186 reaches state S8 before or after column 300 (see Table III). But at the conclusion of Mode 2 and Mode 3 sequences, a fresh set of data (called data for block $B_{n+1}$ when in buffer storage) has been transferred into the active registers (and is now called data for block $B_n$).

Referring to steps x990 through x999 in Table I (which applies to all modes) the flip-flop TAD is cleared on step 990 if EOB counter 186 is in state S9 (as it will be at the conclusion of Mode 3). Likewise, on step 991 the signal TRR becomes as 1 if S9 is a 1 and flip-flop CYST is set (assume the latter is set). This results from the operation of PGA 269 (FIG. 9m) and initiates the operation of the tape reader 39, as previously described. Also on step x991 with S9 = "1," the flip-flop DR is cleared. And on the subsequent steps x992 through x999 the EOB counter advances progressively from state S9 to state S16 and then to state S1. The system is thus Restored to Mode 1 (see FIGS. 9e and 9g).

As the tape reader runs to read the next block of data on the punched tape 37, each address character resets all of the address flip-flops 233 (FIG. 9m) except the one which corresponds to the address character so read. Thus, and as explained above, shift pulses are applied to one of the buffer registers and the number following that address character is shifted into the proper buffer register. Any buffer register which does not receive "new" data from a block being read retains its previous contents. When the entire block has been read, the EL character is sensed, the flip-flop TRR is cleared, and the tape reader is stopped, as previously explained. The new information now in buffer storage (and called data for block $B_{n+1}$) is ready to be transferred into active storage at when later required, except that some preliminary "data processing" or conversion must first be performed.

DATA PROCESS SEQUENCE

Each block of program data will include a "D number" which represents the composite vector length of the corresponding path segment (see FIG. 5). Because the end of the segment is in the present instance defined by the programmed end point coordinates XEP, YEP the D number is used for the purpose of deriving a time factor number TF, as explained with reference to the Equations (1) through (13) supra. Although other preliminary processing of data read from the punched tape may be performed in some applications, the present embodiment performs "data processing" only to convert a D number into a TF number, with the latter then being stored in the time factor buffer register R20 as a number TFB.

When the tape reader was started on step x991 (Table I) the "data ready" flip-flop DR was cleared so that signal $\overline{DR}$ becomes a "1." Then, at the completion of the reading of a tape block, the signals EL and SPR (FIG. 9m) fully enable the AND gate 274 so that the "data process required" flip-flop is enabled (i.e., set) so the signal DPR becomes a 1. As the next time period $\Delta T$ is measured off and step x630 (Table I) is reached, the "data process" flip-flop DP is enable (see legend "EDP ? DPR" and the PGS leading to the J terminal of flip-flop DP in FIG. 9o) so the signal DP becomes a "1." Next, on step x635 the computer 53 is put into its division mode by a signal ed (PGA CC2, condition 1) and simultaneously "1" level signals are applied to the CIT trunk conductors CIT(−); 3,2; 3,1; 4,2; 4,1; 5,2; 5,1; 6,2; 6,1; 7,2; and 7,1. This occurs because the number controlling PGA's N1, N3, N6, N9, N12 in FIG. 9r are all responsive on time step x635 and thus simultaneously apply " 1" level voltages to the enumerated conductors. Thus, the number −3.3333 is signaled on the 3, 4, 5, 6 and 7 place branches of the input trunk CIT. This number is in characteristic plus mantissa notation and is thus transferred into the accumulator 53a where it represents the decimal value of .3333 × 10⁻³.

Thereafter, on step x636 (Table I) the D number from register 47 (see PGA 47r) is read into the computer 53 and a division process is carried out during steps x637 to x688. The quotient $$(.3333 \times 10^{-3})/D = TF \qquad (8a)$$

thus appears in the accumulator 53a at step x689 and remains there even though the division operation is terminated by a "clear divide" signal cd (from PGA CC3). Then, on step x691, that quotient is written into the TFB register R20 (PGA R20w, condition 1 in FIG. 9p) providing that the signal DP is a 1. The foregoing division occurs during every time period ΔT, but the results are transferred into the TFB register only if a new block of data has been read (so DPR became a 1) and the data process flip-flop DP was previously set on step x630. The fact that there is "data ready" (i.e., a usable number is in the TFB register) is signaled by enabling the DR flip-flop (FIG. 9o) on step x697 if DP = 1. On that same step the DPR lip-flop is cleared if DP = 1 by a PGA 274a in FIG. 9m, and thereafter on step x699 the "data process" flip flop DP is cleared.

Thus, the D number is used to derive a time factor number TF, but the latter is stored in the TFB register only after the first computation which follows an EL signal and a consequent DPR signal. As will be noted below, it is conceivable that the "data process" might be in progress or incomplete when transfer of a new block of data to active storage is called for, and in such event, the lack of a DR = 1 signal will indicate that a complete set of data is not available in buffer storage — in which case the system will automatically decelerate the movable element to zero velocity.

UPGRADING THE SERVO COMMANDS

As noted above the servomechanisms 75 and 77 cause the movable element 14 to continuously and dynamically "track" along the X and Y axes such that the actual X and Y machine coordinates of the element are kept in agreement with the command numbers XSC and YSC. These latter numbers are updated by small amounts ΔX/N and ΔY/N at frequent, regular intervals (ΔT/N, the size of each update amount thereby determining the X and Y axis velocities.

Assume for purposes of discussion that a block $B_n$ of data is in active storage registers and that the element is being moved along the path segment defined by that particular data as the timing system of FIG. 9b measures off successive periods ΔT with 1000 steps in each period. From what has been said above, the active registers hold the numbers XCEP, YCEP, I, J, TFA, FA previously transferred from buffer storage. In addition, certain other numbers have been computed and stored (in a way to be described later) and thus it may be assumed that the registers R10 and R11 hold numbers ΔX and ΔY which have been computed according to Equations (5) and (6), supra;

the registers R6 and R7 hold numbers XCP and YCP which represent the X and Y coordinates to be reached at the end of the next "staggered" macromoves, i.e., for the respective points $P_2$ and $P_3$ in FIG. 7.

the registers R8 and R9 hold XMP and YMP numbers which represent in machine coordinates (relative to the origin O' in FIG. 2) the positions of the cutter along the X and Y axes at the end of the last completed macromove.

the registers R2 and R3 hold XOFF and YOFF numbers representing the offsets shown and previously mentioned in connection with FIG. 2.

the registers R4 and R5 hold numbers XSC and YSC representing the last few digits of commanded coordinates.

Referring to Chart A and Table I, the time steps xx16 through xx26 in every time column (excepting 400 and 900) are used for micromove updating. The 400 and 900 columns involve "tenth upgrade" operations wherein the numbers XSC and YSC are simply driven to equal the lowest order digit values of the commanded machine macroposition coordinates XMP and YMP.

Consider the time steps x016 through 026 in the 000 column of Table I. On step 016 the accumulator is cleared (by a CAR signal from PGA CC10, condition 1) and the number ΔX is read in (PGA R10r, condition 2). On step x017 the accumulator contents are shifted right one place by a signal SR1 (from PGA CC14, condition 1), thereby to locate the four digits of the ΔX number in the 6, 7, 8 and 9 places of the accumulator. This has the effect of dividing the ΔX number by 10; it was originally a number 0.0xxxx and is now in the accumulator as 0.00xxxx so that it may be thought of as being 0.1ΔX. This is the value ΔX/N where N is assumed to be 10.

On step x018, the XSC number for register R4 is read in and added (see PGA R4r, condition 1) so that the sum XSC + 0.1ΔX appears in the accumulator. On step x021, this sum is written back into the XSC register (see PGA R4w), replacing the previous value of the XSC number.

From Table I, it will be seen that these same operations are repeated during steps x021 through x026 excepting they involve the numbers ΔY and YSC.

Identical operations occur in those corresponding time steps within columns 100, 200, 300, 500, 600, 700 and 800. Indeed, such operations involving the XSC number also occur in column 900 and such operations involving the YSC number occur in column 400. Thus, once during each of the successive 2 millisecond periods occupied by columns 000 through 800, the number YSC is increased (or decreased if the sign of ΔY is negative) by 0.1ΔY, a total of nine such micromove "updates" taking place. Likewise, in each of the 2 milliseconds occupied by columns 500 and 900 of one period ΔT and by columns 000 through 300 in the next ΔT, the XSC number is changed by 0.1ΔX, there being nine such micromove updates.

In column 400 of each ΔT, the tenth micromove update of the XSC number takes place. At steps x403 and x404 (Table I) the accumulator is cleared and the number ΔX is placed therein (see PGA R10r, condition 1, FIG. 9h). On step x405 the macroposition number XCP is read into and added by the computer. The sum ΔX + XCP is then written back into the register R6 (PGA R6r) on time step x406, replacing the previous value of the XCP number, but that sum remains also in the accumulator. On step x408, the offset number XOFF is read into the computer (PGA R2r, FIG. 9f) so that the new sum (XCP + XOFF) now represents the commanded X coordinate with reference to the machine origin O' (FIG. 2). The latter sum is written into the XMP register on time step x415 (PGA R8w) In this fashion, the desired machine X coordinate value is "updated" by the macromove distance ΔX 50 times per second although the update occurs midway through each period $\Delta T$ and is staggered relative to the $\Delta Y$ macromove updates. Even though the accumulator is cleared on step x416, the new XMP coordinate number is placed therein again on that same step (PGA R8r); and on step x421 the last few digits of that number are written into the XSC register (PGA R4w) —updating the latter for a 10th time so that the number XSC is made equal to the lower order digits of XMP. Even though XMP is a seven digit number, only the decimal digit values for COT branches 5, 6, 7 and 8 are written into the XSC register, so the XSC number agrees with the four lowest order places of the XMP number.

A similar "macromove update" of the number YMP occurs during steps x903 to x915 of each iteration $\Delta T$ represented by Table I. Briefly, $\Delta Y$ is added to the existing value of YCP, and the new sum placed back in the YCP register. That new sum is added to the Y axis offset YOFF to obtain a new value of YMP in machine coordinates, and the new value (updated by the amount $\Delta Y$) is stored in the YMP register. Then, on steps x921 and x926, the last four digits of the YMP number are written into the YSC register to perform the tenth update of the YSC number.

In summary, the commanded machine coordinate numbers XMP and YMP are updated by the numerical amounts $\Delta X$ and $\Delta Y$ at a rate of fifty times per second or once every 20 milliseconds. Similarly, the macromove position coordinate numbers XCP and YCP are "updated" by amounts $\Delta X$ and $\Delta Y$ once every 20 milliseconds. The servo command numbers XSC and YSC are similarly updated by the same amounts during the same time periods, but the latter updating is performed in ten separate micromove steps of $(\Delta X)/10$ and $(\Delta Y)/10$ once every 2 milliseconds. If, in consequence and as an example, the XMP number changes by 10.000 in 1 minute, the XSC number will "roll over" in small steps of $(\Delta X)/10$ through a change of 10.000 in one minute, and the element 14 will move along the X axis through a distance of 10 inches at a velocity of 10 inches per minute.

The foregoing macromove and micromove updating functions occur during each and every iterative time period $\Delta T$, regardless of the mode of the system. Since the $\Delta X$ and $\Delta Y$ numbers have signs (as do XCP, YCP, XSC, YSC, XOFF, YOFF, XMP and YMP), and each update involves algebraic addition, the updated numbers may progressively increase or decrease in magnitude, and the movable element thus moves in either positive or negative directions along the X and Y axes. The servomechanisms keep moving the controlled element as one segment is completed and the next is begun. The manner in which the $\Delta X$ and $\Delta Y$ numbers are determined and changed, to produce composite motion at different angles $\theta$ relative to the X axis and at different feed rates will be made clear below.

LOOK AHEAD TRANSITION TO THE NEXT BLOCK OF DATA

When a fresh block of command data for a new segment is first utilized in the active registers, the EOB counter 186 (FIG. 9e) will be in its S1 state and the system will thus start processing that data by operation in Mode 1 which is illustrated by Chart B and Table II. Since, in essence, the segment is executed by updating the command numbers XSC and YSC every 1/50th of a second, the system needs to "look ahead" so as to determine when the segment is about to be completed, i.e., when the end point coordinates XCEP and YCEP are about to be reached. When they are reached, the currently active data is replaced by a new set of data from the buffer registers and the execution of the next segment is initiated without halting the motion of the controlled element.

Since approach to the end of a segment can occur at any time (because segments may be of greatly different lengths and feed rates may be high or low), the "look ahead" in anticipation of transition is performed during every period $\Delta T$ when the system is in Mode 1. This involves first a determination as to the particular axis along which the motion is fastest, and than a comparison between the present coordinate along that axis and the end point coordinate so that the number of $\Delta T$ periods to elapse before the end point is reached can be determined.

Referring to column 1000 of Table II, and I and J departures are compared and a flip-flop $FAX$ (FIG. 9f) is set to make a signal $FAX = 1$ if the X axis is the "fast axis." If the Y axis is the "fast axis" the flip-flop is cleared and the complement signal $\overline{FAX}$ is a "1." On time steps 1033 and 1034, the number I and J are read into the computer along with a "classify" signal $cx$ on step 1034 (see PGA CC13, condition 1). Thus, on time step 1035 the computer will produce a signal $AGB = 1$ or $ALB = 1$ if the I number is respectively greater or less than the J number. On time step 1035, 1035, a PGA associated with the flip-flop $FAX$ (FIG. 9f) supplies a signal to two AND gates and the response of one thus enables or clears the flip-flop to make $FAX = 1$ or $\overline{FAX} = 1$ if I is respectively greater or less than J. This test and the control of the flip-flop is repeated during the 1000 column of every Mode 1$\Delta T$.

Figure 18:
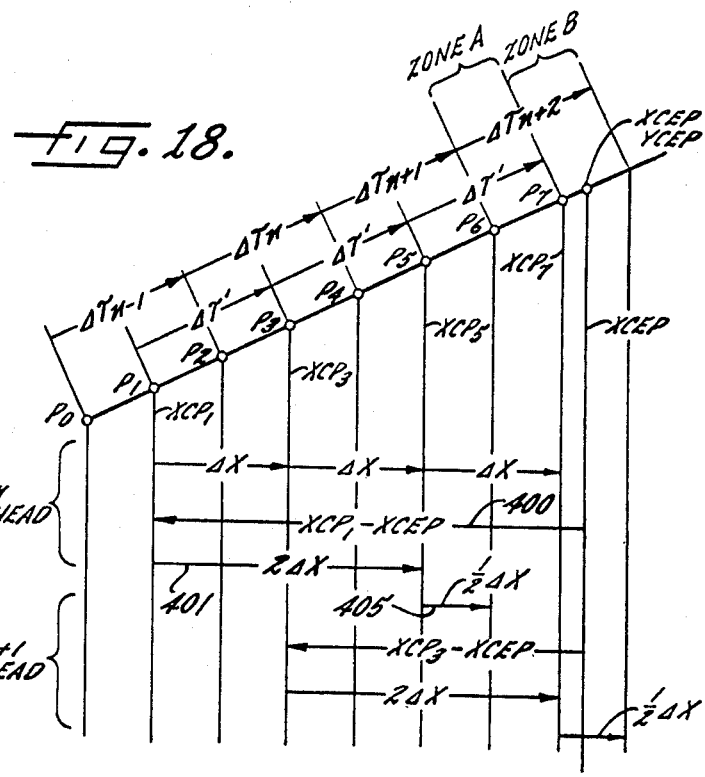
FIGS. 18 and 19 are diagrams showing how the approaching end of a path segment is determined when the segment motion is respectively faster along the X or the Y axis.

The steps which follow comprise a two-stage look-ahead along the fast axis, illustrated in principle by FIG. 18 where it is assumed that the FAX signal is a "1." During steps 1036–1046 of any period $\Delta T_n$, calculations are performed to determine the X coordinate distance remaining from the mid-point ($XCP_1$) of the previous iteration $\Delta T_{n-1}$ and the designated end point XCEP of the segment being executed. Operations are then performed for comparing this remaining X coordinate distance with the quantity 2 $\Delta X$, so as to determine thereby whether or not the designated end point XCEP will be reached during the first half of the following iteration $\Delta T_{n+1}$.

Specifically, during program step 1036 the accumulator is cleared in response to a CAR signal from the PGA CC10 (condition 10). During the same program step the XCP number stored in the register R6 and representing the X coordinate of the point $XCP_1$ along the path segment reached at mid-point of the previous iteration $\Delta T_{n-1}$ is transmitted from the register R6 to the computer 53 in response to a signal from PGA R6r (condition 2). On step 1038 the XCEP number is transmitted to the computer 53 in response to a signal R/XCEP from PGA R14r (condition 1) in FIG. 9i.

In order to subtract the XCEP number from the XCP number, a subtract control signal $sx$ is applied to the computer 53 from the PGA CC1 (condition 1) during step 1038. The result $XCP - XCEP$ (here called $N_1$) appears in the Answer Register 53a during program step 1039. If the sign of this number is positive or negative, the COT(−) line will carry a 0 or 1 signal, and a flip-flop 404 (FIG. 9e) will be reset or set by a PGA 404a to make the signal $\overline{ACNX}$ or the signal ACNX, respectively, a 1.

During the following two program steps 1040 and 1041 the macromove number stored in the $\Delta X$ register R10 is read additively into the computer 53 twice in response to successive control signals $R/\Delta X$ from PGA R10r (conditions 11 and 12). The resulting number appearing in the accumulator represents $XCP - XCEP +2\Delta X$ (here called $N_2$) and its sign will be the same as that of the number $XCP - XCEP$ (i.e., $N_1$) provided that $XCP - XCEP$ (vector 400 in FIG. 18) is not less than 2 $\Delta X$ (vector 401) or, in other words, provided that the X coordinate distance remaining from the mid-point $XCP_1$ of the iteration $\Delta T_{n-1}$ to the designated end point XCEP of the segment illustrated in FIG. 18 is not less than 2 $\Delta X$. If the signs of $(XCP - XCEP + 2 \Delta X)$ and $(XCP - XCEP)$ are the same (i.e., if the signs of $N_1$ and $N_2$ are the same), this indicates that the end point XCEP is more than 1.5 $\Delta X$ from the X coordinate of the point $P_2$ and thus the end of the segment is not yet closely approached. No $\overline{SST}$ signal is produced by the detector 71 in FIG. 9e and the counter 186 remains in its S1 state.

On the other hand, if the sign of $N_2$ is different from that of $N_1$, this indicates that the point XCEP will be reached and passed after 1.5 additional macromoves $\Delta X$ from the point P2, i.e., after 2 $\Delta X$ moves from the point $XCP_1$. To detect this sign reversal, the sign of the number $XCP - XCEP$ or $N_1$ was stored in the ACNX sign storage flip-flop 404 (FIG. 9e) during step 1039, making the ANCX signal a "1" if the sign was negative or the signal $\overline{ACNX}$ a "1" if the sign was positive. This sign is then effectively compared with the sign of the $N_2$ number $XCP - XCEP +2 \Delta X$ which appears in the Answer Register during program step 1042 because the logic gates in the Overrun Detector 71 (FIG. 9e) will produce an $\overline{SST}$ signal at any time when the sign signaled on the COT(−) conductor is different from the sign then represented by the signals ACNX and $\overline{ACNX}$.

In particular, if the sign of the number $N_2$ appearing in the Answer Register 53a during the program step 1041 (and which remains there until step 1047 is FAX = 1) is different from the sign of the number $N_1$ which has appeared in the register during program step 1039 and which was stored in the ACNX flip-flop 404 during that program step, a signal represented by the symbol $\overline{SST}$ is produced during program step 1047. The combination of time step 1047 and $\overline{SST} = 1$ results in an AC signal from PGA 183 (condition 28), thereby to advance the EOB counter to its S2 count state, providing it was previously in the S1 state. Advancement of the counter 186 into its S2 count state therefore signifies that an approaching overrun beyond point XCEP has been detected and that it will occur during the first half of the following iteration $\Delta T_{n+1}$.

With reference to FIG. 18, the test just described is, in effect a two macromove look-ahead projected forward at the beginning of an iteration $\Delta T_n$ from a point $XCP_1$ along the X axis which was passed during the mid-point of the previous iteration $\Delta X_{n-1}$. It will be readily seen that, as of the time when the projection is made (at the beginning of $\Delta T_n$ when the X coordinate is that of point $P_2$), this is, in effect, a 1.5 macromove projection of position along the X axis from the instantaneous position $P_2$ along the X axis at that time. This is called a zone A detection because the actual position of the movable element will be beyond the end point XCEP before half of the next period $\Delta T_{n+1}$ has elapsed. It is possible, however, that the 1.5 $\Delta X$ forward projection will produce no sign change and thus after step 1047 the counter 186 will still be in state S1. In this case, a second projection and comparison is made with a full 2 $\Delta X$ look-ahead.

To perform the second look-ahead operation during the iteration $\Delta T_n$, 0.5 $\Delta X$ is, in net effect, added to the previously accumulated result so as to increase, in effect, the forward projection from 1.5 $\Delta X$ to 2 $\Delta X$. To accomplish this, during step 1042 the number $N_2$ in the accumulator is shifted left one place by a SL1 signal (PGA CC17, condition 3). This does not change the sign of the number $N_2$ but in effect multiplies it by 10 to produce the new number $10N_2$. Then during program steps 1048–1052 the macromove number $\Delta X$ in the $\Delta X$ register R10 is additively read into the computer five times in response to $R/\Delta X$ signals from PGA R10r (condition 13). The new sum is $10N_2 + 5\Delta X$ or 10 $(XCP - XCEP + 2 \Delta X + 5 \Delta X)$, here called the number $N_3$ and appears in the Answer Register 53a during program step 1053 as 10 $(XCP - XCEP + 2.5 \Delta X)$ where XCP is coordinate $XCP_1$ (FIG. 18) and the quantity 205 $\Delta X$ is the sum of vectors 401 and 405. In effect, the computation of the number $N_3$ is a comparison of the signs of $(XCP - XCEP)$ and $(XCP - XCEP + 2.5 \Delta X)$ and the factor of ten is not significant. Means are provided for advancing the EOB counter 186 (if it remained in its count state S1 after the first test) provided that the sign of $N_3$ is different from the sign of $N_2$. In the latter case, an $\overline{SST}$ signal is sent to the PGA 183 on step 1053 by detector 71. The latter PGA will produce an AC signal if $1053 \cdot S1 \cdot \overline{SST} \cdot$ CYST (condition 28) and this is the meaning of the legend "Adv. S2 ? S1 · $\overline{SST}$ · CYST" in step 1053 of TABLE II. It may be assumed that CYST is a "1." Thus, if and only if the movable element will travel beyond the end point XCEP during the second half of the next period $\Delta T_{n+1}$ (called an anticipated zone B overrun) will the counter be advanced from state S1 to state S2 on step 1053.

In the foregoing paragraphs the particular computational steps involved in performing the look-ahead operations for any iteration $\Delta T_n$ iteration have been set out. The results of the two look-ahead tests along the fast X axis will in most cases show no approaching overrun of the end point and the counter 186 will be left in state S1. But as the end of a block segment is approached, then the counter will advance to state S2 either during time step 1047 or time step 1053 (indicating zone A or zone B). Of course, if the counter advances to state S2 on step 1047 it will not be in state S1 on step 1053 and it will not advance during the latter step.

Thus far it has been assumed that the X axis is the fast axis and the signal FAX is a "1." Those operations qualified by $\overline{FAX}$ in Table II thus have not occurred. But if it be assumed that motion along the Y axis is to progress faster than along the X axis, the situation which is depicted by FIG. 19, the comparison of J and I during steps 1033 and 1034 would reveal during the following program step 1035 that I is less than J (i.e., make $ALB = 1$), thereby causing the FAX flip-flop to be cleared and making the signal $\overline{FAX}$ a "1."

In the following three program steps, 1036–1038, the distance remaining along the Y axis to the designated end point YCEP would be computed by subtracting YCEP from the macroposition number YCP then stored in the register R7. Specifically, during program step 1036 of period $\Delta T_n$ the macroposition number $YCP_0$ will be read from the register R7 in response to a R/YCP signal from its associated PGA R7r (condition 2). During that step 1038, the YCEP end point coordinate is read into the computer 53 from the register R15 by a signal R/YCEP from PGA R15r(condition 1) and is read into the computer subtractively by the concurrent application thereto of a control signal sx from PGA CC1 (condition 1). The result, appearing in the Answer Register 53a during the program step 1039 is $YCP_0 - YCEP$ (like $N_2$ mentioned above). During step 1039, the sign of this latter number is stored (by action of PGA 404a) in the ACNX flip-flop (FIG. 9e). The number $N_2$ is represented by vector 410 in FIG. 19.

During program step 1040 the macromove number $\Delta Y$ is read into the computer 53 from the $\Delta Y$ register R11 in response to a signal $R/\Delta Y$ from PGA R11r (condition 11). The sum, which appears during the following program step in Answer Register 53a is $YCP_0 - YCEP + Y$. On step 1041, a SL1 signal (PGA CC17, condition 2) converts this into $10 (YCP_0 - YCEP)$. To this result there is added during the program steps 1042 – 1046 the quantity $0.5\Delta Y$, the resulting number being $10 (YCP_0 - YCEP + 1.5 \Delta Y)$ and forming a number which may be called $N_2$ constituting a 1.5 $\Delta Y$ look-ahead (vector 411) from point $P_o$ and which appears in the accumulator on step 1047. In the manner explained previously with reference to the test for the X axis, if the sign of the number $N_2$ in the Answer Register 53a during program step 1047 differs from the sign of the number $N_1$ existing during step 1039, then a zone A overrun is detected and an $\overline{SST}$ signal is applied by the Overrun Detector 71 to the PGA 183 which conditioned to advance the EOB counter 186 to its S2 count state if it is then in the count state S1 (condition 28).

Figure 19:
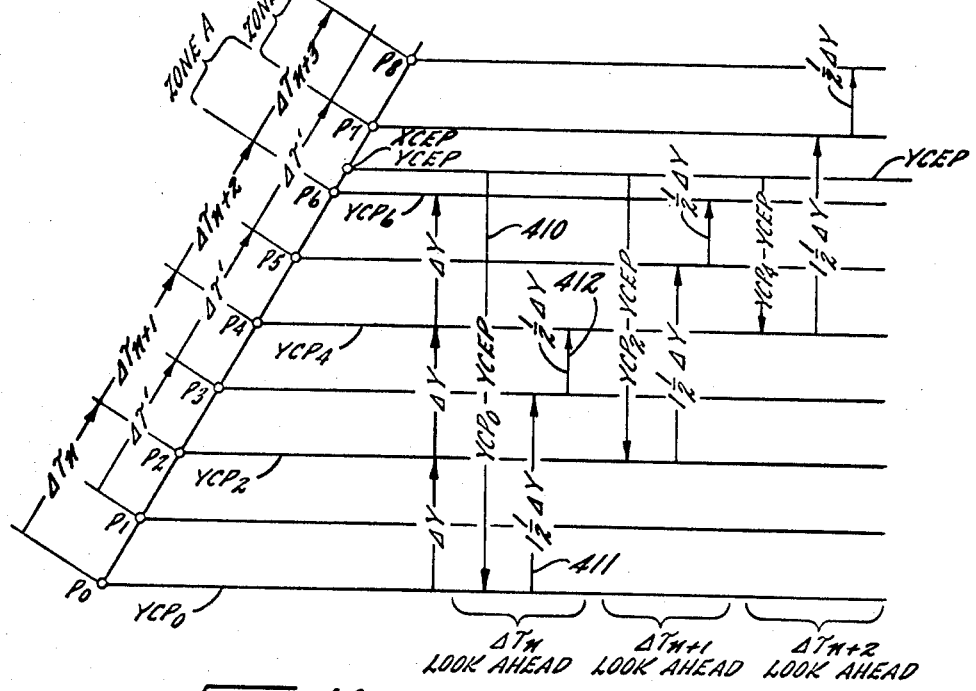

To form the second Y axis look-ahead test during the time period $\Delta T_n$ indicated by the ½ $\Delta Y$ vector 412 in FIG. 19, the macromove number $\Delta Y$ is read from the register R11 into the computer 53 five more times during the program steps 1048–1052 by the application to the register of five additional control signals $R/\Delta Y$ from its associated PGA R11r (condition 13). For the same reasons advanced with reference to the program steps 1042–1048 the effect of these operations is to increase the sum stored in the Answer Register 53a so that, during program step 1053 it is $10 (YCP_0 - YCEP + 2\Delta Y)$ and may be called $N_3$. The amount $2 \Delta V$ is the sum of vectors 411 and 412 in FIG. 19. If the sign of $N_3$ is different from the sign of the sum $N_2$ which had been stored in the Answer Register 53a during the program step 1039, then a zone B overrun is detected. For the same reasons previously given with reference to the test for the X axis, the EOB counter 186 is advanced from its S1 count state to its S2 count state by the application of an $\overline{SST}$ signal to the PGA 183 (condition 3), and a resulting AC signal to the counter.

In summary, during each Mode 1 time period $\Delta T$, tests are made for the fast axis during time steps 1033 through 1053 and the EOB counter is advanced from state 1 to state S2 only if the end of the segment then being executed is about to be reached.

Once the anticipated approach to the end of a segment is signaled by the EOB counter having advanced from state S1 to state S2, the system begins its "transition" to bring in and start using the next block of data. If state S2 is reached on step 1047 (Table II) of any Mode 1 $\Delta T$, it automatically advances to state S3 on the following step 1048 (see PGA 183, condition 2). Thus, if a short zone A overrun is forecast, the transition begins immediately. But if state S2 is reached on step 1053, then the period $\Delta T$ in progress in normal fashion (with counter 186 in state S2) until the counter is advanced to state S3 during step x800 (see Table I and PGA 183, condition 4).

When state S3 is reached during step 1048 or step 1800 of any $\Delta T$, then the counter advances to state S4 on the following respective step 1300 or 1801 (Table I) due to an AC signal from PGA 183 (conditions 5 and 6).

When state S4 is reached on either step 1300 or 1801 of any $\Delta T$, the counter is advanced to state S5 very shortly thereafter by an AC signal from PGA 183 (conditions 7 or 8) on the next following time steps 1397 or 1897 (Table I).

The system is thus removed from Mode 1 because line M1 in FIG. 9d goes to a "0" level —the removal from Mode 1 occurring only when and in response to the detected anticipation of reaching the segment end point.

After counter 186 reaches state S5, then it advances to state S6 at the first-to-occur of the next time steps x000 or x500 (Table I). One-half $\Delta T$ later on the next succeeding step x500 or x000, respectively, the counter advances to state S7. These events occur due to AC pulses from PGA 183 (conditions 8, 9, 10 and 11). The system thus goes into Mode 2 very shortly after its Mode 1 is terminated, and data transfer begins as described above with reference to Chart C and Table III after state S7 is reached. On step 2382 or 2882 in the first Mode 2 iteration, the counter 186 advances to state S8 (as previously described) and performs the further data transfer operations described above and as shown by Chart D and Table IV. On step 3379 or 3879, the counter 186 advances to state S9 to end Mode 3 and on the following step x991 (Table I) the tape reader is started to read the next block of data into buffer storage. In the succeeding step x992 through x999 (Table I) the counter advances from state S9 through state S16 and starts over in state S1. The next $\Delta T$ begins therefore with the system in mode 1 and operating on a fresh set of block data which was transferred into active storage during the preceding Mode 2 and Mode 3 operations.

In this fashion when one block $B_n$ of data in active storage has been used, and the corresponding segment executed, the next block $B_{n+1}$ of data is brought into active storage, and the succeeding block $B_{n+2}$ is read from the punched tape into buffer storage. As soon as the reading of a data block is completed, the "data processing" to compute and store the new time factor TFB is carried out during column x600 of the following period $\Delta T$.

(E) REPEATED COMPUTATIONS TO DETERMINE $\Delta X$ AND $\Delta Y$ DURING EACH $\Delta T$ In order to control the path velocity, and also to automatically control acceleration and deceleration as will be described later, it is necessary to compute and change the $\Delta X$ and $\Delta Y$ numbers (by which XSC and YSC are updated) during each period $\Delta T$. This means that the velocity is not necessarily constant over the many $\Delta T$'s which may elapse in the execution of one path segment. The repeated computation and any necessary changes in $\Delta X$ and $\Delta Y$ are effected by two operational procedures, the first being the computation of a variable number Q according to Equation (9), *supra*, and the second being the computations of $\Delta X$ and $\Delta Y$ according to Equations (5) and (6), supra. As indicated by Chart A, the $\Delta X$ and $\Delta Y$ computations and changes are respectively carried out between time steps x435 and x464 and between time steps x935 and x964 in every $\Delta T$, regardless of mode. On the other hand, and as shown in Chart B, the computations and changes in the number Q are effected twice during every Mode 1 $\Delta T$, between time steps 1370 and 1399, and between time steps 1870 and 1899.

Q COMPUTATION AND UPDATING

To begin, it may be assumed that the register R22 in FIG. 9q holds a velocity-representing number PVA which determines the actual velocity at which the movable element is traveling along the path at any instant. The derivation and changing of this PVA (path velocity, actual) number will be explained later, but it should be understood that it will not necessarily be constant during a succession of time periods $\Delta T$.

Table II for time step 1367 contains the legend "W/PVA" and this means simply that a number previously computed is written from the accumulator into the register R22 on time step 1367 (PGA R22w, condition 1). The accumulator is cleared by a CAR signal on step 1368 but the PVA number is fed back into the computer on step 1370 (PGA R22r, condition 4) during 1371 along with an enable multiply signal emx' from PGA CC6, condition (1). Thereafter, on step 1372 the number TFB or TFA is read into the computer (if counter 186 is or is not in state S4 by operation of PGA R20r (condition 1) or PGA R19r (condition 1) in FIG. 9p. Assume that the number TFA is brought in. During the steps 1373 through 1394 the multiplication PVA·TFA is carried out and the product number Q appears in the accumulator on time step 1396. This is a TYPE III multiplication where both the multiplier TFA and the product Q are in characteristic + mantissa format, and it ends with a clear multiply signal cmx' on step 1395. On step 1396, the number Q is written into register R18 by operation of PGA R18w, condition (1) if the EOB counter is not in state S4. As explained later, if the signals $\overline{S4}$ and S4 are respectively 0 and 1, then the product is not written into the Q register but instead is written into the scratch pad register SP3 for temporary storage as a number QB, i.e., a Q buffer number to be used later.

These very same operations take place in the corresponding time periods of the 1800 column, i.e., periods 1864 through 1896, so it will be apparent that a new value of the Q number may be computed and stored in the Q register twice during each Mode 1 $\Delta T$ period.

$\Delta X$ AND $\Delta Y$ COMPUTATIONS AND UPDATING

Referring first to column x400 of TABLE I, it will be seen that on step x435 the number I is read from register R16 by a R/I signal from PGA R16r (condition 1) in FIG. 9i. The signals LIN and $\overline{PX2}$ are always "1" for purposes of the present disclosure.

Then on step x437 an "enable multiply" signal emx is supplied to the computer from PGA CC4, and the Q number is read into the computer due to a R/Q signal from PGA R18r in FIG. 9j. During steps x438 to x454 the multiplication $I \cdot Q = \Delta X$ is carried out, and is terminated by a "clear multiply" signal cmx from PGA CC5 on step 455. The number $\Delta X$ now appears in decimal format in the accumulator.

There may, however, be a small "remainder" representing lower order digit places of previous $\Delta X$ computations, and such remainder number XR is stored in the register R12 —as explained in said copending application. To add this remainder and thus obtain any carries which it produces to higher order decimal places, the $\Delta X$ number in the accumulator is shifted four places to the left by an SL4 signal from PGA CC20 on step x456. Then the remainder XR is read in from register R12 by a R/XR signal from PGA R12r during step x457. The sum is shifted four places back to the right in the accumulator by a signal SR4 from PGA CC19 on step x458 so that the corrected $\Delta X$ number is correctly alined with the COT branches. Thereafter, the newly computed $\Delta X$ number is written into the register R10 by a W/$\Delta X$ signal from PGA R10w in FIG. 9h.

A ZR1 signal from PGA CC21 now places all zeros in the main Answer Register 53a, leaving the new remainder of the new $\Delta X$ number in the Overhanging Register 53b. On step x461 a SL4 signal from PGA CC20 shifts that remainder into the main Answer Register, and then on step x461 this new remainder is written into the XR register R12 by a signal from PGA R12w —so that it can be used on the next succeeding $\Delta X$ computation. The accumulator is then cleared by a CAR signal on step x462.

The same sequence of operations set out above occur during the steps x935 through x962 —except with respect to the Y axis, involving the numbers J, Q, $\Delta Y$ and YR. These operations will be apparent from Table I and the PGA's shown in the drawings as associated with the J, Q, $\Delta Y$ and YR registers.

It will be apparent, however, that the macromove numbers $\Delta X$ and $\Delta Y$ may be changed during any time period $\Delta T$, depending upon changes in the I or J numbers and changes in the Q factor (the latter changing due to changes in PVA or TFA).

VELOCITY AND ACCELERATION CONTROL

From Equations (1) through (13) and the example given above with respect thereto, it will be understood that the X and Y axis velocities are equal to the average rate of change of the servo command numbers XSC and YSC. Since the latter are updated (in small micromoves, as explained) by amounts of $\Delta X$ and $\Delta Y$ during each successive, equal period $\Delta T$ (here, 1/50th of a second), the macromove (and thus the micromove) magnitudes determine the axis velocities. These macromove magnitudes are proportional respectively to I/D and J/D because Equations (3) and (4), from which Equations (5) and (6) are derived, contain the ratios $I/D$ and $J/D$ The velocity $V$ in Equations (3) and (4) thus represents the feed rate or path velocity resultant of the X and Y axis component velocities.

It is important in the numerical control of machine tools and the like to accurately establish and effect a desired path feed rate. If the cutter moves too slowly, production efficiency is decreased and the return on the investment represented by a large machine tool is reduced. If the cutter moves too fast, it may be damaged or destroyed. And unless feed rate is kept reasonably uniform at the programmed value, the surface finish on the workpiece may be irregular. It is desirable, therefore, that a parts programmer designate (by the programmed F number) the highest feed rate which can be safely tolerated and that he call for higher or lower feed rates in successive blocks of data, as may be appropriate.

As taught in McDonough et al. U.S. Pat. No. 3,390,315, large changes in programmed feed rates from block-to-block can call for such high values of acceleration or deceleration that the finite maximum torque capability of the servomotors 21 and 25, considered with the inertia of the members being moved, will cause the servo system to "lose tracking" and produce errors in the shape of the workpiece.

In accordance with the present invention, an iteratively computing numerical contouring system of the type here described can be programmed to produce widely different feed rates during execution of any two successive path segments represented by any two successive blocks of data. And when an abrupt change in path velocity (feed rate) is called for, it is automatically carried out gradually with values of acceleration or deceleration preselected (and which may be easily changed) so as not to exceed the machine and servo drive capabilities.

In carrying out the invention, the programmed path feed rate F is converted into a velocity-determining number $PVA$ —but as the commanded value $F$ changes abruptly, the number $PVA$ is changed only gradually until it produces the velocity corresponding to the new feed rate $F$. Moreover, the programmed feed rate $F$ may be modified by a manually adjustable "feed rate override" to produce an actually commanded path velocity $PVC$; and if the "override" factor is abruptly changed, the actual velocity of the element's motion will then change gradually by automatic acceleration or deceleration. In order to make clear the apparatus and methods by which these objectives are accomplished, the manipulation of data to establish and control the actual velocity number $PVA$ will first be described.

APPLYING FEED RATE OVERRIDE AND IMPOSING MAXIMUM VELOCITY LIMITS

Normally, the active commanded feed rate number FA stored in register R21 (FIG. 9p) will determine the path velocity of the movable element being controlled. This commanded feed rate may be increased or decreased by a machine operator's "feed rate override." For example, if a feed rate of 100 inches per minute is called for by an active feed rate number FA, the operator may manually set the digit switches to represent a "percent feed" number PCF of 0.80 —and this will be multiplied by the number FA to produce an actually commanded feed rate of 80 inches per minute. The number PCF usually is adjustable (by setting knobs shown in FIG. 9q) to any value from 0.20 to 1.25 so that the actually commanded feed rate may be changed from 20 to 125 percent of the programmed feed rate FA.

But the servomotors 21 and 25 may have maximum speed ratings and the machine tool may have a maximum rated actual feed rate (for example, 180 inches per minute). If the programmed feed rate FA is 160 in/min. and the PCF number is 1.25, then the actual velocity called for would be 200 in/min. —i.e., beyond the machine capabilities. In such cases, the maximum safe value of 180 in./min. should (and in the present case will) be used for the actual feed rate.

Referring to Table II, the time step 1297 contains the legend "CAR, R/FA ? $\overline{TAD}$." Assuming that the TAD flip-flop is cleared and the signal $\overline{TAD}$ is a 1, then on time step 1297 the active feed rate number FA is read into the computer 53 from the FA register R21. This will normally occur during every Mode 1 period $\Delta T$. The number is shifted two places to the left in the accumulator by a SL2 signal from PGA CC18 on step 1298 and is then written into and stored for future use in the register R24 as the number PVC on step 1299. See PGA R24w in FIG. 9p. Observe from FIG. 16 that the units digit of the number FA is read onto the CIT–6 branch, whereas the units digit of the number PVC is written from or read onto the COT–4 or CIT–4 branch. By shifting the number FA two places to the left after it has been read into the accumulator, the orders of digits of the FA and PVC numbers are aligned.

The PVC number is then modified by the feed rate override setting the maximum feed rate limit during the later time steps 1336 to 1359 as indicated generally in Chart B. More specifically and as shown in Table II, on time step 1336 a signal $emx''$ enables the computer 53 for a multiplying operation, and on time step 1337 the feed rate number FA (previously stored as the number PVC in register R24) is read into the computer as a multiplicand. It may be assumed that the signal $\overline{IFA}$ is a "1" because CYST is a "1," the IFA signal being used to "inhibit feed active" and thus to hold feed rate to zero until the system has received an active set of data during initial start-up.

In the present portion of this description, it will be assumed that the TAD and DTZ signals are "0," so from Table II it becomes apparent that on time step 1339 the PCF number is read into the computer (see PGA R28r in FIG. 9q, Condition 1) as a multiplier. During steps 1340 to 1353 the multiplication PVC × PCF is carried out, the multiplying mode being terminated by a $cmx''$ signal on step 1355 and the product then being signaled in the accumulator and on the COT trunk 61. This product number represents the feed rate desired due to the programmed feed rate FA and the override number PCF dialed into register R28 by the machine operator. It may have any value from zero to an upper limit conceivably as high as 999.999. But it will be assumed here, for example, that the maximum safe feed rate for the machine tool of FIG. 1 is 180 in./min. and thus any greater product value should not be used.

To limit the maximum feed rate produced by PVC × PCF, the computer is placed in its "compare" or classify mode by a $cx$ signal on step 1357. See PGA CC13, Condition (2). On that same time step, the number 180 (i.e., the assumed maximum path velocity for the machine) is read into the computer. This is done by signal R/180 produced by PGA N2 (Condition 1) in FIG. 9r, which makes the CIT conductors 2,1 and 3,8 reside at a "1" level. If PVC × PCF is greater or less than 180 in./min. then the computer 53 in its classify mode produces either an AGB or ALB during time step 1358. If AGB is a "1" then PGA CC10 produces a CAR signal and the PGA N2 reads the limit number 180,000 into the computer —so that thereafter 180 in./min. will be used as the commanded feed rate. On the other hand, if AGB is a "0" level on step 1358, nothing happens during that step, and the product PVC × PCF remains in the accumulator to be used as the commanded path velocity.

Then, on step 1359 the number (either 180 or PVC × PCF, whichever is less) then in the accumulator is written back as a number PVC into the register R24 (PGA R24w, Condition 2). The PVC number is now considered to be the "path velocity computed" number; it may be greater or less than the programmed feed rate FA depending upon the setting of the PCF digiswitches, and in any event will be no greater than a selected maximum (here, for example, 180 in./min.). But if the programmed feed rate FA is, for example, 60 in./min. and the PCF number is 1.00, then the PVC number stored after step 1359 will be the same 60 in./min. value, i.e., PVC will be equal to FA.

Even though the PVC number is written into register R24 on step 1359, it still remains in the accumulator. On that same step, a subtract sx is applied to the computer, and the number PVA is read in (see PGA R22r, Condition 1), so that the difference PVC−PVA appears in the accumulator at the beginning of step 1360.

Also, during step 1359, a CVD signal is created by a PGA (Condition 1) shown in FIG. 9n, and this "clears" or resets all four of the flip-flops VDM, VDA, VDB, VDC.

The difference (PVC−PVA) between the velocity to be reached next (PVC) due to the newly brought in feed rate FA and the actual velocity (PVA) at which the system moves the element 14 is signaled in the accumulator at the beginning of step 1360. For brevity the difference (PVC−PVA) will be called PVD ("path velocity difference") even though that number is stored in the accumulator (and not in a register) during time steps 1360 through 1365.

In accordance with the invention here claimed, this difference PVD is computed and classified as to its magnitude so that the subsequent acceleration or deceleration to reach the PVC velocity can be sized in magnitude as a function of the total change in velocity remaining to be made. The function may be proportional, quasi-exponential, or as here to be described, monotonic.

For the moment, it will be assumed that the actual velocity PVA is equal to the computed velocity PVC and that PVD is zero. This will be the usual condition when the movable element is midway through a path segment and traveling at a constant velocity. With that assumption, it may be taken for the present that all of the flip-flops VDA, VDB, VDC and VDM remain cleared, and that the signals $\overline{VDA}$, $\overline{VDB}$, $\overline{VDC}$, $\overline{VDM}$ (FIG. 9n) are "1." Under such circumstances, no effective operations can take place during time steps 1360 through 1363, and on time step 1364 the accumulator is cleared by a CAR signal from PGA CC10 (Condition 28). Also, the PVC number is written into the accumulator (PGA R24r, Condition 2, FIG. 9p). And, on step 1367, that number is written back into the PVA register (PGA R22w, FIG. 9q). Since it has been assumed that PVA = PVC and PVD is zero, this writing into the PVA register leaves the PVA number at its previous value, — and the movable element continues to be driven at the uniform path velocity PVA.

Thus, in ordinary circumstances (when velocity is not to be changed) the number PVA remains constant at a value established by the commanded feed rate FA, as modified by the override number PCF, and the controlled element moves at the corresponding, equal velocity PVC along the path segment being executed.

If, however, the effective commanded feed rate FA is changed, or if the PCF number is changed, then the velocity will have to be changed —by acceleration or deceleration as hereinafter set forth.

CLASSIFYING ANY VELOCITY DIFFERENCE AND CAUSING A PROGRESSIVE CHANGE IN ACTUAL VELOCITY

As noted above, the number PVC written into register R24 (FIG. 9p) on time step 1359 may change abruptly at any time either because the feed number written in on step 1299 changes or because the PCF number is changed by the machine operator. But always during any Mode 1ΔT, the difference PVD = PVC−PVA appears in the accumulator at the beginning of time step 1360 (Table II). Although it is within the scope of the invention to cause acceleration when any finite difference PVD exists, it is a more specific feature of the invention to classify the difference PVD according to its sign and magnitude. Having made previous numerous references to various PGA's, registers and the particular figures in which they appear, it will now be understood by the reader how Table II can be read by cross-reference to PGA's and registers, without specific mention of the latter in the following descriptions. From Table II and with reference to the various registers and PGA's in FIG. 9, it will be apparent that:

On step 1360: Flip-flop VDM is enabled if COT(−) is a 1, indicating that PVD is a negative number because PVC<PVA. Thus, when the signals VDM or $\overline{VDM}$ are a "1," this indicates that there will have to be an increase (acceleration) or a decrease (deceleration) to bring PVA into equality with PVC. The computer is conditioned by a cx signal to "classify" PVD relative to the number 3.00 read onto the input trunk CIT by PGA N6 (FIG. 9r).

On step 1361: If AGB is a "1," it means that PVD is greater than 3.0, and in this case the flip-flop VDA (FIG. 9n) is enabled to change the signal VDA from "0" to "1." Also the number 0.3 is read onto the CIT trunk by PGA N9 (FIG. 9r) along with a cx signal from PGA CC13 (FIG. 9c), Condition 4). Thus PVD is compared with 0.3.

On step 1362: If AGB is a "1" and if $\overline{VDA}$ is a "1," this means that PVD is greater than 0.3 but less than 3.0. In this case, the flip-flop VDB is set to change the signal VDB from "0" to "1." Also the number 0.1 is read into the computer by operation of PGA N8 along with a cx control signal from PGA CC13, so that *PVD* is compared with the value 0.01.

On step 1363: If AGB, $\overline{VDA}$ and $\overline{VDB}$ are all at the "1" level, this means that *PVD* is greater than .01 but less than 0.3, and in consequence the flip-flop *VDC* is enabled to signal *VDC* = "1."

On step 1364: The accumulator is cleared by a CAR signal. If none of the flip-flops *VDA*, *VDB* or *VDC* has been set (meaning *PVD* is less than .01, then the number *PVC* is read into the accumulator, as previously described. This means that on step 1366, the *PVA* number will be made directly equal to the *PVC* number, calling for the servomechanisms to make a small abrupt change of no more than .01 in./min. in the velocity of the movable element. This is within their capabilities. But on the other hand, if *PVD* is greater than .01, then one of the signals *VDA*, *VDB*, *VDC* will be a "1" and the number *PVA* will be read into the computer (see PGA R22r, Condition 2, FIG. 9q).

This latter operation of bringing the number *PVA* into the accumulator is the first in a sequence for changing the velocity number *PVA* by an amount $\Delta V$ during each $\Delta T$ so that *PVA* and the velocity of the moving element are changed at a rate of $\Delta V/\Delta T$. If $\Delta V$ is positive or negative, the controlled element accelerates or decelerates until *PVA* becomes equal to *PVC* and *PVD* becomes zero.

Again referring to Table II —

On step 1365:

i. If VDM is "1" (because *PVD* previously computed was negative), a control signal *sx* is supplied to the computer. If *VDM* is "0," that control signal does not appear. Thus, the computer is conditioned to add or subtract if $\overline{PVC-PVA}$ is positive or negative.

ii. Assume for the moment that $\overline{SAD}$, $\overline{SAV}$ and $\overline{TAD}$ are all "1." Thus, if PVD is greater than 3.0, and *VDA* is a 1, the number 1.0 is read into the computer (by operation of *PVA* N4, Condition 1) and added to *PVA* then in the accumulator to perform the algebraic addition:

$$PVA + \Delta V = PVA_{new} \text{ if } VDM \text{ is "0"} \quad (15)$$

$$PVA - \Delta V = PVA_{new} \text{ if } VDM \text{ is "1"} \quad (16)$$

where $\Delta V$ is 1.0 because *PVD*>3.0.

iii. If *PVD* is greater than 0.3 in./min but less than 3.0 in./min as indicated by *VDB* being a "1," then the number 0.1 is read into the computer (by operation of PGA N8) and the same operation expressed by Equations (15) or (16) is performed, except that $\Delta V$ is 0.1.

iv. If *PVD* is greater than 0.1 but less 0.3 (as indicated by *VDC* being a "1"), then the number 0.01 in./min. is read into the computer by operation of PGA N10 —and the same operation expressed by Equations (15) and (16) is performed, except that $\Delta V$ is now 0.01 in./min.

Figure 20:
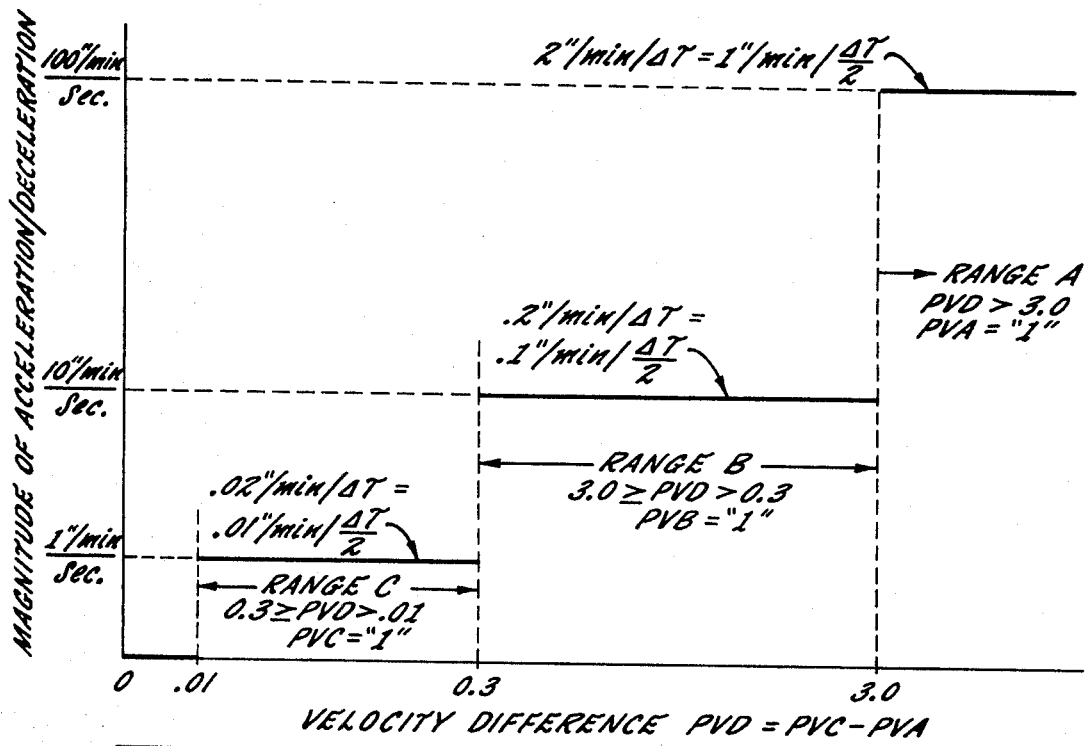
FIG. 20 is a diagram illustrating the range into which path velocity difference is classified and the related acceleration/deceleration value put into effect for each range.

Referring to FIG. 20, it will be seen that the controlled setting of flip-flops *VDA*, *VDB*, *VDC* classifies the magnitude of *PVD* into three ranges and identifies that one which presently exists. In Range *A*, *PVD* is greater than 3.0 in./min.; in Range *B*, the *PVD* is greater than 0.3 but less than 3.0 in./min.; and in Range *C*, the *PVD* is greater than 0.01 in./min. but less than 0.3 in./min. Whenever *PVD* is less than 0.01 in./min., it is considered that *PVA* is substantially equal to *PVC*, and thus *PVA* can be updated during a single period $\Delta T$ to become equal to PVC. This latter result occurs in Table II by virtue of $R/PVC$ ? $\overline{VDA} \cdot \overline{VDB} \cdot \overline{VDC}$ on step 1364 and *W/PVA* on step 1367.

In carrying out the present invention in its preferred form, the velocity of movable element is changed (acceleration or deceleration) at a rate $dV/dt$ which is a monotonic function of the existing velocity difference, i.e., the magnitude of velocity change which must be effected to bring the actual velocity *PVA* into agreement with the next steady state velocity *PVC* to be reached. Other functions such as proportional or exponential may be used. But in the exemplary embodiment (as represented in FIG. 20), and merely for purposes of explanation, it has been provided that i. If *PVD* is in Range *A*, then acceleration $dV/dt$ will be effected at 100 in./min./sec.

ii. If *PVD* is in Range *B*, then acceleration $dV/dt$ will be effected at 10 in./min./sec.

iii. If *PVD* is in Range *C*, then acceleration $dV/dt$ will be effected at 1.0 in./min./sec.

In order selectively to effect such rates of change of velocity, the number *PVA* is changed during each period $\Delta T$ by a predetermined increment $\Delta V$. Assuming that each period $\Delta T$ is 0.02 sec., then it figures out that:

i. In Range *A*, $dV/dt$ is effected by making $\Delta V/\Delta T$ equal to $\pm 2.0$.

ii. In Range *B*, $dV/dt$ is effected by making $\Delta V/\Delta T$ equal to $\pm 0.2$.

iii. In Range *C*, $dV/dt$ is effected by making $\Delta V/\Delta T$ equal to $\pm 0.02$. It may be said, therefore, that when the velocity difference falls in Range *A*, *B* or *C*, the actual velocity is periodically incremented during each $\Delta T$ period by the respective amounts $$\Delta V_A = \pm 2.0 \text{ in./min.}/\Delta T$$

$$\Delta V_B = \pm 0.2 \text{ in./min.}/\Delta T$$

$$\Delta V_C = \pm 0.02 \text{ in./min.}/\Delta T$$

The magnitude of acceleration/deceleration is thus made dependent upon the magnitude of the velocity difference *PVD*, in a monotonic function shown along the vertical axis in FIG. 20.

Referring to Chart B and Table II, the operations carried out during steps 1364 through 1367 are also identically performed during steps 1864 through 1867 —so that in fact the *PVA* number is incremented twice during each period $\Delta T$ or once during each half period $\Delta T/2$ where $\Delta T/2 = 0.01$ seconds.

Recalling that during steps 1365 (Table II) the amount 1.0 or 0.1 or 0.01 are algebraically added to *PVA* depending upon whether *VDA* or *VDB* or *VDC* is a "1," it will thus be seen that whenever any velocity difference $PVD = PVC - PVA$ exists, the *PVA* number is incremented at a rate of $$1.0 \text{ in./min.}/(\Delta T)/2 \text{ if } PVD>3.0 \quad (i)$$

$$0.1 \text{ in./min}/(\Delta T)/2 \text{ if } 3.0 \leq PVD>0.3 \quad (ii)$$

$$0.01 \text{ in./min.}(\Delta T)/2 \text{ if } 0.3 \leq PVD>0.01 \quad (iii)$$

Figure 21:
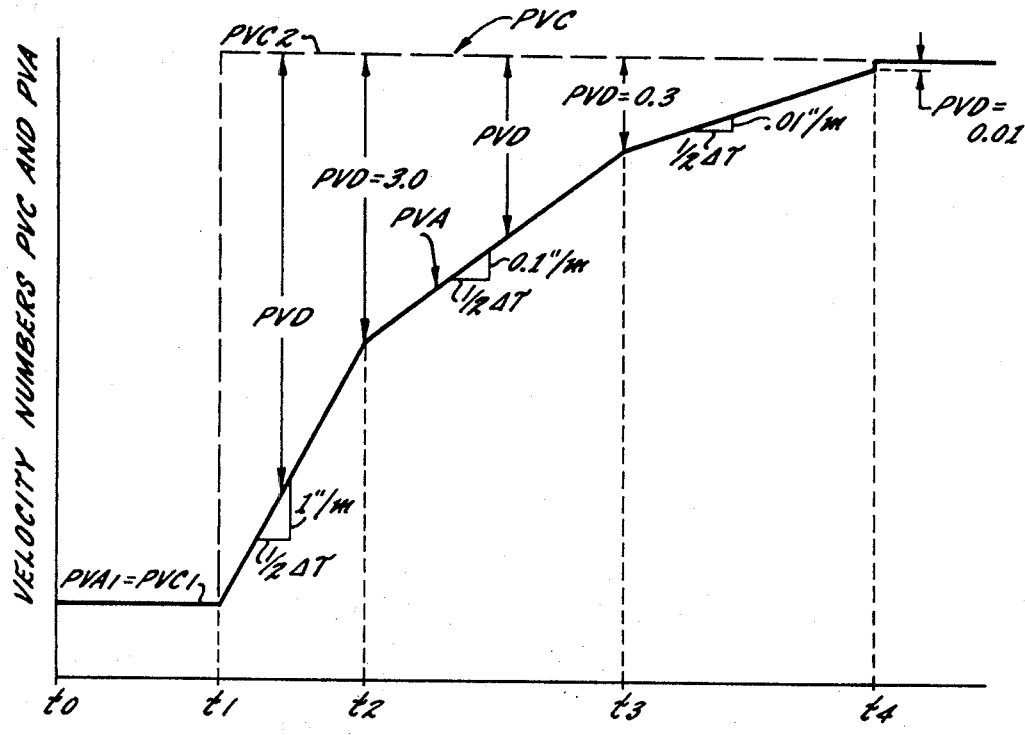
FIG. 21 is a plot of velocity and a velocity number PVA versus time, showing the operation which takes place during automatic acceleration from a first to a second, higher velocity.

FIG. 21 illustrates how the number PVA, and thus the actual velocity of the controlled element, is changed whenever there is an abrupt change in the commanded velocity *PVC*. Between the time instants $t_0$ and $t_1$, the actual path velocity *PVA*, is equal to the initial computed path velocity $PVC_1$. It is assumed that at instant $t_1$ the desired velocity *PVC* increases abruptly to a value $PVC_2$. This might happen, for example, after a new block of data and a new value of feed rate FA are transferred into active storage during Mode 3 operation at the end of one segment, so that during the first following Mode 1 period $\Delta T$ for the succeeding segment, a higher number is read from the register FA on time step 1297, and the number *PVC* is increased to a higher value on time step 1357. During that first and successive Mode 1 $\Delta T$ periods the value *PVD* is computed and signaled, this being represented by the difference between the ordinates for the curves *PVC* and *PVA* in FIG. 21. After instant $t_1$ in the latter Figure, *PVD* is greater than 3.0, so during each half of each $\Delta T$ (in Columns 1300 and 1800) the *PVA* number is incremented or changed by an amount $(\Delta V)/2$ which is 1.0 (equivalent to 100 in./min./sec.). When *PVD* is reduced to a value less than 3.0 at instant $t_2$ in FIG. 21, the increments $\Delta V$ per $(\Delta T)/2$ change automatically to 0.1 (equivalent to 10 in./min./sec.); and when *PVN* is further reduced to below 0.3 at instant $t_3$, the increments $\Delta V$ per $(\Delta T)/2$ are reduced to 0.01 (equivalent to 1.0 in./min./sec.). When *PVD* becomes less than .01 at instant $t_4$, then *PVA* is simply changed by a small amount to make it equal to *PVC*.

In this way, slopes of the velocity versus time, or $dV/dt$, are made to have preselected values which become progressively lower as the velocity different *PVD* becomes progressively smaller. Overshoot due to inertia of the driven parts in thus avoided, yet a high value of acceleration or deceleration is effected when the velocity difference is large, so that the time required to progress from a first to a second value of path velocity is kept reasonably short.

It will be recalled that during each $\Delta T$, the macromove amounts $\Delta X$ and $\Delta Y$ are computed according to the expressions $$\Delta X = I \cdot PVA \cdot TF \qquad (12)$$

$$\Delta Y = J \cdot PVA \cdot TF \qquad (13)$$

and that the servo command numbers *XSC* and *YSC* are updated (in micromoves) by macromove amounts $\Delta X$ and $\Delta Y$ during each period $\Delta T$, such that $$XSC_2 = XSC_1 + \Delta X_1 \qquad (21)$$

$$YSC_2 = YSC_1 + \Delta Y_1 \qquad (22)$$

So long as $\Delta X$ and $\Delta Y$ keep the same value, then the path velocity will remain constant over several $\Delta T$'s. But if the quantity *PVA* is being incrementally changed during successive $\Delta T$'s such that $$PVA_2 = PVA_1 + \Delta V_1 \qquad (23)$$

then it becomes apparent that $\Delta X$ and $\Delta Y$ will change during successive $\Delta T$'s and at an average rate determined by the magnitude of $\Delta V$. Therefore, Equations (12) and (13) for two successive periods $\Delta T$ can be written $$\Delta X_1 = I \cdot PVA_1 \cdot TF \qquad (24)$$

$$\Delta X_2 = I \cdot PVA_2 \cdot TF \qquad (25)$$

$$\Delta Y_1 = J \cdot PVA_1 \cdot TF \qquad (26)$$

$$\Delta Y_2 = J \cdot PVA_2 \cdot TF \qquad (27)$$

This means that from one period $\Delta T_1$, the next period $\Delta T_2$, $\Delta X$ and $\Delta Y$ will change by the amounts $$\Delta\Delta X = \Delta X_2 - \Delta X_1 \qquad (28)$$

$$\Delta\Delta Y = \Delta Y_2 - \Delta Y_1 \qquad (29)$$

and thus that $$\Delta\Delta X = I \cdot TF \cdot (PVA_2 - PVA_1) \qquad (30)$$

$$\Delta\Delta Y = J \cdot TF \cdot (PVA_2 - PVA_1) \qquad (31)$$

or from Equation (23):

$$\Delta\Delta X = K_x \cdot \Delta V \qquad (32)$$

$$\Delta\Delta Y = K_y \cdot \Delta V \qquad (33)$$

where $K_x$ and $K_y$ are factors of proportionality equal to $I \cdot TF$ and $J \cdot TF$ which may not remain constant from block to block if $I$, $J$ or $D$ are changed.

Equations (21), (22), (32) and (33) make it clear that where a member is being moved along an axis (say, the X axis) by servo tracking of a changing number XSC that is being incremented at a rate of $\Delta X$ per $\Delta T$ so that its velocity (rate of change of position) is proportional to $\Delta X$, that member may be accelerated or decelerated by incrementing (increasing or decreasing) the amount $\Delta X$ during each time period $\Delta T$ and by an amount $\Delta\Delta X$ which is proportional to $\Delta V$. By selecting and controlling the size of the velocity incrementing number $\Delta V$ (the rate at which *PVA* changes per $\Delta T$), then the position incrementing number $\Delta X$ can itself be incremented by an amount $\Delta\Delta X$ per $\Delta T$ to determine the rate of change of velocity, and therefore to accelerate or decelerate the controlled member. In effect, the present method and apparatus here periodically change a number $\Delta X$ by an amount $\Delta\Delta X$, and periodically change a number XSC by the amount $\Delta X$; the amount $\Delta\Delta X$ being determined by the periodic incrementing or changing of a velocity-determining number PVA by selectively changeable amounts $\Delta V$.

As noted previously, the numbers $\Delta X$, $\Delta Y$, $I$, $J$, *PVD* may be either positive or negative; and if the *sx* signal appears on time step 1365 in Table II (because *PVC* − *PVA* is negative), then the $\Delta V/(\Delta T/2)$ increments of 1.0 or 0.1 or .01 are subtracted from *PVA* —in effect making $\Delta V$ in the foregoing equations negative. Therefore, either controlled acceleration or deceleration is carried out in the present system, depending upon whether *PVC* − *PVA* is positive or negative, and it happens automatically whenever *PVC* is, for any reason, changed.

Because PVA is updated twice per $\Delta T$ (in columns 1300 and 1800 of Table II) by an amount $\Delta V/2$, a "fresh" and accurate value of *PVA* is available for the following computations of $Q$ and $\Delta X$ and $\Delta Y$ (in columns 1400 and 1900). If more than two axes were being controlled, *PVA* could be updated more frequently by different fractional amounts so as to provide accurate values just prior to computation of each axis macromove; and it is within the scope of the invention to update PVA by different fractional amounts of the desired $\Delta V/\Delta T$ and for a different number of updates so long as the total $\Delta V$ per $\Delta T$ has the desired value.

"NEXT BLOCK" ACCELERATION

As thus far described, the actual path velocity PVA and the computed path velocity PVC are compared during every Mode 1 time period $\Delta T$ to determine the sign and magnitude of the difference $PVD = PVC - PVA$. Then, if any difference exists (i.e., $PVD \neq 0$) the controlling velocity number PVA is incremented by an amount $\Delta V$ during each period $\Delta T$ (actually, it is incremented by an amount $\Delta V/2$ twice during each period $\Delta T$). Thus, whenever any difference between the command velocity PVC and the actual velocity PVA arises for any reason (and if the system is in Mode 1, meaning that data transfer not in progress), then acceleration or deceleration will take place completely automatically. No special acceleration-deceleration auxiliary function code needs to be included in any block of data on the punched tape 37. Normally there will be a change in commanded velocity when a block of data is transferred, and a new number FB in buffer register 45 is put into the active FA register R21 during the transfer which occurs in Mode 3 (see steps 3338, 3339 and 8338, 8339 in Table IV). On the next iteration $\Delta T$, the system goes into Mode 1, a different value of the number FA will be read on step 1297 (Table II), and PVC will be changed —so that acceleration or deceleration will take place during the succeeding several iterations until PVA has been incremented by a total amount which makes it equal to the new value of PVC. In other words, the commanded velocity desired for a given path segment is reached only after that segment has been partially executed. This is called "next block" acceleration/deceleration because it occurs only after the next block of data in buffer storage has been transferred into active storage.

Figure 22:
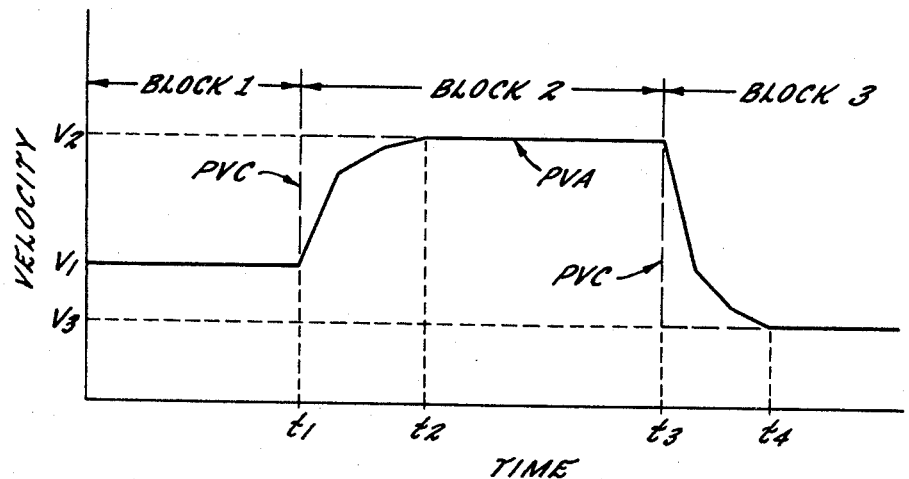
FIGS. 22 and 23 are graphic illustrations of velocity versus time and respectively illustrating the general nature of "next block" and "this block" acceleration or deceleration.

"Next block" operation is illustrated by FIG. 22, where Block 1 is carried out at a commanded velocity of $V_1$ and at instant $t_1$ the commanded velocity PVC (for block 2) jumps abruptly to a higher value $V_2$ when the segment for Block 1 has been fully executed. In this case the actual velocity represented by curve PVA rises gradually only after the execution of Block 2 has been initiated at instant $t_1$ and PVA reaches the commanded velocity $V_2$ at a later instant $t_2$. Then, when Block 2 has been fully executed at instant $t_3$, the deceleration or gradual reduction in PVA begins at instant $t_3$ and the velocity $V_3$ is reached at some later instant $t_4$ —after the Block 3 segment has been partially completed.

In the case of deceleration, however, where the block of data in buffer storage calls for a lower feed rate than that in active storage, it is preferable to make the commanded velocity for a given segment be reached and put into effect before the execution of that segment begins. This is so because otherwise a segment may be started with a velocity too high for safety of the cutter or workpiece, whereas a velocity lower than that commanded at the beginning of a segment cannot be particularly harmful. Moreover, when the controlled element is to be decelerated to zero velocity, it must come to a standstill before it reaches the end of a segment being processed in active storage, for otherwise it would overshoot the desired stopping point and thus ruin a workpiece (especially where an inside corner is to be cut).

Figure 23:
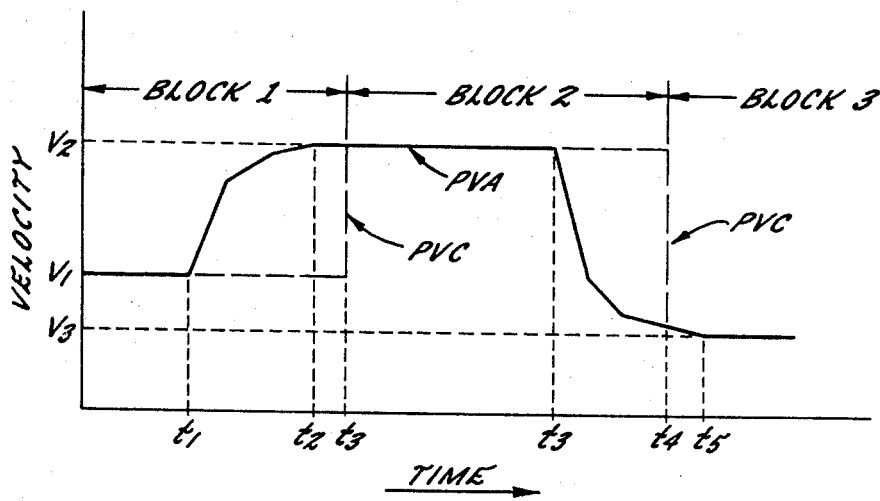

While "next block" deceleration may be carried out within the purview of the present invention in its broader aspects, the more preferable "this block" deceleration is accomplished in the exemplary embodiment, and will be described below. "This block" operation is generally illustrated in FIG. 23, where it is assumed that PVA and PVC are equal prior to instant $t_1$. Normally Block 1 would be fully executed at instant $t_3$ and there would occur an abrupt jump in PVA to a higher value $V_2$. But if at some earlier instant $t_1$ (and prior to the complete execution of Block 1) the system is caused to "anticipate" the new velocity $V_1$ and thus the acceleration operation begins at instant $t_1$, the actual velocity PVA will rise (with three successively smaller slopes) until it reaches the new value $V_2$. Because the average velocity PVA will be higher than the velocity $V_1$, Block 1 will be fully executed at an instant $t_2$ which is earlier than instant $t_3$. Of course, Block 2 will then be carried out at the velocity $V_2$ which corresponds to the programmed feed rate F in the Block 2 data.

Assuming that Block 3 in FIG. 23 contains a lower feed rate number F, the velocity number PVC would normally drop abruptly to call for a velocity $V_3$ at instant $t_4$. Unless "anticipation" is used, the actual velocity PVA would gradually decrease after instant $t_4$ (as it is shown decreasing after instant $t_3$ in FIG. 22) and after the execution of Block 3 had begun. In order to be certain that the actual velocity PVA has gradually decreased to the velocity $V_3$, and Block 3 begins to be executed at that commanded velocity, the decrease in velocity is anticipated during the execution of Block 2, and deceleration is initiated at instant $t_3$ in FIG. 23. This means that the actual velocity is reduced to the new, lower value at an instant $t_5$ substantially at the time when Block 2 is fully executed. Instant $t_5$ is shown later than instant $t_4$ because the lower average velocity during Block 2 makes the time for its execution "stretch." But at instant $t_5$ when the execution of Block 3 actually begins, the actual velocity PVA is at the value $V_3$ which corresponds to the commanded feed rate for Block 3.

FIG. 23 thus shows "this block" acceleration/deceleration because changes in velocity occur during a time interval while an active block of data is being processed to reach a new velocity corresponding to that defined in the next block of data then held in buffer storage.

FIGS. 20 through 23 are not drawn to scale and are intended only to show in a general way the relationships between PVD, $\Delta V$, PVC and PVA as they change during "next block" or "this block" acceleration or deceleration.

In the specific apparatus and method next to be described, acceleration will always take place by "next block" action; and deceleration will always take place by "this block" action. It will become readily apparent to those skilled in the art, however, that acceleration may be effected by "this block" action, and deceleration may be effected by next block action, as respectively illustrated in FIGS. 23 and 22.

SIGNALING A FORTHCOMING VELOCITY DECREASE

Whenever block $B_n$ data is first placed in active storage (by data transfer, previously described), a determination is made as to whether the path velocity to be reached at the end of the corresponding segment is to be lower than the path velocity which will be in effect during the time that the controlled element is moving through the early portion of that segment. Such expected lower velocity may occur, and it is detected and signaled (so that "this block" deceleration may be effected) under the following circumstances:

i. If the programmed feed number $F$ (stored in the register 45 as the number FB) for block $B_{n+1}$ is less than the programmed feed number FA (stored in the register R21) for block B.

ii. If the velocity to be reached at the end of the segment for block B is zero, because a. An M00 code (meaning a programmed system stop) has been read and stored in register 48 as constituting or forming a part of the block $B_{n+1}$ data, or b. The "data processing" of the $B_{n+1}$ data read from the punched tape 37 has not been performed (due for example, to malfunction or slowness of the tape reader 39 or other devices), or c. A special code, such as G09, has been read as a part of the block $B_n$ data, (and signaled at the output of decoder 46a in FIG. 91) signifying that the controlled element is to be brought to zero velocity at the end of the $B_n$ segment, and the $B_{n+1}$ segment than automatically executed thereafter. The G09 code will be used, for example, when the programmed path includes a sharp inside corner, even though the normal path velocity is quite high. The G09 will cause the cutter 14 to approach the corner point by decelerating to zero due to the data of block $B_n$, and the subsequent data of block $B_{n+1}$ will thereafter cause the cutter 14 to accelerate back to the desired feed rate along a segment lying at a considerably different angle.

In order to signal the circumstance (i) mentioned immediately above, the numbers FA and FB are compared. On step 1094 (Table II) the accumulator 53a is cleared and the number FB placed therein. See PGA 45r, Condition (5), FIG. 91. On step 1095, a classify signal cx is supplied to the computer 53 (see PGA CC13) and the number FA is read into the computer input trunk CIT. Only if FB is less than IA will signal ALB be a "1," and this indicates that the feed rate for block $B_{n+1}$ is to be less than that now being effected for block $B_n$. Otherwise, signal $\overline{ALB}$ is a 1.

On step 1096, the Table II legends indicate EANR ? ALB·$\overline{DTZ}$ or CANR ? $\overline{ALB·DTZ}$. Assuming that the flip-flop DTZ to be reset and thus the $\overline{DTZ}$ signal to be a "1," the flip-flop ANR is either enabled or cleared on step 1096 if the feed rate for block $B_{n+1}$ is, or is not, less than the feed rate for the segment defined by block $B_n$ and being executed. When the signal ANR is a "1" the system is conditioned so that it will in the near future start a deceleration procedure.

In order to signal the circumstance (ii) mentioned immediately above, and prepare the system for "-deceleration to zero" velocity, the flip-flop DTZ is set so that the signal "DTZ" becomes a "1." Actually, in the preferred arrangement here shown, the flip-flop DTZ is set by an EDTZ signal every time a new block of data is transferred from buffer to active storage. See the PGA which produces the EDTZ signal in FIG. 9n and refer to Table IV, step 3378 or 3878. Then, if the system is not required to decelerate to zero (because there is neither an M00 code signal from the M decoder in FIG. 9o, nor a G09 code signal from the G decoder 46a in FIG. 91, nor a signal DP from the "data process" flip-flop in FIG. 9n indicating that data has been fully processed and is ready), the flip-flop DTZ is cleared by a signal CDTZ from a PGA in FIG. 9n which responds when $\overline{ICDTZ}$ · DP · x698 (see Table I, time step x698), From FIG. 9n, it will be seen that the $\overline{ICDTZ}$ signal appears when there is neither a G09 code signaled; nor the simultaneous appearance of signals M00 and NDM; and if "data process" has been performed then flip-flop DTZ will be cleared by a PGA shown in FIG. 9n, and the DTZ signal will become a "0." But on the other hand, if on step x698 after a Mode 3 data transfer iteration, the signal DP is a "0" or the signal ICDTZ is a "0" (because neither G09 is a "1" nor Moo· NDM is a "1") then the DTZ flip-flop will remain set and the signal DTZ will be a "1." In the latter case, the system knows it must prepare to reach zero velocity by the end of the segment defined by the data of block $B_n$ in active storage.

Summarized, signal ANR is a "1" if the system must perform "this block" deceleration to a new, lower feed rate for block $B_{n+1}$; and the signal DTZ is a "1" if the system must perform "this block" deceleration to zero velocity.

DETERMINATION OF THE PARTICULAR PERIOD $\Delta T$ AT WHICH DECELERATION SHOULD BE INITIATED When deceleration (due to ANR = "1" or DTZ = "1") is to be effected, it is desirable that the new, lower velocity (PVN) be reached substantially at the same time that the end point for the segment in progress is reached. That end point is reached either when the "look ahead" performed in column 1000 (see Chart B) signals a Zone A or Zone B response and causes data transfer to occur respectively in the following iteration period $\Delta T$ or in the following 1.5 $\Delta T$ periods.

But when deceleration is initiated, and PVA is decreased by monotonically decreasing increments of $\Delta V$ per $\Delta T$, then $\Delta X$ and $\Delta Y$ both decrease and the velocity of the movable cutter 14 is reduced. Therefore, it may require several periods $\Delta T$ from that instant when deceleration is initiated to that point in time when the segment end point XCEP, YCEP is reached. This number of periods $\Delta T$ will depend upon the total velocity reduction to be obtained, e.g., whether it is to be reduced from 100 in./min. to 10 in./min. or from 15 in./min. to zero, involving a total velocity change of 90 or 15, respectively. In keeping with the invention here disclosed, the distance (called DLAP) which the element will travel along the fast axis during the course of decelerating from its existing velocity PVA to its next, lower desired velocity PVN is computed. This distance is compared with the travel still to be executed along the fast axis before the segment end point is reached. When the latter distance (called "remaining distance"

RD) is reduced to a value equal to or less than the deceleration distance DLAP, then the deceleration procedure is initiated (by setting a flip-flop TAD to make the signal TAD = "1").

DLAP COMPUTATIONS

Figure 24:
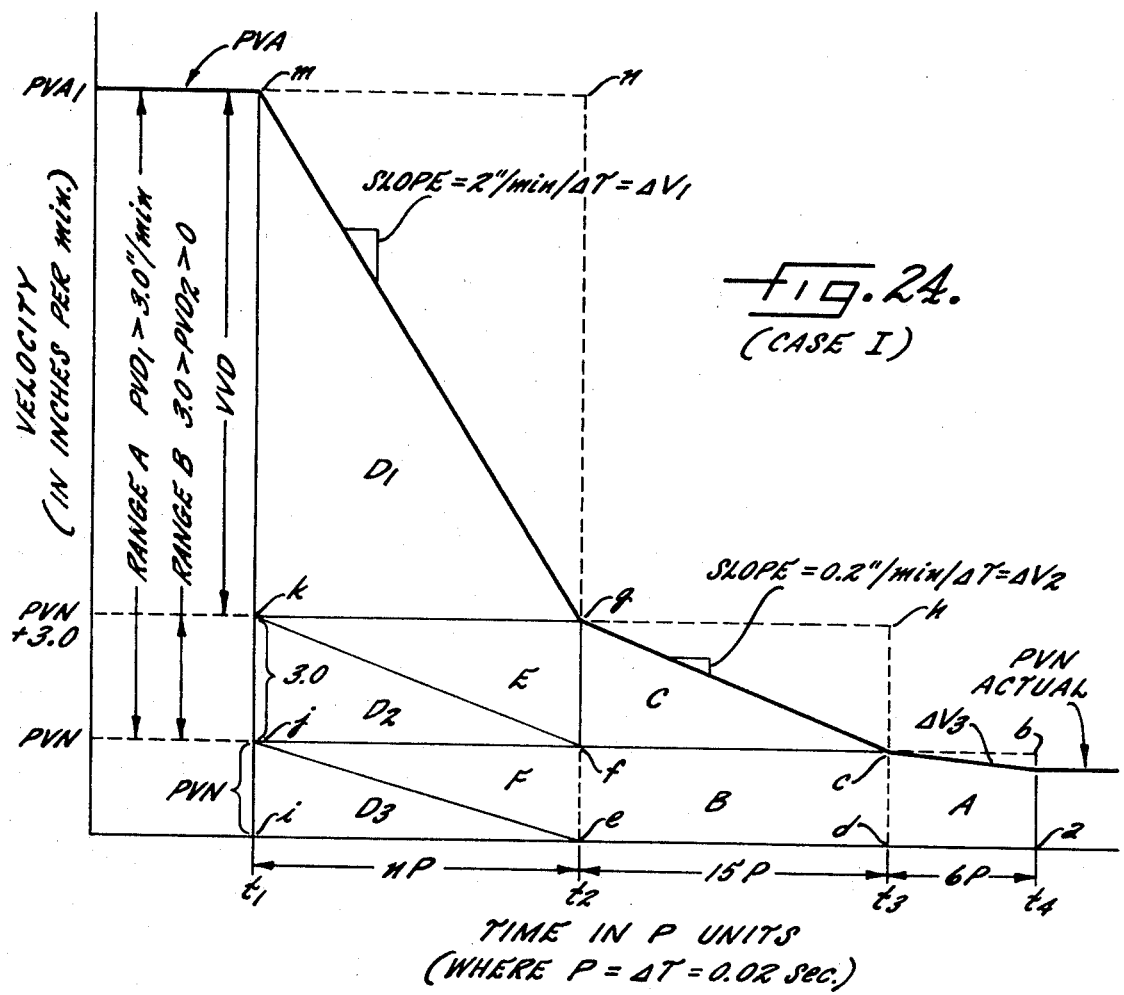
FIGS. 24 and 25 are graphs of velocity versus time and respectively make clear the manner in which the distance traveled ($DLAP$) during deceleration from a first to a second velocity is computed for Case I and Case II.

Before describing the procedural steps, it will be helpful to refer to FIG. 24, which is a plot of velocity versus time, when time is considered not in units of seconds or minutes, but rather in units of $\Delta T$ (i.e., 0.02 seconds). The symbol $P$ will be used to designate the number of time periods $\Delta T$. For example, if $P$ is 6 then it represents actual time of $6 \times 0.02 = 0.12$ seconds. It is assumed that the number $PVA$ (in inches per minute) and thus the actual velocity of the controlled element have an initial value of $PVA_1$ and that the next block of data (in buffer storage) contains an F number which will result in a "next" velocity $PVN$ which is somewhat lower. The initial actual velocity $PVA$, and the next velocity $PVN$ may have any of a wide range of values, and thus their initial difference $$PVD_1 = PVN - PVA_1 \qquad (35)$$

may be very large or very small. It will be assumed that at the time instant $t_1$ the deceleration procedure previously described with reference to column 1300 of Table II begins because $(PVC - PVA) = PVD$ as there described suddenly becomes a relatively large negative number on step 1359, so that $PVA$ is updated twice per period by subtracting 1.0, i.e., is reduced at a rate of 2.0 in./min./$\Delta T$, which is shown as the slope $\Delta V_1$ in FIG. 24. When $PVD$ is reduced to Range B between 3.0 and 0.3 in./min., then $PVA$ decreases at the slope labeled $\Delta V_2$ and which has been arbitrarily chosen to be 0.2 in./min./$\Delta T$. The distance traveled in any given time interval is $$D = \int_{t_1}^{t_n} v \cdot dt$$

and thus the area under the curve $PVA$ in FIG. 24 is equal to the distance traveled between any two time instants. Thus, FIG. 24 may be used to explain the computation and summing of individual areas to arrive at a total distance value $DLAP$ which the element will travel after deceleration begins and until the next, lower velocity $PVN$ is reached.

In making these calculations, the distance traveled while deceleration occurs in Range C at a slope of $\Delta V_3$ of 0.02 in./min./$\Delta T$ is only estimated by assuming that the element travels at the velocity $PVN$ for an arbitrary time of six $\Delta T$ periods, shown as $6P$ in FIG. 24. This is sufficiently accurate because the distance traveled while Range C deceleration takes place is relatively small. This latter distance is represented by the area of the rectangle A defined by points $a, b, c, d$ where $$A = PVN \times 6P \qquad (36)$$

Recalling that $PVN$ is in in./min and $P = .02$ seconds, $$A = PVN \times 6 \times (.02)/(60) = .002\ (PVN) \text{ inches} \qquad (37)$$

On the other hand, the area under that portion of the curve $PVA$ which is at the slope $\Delta V_2$ is equal to the area of rectangle B defined by points $c, d, e, f$ plus the area of the triangle C defined by points $c, f, g$. The area of triangle C is, however, equal to one half the area of the rectangle $c, f, g, h$. The length $e, d$ is equal to the length $f, c$. Because the Range C deceleration is ignored and approximated by rectangle A, it is assumed that the horizontal line $f, c$ represents $PVN$ and that at point $c$, the difference $PVD$ is zero. With that assumption, the velocity will decrease by an amount of 3.0 in./min. during the period between instants $t_2$ and $t_3$ at a slope of $\Delta V_2 = 0.2$ in./min./$P$. This means that the length $e, d$ is equal to 3.0  0.2 = $15P$ and it has been so labeled in FIG. 24. Now from inspection, the areas B and C may be written:

$$B = PVN \times 15P \qquad (38)$$

$$C = \tfrac{1}{2}\ (3.0 \times 15P) \qquad (39)$$

$$B = PVN \times (.02)/(60) \times 15 = .005 PVN \text{ inches} \qquad (40)$$

$$C = \tfrac{1}{2}\ (3.0 \times (.02)/(60) \times 15) = .0075 \text{ inches} \qquad (41)$$

Still further, the area under the $PVA$ curve where the latter has a slope $\Delta V_1$, is the sum of the triangles $D_1, D_2, D_3, E, F$. The area of the triangle $D_1$, for example, is equal to one half the area of the rectangle $k, g, n, m$. But the length $k, g = j, f, = i, e$ may have a wide range of values depending upon the initial value $PVA$, and the next velocity value $PVN$. The curve $PVA$ has a slope $\Delta V_1 = 2$ in./min./$\Delta T$ as it decreases from $PVA_1$ at point $m$ to a value of $(PVN + 3.0)$ at point $g$. The velocity thus decreases at a rate of $2.0/P$ over a span labeled $VVD$ in FIG. 24. From inspection $$VVD = PVD_1 - 3.0 \qquad (42)$$

The slope of $PVA$ forming the hypotenuse of triangle $D_1$ may be written:

$$(2.0)/P = (VVD)/(nP) \qquad (43)$$

so that $$n = (VVD)/2 = .5\ VVD \qquad (44)$$

Knowing $n$ from Equation (44), it is now possible to compute the area of the large rectangle $i, e, n, m$. By taking one half of that area, the sum of the areas of the three triangles $D_1, D_2, D_3$ is obtained. This sum will be designated by the symbol $D$ in considering FIG. 24. Then, by computing the areas of the triangles E and F and adding them to the sum $D$, the entire area under the curve $PVA$ between instants $t_1$ and $t_2$ will be obtained.

The area $A_r$ of the large rectangle $i, e, n, m$ is easily computed. It may be visualized as made up of a series of vertical strips, each strip having an area equal to the distance $\Delta X_1$ (if the X axis is the fast axis being considered) or the distance $\Delta Y_1$ (if the Y axis is the fast axis being considered) necessary to produce the initial velocity $PVA_1$. The total number of such strips is equal to the number $n$, because the distance represented by the area $A_r$ is that which will be traveled along the fast axis (X or Y) by updating the servo command number ($XSC$ or $YSC$) by the amount $\Delta X_1$ or $\Delta Y_1$ during n of the periods $\Delta T$. The fast axis macromove $\Delta X$ or $\Delta Y$ will here be called $\Delta_f$ for the sake of generality. Thus, $$A_r = n\Delta_f \tag{45}$$

$$D = D_1 + D_2 + D_3 = .5\, n\Delta_f \text{ inches} \tag{46}$$

where $\Delta_f$ represents the $\Delta X$ or $\Delta Y$ increments along the fast axis which produce the initial path velocity $PVA_1$. $D$ is expressed in inches.

The area of the triangle E may, from inspection of FIG. 24, be written as equal to one-half the area of the rectangle $j, f, g, k$. That rectangle is in area equal to the sum of a plurality of small vertical strips each having a height of 3.0 in./min. and a width of $\Delta T$, and where the number of such strips is $n$. But expressed in terms of inches per $\Delta T$, when there are 50 $\Delta T$'s per second and 3000 $\Delta T$'s per minute, the height of 3.0 in./min. is correctly expressed as $(3.0)/(3000) = .001$ inches per $\Delta T$. Thus, the area of the triangle $E$ is:

$$E = \tfrac{1}{2} n \times .001 \text{ inches} \tag{47}$$

The area of the triangle F is equal to one half the area of the rectangle $i, e, f, j$. That rectangle is made up of a plurality of vertical strips which in height are $PVN$ in./min. or $(PVN)/3000$ inches per $\Delta T$. Each strip is $\Delta T$ seconds or $1P$ seconds in width and there are $n$ such strips. Therefore the area of the triangle $F$ is:

$$F = \tfrac{1}{2} \times n \times (PVN)/3000 = .5\, n(.00033 PVN) \text{ inches} \tag{48}$$

From instant $t_1$ to instant $t_4$ in FIG. 24 (hereafter called Case I), the total area under the curve $PVA$ — and thus the total distance $DLAP$ when the movable element will travel in decelerating from $PVA_1$ to $PVN$ — is to a close approximation the sum of the areas $A, B, C, D_1, D_2, D_3, E$ and $F$. But $$D = D_1 + D_2 + D_3 \tag{49}$$

so that $$DLAP = A + B + C + D + E + F \tag{50}$$

By substitution from the previous equations for $A, D, \ldots F$, this becomes $$DLAP = .002 PVN + .005 PVN + .0075 + .5 n\Delta_f + .5 n \times .001 + .5(.00033 PVN) \tag{51}$$

By rearranging and factoring, Equation (51) becomes:

$$DLAP = \underbrace{(.002 + .005) PVN}_{A\ \ B} + \underbrace{.0075}_{C} + .5 n (\underbrace{\Delta_f}_{D} + \underbrace{.001}_{E} + \underbrace{.00033 PVN}_{F}) \tag{52}$$

In this expression, the quantities corresponding to the areas A through F are identified by arrows.

Figure 25:
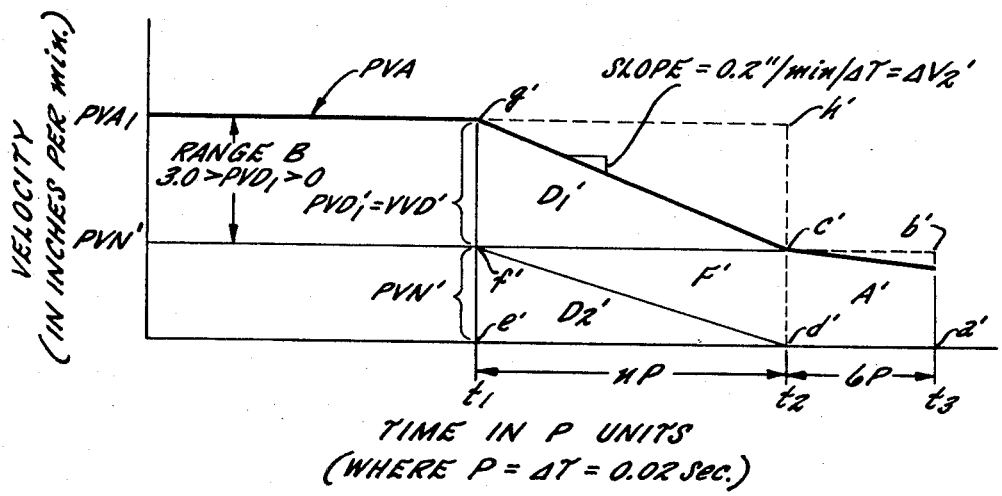

There is, of course, the possibility that deceleration from an initial velocity $PVA_1$ to a lower velocity $PVN$ to be reached just prior to the end of a path segment results in an initial velocity difference $PVD_1$ which is less than 3.0, so that the areas $D, E, F$ as shown in FIG. 24 are not applicable, because deceleration is initiated at the slope $\Delta V_2$. This situation is illustrated in FIG. 25 as Case II, where the same symbols with distinguishing primes are used and where $PVA_1$ is initially no more than 3.0 in./min. greater than $PVN$, and may be only slightly greater (i.e., 1.2 in./min.) than $PVN$. In this case, if deceleration begins at instant $t_1$, it will proceed initially at a slope $\Delta V_2'$ equal to 0.2 in./min. per $P$, and the new velocity $PVN'$ reached at point $c'$. The additional distance represented by the area $A'$ must, by assumption, be traveled with velocity changing at the slope $\Delta V_3$ before the end of the path segment is actually reached.

In FIG. 25, therefore, the initial velocity different $PVD_1$ at instant $t_1$ is a variable which is equal to the height of a triangle $D_1'$ defined by points $f', c', g'$. Moreover, the slope of the curve $PVA$ immediately after instant $t_1$ is $\Delta V_2' = 0.2$ in./min./$P$ (rather than $\Delta V_1 = 2$ in./min./$P$ after instant $t_1$ in FIG. 24). Thus, the number $n$ of $\Delta T$ or $P$ units which elapse while $PVA$ is changing at a slope of $\Delta V_2 = 0.2$ in./min./$P$ is variable in FIG. 25, whereas it was fixed at a value of $15P$ in FIG. 24.

Yet, it will be seen that the area $A'$ in FIG. 25 is expressed by the same Equation (37) given above:

$$A' = .002 PVN \tag{37'}$$

Also, because the $PVA$ curve has a slope of 0.2 in./min./$P$ between instants $t_1$ and $t_2$ in FIG. 25, that slope may be expressed by the ratio of the vertical length $VVD$ and the horizontal length $nP$, so that $$(0.2)/P = (VVD')/(n'P) \tag{43'}$$

and $$n' = (VVD')/.2 = 5 VVD \tag{44'}$$

Thus, in Case II, Equation (44') rather than Equation (44) may be used to determine the number $n$.

In FIG. 25, the area of the rectangle $e', d', h', g'$ is $$A'_r = n'\Delta_f \tag{45'}$$

where $\Delta_f$ is the $\Delta X$ or $\Delta Y$ macromove corresponding to the initial velocity $PVA_1'$, depending upon whether the X axis or the Y axis is the fast axis. The sum of the areas of triangles $D_1'$ and $D_2'$ is equal to one-half of the area of that rectangle, viz.

$$D' = D_1' + D_2' = .5\, n'\Delta_f \tag{46'}$$

It will be seen that Equation (46') is essentially the same expression as Equation (46).

In FIG. 25, the area of the triangle $F'$ is equal to half the area of the rectangle $e', d', c', f'$. That rectangle is made up of a plurality of vertical strips which in height are $PVN'$ (expressed in inches/min.) or $PVN/3000$ expressed in inches per $\Delta T$. Each strip is $1P$ seconds wide. Therefore the area of the triangle $F'$ is:

$$F' = \tfrac{1}{2} \times n \times (PVN)/(3000) = .5 n (.00033 PVN) \text{ inches} \tag{48'}$$

It will be seen that Equations (48) and (48') are identical.

The total area under the curve $PVA$ in Case II is thus the sum of the areas $A' + D_1' + D_2' + F'$. But $$D' = D_1' + D_2' \tag{49'}$$

Therefore, the distance $DLAP'$ represented by such total area is $$DLAP' = A' + D' + F' \tag{50'}$$

and by substitution from Equations (37'), (46') and (48'):

$$DLAP' = .002\,PVN + .5n\Delta_f + .5n\,(.00033\,PVN) \quad (51')$$

By rearranging and factoring:

$$DLAP' = .002PVN + .5n(\Delta_f + .00033PVN) \quad (52')$$
$$\phantom{DLAP' = .00}\underset{A}{\uparrow}\phantom{PVN + .5n(}\underset{D}{\uparrow}\phantom{_f +}\underset{F}{\uparrow}$$

Comparison of Equations (52) and (52') reveals that the latter computation of Equation (52') for Case II of FIG. 25 can be performed in exactly the same way as the computation of Equation (52) for Case I of FIG. 24, except that the terms B, C and E of Equation (52) are omitted when DLAP for Case II is to be determined. Also in Case II, the computation of the number n involves a shift in the decimal point relative to Case I (compare Equations 44 and 44').

The DLAP distance (for either Case I or Case II) is computed once during every Mode 1 period $\Delta T$, in order to find out how far the controlled element would travel if deceleration were initiated during that particular $\Delta T$. Such computation is initiated (as shown in Chart B and Table II) on steps 1097 to 1099, continued on steps 1131 to 1197, and then continued on steps 1226 to 1237. On step 1237 of every $\Delta T$ period the number DLAP has been computed and stored in the scratch pad 1 register R25, by a procedure which will next be explained with reference to Equations (52), (52'), (44) and (44') set out above. For brevity, only limited reference will be made to the specific PGA's and their responsive conditions by which numbers are read from or written into different registers, and to the specific PGA's in FIG. 9c which produce the properly timed various control signals for the computer. The reader of this specification will by this point in his study know how to cross-refer between Table II and the various structural components shown in composite FIG. 9.

On step 1097: The feed number FB is read into the computer if ANR is a "1," indicating that the programmed feed rate F for the next block $B_{n+1}$ is less than that for the block $B_n$ which is inactive storage and presently being carried out. On the other hand, if signal DTZ is a "1," the arbitrarily low value of 3 is read into the seventh place of the computer (by PGA$_{n14}$, FIG. 9r) when the controlled part is to reach zero velocity at the end of the segment currently being executed from data in active storage. This represents the number .003.

On step 1098: The number in the accumulator is shifted two places to the left by an SL2 signal, thereby to aline it properly with the decimal branches of the output trunk COT. The four digit number FB now appears in the 2, 3, 4, 5 places of the accumulator; or the number .003 appears as the value representing 0.30 in./min.

On step 1099: This latter number is then written into scratch pad 3 register R27 as the next succeeding feed rate (FB or 0.3) which the system is to use.

On steps 1100 through 1126, the regular micromove servo upgrading occurs, as it does in every period $\Delta T$. See Chart A.

On step 1131: As shown in Chart B and Table II the DLAP computation is resumed. The computer is conditioned for Type I multiplication by an $emx''$ signal.

On step 1132: The feed rate number (either FB or 0.3) previously stored in register SP3 is read into the computer (the latter having been previously cleared on step 1126).

On step 1134: If $\overline{DTZ}$ is a "1" the number PCF is read in (see PGA R28r) as a multiplier. If DTZ is a "1," the number 1.0 is read into the fourth CIT branch (see PGA n4), forming an artificial PCF number of 1.0, so that the end product will be the same as the .3 in./min. previously put into the accumulator.

On steps 1135 through 1150: The multiplication of the next F number times the PCF number is performed, and the product ($F \times PCF$) appears in the accumulator as an adjusted feed number. The computer is "cleared" from its multiplying mode by a $cmx''$ signal.

On step 1151: A classify signal cx is supplied and the maximum cutter velocity (here assumed to be 180 in./min.) is read in for comparison with the adjusted feed number already in the accumulator.

On step 1152: If the adjusted feed number ($F \times PCF$) is greater than 180 in./min., and $AGB = $ "1," then the accumulator is cleared by a CAR signal, and the number 180 is read into the accumulator (see PGA n2) to serve as the next feed rate PVN to be achieved. If AGB is "0," the adjusted feed rate remains in the accumulator as the number PVN.

On step 1153: The number PVN is written as a new number into the SP3 register R27 for future use, but is also remains in the accumulator. A subtract signal sx and the number PVA are fed to the computer to perform the subtraction $PVA_1 - PVN$, the result being $PVD_1$ (see Equation 35). The PGA in FIG. 9n produces a CVD signal and all the flip-flops VDM, VDA, VDB, VDC are reset to "0" states.

On step 1154: The number in the accumulator is written into the PVD register only if TAD is a "1." Assume for the moment that TAD is a "0." Thus, only a classify signal cx and the number 3.0 are fed to the computer (from PGA's CC13 and n6) so that an AGB signal will be produced only if $PVD_1$ (see FIGS. 24 and 25) is greater than 3.0 in/min.

On step 1155: An EVDA signal is generated and flip-flop VDA is set only if AGB is a "1" and $PVD_1$ is greater than 3.0. If at this time $VDA = $ "1," the system will act according to Case I and FIG. 24, but if $VDA = $ "0" the system will act according to Case II and FIG. 25. The VDA signal will be mentioned several times in the following description, by referring simply to Case I or Case II.

On step 1156: A FUL signal and the number 3.0 are read into the computer (by action of PGA's CC12 and n6) so that the subtraction $PVD_1 - 3.0 = VVD$ is performed, but only if VDA is a "1" and Case I is applicable. See FIG. 24.

On step 1157: The number VVD is written into register SP2. If Case II is applicable, this number is simply $PVD_1$ which remained in the accumulator at the end of step 1154 because $PVD_1 = VVD$ as shown in FIG. 25. In either case, VVD is stored in register SP2.

On step 1158: The number VVD is read from register SP2 and added to the number VVD already in the accumulator. The sum is 2VVD.

On step 1159: The number 2VVD is written into register SP1 for storage and future use. The number VVD is again read in from register SP2 and the new sum is 3VVD.

On step 1160: The number 2VVD is read into the computer from register SP1 and the resulting new sum is $2VVD + 3VVD = 5VVD$ in the accumulator.

On step 1161: The SR1 signal is supplied to shift the accumulator contents, which then represent 0.5 VVD. The number 2VVD is read in from register SP1 and added to produce in the accumulator a new sum 2.5 VVD.

On step 1163: The accumulator contents 2.5VVD are shifted two or three laces to the right if VDA or VDA are respectively at the "1" level and Case 11 or Case I applies. The new number in the accumulator is now properly lined up to be added to other numbers (with its decimal point between COT−6 and COT−7) but because of the different number of shifts, that new number is 2.5VVD for Case II and 2.5VVD for Case I.

It will be recalled from Equations (44) and (44'), supra, that the variable n is equal to .5VVD in Case I and 5VVD in Case II. Since the accumulator now holds a number equal to .25VVD or 2.5VVD (if VDA is a "1" or a "0" and Case I or Case II is respectively in effect), the accumulator number represents n/2 or 0.5n.

On step 1168: The latter number 0.5n is written into the LAB register for storage and future use, but only if $TAD = 1$ because deceleration has not yet started. The computer is then cleared by a CAR signal and the next velocity number PVN previously stored (during step 1153) in register SP3 is written into the computer.

On step 1169: The number PVN is again read in from register SP3, so that the new sum is 2PVN.

On step 1170: The sum 2PVN is written for temporary storage into register SP1; and the number PVN is again read in from register SP3, so the new sum becomes 3PVN.

On step 1171: The accumulator contents becomes 0.3PVN due to a SR1 signal. The number PVN is again read in from register SP3, so the new sum becomes 1.3PVN.

On step 1172: The number 2PVN previously stored in register SP1 is read in. The new sum becomes 3.3PVN.

On step 1173: The accumulator contents are shifted three places to the right by a SR3 signal, so the number represented in .0033PVN. This number will be treated, however, as being .00033PVN because its decimal point will later be considered to reside between the COT−3 and COT−4 branches. Thus, the valve .00033PVN which is the term $F$ in Equations (52) and (52') has been computed and appears in the accumulator.

On step 1174: If $VDA = $ "1" and Case I is in effect, then the number decimal digit 1 is read into the computer on the CIT−6 branch by a signal from PGA n15. Because the decimal point of the term $F$ is between COT−3 and COT−4, this has the effect of reading in the number .001. The new sum is (.001 + .00033PVN) and is thus the sum of terms $E$ and $F$ in Equation (52). But observe that if Case II is applicable, then the number .001 representing the term $E$ (and which is absent from Equation 52') is simply not added in.

On step 1175: A control signal FP is applied to the computer. The number $\Delta_f$ is read in by reading the $\Delta X$ number from register R10 if FAX is "1" or reading in the $\Delta Y$ number if $\overline{FAX}$ is "1." Thus, the fast axis macromove is brought in and added (regardless of its sign) so that the new sum is $(E + F + \Delta_f)$ in Case I, or $(F + \Delta_f)$ in Case II.

On step 1176: This latter sum is written into and temporarily stored in the register SP2; and the computer is conditioned to multiply by a signal $emx''$. The "enable multiply" signal has the effect of clearing the accumulator, but the number so cleared in this instance is first stored in the register SP2.

On step 1177: The number $E + F + \Delta_f$ (Case I) or the number $F + \Delta_f$ (Case II) is read in from register SP2 where it was previously stored during step 1176.

On step 1179: The number 0.5n is read in from the register LAB where it was previously stored. Multiplication proceeds until a $cmx''$ clearing signal appears on the later step 1195 and the accumulator now holds numbers which may be designated a sub-total $S_t$ which is:

$$S_t = 0.5n (\Delta_f + E + F) \quad \text{- - - for Case I}$$

$$S_t = 0.5n (\Delta_f + F) \quad \text{- - - for Case II}$$

See Equations (52) and (52') supra. The $cmx''$ signal is so timed that the product or sub-total in effect has its decimal point located between COT−4 and COT−5.

On step 1196: This $S_t$ number is shifted one place to the left by a SL1 signal, to aline it properly in the accumulator and in effect to locate its decimal point between COT−3 and COT−4.

On step 1197: The $S_t$ number is written into register SP1 for temporary storage and the DLAP computations are deferred until the later step 1230.

On step 1229: The accumulator having been cleared on step 1226 (Table I), and the number PVN having been previously stored in register SP3 during step 1153, the number PVN is read in to the accumulator from the latter register.

On step 1230: The number PVN is read from register SP3 again, so that the new accumulator sum is 2PVN.

On step 1231: If $VDA = $ "1," and the system is operating under Case I, the number 2PVN is written from the accumulator and temporarily stored in register SP2; and the number PVN is again read in from register SP3 so that the new accumulator sum is 3PVN.

On step 1232: The number 2PVN is read into the computer from register SP2 (if Case I is being followed), and the new accumulator sum is thus 5PVN.

On step 1233: The number 2PVN is again read in from register SP2 (if Case I is being followed) and added, so that the new accumulator sum is 7PVN. Therefore, at the end of step 1233, the accumulator holds the number 7PVN if Case I is applicable (because the signal VDA was a "1" during steps 1231-1233); or it still holds the number 2PVN which appeared therein during step 1230 and remained unchanged during steps 1231-1233 if the signal VDA was a "0."

On step 1234: The accumulator contents are shifted two places to the right by a SR2 signal so that the accumulator holds the number .07PVN for Case I or .02PVN for Case II (assuming that the decimal point for such number is located between COT−4 and COT−5). But because such number will later be treated as residing between COT−3 and COT−4, the number actually represents .007PVN or .002PVN for Case I or Case II. It will be seen, therefore, that the accumulator now holds the term represented by the symbols $A$ and $B$ in Equation (52) if Case I is applicable, or it simply holds the term represented by the symbol $A$ in Equation (52′) if Case II is applicable.

On step 1235: If Case I applies and $VDA = $ "1," the number .0075 is read in to the computer by *PGA n*5, and added to the number previously existing in the accumulator. The new sum at the end of step 1235 is thus the sum of the terms represented by $A$, $B$ and $C$ in Equation (52) or is simply equal to the term A in Equation (52′) if Case II is applicable. The decimal point is, in effect, between COT−3 and COT−4.

On step 1236: The sub-total number $S_t$ previously stored in register SP1 during step 1197 is read into the computer and added. The new sum appearing in the accumulator is therefore equal to the *DLAP* represented by Equation (52) in Case I or represented by Equation (52′) in Case II.

On step 1237: The *DLAP* number so computed is written from the accumulator into the scratch pad register SP1 for temporary storage. This stored number *DLAP* represents the distance which the controlled element will move while decelerating to the next desired velocity *PVN* according to the monotonic function illustrated by FIG. 21 if the deceleration procedure were initiated during the particular period $\Delta T$ for which the number *DLAP* has been computed. It will be understood that the number *DLAP* is recomputed during each and every successive Mode 1 $\Delta T$.

SIGNALING WHEN DECELERATION SHOULD BE STARTED

In the usual circumstances, the distance *DLAP* after each computation will turn out to be greater than the remaining distance which must be traveled along the fast axis to reach the end point (*XCEP* or *YCEP*) of the segment defined by the data block $B_n$ in active storage. When the decreasing distance remaining to be traveled becomes equal to the projected distance *DLAP*, then the flip-flop *TAD* is set, deceleration thereafter begins, and the next-desired velocity will be reached at or slightly before the segment end point is reached.

Figure 26:
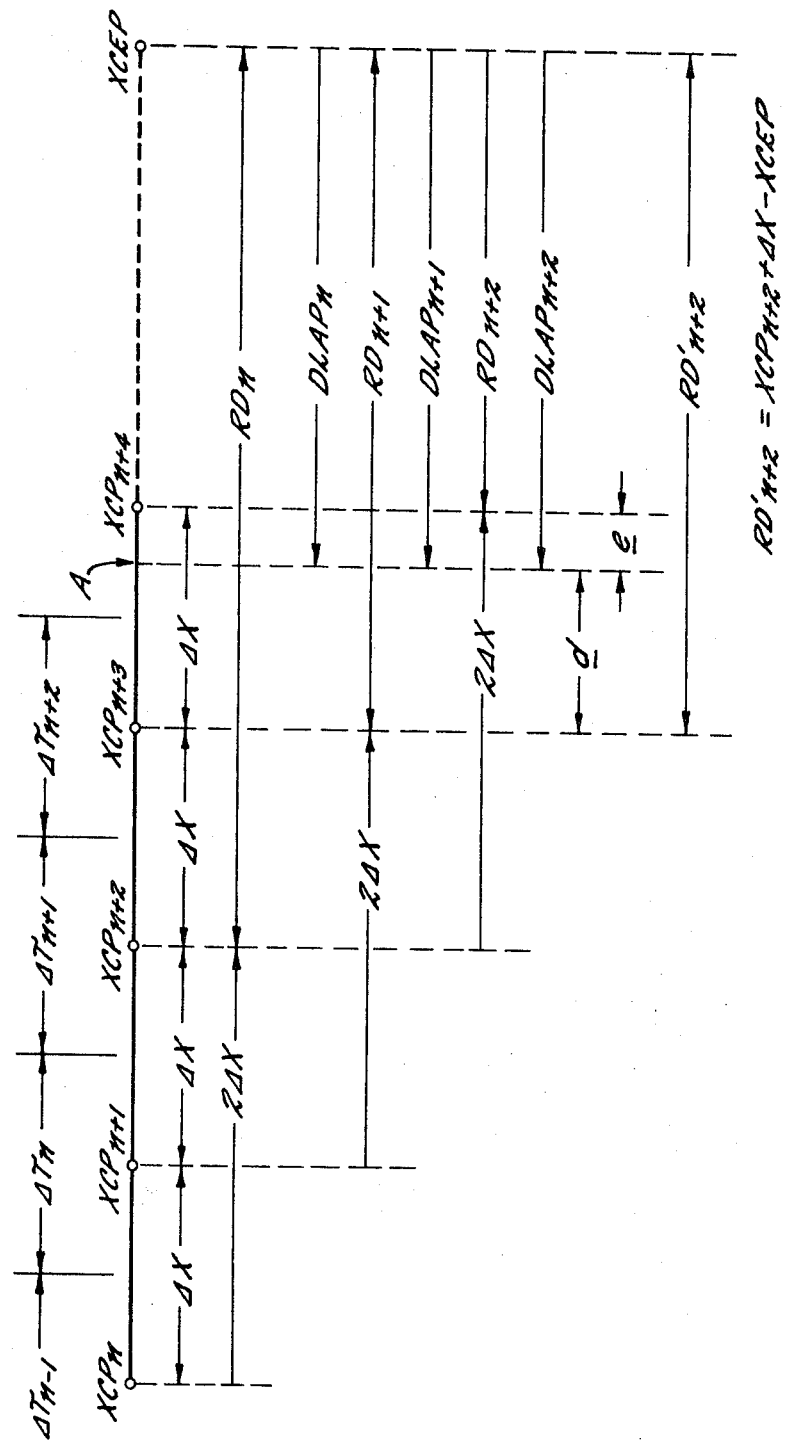
FIG. 26 is a vector diagram of distances showing how the remaining distance to be traveled is computed and compared to the distance to be traveled during the course of deceleration.

Referring to FIG. 26 where it is assumed that the fast axis is the X axis, the coordinate points $XCP_n$, $XCP_{n+1}$, $XCP_{n+2}$, $XCP_{n+3}$ are those which are reached by the movable element during column *x*400 of the respective preceding time periods $\Delta T_{n-1}$, $\Delta T_n$, $\Delta T_{n+1}$, and $\Delta T_{n+2}$. In other words, and taking the period $\Delta T_n$ as an example, a number representing the $XCP_n$ coordinate is stored in the *XCP register R6 prior to column x*400 during period $\Delta T_n$, and thus is available during the *DLAP* computations carried out in columns 1100 and 1200 of Table II. The actual remaining distance to be traveled after column *x*400 in period $\Delta T_n$ is $XCEP - XCP_{n+1}$; but as indicated by Table I, prior to column *x*400 in period $\Delta T_n$ the coordinate number $XCP_{n+1}$ has not been computed and stored. To obtain the coordinate $XCP_{n+1}$ during period $\Delta T_n$, the values of $XCP_n$ and $\Delta X$ may be added. But on the other hand, if the flip-flop *TAD* is set during column 1200 of period $\Delta T_n$ the first change $\Delta \Delta X$ in the effective $\Delta X$ number to start deceleration will take place in the micromove updating carried out during column *x*500 (and subsequent columns) of the period $\Delta T_n$. To be certain that deceleration is initiated during a period $\Delta T$ which is early enough to assure that the next path velocity *PVN* is reached before the end point *XCEP* is reached in space, the actual remaining distance to be traveled (after the point $XCP_{n+1}$ is reached) is decreased by an additional macromove $\Delta X$.

With the foregoing in mind, it may be seen from FIG. 26 that during period $\Delta T_n$, the assumed remaining distance $RD_n$ which the element must travel (if flip-flop *TAD* is set during that period) after decelereation is initiated is the distance between the coordinate $XCP_{n+2}$ and the end point *XCEP*. This is one $\Delta X$ less than the actual remaining distance from point $XCP_{n+1}$. But the number $XCP_{n+2}$ is not stored in the *XCP* register R6 during column 1200 of period $\Delta T_n$; rather the number representing coordinate $XCP_n$ is so stored. In order to compute the remaining distance $RD_n$, therefore, the quantity $2\Delta X$ may be added to the number $XCP_n$ (obtaining the equivalent of coordinate point $XCP_{n+2}$); and the number *XCEP* may then be subtracted to arrive at the remaining distance $RD_n$. This will be apparent from the vectors in FIG. 26 which show the assumed remaining distances $RD_n$, $RD_{n+1}$, $RD_{n+2}$ to be traveled from the instant that deceleration begins if it is initiated by a signal during periods $\Delta T_n$, $\Delta T_{n+1}$, $\Delta T_{n+2}$, respectively. In general:

$$RD = 2\Delta X + XCP - XCEP \qquad (55)$$

As noted above, the distance *DLAP* is computed during each Mode 1 period $\Delta T$ and stored in the SP1 register on step 1237. This distance is represented in FIG. 26 by the vectors $DLAP_n$, $DLAP_{n+1}$, $DLAP_{n+2}$ for the time periods $\Delta T_n$, $\Delta T_{n+1}$, $\Delta T_{n+2}$ respectively in FIG. 26. Such vectors are shown extending back from the end point *XCEP* so that they may be compared with the respective *RD* distances. The first two such vectors are shorter than distances $RD_n$ and $RD_{n+1}$, indicating that the next velocity *PVN* would be reached before the movable element arrives at the end point *XCEP* if the *TAD* flip-flop were set during periods $\Delta T_n$ or $\Delta T_{n+1}$, respectively. The third such vector $DLAP_3$ is longer than the distance $RD_{n+3}$ and indicates that the next velocity *PVN* would be reached very shortly before the instant the cutter arrives at the end point *XCEP* if deceleration were started at the instant when the cutter has passed point $XCEP_{n+3}$ and has reached a point A.

In basic terms, it is contemplated according to the invention that the remaining distance *RD* will be compared with the computed distance *DLAP* during each period $\Delta T$, and when *RD* changes from greater to less than the *DLAP*, then deceleration is initiated, using the next desired velocity *PVN* as the steady state velocity which is to be reached substantially simultaneously with the controlled element arriving at the segment end point *XCEP*.

In realizing this objective, certain steps designated in column 1200 of Table II are carried out, and those not described in the present portion of the specification will be treated later. The operations are qualified by *FAX* and $\overline{FAX}$ signals in many instances, and only the instances where *FAX* = "1" (meaning) the X axis is the fast axis) will be described. It will be apparent to those skilled in the art that essentially the same operations are performed and FIG. 26 is equally applicable in the event that the fast axis is the Y axis and the signal $\overline{FAX}$ is a "1."

Referring first to step 1241: The computer is cleared and the number XCP is read into the accumulator.

On step 1242: The number $\Delta X$ is read into the computer and the resulting sum is $XCP + \Delta X$.

On step 1243: The number $\Delta X$ is again read into the computer providing that the $TAD$ flip-flop has not been set ($\overline{TAD} = $ "1") and the sign of the number (which is $.5n$ and equal to either $.5VVD$ or $5VVD$) stored in $LAB$ register R29 during step 1168 is negative. Review of column 1100 will confirm that this sign is the same as the sign of the number $VVD$ and is negative if $PVN - PVA_1$ is negative, indicating that deceleration is required to reach the new velocity $PVN$. Thus $\Delta X$ is added, and the new sum in the accumulator is $XCP + 2\Delta X$ at the end of step 1243.

On step 1244: A subtract control signal $sx$ is supplied and the number $XCEP$ is read in from register R15 (see PGA R15r, Condition 3). The new number in the accumulator is $XCP + 2\Delta X - XCEP$ which is the remaining distance $RD$ (see Equation 55, supra, and FIG. 26) for the period $\Delta T$ being measured off.

On step 1245: A classify signal $cx$ is supplied and the number (which is $DLAP$) previously stored during step 1237 in register SP1 is read into the computer and compared with $RD$ already then in the accumulator, provided the signal $\overline{TAD} = $ "1" (here assumed). $\overline{AGB}$ becomes a "1" during the following step if $RD \leq DLAP$. This comparison signal ($\overline{AGB} = 1$ or $\overline{AGB} = 0$) remains, of course, until the subsequent comparison is made, and is thus available during the later step 1248.

On step 1248: The flip-flop $TAD$ is set by an $ETAD$ signal (see the associated $PGA$ in FIG. 9n) providing that the signals $\overline{AGB}$ and $\overline{TAD}$ are both "1," and provided that either $ANR$ or $DTZ$ is a "1" (see the $PGA$ in FIG. 9n to clear flip-flop $TAD$ and prevent its being set whenever $\overline{ANR} \cdot \overline{DTZ} = $ "1"). As noted under step 1246 supra, $\overline{AGB}$ will be a "1" only if $RD \leq DLAP$ (as illustrated for example by $RD_{n+2}$ and $DLAP_{n+2}$ in FIG. 26). Otherwise, the $\overline{TAD}$ signal remains a "1" and normal operations (without the initiation of deceleration) continue.

It will be assumed that the comparison performed on step 1246 does result in $TAD = $ "1" on step 1248, after failure of this to occur during several preceding periods $\Delta T$. This represents then the instant $t_3$ in FIG. 23 where deceleration is to start while BLOCK 2 is being executed and before the end point for that block (normally at instant $t_4$) is reached. With $TAD = 1$, the operation of the system is drastically altered from normal (when $TAD = 0$), as will now be explained. It is time to begin decelerating.

On the subsequent step 1297: The feed rate number $FB$ for the next block is read from register 45 if the signals $ANR$ and $TAD$ are both "1." This occurs when the next desired, programmed feed rate is some finite value, lower than the present actual velocity $PVA$. On the other hand, if the system is to be decelerated to zero velocity as indicated by the signal $DTZ$ being "1" (and ANR being "0"), then the low arbitrary number of .003 is read into the accumulator to represent the next desired feed rate. A feed rate of 0.00 is not read in because such a value would result in the controlled element remaining at a stand-still and thus never reaching the end point $XCEP$.

On step 1298, the new feed rate number ($FB$ for the next block of data, or .003) is shifted left two places, to aline it properly in the accumulator; and on step 1298 the result is written into the register SP1 as a new feed number $FB$ or 0.3 in./min. depending upon whether $ANR$ or $DTZ$ is a "1."

Thereafter, during steps 1336 through 1363 the feed rate number is converted into an adjusted desired velocity number $(F \times PCF)$ providing that one step 1339 the signal $\overline{DTZ}$ is a "1" (it being assumed now that $\overline{TAD} = $ "0"). If deceleration to zero has been called for and $DTZ$ is "1," the PCF number is arbitrarily treated as 1.0 (see PGA n4). Classification into Range $A$, $B$ or $C$ takes place, as previously described, and one or none of the flip-flops $VDA$, $VDB$, $VDC$ is set —so that the controlling velocity number $PVA$ is updated by increments $(\Delta V)/2$ of 1.0, 0.1 or 0.01 during steps 1365 and 1865. If $PVD$ is less than .01 in./min. then $PVA$ is simply made equal to $PVC$ on step 1364. Incidentially, the flip-flop $VDM$ will have been set because $PVC - PVA$ is negative (step 1360) so that the increments $(\Delta V)/2$ will be subtracted from $PVA$ — causing deceleration rather than acceleration. Thus, the procedure of updating $PVA$ by negative increments $(\Delta V)/2$ twice during each period $\Delta T$ will continue (as previously explained above).

MODIFYING OPERATION WHEN "THIS BLOCK" DECELERATION IS IN PROGRESS

Except for the last few preceding paragraphs, it has been assumed that the signal $TAD$ is "0" and deceleration was not in progress. But once the deceleration is commenced because the $TAD$ flip-flop becomes set, certain changes in the normal operations are brought into effect —principally for the purpose of assuring that the velocity is not reduced to such a low value in advance of the element reaching the segment end point that an undue amount of time is consumed to complete the segment.

Two possible situations may exist, viz., where normal "this block" deceleration is taking place and the flip-flop $ANR$ is set (see step 1096), or where $DTZ$ has been set (on step 3378 or 3878, Table IV, as described) and then has not been reset (on some following step x698, Table I, as described) because either $\overline{ICDTZ}$ or $DP$ is a "0." If deceleration to zero is required, $\overline{ICDTZ}$ will be a "0" either because a G09 code has been read and stored or because an M00 code has been read and stored as the newest M code (see FIG. 9n); or the "data process" operations on a new read block of data have not been completed and the flip-flop DP has not been set on step x630 as previously described.

Observe from step 1365 in Table Ii, the legend R/1.0 ? $VDA \cdot \overline{SAD} \cdot \overline{SAV}$. This means that the update (decrease $\Delta V$) in the $PVA$ number will not occur if either of the $SAD$ or $SAV$ flip-flops (FIG. 9n) is set. In other words, a decreasing up-date in $PVA$ will be skipped, and the velocity thus prevented from decreasing if either of flip-flops $SAD$ or $SAV$ is set.

THE TIME SAVING ACTION OF FLIP-FLOP $SAV$ WHEN DECELERATING TO ZERO

The flip-flop $SAV$ is employed to turn off the deceleration operation whenever the actual path velocity is less than or equal to 5 in./min. so long as the remaining distance to the end point is greater than .007 inch. These numbers are arbitrarily selected, and other values may be used.

From the clearing PGA associated with flip-flop SAV (FIG. 9n), the condition (3) signal $\overline{TAD}$ will reset or hold the flip-flop reset so long as the signal $\overline{TAD}$ is a "1." But assuming the TAD flip-flop has been set, it will be apparent from step 1238 in Table II that the flip-flop SAV is reset or cleared (if previously set) during every Mode 1 ΔT. The signal $\overline{SAV}$ is thus normally "1." On step 1240, that flip-flop SAV will be "enabled" or set (see the associated PGA in FIG. 9n) when, during that step, the signals DTZ and TAD signals are both "1" (meaning deceleration toward zero has been started) and the signal $\overline{AGB}$ is a 1. The latter signal is controlled by a comparison on step 1239 of the number PVA (read in during step 1238) and the number 5.0 in./min. read in (by means of PGA n7) on step 1239. Thus, $\overline{AGB}$ will be a "1" on step 1240 only if PVA ≤ 5.0 in./min. In other words, the system tells itself by setting flip-flop SAV, only when decelerating to zero, that the rate of change of velocity (ΔV/ΔT) may be reduced if the existing velocity difference is less than an arbitrary, high value which is here chosen to be 5.0 in./min.

If $\overline{SAV}$ becomes 0 (and SAV becomes 1) on step 1240 because flip-flop SAV is set, then on the later steps 1365 and 1865, the negative ΔV update of 1.0 will simply be skipped, —and the magnitude of the deceleration will be reduced from that which otherwise would be effected. This is advantageous because it keeps the average velocity higher during the time that zero velocity is being approached, and thus the total time ("time stretch") to reach the segment end point is reduced. The SAV flip-flop "saves" time.

The flip-flop SAV may, under the conditions described, be set on step 1240 during some period ΔT which follows a preceding period ΔT in which TAD was set on step 1248. On the later step 1243 during such following period, the number ΔX is not read into the computer (as previously described) because the signal $\overline{TAD}$ is now a "0." The number in the accumulator thus remains the same as at the end of step 1242, i.e., equal to XCP + ΔX.

The subtraction described above for step 1244 then takes place, but because $\overline{TAD}$ is now "0," the new number in the accumulator becomes XCP + ΔX − XCEP (rather than XCP + 2ΔX − XCEP as previously described). The expression XCP + ΔX − XCEP is equal to the vector RD' shown in FIG. 26 which is applicable to a computation made during the period $\Delta T_{n+2}$ relative to the point $XCP_{n+2}$. $RD'_{n+2}$ is greater by one ΔX than the distance $RD_{n+2}$, it being recalled that the assumed remaining distance RD is made shorter by one ΔX than the actual remaining distance, and that $RD'_{n+2}$ represents the actual remaining distance from point $XCP_{n+3}$ to point XCEP. From inspection, and taking the general case:

$$RD' = XCP + \Delta X - XCEP \qquad (56)$$

Because of this, the classification or comparison made on step 1245 is a comparison of RD' = (XCP + ΔX − XCEP) with the number .007 —the latter number being read into the computer (by action of PGA n11) because the signal TAD is now a "1." If (XCP + ΔX − XCEP) ≤ .007, then on step 1246 the signal $\overline{AGB}$ is a 1 and the SAV flip-flop is cleared or reset. Therefore, after the movable element approaches to within approximately .007 in from the segment end point XCEP, the signal SAV again becomes a "0" (almost immediately after becoming "1" on step 1240) and the (ΔV)/2 increment of −1.0 can occur during steps 1365 and 1865 (assuming that VDA and $\overline{SAD}$ are both "1"). In effect, the flip-flop SAV is disabled (even though PVA and the velocity difference PVD are less than 5.0 in./min.) when the remaining distance to be traveled has been reduced to less than .007 inch. The numbers 5.0 in./min. and .007 in. are exemplary. But it will be seen that time stretch is reduced and the average velocity kept higher when the element is being decelerated to zero velocity by using the SAV flip-flop to interrupt deceleration when the velocity difference is less than a predetermined amount and the remaining distance to be traveled is greater than a predetermined value.

QUASI-EXPONENTIAL TIME-SAVING

Referring first to step 1154 in Table II, once deceleration has been started (by TAD becoming a "1" during step 1248 of a previous iteration ΔT), then the number PVD = PVN − PVA (which exists in the accumulator at the end of step 1153, as described above) is written into the PVB register R23 (see PGA R23w, Condition 1).

On the later step 1250, the accumulator is cleared by a CAR signal. Assuming that SAD = "0," then the accumulator remains cleared after step 1251. On step 1252, the number PVD (previously written into the PVB register during step 1154) is read into the accumulator by a R/PVB signal from PGA R23r. On step 1253, this number is shifted one place to the right by a SR1 control signal, to divide the number by 10. In other words if the number PVD prior to step 1253 was xxx.xxx, it becomes xx.xxxx or 0.1 PVD after step 1253.

On step 1254, the number 0.1 PVD in the accumulator is written back into the PVB register, if (as now assumed) TAD = 1 and the deceleration procedure has been started.

On the later time steps 1365 and 1865 when the actual incrementing of PVA occurs to reduce the velocity by (ΔV)/2 per (ΔT)/2, the following legends appear in Table Ii:

$$R/0.1 \, ? \, VDB \cdot \overline{TAD}$$

$$R/PVB \, ? \, VDB \cdot TAD$$

This means that when the velocity difference PVD has been reduced below Range A and into Range B (between 3.0 and 0.3, as shown in FIG. 20), the deceleration cannot occur at a rate of 0.2 in./min. per ΔT (as in the case of acceleration, previously described). Deceleration increments of − 0.1 in./min. per (ΔT)/2 do not occur. Instead, when TAD = 1, the number 0.1 PVD (rather than the number 0.1) is read in from register PVB and subtracted from PVA during step 1365. Thus, the increment ΔV/2 per ΔT/2 is in this latter case equal to 0.1 PVD, i.e., one-tenth of the then existing velocity difference PVD. The factor of one-tenth is merely exemplary and may be chosen to have other fractional values. The larger the velocity difference PVD the larger will be the subtracted increment ΔV/2 so that the magnitude of deceleration (.1 PVD/(ΔT2) which is equal to .2 PVD/ΔT) will be initially high when the velocity difference is great and will progressively decrease as the velocity difference PVD becomes smaller. The deceleration within Range B will thus not be linear; each increment during each period $\Delta T$ will be proportional to the remaining change of velocity to be effected (from the existing PVA to the next desired velocity PVN) and this will result in the actual velocity being reduced in a quasi-exponential fashion as time passes. In this way, the total time required to decelerate from an initial high actual velocity PVA, to the next desired, lower velocity PVN will be materially reduced, and the "time stretch" (i.e., the interval between instants $t_4$ and $t_5$ in FIG. 23) will be lessened. As noted above, unnecessary time stretch is undesirable because it consumes time and reduces the efficiency of utilization of the machine tool and the control system in machining a programmed part. The reduction of time stretch by the feature here described is accomplished by making the $\Delta V/\Delta T$ proportional to the existing velocity difference PVD so that each successive, periodic velocity change $\Delta V$ becomes smaller as the next desired velocity PVN is approached.

THE TIME SAVING ACTION OF THE FLIP-FLOP SAD

The flip-flop SAD is either enabled or cleared during each time period $\Delta T$ after to the initiation of deceleration (i.e., during any period $\Delta T$ when $\overline{TAD}$ is a 1 prior to step 1248 in that period). It is held in a reset state by the clearing PGA (FIG. 9n), condition (2) which requires only a $\overline{TAD}$ signal; and set in order to compensate for the "velocity undershoot" which arises from the assumption made (and described above) in computing RD, that the remaining distance is one less $\Delta X$ in length than the actual remaining distance RD'. The time period $\Delta T_{n+2}$ in FIG. 26 is exemplary of a period in which deceleration is initiated (because $DLAP_{n+2} >$ $RD_{n+2}$ and flip-flop TAD is set on step 1248). It will be understood that if TAD is set in time column 1200 (step 1248) during time period $\Delta T_{n+2}$, the first effective decreasing of $\Delta X$ occurs during time column x500 of that same period because the decreased PVA and lower Q computed in time column 1300 will result in a new, smaller $\Delta X$ value being computed in time column x400 of Table I. During period $\Delta T_{n+2}$, at the end of step 1244, a number representing $RD_{n+2}$ appears in the accumulator (as previously described) and such number remains there after step 1245. On step 1246 a FUL control signal is brought in and the number DLAP read in from register SP1 (where it was previously stored at step 1237). The new result in the accumulator is $RD-|DLAP|$, which represents the distance e (FIG. 26) by which $DLAP_{n+2}$ exceeds $RD_{n+2}$, taking the time period $\Delta T_{n+2}$ as an example. From the vectors RD' and $-DLAP_{n+}$ in the lower portion of FIG. 26, it will also be seen that $$e = RD' - DLAP_{n+2} = XCP + \Delta X - XCEP - DLAP_{n+2} \quad (57)$$

Since $\Delta X = d + e$, it follows that $$d = e - \Delta X \quad (58)$$

On time step 1247, when a number representing "overshoot" e is in the accumulator, a FUL signal is supplied and the $\Delta X$ number is read in to perform that latter computation, viz., $d = e - |\Delta X|$, and thus the accumulator then holds a number representing the "velocity undershoot" d. This is the distance d by the movable element will fall short of the end point XCEP at the instant its velocity is reduced to the new value PVN due to the assumption that the remaining distance RD is one less $\Delta X$ in length than the actual remaining distance RD'. The purpose of the flip-flop SAD is to partially compensate for such "undershoot" so that time stretch does not occur as a result of the element moving the whole distance d at the low velocity PVN.

On time step 1248: If $\overline{TAD}$ is a "1," the number d is written from the accumulator into the LAB register R29. But if TAD is a "1" this "writing" into the LAB register does not occur, so if deceleration has already been started the number in the LAB register remains unchanged, i.e., represents the distance d computed during an earlier time period when the TAD flip-flop was set to initiate deceleration.

At the end of time step 1248, the accumulator has been first cleared and the fast axis macromove number$\Delta X$ has been read in.

On time step 1249: A classify control signal cx is received, and the number d previously stored in the LAB register is read in by a R/LAB signal from PGA R29r. On the following step, therefore, the signal $\overline{AGB}$ will be a 1 if and only if $\Delta X \leq d$; and the signal AGB will be a 1 if this is not true. Note that the macromove $\Delta X$ will always be greater than d during the period $\Delta T$ in which flip-flop TAD is set, but as deceleration proceeds, the value of $\Delta X$ will become less than d during some later period $\Delta T$.

On step 1250: The flip-flop SAD is enabled (set) or cleared (reset) if $\overline{AGB}$ is a 1 or AGB is a 1 respectively, indicating either that $\Delta X$ is less than d or $\Delta X$ is greater than d. In this fashion, the flip-flop SAD (FIG. 9n) is controlled during each period $\Delta T$ after the appearance of a $TAD = 1$ signal.

If flip-flop SAD has been set, and $SAD = 1$, then the accumulator is cleared on step 1250 (so it holds the number zero) and the number 0.000 is written into the LAB register R29 on step 1251. Thus, immediately after the comparison performed during step 1249, the LAB number is reduced to zero so that during some later iteration (assuming that TAD is set during iteration $\Delta T_{n+2}$), the comparison cannot again set flip-flop SAD. In other words, the signal SAD is a "1" during only one iteration $\Delta T$ after flip-flop TAD is set to start the deceleration procedure. This is true because once the comparison of d and $\Delta X$ performed during step 1249 results in setting of the SAD flip-flop on step 1250 of any period $\Delta T$, then the number d in the LAB register is set artificially to zero during step 1251, and therefore the comparison on step 1249 of the following period $\Delta T$ must find $\Delta X > d$, produce an $AGB = 1$ signal, and result in flip-flop SAD being cleared on the next step 1250.

Referring next to steps 1365 and 1865, observe again that if PVD is greater than 3.0 ($VDA = 1$), then the operation $R/1.0 ? VDA \cdot \overline{SAD} \cdot \overline{SAV}$ is performed. If flip-flop SAD is set, signal $\overline{SAD}$ will be "0," and thus the incremental, subtractive updating by PVA by the amount 1.0 is skipped during both steps 1365 and 1865. This, in part, removes the undershoot d explained above and which otherwise would occur. It therefore lessens the time during which the element moves at the low velocity $PVN$ before reaching the end-point $XCEP$, and thus reduces time stretch.

REVIEW OF TERMINATING ONE SEGMENT AND IMMEDIATELY PROCEEDING WITH THE NEXT

When the system is functioning to cause the movable cutter 14 to proceed along a segment defined by a block of data $B_n$ in active storage, the successive periods of $\Delta T$ will be "Mode 1" and all of the operations carried out as described with reference to Tables I and II will be performed during each $\Delta T$. If for any reason, the actual velocity $PVA$ differs from the commanded or computed velocity $PVC$, the value of $PVA$ will be incremented by an amount $\Delta V/2$ twice during each period $\Delta T$ until such equality is reached. In most of the periods, after the desired velocity has been reached, the "updating" increment $\Delta V$ will become zero, and the cutter 14 will be moving at a constant velocity.

If the next block of data $B_{n+1}$ then in buffer storage contains a feed command $FB$ which is greater than the active feed rate $FA$, then all of the $DLAP$ and $RD$ computations above-described will have no effect because neither of the flip-flops $ANR$ or $DTZ$ will be set during step 1097 (Table I) of any Mode 1 $\Delta T$. That is, the $TAD$ flip-flop cannot be set because the $PGA$ (FIG. 9n) for clearing it is always responsive to the condition $\overline{ANR} \cdot \overline{DTZ}$. It will be recalled that $DTZ$ is set (Table IV) at the end of each segment processing on step 3378 or 3878, but is reset on step 698 of the next period $\Delta T$ if (a) a stop code M00 has not been received in buffer storage, (b) a momentary stop code G09 has not been programmed, or (c) the "data process" has been completed and the next block of data is in buffer storage and ready for use.

TRANSFER AND USE OF NEW DATA FOR BLOCK $B_{n+1}$ UNDER NEXT BLOCK ACCELERATION CONDITIONS

When a Zone A or Zone B approach to the end of a block is detected by the fast axis comparison performed between steps 1033 and 1053 of a Mode 1 $\Delta T$, then the system begins transition toward using the next block of data then in buffer storage. The "end of block" counter 186 in FIG. 9e is advanced from state S1 to S2 on step 1047 or step 1053, respectively.

Thereafter, the counter is advanced to state S3 respectively on step 1048 (Table II) or step x800 (Table I) of that same period $\Delta T$.

Thereafter, the counter is advanced to state S4 respectively on step x300 or step x801 (Table I) of that same period $\Delta T$.

For a Zone A transition, with the system in Mode 1 and the signal S4 from counter 186 a "1," then on step 1372 (Table II), the next block time factor TFB is used (instead of the present block time factor TFA) to compute the value of $Q$. This is the significance of the legends "$R/TFA$ ? $\overline{S4}$" and "$R/TFB$ ? S4." On time step 1396 (Table I), the number in the accumulator is a $Q$ factor, but it is based upon Block $B_n$ or $B_{n+1}$ data and here called $QA$ or $QB$ (where $QA = TFA \times PVA$ and $QB = TFB \times PVA$), depending upon whether the signal S4 is a "0" or a "1." Thus, on step 1396 after a Zone A approach has been detected, the number in the $Q$ register R18 is not changed, and the new number $QB$ is written into register SP3. On the next time step x397 (Table I), the counter 186 advances from state S4 to state S5; and on the following step x500 it advances from state S5 to state S6 —so that Mode 2 begins. During Modes 2 and 3 (Tables III and IV), the operations of Table II for Mode 1 do not occur —and thus the numbers $PVA$ and $Q$ and $QB$ (in register SP3) are "frozen" and held constant until the transition procedure returns the system to Mode 1 after data block $B_{n+1}$ is made fully active. During the following 2800 column, the EOB counter advances to state S7, and during the next 2300 column of Mode 2 (Table III), the $QB$ number from register SP3 is written into the $Q$ register and becomes effective in the macromove computations shown in Chart A and Table I.

The preceding paragraph applies also to a Zone B transition, except that the counter 186 advances from S3 to S4 on step x801 so that one more fast axis macromove $\Delta X$ is executed (with $Q$ based upon $TFA$). The next block time factor $TFB$ is first used at time step 1872 to compute a new factor $Q_B$ which is stored in register SP3. The counter 186 advances from state S4 to S5 (leaving Mode 1) on step x897 and to state S6 on step x000 of the next $\Delta T$ period. The system thus begins Mode 2 on step x000 of the next succeeding period $\Delta T$ (see Table I). Again, the numbers $PVA$, $Q$, and $QB$ (the latter being stored in the register SP3) cannot change during Mode 2 or Mode 3 operations, which occupy only a relatively short time span equal to 1.5 $\Delta T$. During the following 2300 time column, the EOB counter 186 advances to state S7. The number $QB$ is transferred to the $Q$ register during Mode 2, column 2800 and becomes effective.

The transfer of data in buffer storage to active storage during Mode 2 and Mode 3 operations has been previously described with reference to Tables III and IV. In effect, for a Zone A transition, the new values of $G, I, J$ numbers are transferred into active storage (and the number $QA$ is replaced by $QB$) during Mode 2, column 2300 approximately 1.5 $\Delta T$'s after a Zone A end point detection has been made during any time column 1000. By contrast, they are so transferred (during Mode 2, column 2800) approximately 2.0 $\Delta T$'s after a Zone B end point detection has been made during any time column 1000. The new $I$, $J$ and $QA$ values are used almost immediately in the computations for $\Delta X$ and $\Delta Y$ (Chart A, columns x400 and x900). The new numbers $XEP$, $YEP$ and $TFB$ are in both cases transferred from buffer to active one-half $\Delta T$ later under the sequences of Mode 3, and they are used in the next following $\Delta T$ period which is carried out with the system in Mode 1.

At the end of Mode 3 the counter 186 is stepped to state S9 (Table IV, step 3379 or 3879). The AND gate 269 (FIG. 9m) then produces an output signal on time step x991 (Table I), thereby enabling TRR flip-flop 257 and starting the tape reader 39 (FIG. 9m). The reader 39 stops when the next $EL$ response is received, and therefore a new block of data is transferred into buffer storage. The "data process required" flip-flop is set through AND gate 274 by this same $EL$ response from the tape reader. Therefore, during some later period $\Delta T$ after the system has reverted into Mode 1 and a new block of data has been read from the punched tape, the "data processing" to compute the next time factor TFB is carried out at steps x630 to x691 (Chart A and Table I), —the flip-flop DP being enabled on step x630. On step x697, the "data ready" flip-flop is enabled, and the "data process required" flip-flop is cleared to make DR = "1" and DPR = "0." On step x698 the DTZ flip-flop (previously set during step 3378 or 3878) is normally cleared.

DATA TRANSFER WHEN DECELERATION TO A LOWER FEED RATE OR ZERO OCCURS DURING "THIS BLOCK" $B_n$

But the DTZ signal will remain a "1" unless the signals DP and $\overline{ICDTZ}$ are not both "1" on step x698 to cause resetting of flip-flop DTZ. Thus, as mentioned previously and as shown by the logic circuitry of FIG. 9n, the signal DTZ is made a "0" during some later $\Delta T$ for a new segment (i) unless G Buffer decoder signal G09 is a "1," (ii) unless both M00 and NDM are a "1" or (iii) unless the DP signal is not a "1" (indicating that "data processing" has not been completed).

On the first and succeeding iterations $\Delta T$ for a segment whose data has been transferred into active storage, therefore, the DLAP and RD computations become effective to search for and detect the time at which, by anticipation, deceleration should be initiated so that the cutter 14 will reach a new lower velocity (if ANR is set) or zero velocity (if DTZ has remained set) by the time that the segment has been fully executed.

DECELERATION TO A LOWER PROGRAMMED FEED RATE

In the case of ANR being set, deceleration is initiated by a TAD = 1 signal when RD becomes equal to or less than DLAP. The segment end point is detected (some time thereafter when the new, lower velocity has been reached) by a Zone A or Zone B look-ahead, and data transfer is effected by Mode 2 and Mode 3 operations, after which the tape reader 39 is re-started as described above.

DECELERATION TO A TEMPORARY STOP IN RESPONSE TO G09 CODE

In the case of a G09 signal, the cutter 14 does not actually reach zero velocity, but it is slowed down to a creep speed of 0.3 in./min. before the end point for the data block $B_n$ is reached. Note from steps 1097 and 1098 (Table II) that if DTZ is "1," then the number 0.003 is read in and shifted two places to the left so that it represents a "creep" value of 0.3 in./min. as the next feed rate. With DTZ set, deceleration is initiated by a TAD = 1 signal when RD becomes equal to or less than DLAP. But the next velocity PVN so reached is 0.3 in./min. which is almost, but not quite, a zero feed rate. A Zone A or Zone B approach to the end point XCEP is then signaled, and the next block $B_{n+1}$ of data is transferred to active storage in the Mode 2 and Mode 3 sequences described above. After the data of block $B_{n+1}$ is in active storage and begins to be processed, the cutter 14 automatically accelerates to the new velocity called for by the feed rate F forming a part of that data block $B_{n+1}$.

STOPPING IN RESPONSE TO AN M00 CODE

The M00 code might conceivably be signaled from the buffer register 48 and its associated decoder (FIG. 9o) if no information at all is supplied thereto and the register flip-flops are reset at the time the control system is first started up. To "validate" an M00 signal, therefore, and permit it to be used because an M00 code has actually been read from the punched tape, the M00 signal is made effective only if accompanied by a "new M data" signal from the flip-flop NDM shown in FIG. 9n. The latter flip-flop is reset by a PGA 276 which produces a CNDM signal when transfer of data from buffer to active occurs in Mode 3 (Table IV, step 3378 or 3878); it is set only if the resulting reading of any block on the punched tape produces an M address signal on the line 231M. Thus, if register 48 signals "M00" and if NDM is a "1," the M00 signal from the associated decoder is a valid newly received instruction, calling for a complete stop of the cutter 14 and the tape reader.

In the case of deceleration to zero in response to co-existing signals M00 and NDM (in which case $\overline{ICDTZ}$ is "0"), those two signals cause flip-flop DTZ to remain set, so that PVN is treated as 0.3 in./min., and deceleration to the creep velocity is initiated when flip-flop TAD is set, as described above. Those two signals M00 and NDM also set the cycle stop flip-flop CYSP (FIG. 9o), make the signal CYSP a "1" and the latter calls for the system to fully stop. In these circumstances when a block $B_n$ in active storage is almost fully executed, the element velocity will have been reduced to a creep value of 0.3 in./min. A Zone A or Zone B approach to the end point XCEP will be signaled and the system will leave Mode 1 and progress to Mode 2.

On steps 2379 and 2879 (Table III) the IB number is read into the computer; and likewise on steps 2380 and 2880 the JB number is read in, —but this can occur only if the signal $\overline{CYSP}$ is a "1." Because the M00 and NDM signals set the flip-flop CYSP and make $\overline{CYSP}$ = "0," the reading of IB and JB numbers from registers 42 and 43 into the computer cannot occur. For this reason, the active I and J registers R16 and R17 have zero written into them on steps 2380 and 2381 (or 2880 and 2881), because the accumulator holds zero after having been cleared on steps 2379 and 2380 (or 2879 and 2880). The numbers I and J in the active registers thus are made zero, and the macromove numbers $\Delta X = Q \cdot J$ and $\Delta Y = Q \cdot J$ become zero so that the servo command numbers XSC and YSC remain constant and the movable cutter 14 is fully stopped and stationary with zero velocity. Thus, the movable element is abruptly stopped after having been decelerated to a creep speed when the Mode 2 sequence is next executed —all in response to an M00 code having been read from the punched tape and placed in buffer storage.

Even though the controlled element is stopped during Mode 2, the control system continues to measure off successive periods $\Delta T$. Thus, the system advances from Mode 2 through Mode 3. At step 3378 or 3878 (Table IV), a PGA (FIG. 9n) produces a CCYST signal because the signal CYSP is a "1," thereby resetting the cycle start flip-flop, making $\overline{CYST}$ a "1," IFA a "1," and IFA a "0." As the system proceeds to Mode 1 (even though I and J are zero and the controlled element is stopped), the desired velocity number PVC is driven to zero. Note from Table I that the $emx''$ signal on step 1336 clears the accumulator. On step 1337, the number PVC is read in as a multiplicand only if $\overline{IFA}$ is "1." Thus, if $\overline{IFA}$ is "0" due to the co-existing signals M00 and NDM having caused $\overline{CYST}$ to be a "1," then the multiplicand read in on step 1337 is zero, and the product $PVC \times PCF$ becomes $0 \times PCF = 0$. This clamps the desired velocity number PVC to a zero value and within a few iterations the number PVA is reduced to zero. Therefore, when the system is re-started, the number PVA will begin at zero and rise gradually to an initially commanded feed rate by the acceleration procedure heretofore described.

Also, when CYST is "0," the gate 269 (FIG. 9m) is disqualified so that flip-flop 257 is not set and the tape reader does not re-start at the end of Mode 3 operations. The entire system thus is brought to a stop even though the timing signal generator of FIG. 9b continues to count and measure off successive periods $\Delta T$ and successive time steps within each period.

STOPPING IN RESPONSE TO AN INCOMPLETE "DATA PROCESS"

When deceleration to zero occurs because the signal DP is not a "1" during time step x698 (Table I) and DTZ remains a "1," this signifies either that there has been a malfunction (e.g., tape breakage) or that data processing has not been completed(due, for example, to the tape reader 39 having not yet read a full block of data after having been re-started). When the block of data in active storage has been almost fully executed, the cutter velocity will have been reduced to a creep speed of 0.3 in./min., as previously explained. The approach to the end point of the segment is sensed, and the EOB counter 186 advances from S1 to S2 to S3 to S4, as described above. If by this time the tape reader has not finished reading the next data block $B_{n+1}$ (which should now be in buffer storage) or if the data processing computations have not been completed, the DP signal will be a "0" and the data ready flip-flop DR will not have been set on step x697 (Table I). If the signal $\overline{DR}$ is still a "1" when the count state S4 is reached, an AND gate (FIG. 9o) produces a signal ECYSP. The cycle stop flip-flop CYSP is set and the system is therefore brought to a complete stop in the same manner and by the same operations described above which occur when M00 and NDM signals appear together. Thus, if "data processing" is not properly completed, the system is turned off and the cutter thereafter remains stationary. A human attendant may cure the malfunction (e.g., broken punched tape) and then re-start the system initiating the initial start-up operations.

INITIAL START-UP

The sequences which transpire during initial start-up of the system have been treated briefly above, but for the sake of completeness will be repeated here in a step-by-step fashion. It may be assumed that when a new punched tape is first placed in the tape reader (or the system otherwise has been fully stopped) there is no block of data in either the active or the buffer registers. The EOB counter 186 will reside in its S1 state; the Cycle Stop flip-flop CYSP will be set (CYSP="1") and the Cycle Start flip-flop CYST will be reset ($\overline{CYST}$="0").

To initiate the operation of the system, it is necessary to read in a first block of data, perform "data process" on it to compute TFB from the segment length number D, and transfer such first block of processed data into active storage. Thereafter, the system needs to initiate its use of the actively stored data and also re-start the tape reader 39 so a second block of data becomes available in buffer storage. From that point on, the system will proceed block-to-block as set out fully above.

For initial start-up, the human attendant momentarily closes the CY START switch (FIG. 9m). The following sequence then proceeds:

1. Flip-flop READ is set because $\overline{CYST}=1$.
2. AND gate 273 is fully qualified, and produces an output signal which passes through OR circuit 270, so that AND gate 267 passes a PCP pulse.
3. Flip-flop 257 is set, so the TRR signal becomes a "1" and the tape reader is started to read the first block of data.
4. The EL and SPR sprocket signals from the reader at the end of the first block of data satisfy the requirement S1 · READ · EL · SPR of condition (27) in the PGA 183 (FIG. 9e) —and so the EOB counter is advanced to state S2. Observe, however, that flip-flop CYST has not yet been set, so that any operations shown in Table I or Table II as qualified by a CYST signal cannot take place. In other words, the EOB counter 186 cannot advance from state S2 to state S3 on step 1048 (Table II) or step x800 of Table I.
5. With the S1 signal a "0," the gate 273 is disqualified, and when the EL and SPR response at the end of reading of the first data block resets the flip-flop TRR, the reader does not immediately re-start.
6. The system is now operating in Mode 1 but with the signal $CYST = 0$ —which modifies its operation. The signal $\overline{IFA}$ is "0," so on step 1337 (Table II) a zero is left in the accumulator as a multiplicand, and the product written into the PVC register on step 1359 is zero —so PVA remains zero and the movable element 14 remains stationary.
7. When, however, the first block code EL was read (FIG. 9m) the "data process required" flip-flop 274 was set, making DPR a "1." Thus, when step x630 of a period $\Delta T$ is reached, the "data process" flip-flop DP is set, and the data processing or division is carried out during the following steps x635 through x691 (Table I). The first block of data is now ready for transfer to active storage.
8. On step x697 the "data ready" flip-flop DR is enabled by its PGA (FIG. 9m) because the signal DP is a "1."
9. On step x698, the flip-flop DTZ is cleared.
10. On step x699 the flip-flop DP is reset by a CDP signal. More importantly, condition (29) of PGA 183 (FIG. 9e) requiring S2 · READ · DR · 699 is satisfied, so that EOB counter advances from state S2 to state S3.
11. Because S3 and READ are now both "1," the PGA associated with flip-flop CYSP resets the latter and signal CYSP becomes a "0."

12. The enabling PGA for the Cycle Start flip-flop CYST is now satisfied by S3 · READ · x201 condition which is reached during step x201 the next succeeding period ΔT (Table I), and thus the signal CYST becomes a "1" and so remains until the system is fully stopped. And, the PGA 275 (FIG. 9m) produces a response during said step x202 to reset the READ flip-flop 272.

13. The system is now in Mode 1 with the EOB counter in state S3, and with CYST = "1," CYSP = "0" and READ = "0." This is the normal running condition —and for the reasons indicated previously, the EOB counter will advance to state S4 on the following step x300 and then to state S5 on the subsequent step x397 (Table I). The system immediately leaves Mode 1 and progresses through Modes 2 and 3 so that the first block of data is transferred from buffer to active storage, and the tape reader 39 is re-started (on step x991, Table I) by the AND gate 269 just after Mode 3 ends. As the following period ΔT begins, the EOB counter is in state S1 to place the system in Mode 1, and the first block of data begins to be executed.

Block-to-block execution proceeds until such time that the flip-flop CYSP is enabled (as heretofore described) and the system brings the movable element to a full stop.

RESUME

In the foregoing description, no attempt has been made to explain how the cutter is caused to end up exactly (or almost exactly) at the precise end point XCEP, YCEP for each of the successive segments, even though different segment components I and J may not be equal in length to the X and Y distances traveled during the execution of one segment. Because the X and Y traveled distances after Mode 3 for any block of data cannot differ from the segment components I and J by more than one small macromove ΔX or ΔY, the possible errors are small, and the reader is referred to either applicant's said copending application or to Fitzner U.S. application, Ser. No. 762,836, filed Sept. 26, 1969, (now U.S. Pat. No. 3,634,661) (and assigned to the assignee of the present case) for an explanation as to how such errors can be reduced to insignificance.

In the method and apparatus here described, acceleration and/or deceleration are automatically accomplished and the velocity is changed so as to arrive at various different programmed values without undue delays, —completely independently of changes in the segment length D or in programmed feed rate F from block-to-block. The rate of change of velocity (i.e., magnitude of acceleration or deceleration) is chosen and readily changed to satisfy the characteristics of the particular machine being controlled, and indeed is automatically decreased as the velocity difference to be realized decreases progressively. A velocity decrease, in particular one to end up at zero velocity, is anticipated by look-ahead with operations in an iterative computing director such that a newly desired velocity is reached just before that new velocity is programmed to be in effect. This latter result may also be readily accomplished for acceleration by adoption of the same technique used for deceleration.

Where macromoves ΔX and ΔY are carried out in "-staggered" relation, as here disclosed, it is possible that a factor Q or a velocity command number PVA might lag behind the value needed if they were updated or recomputed only once during each time period ΔT. It is a noteworthy advantage of the present invention that when a change of ΔT/ΔT is to be made, the velocity controlling number PVA is changed by a fractional amount of ΔV at more than one instant during each ΔT while keeping the total change equal to ΔV/ΔT. The factor Q (based on PVA) is recomputed more than once during each period ΔT. Therefore, a fresh and accurately valid value of Q is available and used both when the ΔX macromove is computed midway through a period ΔT (Chart A, column 400) and when the ΔY macromove is computed substantially at the end of a period ΔT (Chart A, column 900) in the system here described.

There follow as the last portion of the present specification the Charts A, B, C, D and Tables I, II, III, IV to which many references have been made in the foregoing description. These have been so located for convenience of access in looking back and forth between the specification, drawings, charts and tables.

CHART A
FUNCTIONAL OPERATIONS COMMON TO ALL MODES
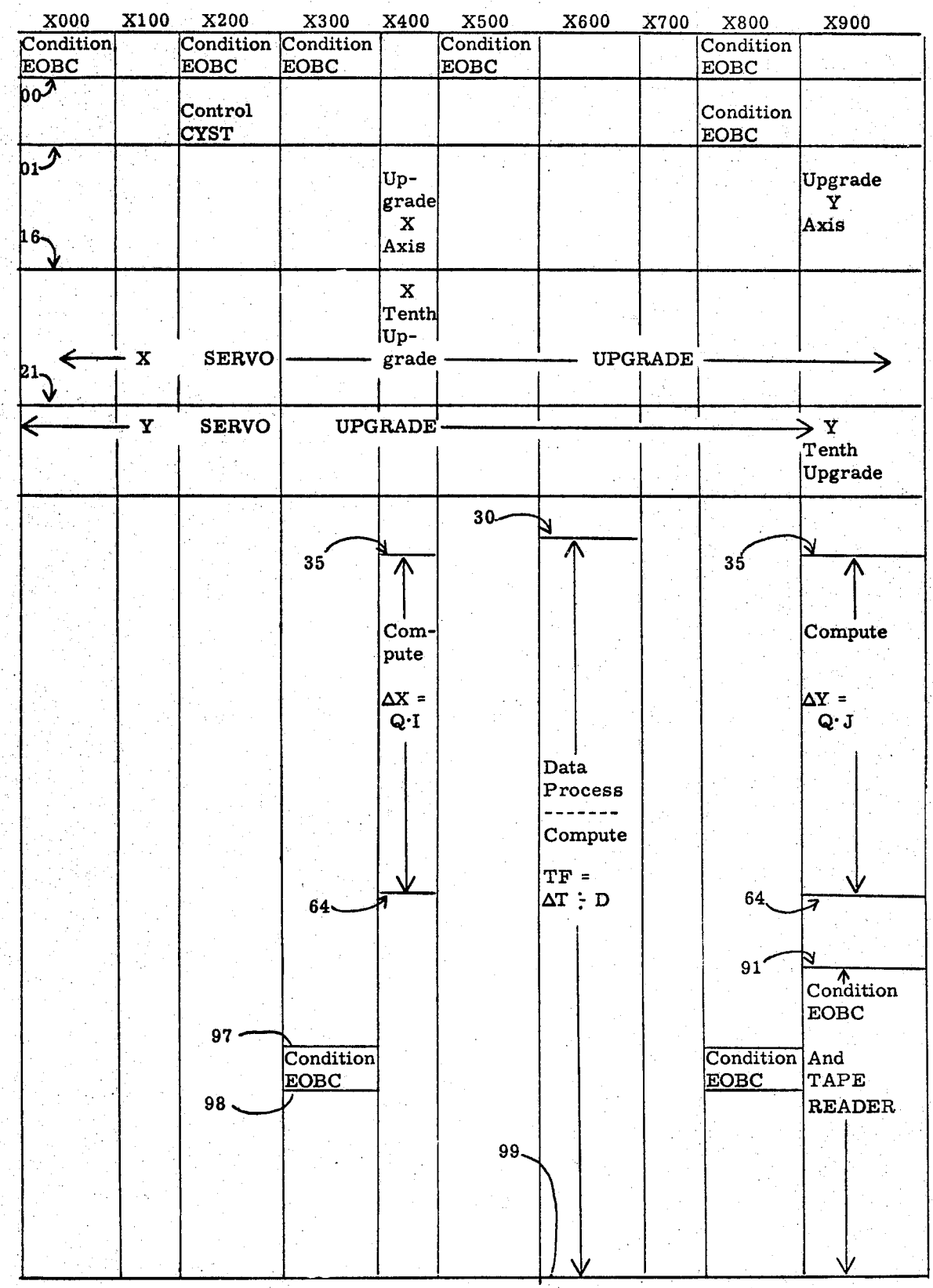

TABLE I --- STEPS COMMON TO ALL MODES

| | X000 | X100 | X200 | X300 | X400 | X500 | X600 | X700 | X800 | X900 |
|---|---|---|---|---|---|---|---|---|---|---|
| 00 | Adv. S6 ? S5 Adv. S7 ? S6 | | | Adv. S4 ? S3 | | Adv. S6 ? S5 Adv. S7 ? S6 | | | Adv. S3 ? S2 · CYST Adv. S4 ? S3 · CYST | |
| 01 | | | ECYST ? S3·READ | | | | | | | |
| 02 | | | CREAD ? S3 | | | | | | | |
| 03 | | | | | CAR | | | | | CAR |
| 04 | | | | | R/ΔX | | | | | R/ΔY |
| 05 | | | | | R/XCP | | | | | R/YCP |
| 06 | | | | | W/XCP | | | | | W/YCP |
| 07 | | | | | | | | | | |
| 08 | | | | | R/XOFF | | | | | R/YOFF |
| 09 | | | | | NONE | | | | | |
| to 014 | | | | | | | | | | |
| 015 | | | | | W/XMP | | | | | W/YMP |
| 016 | CAR | | | | R/XMP | R/ΔX | | | | ↑ |
| 017 | R/ΔX | | | ↑ | | SAR | | | | ↑ |
| 018 | SR1 | | | ↑ | | R/XSC | | | | ↑ |
| 019 | R/XSC | | | ↑ | | | | | | |
| 020 | | | | | | | | | | |
| 021 | W/XSC, CAR | | | | | | | | ↑ | R/YMP |
| 022 | R/ΔY | | | | | | | | ↑ | |
| 023 | SR1 | | | | | | | | | |
| 024 | R/YSC | | | | | | | | | ↑ |
| 025 | | | | | | | | | | ↑ |
| 026 | W/YSC, CAR | | | | | | | | | |
| 27 to 29 | | | | | | | | | | |
| 30 | | | | | | | EDP ? DPR | | | |
| 31 to 34 | | | | | | | | | | |

TABLE -1 CONT.

| Row | | | | | R/I | | ed, CIT(-), CIT 32, CIT 31, CIT 42, CIT 41, CIT 52, CIT 51, CIT 62, CIT 61, CIT 72, CIT 71 R/D | -3.3333 ch. + m. equals .3333x10⁻³ | R/J |
|---|---|---|---|---|---|---|---|---|---|
| 35 | | | | | | | | | |
| 36 | | | | | | | | | |
| 37 | | | | | emx, R/Q | | | | emx, R/Q |
| 38 to 54 | | | | | Carry Out I x Q multipli-cation | | | | Carry Out J x Q multiplication |
| 55 | | | | | cmx | | | | cmx |
| 56 | | | | | SL4 | | | | SL4 |
| 57 | | | | | R/XR | | | | R/YR |
| 58 | | | | | SR4 | | | | SR4 |
| 59 | | | | | W/ΔX | | | | W/ΔY |
| 60 | | | | | ZR1 | | | | ZR1 |
| 61 | | | | | SL4 | | | | SL4 |
| 62 | | | | | W/XR, CAR | | | | W/YR, CAR |
| 63 | | | | | | | ← Carry Out division → | | |
| 64 to 88 | | | | | | | | | |
| 89 | | | | | | | cd | | |
| 90 | | | | | | | | | CTAD ? S9 |
| 91 | | | | | | | W/TFB ? DP | | TRR. ?S9·CYST,CDR. ?S9 |
| 92 | | | | | | | | | Adv. S10 ? S9 |
| 93 | | | | | | | | | Adv. S11 ? S10 |
| 94 | | | | | | | | | Adv. S12 ? S11 |
| 95 | | | | | | | | | Adv. S13 ? S12 |
| 96 | | | | | | | | | Adv. S14 ? S13 |
| 97 | | | | Adv. S5 ?S4 | | | EDR ? DP CDPR ? DP | Adv. S5 ? S4 | Adv. S15 ? S14 |
| 98 | | | | | | | CDTZ ? ICDTZ· DP | | Adv. S16 ? S15 |
| 99 | | | | | | | CDP Adv. S3 ? S2· READ·DR | | Adv. S1 ?S16 |

CHART B
FUNCTIONAL OPERATIONS PECULIAR TO MODE 1
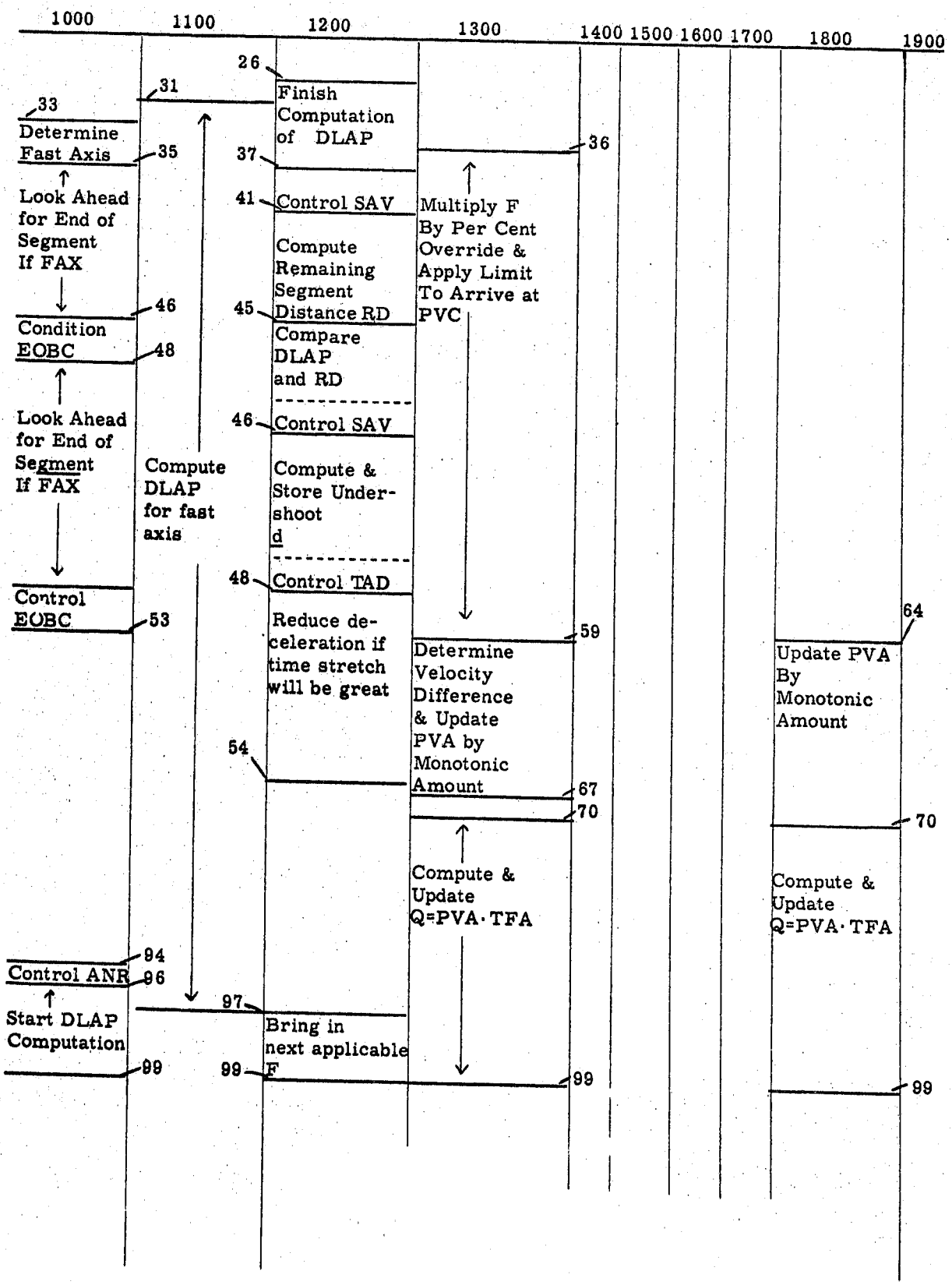

TABLE II
STEPS PECULIAR TO MODE 1

| | 1000 | 1100 | 1200 | 1300 | 1800 |
|---|---|---|---|---|---|
| 1 to 25 | | | | | |
| 26 | | | CAR | | |
| 27 | | | | | |
| 28 | | | R/SP3 | | |
| 29 | | | R/SP3 | | |
| 30 | | $emx''$ | W/SP2 & R/SP3 ? VDA | | |
| 31 | | R/SP3 | R/SP2 ? VDA | | |
| 32 | | | R/SP2 ? VDA | | |
| 33 | R/I | R/PCF ? $\overline{DTZ}$, R/1.0 ? DTZ | SR2 | | |
| 34 | cx, R/J | | R/.0075 ? VDA | | |
| 35 | E FAX ? AGB, C FAX ? ALB | | R/SP1 | $emx''$ | |
| 36 | CAR, R/XCP ? FAX, R/YCP ? $\overline{FAX}$ | | W/SP1 | R/PVC ? $\overline{IFA}$ | |
| 37 | | | CSAV, CAR, R/PVA | | |
| 38 | sx, R/XCEP ? FAX R/YCEP ? $\overline{FAX}$ | | cx, R/5.0 | R/PCF ? $\overline{TAD}$ + $\overline{DTZ}$ R/1.0 ? DTZ·TAD | |
| 39 | E ACNX ? COT(-), CACNX ? $\overline{COT(-)}$ | | E SAV ? TAD·$\overline{DTZ}$·$\overline{AGB}$ | ← | Multiply |
| 40 | R/$\Delta$X ? FAX R/$\Delta$Y ? $\overline{FAX}$ | | CAR, R/XCP ? FAX, R/YCP ? $\overline{FAX}$ | | |
| 41 | R/$\Delta$X ? FAX, SL1 ? $\overline{FAX}$ | Multiply | R/$\Delta$X ? FAX, R/$\Delta$Y ? $\overline{FAX}$ | | |
| 42 | SL1 ? FAX, R/$\Delta$Y ? $\overline{FAX}$ | | R/$\Delta$X ? LABM·$\overline{TAD}$·FAX, R/$\Delta$Y ? LABM·$\overline{TAD}$·$\overline{FAX}$ | | |
| 43 | R/$\Delta$Y ? $\overline{FAX}$ | | sx, R/XCEP ? FAX, R/YCEP ? $\overline{FAX}$ | | |
| 44 | Ditto | | cx, R/SP1 ? $\overline{TAD}$, R/.007 ? TAD | | |
| 45 | Ditto | | C SAV ? $\overline{AGB}$, FUL, R/SP1 | | |
| 46 | Ditto | | FUL, R/$\Delta$X ? LABM·FAX, R/$\Delta$Y ? LABM·$\overline{FAX}$ | | |
| 47 | Adv. S2 ? S1·$\overline{SST}$·CYST | | | | |

TABLE -2 CONT.

| | | | | |
|---|---|---|---|---|
| 48 | R/ΔX ? FAX<br>Adv. S3 ? S2 · CYST | R/ΔY · FAX, | W/LAB ? $\overline{TAD}$, CAR,<br>E/TAD ? AGB · $\overline{TAD}$,<br>R/ΔX ? FAX,<br>R/ΔY ? $\overline{FAX}$ | |
| 49 | R/ΔX ? FAX,<br>R/ΔY ? $\overline{FAX}$ | | cx, R/LAB | |
| 50 | R/ΔX ? FAX,<br>R/ΔY ? $\overline{FAX}$ | cmx'' | | |
| 51 | Ditto | cx, R/180 | E SAD ? AGB, | |
| 52 | Ditto | CAR&R/180 ? AGB | C SAD ? AGB, CAR | |
| 53 | Adv.S2 ? S1·SST·CYST | W/SP3, sx,<br>R/PVA, CVD | W/LAB ? SAD | |
| | | W/PVB ? TAD, cx, R/3.0 | R/PVB | |
| 54 | | EVDA ? AGB | SR1 | |
| 55 | | FUL & R/3.0 ? VDA | W/PVB ? TAD | cmx'' |
| 56 | | W/SP2 | | |
| 57 | | R/SP2 | | cx, R/180 |
| 58 | | W/SP1,<br>R/SP2 | | CAR & R/180 ? AGB |
| 59 | | R/SP1 | | W/PVC, sx,<br>R/PVA, CVD |
| 60 | | | | EVDM ? COT(-),<br>cx, R/3.0 |
| 61 | | SR1, R/SP1 | | EVDA ? AGB,<br>cx, R/0.3 |
| 62 | | | | EVDB ? AGB · VDA,<br>cx, R/0.1 |
| 63 | | SR2 ? $\overline{VDA}$,<br>SR3 ? VDA | | EVDC ? AGB · $\overline{VDA}$ · $\overline{VDB}$ |
| 64 | | | | CAR, R/PVC ? $\overline{VDA}$ · VDB · VDC,<br>R/PVA ? VDA + VDB + VDC |
| 65 | | | | sx ? VDM,<br>R/1.0 ? VDA · SAD · SAV<br>R/0.1 ? VDB · $\overline{TAD}$,<br>R/.01 ? VDC,<br>R/PVB ? VDB · $\overline{TAD}$ |
| 66 | | W/LAB ? $\overline{TAD}$, CAR, R/SP3 | | CAR ? COT(-) |
| 67 | | R/SP3 | | W/PVA |
| 68 | | | | CAR, |
| 69 | | W/SP1, R/SP3 | | |
| 70 | | SR1, R/SP3 | | emx', R/PVA |
| 71 | | | | |

TABLE-2 CONT.

| | | | |
|---|---|---|---|
| 72 | | R/SP1 | |
| 73 | | SR3 | R/TFA ? $\overline{S4}$ |
| 74 | | R/.001 ? VDA, | R/TFB ? S4 |
| 75 | | FP, R/ΔX ? FAX, R/ΔY ? $\overline{FAX}$ | ← |
| 76 | | W/SP2, emx" | |
| 77 | | R/SP2 | Multiply |
| 78 | | R/LAB | |
| 79 | | | |
| 80 to 93 | | Multiply → | → |
| 94 | CAR, R/FB | cmx" | cmx' |
| 95 | cx, R/FA | S L1 | W/Q ? $\overline{S4}$ |
| 96 | E ANR ? ALB · $\overline{DTZ}$ <br> C ANR ? $\overline{ALB}$ · $\overline{DTZ}$ | | W/SP3 ? S4 |
| 97 | CAR, R/FB ? ANR, <br> R/.003 ? DTZ | W/SP1 | CAR, R/FA ? $\overline{TAD}$, <br> R/.003 ? DTZ · TAD, <br> R/FB ? ANR · TAD <br> SL2 <br> W/PVC |
| 98 | SL2 | | |
| 99 | W/SP3 | | |

CHART C

FUNCTIONAL OPERATIONS
PECULIAR TO MODE 2

| 2300 | 2800 |
|---|---|
| 77 | |
| Transfer GB to GA<br><br>Transfer IB to I  →<br><br>Transfer JB to J | Ditto |
| 81 | |
| Adv. to S8 ? S7  → | Ditto |
| 82 | |
| 99 | |

TABLE III
STEPS PECULIAR TO MODE 2

| | 2300 | 2800 |
|---|---|---|
| 1 to 75 | NONE | → |
| 76 | CAR, R/SP3 ? S7 | → |
| 77 | W/Q ? S7, CAR | → |
| 78 | R/GB ? S7 · GO9 | → |
| 79 | W/G ? S7, CAR, R/IB ? S7 · LIN · $\overline{CYSP}$ | → |
| 80 | W/I ? S7 · LIN, CAR, R/JB ? S7 · LIN · $\overline{CYSP}$ | → |
| 81 | W/J ? S7 · LIN, CAR | → |
| 82 | Adv. to S8 ? S7 | → |
| 83 to 99 | NONE | |

TABLE IV
STEPS PECULIAR TO MODE 3

| | 3300 | 3800 |
|---|---|---|
| 1 to 34 | NONE | |
| 35 | R/XEP | → |
| 36 | W/XCEP, CAR, R/YEP | → |
| 37 | W/YCEP CAR R/TFB | → |
| 38 | W/TFA, CAR, R/FB | → |
| 39 | W/FA, CAR, | → |
| 40 to 77 | NONE | |
| 78 | CNDM, EDTZ, CANR, CCYST ? CYSP | → |
| 79 | Adv. to S9 ? S8 | → |
| 80 to 89 | NONE | |
| 90 | | |
| 91 to 99 | NONE | |

CHART D

FUNCTIONAL OPERATIONS PECULIAR TO MODE 3

| 3300 | 3800 |
|---|---|
| 35 | |
| Transfer XEP to XCEP<br>Transfer YEP to YCEP →<br>Transfer TFB to TFA | Ditto |
| 39 | |
| | |
| 78 | |
| CLEAR NDM<br>CLEAR ANR →<br>ENABLE DTZ | Ditto |
| 79 | |
| 80  Adv. S9 ? S8 | Adv. S9 ? S8 |
| 90 | |
| | Clear TAD ? S9 |
| 99 | |

I claim as my invention:

1. In a system for iteratively incrementing a signaled number $XSC$ by amounts $\Delta X$ during successive equal time periods $\Delta T$ and causing an element to move dynamically along an axis X so as to keep its displacement substantially in agreement with such number, the velocity of the element thus being $(\Delta X)/(\Delta T)$ and determined by the incrementing amount $\Delta X$, the improvement comprising in combination
   a. means for signaling a desired velocity number $PVC$ which from time-to-time may be abruptly changed, and
   b. means responsive to a change in the value of the signaled number $PVC$ for changing the incrementing amount $\Delta X$ by a predetermined amount $\Delta\Delta X$ during each period $\Delta T$ until the velocity of the element is made equal to the new value of the number $PVC$, whereby a change in the signaled number $PVC$ from a first value $PVC$ to a second value $PVC_2$ causes the velocity of the element to change from its original value to the new value at a rate proportional to $\Delta\Delta X/\Delta T$.

2. In a system for iteratively incrementing a signaled number $XSC$ by amounts $\Delta X$ during successive equal time periods $\Delta T$ and causing an element to move dynamically so as to keep its position along an axis substantially in agreement with such number, the velocity of the element thus being $(\Delta X)/(\Delta T)$ and being controlled by changing the value of the incrementing amount $\Delta X$, the combination comprising
   a. means for signaling a velocity number $PVA$,
   b. means responsive to said means (a) for causing said incrementing amounts $\Delta X$ to be proportional to said number $PVA$ so that the actual velocity of the element is determined by said number,
   c. means for signaling a second velocity number $PVC$ which represents the desired velocity of the element,
   d. means responsive to said means (a) and (c) for comparing said numbers $PVA$ and $PVC$ and for controlling said means (a) to incrementally change the number $PVA$ by an amount $\Delta V$ during successive periods $\Delta T$ and thereby bring it into equality with the number $PVC$ whenever the latter changes.

3. The combination set forth in claim 2 further characterized in that said comparing means (d) includes
   d1. means for signaling whether said number $PVC$ is greater or less than said number $PVA$, and
   d2. means for incrementally changing the number $PVA$ respectively in a positive or negative sense during successive periods $\Delta T$ in response to said signaling means ($d1$) indicating the number $PVC$ to be greater or less than the number $PVA$.

4. In a system for iteratively incrementing a signaled number $XSC$ by amounts $\Delta X$ during successive equal time periods $\Delta T$ and causing an element to move dynamically so as to keep its position along an axis substantially in agreement with such number, the velocity of the element thus being $(\Delta X)/(\Delta T)$ and being controlled by changing the value of $\Delta X$, and the value of $\Delta X$ being determined during each period according to the function $\Delta X = K \cdot PVA \cdot \Delta T$ where $K$ is a factor of proportionality and $PVA$ represents the velocity at which the element moves, the combination comprising
   a. means for signaling a number $PVA$ which is utilized in said function,
   b. means for signaling a number $PVC$ representing the velocity next desired and which may from time-to-time change,
   c. means for signaling a velocity difference number $PVD = PVA - PVC$, and
   d. means responsive to signals from said means (c) for adjusting said means (b) so as to change said number $PVA$ in predetermined increments $\Delta V$ during successive periods $\Delta T$ to make $PVA$ approach and equal $PVC$ whenever $PVA$ and $PVC$ are not equal, whereby said amount $\Delta X$ progressively changes to thereby change the velocity of the element at a rate determined by the size of said increments $\Delta V$.

5. In a system for iteratively incrementing signaled numbers $XSC$ and $YSC$ by amounts $\Delta X$ and $\Delta Y$ during successive equal time periods $\Delta T$ and causing an element to move dynamically along X and Y axes to keep its displacement along such axes substantially in agreement with such numbers, the X and Y axis velocities of the element thus being $(\Delta X)/(\Delta T)$ and $(\Delta Y)/(\Delta T)$ and the composite velocity of the element being the vector sum of such axis velocities, the improvement comprising in combination
   a. means for signalling a desired velocity number $PVC$ which from time-to-time may be abruptly changed,
   b. means for signaling an actual velocity number $PVA$ and causing said amounts $\Delta X$ and $\Delta Y$ both to be proportional thereto so that such number determines said composite velocity,
   c. means for comparing the numbers $PVC$ and $PVA$, and
   d. means responsive to said comparing means for changing said number $PVA$ by an amount $\Delta V$ during each time period $\Delta T$ whenever the numbers $PVC$ and $PVA$ are not equal, whereby said amounts $\Delta X$ and $\Delta Y$ are incrementally changed by increments of $\Delta\Delta X$ and $\Delta\Delta Y$ during each period $\Delta T$ whenever said numbers $PVC$ and $PVA$ are not equal to cause acceleration of the composite velocity equal to $\Delta V/\Delta T$ until said numbers $PVC$ and $PVA$ become equal.

6. The combination set forth in claim 5, further characterized in that said comparing means (c) includes means for computing and signaling a velocity difference number $PVD = PVC - PVA$ during each period $\Delta T$, and said changing means (d) includes means responsive to said signaled number $PVD$ during each period $\Delta T$ for changing said number $PVA$ by an amount $\Delta V$ until said number becomes less than a predetermined value (e.g., 0.01), together with means for making said number $PVA$ equal to the number $PVC$ when said number $PVD$ is less than said predetermined value.

7. The combination set forth in claim 6, further characterized in that said means for changing includes means for causing said amount $\Delta V$ to take on different values according to a predetermined function of the value of said number $PVN$ when the latter is greater than said predetermined value.

8. In a method for controlling the velocity of a movable element by iteratively incrementing a signaled number $XSC$ by amounts $\Delta X$ during successive equal time periods $\Delta T$ and causing the element to move dynamically along an axis X in accordance with changes in the number $XSC$, the velocity of the element thus being $\Delta X/\Delta T$ and determined by the incrementing amount $\Delta X$, the improvement comprising the steps of a. signaling a desired velocity number $PVC$ and from time-to-time changing the latter abruptly, and
b. sensing any change in the signaled number and in response thereto changing the magnitude of the incrementing amount $\Delta X$ by a predetermined amount $\Delta\Delta X$ during each of the periods $\Delta T$ until the incrementing amount $\Delta X$ reaches a value which produces a velocity equal to that represented by a new value of said velocity number $PVC$, whereby the velocity of the element changes at a rate of $\Delta\Delta X/\Delta T$ in the transition of reaching the new desired velocity in response to a change in the signaled number $PVC$.

9. The method of controlling the velocity of an element movable along an axis X and wherein the desired velocity $PVC$ may from time-to-time be abruptly and widely changed, comprising the steps of a. signaling a velocity number $PVA$,
b. signaling a commanded displacement number $XSC$ and causing the displacement of the element along said axis to be dynamically and substantially equal to the number $XSC$ as the latter changes in small increments,
c. making small changes $\Delta X$ in said number $XSC$ during each of successive equal time periods $\Delta T$, where $\Delta X$ is proportional to said signaled number $PVA$,
d. signaling a desired velocity number $PVC$ and from time-to-time changing the same, and
e. comparing said signaled numbers $PVA$ and $PVC$ and, in response to any difference therebetween, changing said signaled number $PVA$ by a predetermined amount $\Delta V$ during each period $\Delta T$ to bring the signaled number $PVA$ into equality with the number $PVC$, whereby the changes $\Delta X$ during successive periods $\Delta T$ are varied to change the velocity of said element at a rate $\Delta V/\Delta T$ until the velocity is equal to the number $PVC$ in response to any changes in the latter number.

10. The method of controlling the velocity of an element movable along an axis, comprising the steps of a. signaling a number $PVA$ representing the commanded velocity at which the element is to be moved,
b. computing and signaling during each of successive equal time periods $\Delta T$ the quantity $\Delta X = K \cdot PVA \cdot \Delta T$ where $\Delta X$ represents increments of distance along the axis and K is a factor of proportionality,
c. signaling a commanded position number $XSC$ and changing the value thereof during each period $\Delta T$ by an amount equal to said computed quantity $\Delta X$,
d. causing said element to move along said axis so that its actual position agrees substantially at all times with said number $XSC$,
e. signaling a number $PVC$ and changing the value thereof to a new and different value whenever an element velocity, different from that then obtaining, is desired,
f. computing and signaling a velocity difference number $PVD = PVC - PVA$ during each of said time periods $\Delta T$, and
g. in response to said number $PVD$ being other than zero during any period $\Delta T$, changing the value of the number $PVA$ by a predetermined amount $\Delta V$ during that period $\Delta T$, so as to bring the number $PVA$ into equality with said number $PVC$ at a controlled rate which is $\Delta V/\Delta T$.

11. The method defined in claim 10 further characterized in that said last-recited step (g) includes g1. changing the value of the number $PVA$ by an amount $\Delta V$ during each period $\Delta T$ and causing the amount $\Delta V$ to change according to a predetermined function of the magnitude of the velocity difference number $PVD$.

12. The method defined in claim 8 further characterized in that the last-recited step (g) includes g1. changing the value of the number $PVA$ by one of a plurality of predetermined amounts $\Delta V1$, $\Delta V2$, $\Delta V3$ during each period $\Delta T$, and wherein the value of the particular amount of change made during any given period $\Delta T$ is a monotonic function of the magnitude of the velocity difference number $PVD$ computed during that period.

13. The method defined in claim 12 further characterized in that said last-recited step (g) includes g1. decreasing the value of the number $PVA$ by a predetermined amount $\Delta V$ during each period $\Delta T$ in which the difference number $PVD$ is negative in sign, and
g2. increasing the value of the number $PVA$ by a predetermined amount $\Delta V$ during each period $\Delta T$ in which the difference number $PVD$ is positive in sign.

14. The method of controlling the velocity of an element movable along an axis X and wherein the desired velocity may from time-to-time be abruptly changed by substantial amounts, comprising the steps of a. signaling a velocity number $PVA$,
b. signaling a commanded position number $XSC$,
c. computing and signaling during each of successive equal time periods $\Delta T$ an incremental move number $\Delta X$ according to the relation $\Delta X = (PVA \cdot \Delta T \cdot I)/D$, where $I$ is the X axis component of a path segment having a length $D$ and lying at any angle relative to the X axis,
d. changing the commanded number $XSC$ during each period $\Delta T$ by an amount equal to the number $\Delta X$ last computed,
e. utilizing said changing number $XSC$ to drive the element along the axis such that the displacement of the element is dynamically and substantially equal to that changing number,
f. signaling a desired velocity number $PVC$ and from time-to-time changing the latter,
g. algebraically comparing said numbers $PVA$ and $PVC$ and, in response to any existing difference between the two, changing the number $PVA$ in a sense and by a predetermined amount $\Delta V$ during each time period $\Delta T$ until the two become equal, whereby the value of the $\Delta X$ number progressively changes from period-to-period to make the velocity of the element approach the desired velocity $PVC$, when the latter is changed, at a rate proportional to $(\Delta V)/(\Delta T)$.

15. In a method for controlling the composite velocity of an element movable along X and Y axes by iteratively incrementing signaled numbers $XSC$ and $YSC$ by amounts $\Delta X$ and $\Delta Y$ during successive equal time periods $\Delta T$, and moving said element along the X and Y axes to keep its axis displacements substantially in agreement with such $XSC$ and $YSC$ numbers, the X and Y axis velocities of the element thus being proportional to $(\Delta X)/(\Delta T)$ and $(\Delta Y)/(\Delta T)$ and the composite velocity of the element being the vector sum of such axis velocities, the improvement comprising the steps of a. signaling a desired path velocity number $PVC$ and from time-to-time changing the latter abruptly and by wide amounts,
b. signaling an actual velocity number $PVA$ and causing said amounts $\Delta X$ and $\Delta Y$ both to be proportional thereto, so that such number determines said composite velocity,
c. comparing the numbers $PVC$ and $PVA$ during each period $\Delta T$, and
d. changing said number $PVA$ by an amount $\Delta V$ during each time period whenever the numbers $PVC$ and $PVA$ are not equal, whereby said amounts $\Delta X$ and $\Delta Y$ are incrementally changed by increments of $\Delta\Delta X$ and $\Delta\Delta Y$ during each period $\Delta T$ in which said numbers $PVC$ and $PVA$ are not equal, and the composite velocity is changed at a rate of $(\Delta V)/(\Delta T)$ to produce acceleration or deceleration until said numbers $PVC$ and $PVA$ become equal.

16. The method set forth in claim 15 further characterized in that said step (c) of comparing said numbers $PVC$ and $PVA$ includes the step of computing and signaling a velocity difference number $PVD = PVC - PVA$ during each period $\Delta T$, and said step (d) of changing the signaled number $PVA$ includes changing said number $PVA$ by an amount $\Delta V$ during each period $\Delta T$ until the latter number becomes less than a predetermined value, and making said number $PVA$ equal to said number $PVC$ when said number $PVD$ is less than said predetermined value.

17. In combination with a system for iteratively incrementing a signaled number $XSC$ by amounts $\Delta X$ during successive equal time periods $\Delta T$ and causing an element to move dynamically along an axis X so as to keep its displacement substantially in agreement with such numbers, the velocity of the element being $(\Delta X)/(\Delta T)$ and determined by the magnitude of $\Delta X$, the improvement comprising a. means for signaling a desired velocity number $PVC$ which from time-to-time may be abruptly changed,
b. means for signaling the difference $PVD$ between the desired velocity number $PVC$ and the actual velocity at which the element is moving,
c. means for changing the incrementing amount $\Delta X$ by a change $\Delta\Delta X$ during each of the time periods $\Delta T$ when said difference is substantially other than zero, and
d. means for varying the change $\Delta\Delta X$ as a predetermined function of the signaled difference $PVD$ as the latter takes on different values.

18. The combination set forth in claim 17 wherein said means (d) includes means for causing said change $\Delta\Delta X$ to vary as a monotonic function of the signaled difference $PVD$.

19. The combination set forth in claim 17 wherein said means (d) includes means for causing said change $\Delta\Delta X$ to vary as a predetermined fraction of the magnitude of the signaled difference $PVD$.

20. In a method for controlling the velocity of a movable element by iteratively incrementing a signaled number $XSC$ by amounts $\Delta X$ during successive equal time periods $\Delta T$ and causing the element to move dynamically along an axis X in accordance with changes in the number $XSC$, the velocity of the element thus being proportional to $\Delta X/\Delta T$ and determined by the incrementing amount $\Delta X$, the improvement comprising the steps of a. signaling a number $PVC$ proportional to a desired velocity and from time-to-time abruptly changing the same,
b. comparing said desired velocity number $PVC$ with the actual velocity at which the element is moving and signaling the difference therebetween,
c. incrementing the amount $\Delta X$ by a change $\Delta\Delta X$ during each of the time periods $\Delta T$ whenever said difference is substantially other than zero, and
d. adjusting the value of the change $\Delta\Delta X$ so that the latter varies as a predetermined function of the magnitude of said difference.

21. The method set forth in claim 20 further characterized in that said predetermined function is a monotonic function of the magnitude of said difference.

22. The improved method set out in claim 20 further characterized in that said step (d) includes adjusting the value of the change $\Delta\Delta X$ so that the latter varies as a predetermined fraction of said difference.

23. In a system for controlling the displacement and velocity of an element movable along an axis, wherein a displacement number $XSC$ is iteratively changed by an amount $\Delta X$ during each of successive equal time periods $\Delta T$, and the successive displacements I and feed rates $F$ are defined in successive blocks of data fed sequentially into the system, the combination comprising a. means for storing and signaling a number $PVA$ representing the velocity at which the element is to be moved
b. means for computing an increment value $\Delta X = K \cdot PVA$ during each time period $\Delta T$ where $K$ is a factor of proportionality,
c. means for causing execution of a first block of data $B_1$ by storing in said means (a) a number $PVA$ proportional to the commanded feed rate $F_1$ so that the increment value $\Delta X$ is $\Delta X_1 = K \cdot F_1$, where $K$ is a factor of proportionality,
d. means for storing the commanded feed rate $F_2$ for a second block of data,
e. means for storing and signaling a number $PVC$ which is proportional to said commanded feed rate $F_2$, and
f. means for effecting a transition from the execution of a first to the execution of a second block of command data, including
  f1. means responsive to the appearance of said storing means (e) of a number $PVC$ which differs from the then-existing value of the number $PVA$ for changing the number $PVA$ stored in said means (a) by a predetermined amount $\Delta V$ during each time period $\Delta T$ until said number $PVA$ becomes equal to the number $PVC$, whereby the increment $\Delta X$ during transition periods $\Delta T$ progressively changes and the velocity of the element changes from first to second values respectively proportional to $F_1$ to $F_2$, and at a rate of $\Delta V/\Delta T$.

24. In a method of moving an element along an axis through successive segment components at successive composite feed rates $F$ defined in sequential blocks of numerical data, and wherein servo means respond to a number $XSC$ to move the element in accordance with changes in the value thereof, the number $XSC$ being incrementally changed by an amount $\Delta X$ during each of successive equal time periods $\Delta T$, and the amount $\Delta X$ being computed during each period $\Delta T$ according to the formula $\Delta X = K \cdot PVA$ where $PVA$ is a velocity representing number and $K$ is a factor of proportionality, the improvement which comprises the steps of a. storing and signaling a number $PVA$ which is proportional to the number $F_1$ contained in a first block of data $B_1$ so that increment amounts $\Delta X$ equal $\Delta X_1 = K \cdot PVA$, b. storing and signaling a command velocity number $PVC$ which is proportional to the number $F_2$ defined in a second block of data $B_2$ when said second block of data is received actively in the system, and c. progressively changing the stored number $PVA$ a predetermined amount $\Delta V$ during each time period $\Delta T$ to bring the number $PVA$ into equality with the number $PVC$ whenever a difference exists between the numbers $PVA$ and $PVC$, whereby the increment amount $\Delta X$ changes in steps of $\Delta\Delta X$ during successive periods $\Delta T$ from $\Delta X_1 = KF_1$ to $\Delta X_2 = KF_2$ when there is a transition from execution of a first block of data to execution of a second block of data.

25. In a numerical control system for moving an element along two axes X and Y at different commanded resultant velocities $V$ and in different resultant directions through successive segments $D$, said system having a. means for measuring off successive equal time periods $\Delta T$, b. means for signaling X and Y axis command displacement numbers $XSC$ and $YSC$, c. means for incrementally changing said numbers $XSC$ and $YSC$ by respective incremental amounts $\Delta X$ and $\Delta Y$ during respective first and second portions of each time period $\Delta T$, d. means for driving said element along the X and Y axes in directions corresponding to the sense of change in said numbers $XSC$ and $YSC$ and through distances corresponding to the extent of change in such numbers, the improvement which comprises in combination:

e. means signaling a number $PVA$ representing the actual path velocity at which said element is to be moved, f. means for signaling a number $PVC$ representing a desired path velocity at which said element is to be moved and changing said number abruptly from time-to-time, g. means for computing and signaling, during the first half of each of said periods $\Delta T$, a number representing said incremental amount $\Delta X$ according to the formula $\Delta X = PVA \cdot \cos\theta \cdot \Delta T$ where $PVA$ is the number signaled by said means (e), $\theta$ is the angle of the desired motion path relative to the X axis, and $\Delta T$ is a constant designating the duration of one of said periods $\Delta T$, h. means for computing and signaling, during the second half of each of said periods $\Delta T$, a number representing said incremental amount $\Delta Y$ according to the formula $\Delta Y = PVA \cdot \sin\theta \cdot \Delta T$, i. means for utilizing the numbers signaled by said means (g) and (h) for effecting operation of said means (c), j. means for computing and signaling, during each of said periods $\Delta T$, the difference $PVD$ between said signaled numbers $PVA$ being and $PVC$, and k. means responsive to said signaled difference $PVD$ being other than approximately zero for actuating said means (e) to change the signaled number $PVA$ by a predetermined amount $(\Delta V)/2$ during the first and second halves of each time period $\Delta T$ and prior to each operation of said means (g) and (h), whereby said incremental amounts $\Delta X$ and $\Delta Y$ are changed during any period $\Delta T$ when the signaled numbers $PVA$ and $PVC$ are unequal, and the path velocity of the movable element is changed at a rate of $(\Delta V)/(\Delta T)$.

26. The improvement defined in claim 25 further characterized by means responsive to said signaled difference $PVD$ being almost but not exactly zero during any period $\Delta T$ for setting said means (c) to signal a number $PVA$ equal to the then-existing number $PVC$.

27. In a method for controlling the path velocity and direction of an element movable along two axes X and Y by iteratively incrementing both of two signaled numbers $XSC$ and $YSC$ by respective amounts $\Delta X$ and $\Delta Y$ during respective first and second portions of successive equal time periods $\Delta T$ and causing the element to move dynamically along the X and Y axes in accordance with changes in the numbers $XSC$ and $YSC$, the path of velocity of the element thus being $(\Delta D)/(\Delta T)$ where $\Delta D = \sqrt{\Delta X^2 + \Delta Y^2}$ and being determined by the incrementing amounts $\Delta X$ and $\Delta Y$, the improvement comprising the steps of a. signaling a desired velocity number $PVC$ and from time-to-time changing the latter abruptly and by wide amounts, b. signaling an actual velocity number $PVA$, c. computing and signaling during a first half of each time period $\Delta T$ the increment amount $\Delta X$ according to the formula $\Delta X = PVA \cdot \Delta T \cdot \cos\theta$ where $PVA$ is the signaled number, $\Delta T$ is the numerical value of the time periods $\Delta T$, and $\theta$ is the angle of the path relative to the X axis, d. computing and signaling during a second half of each time period $\Delta T$ the increment amount $\Delta Y$ according to the formula $\Delta Y = PVA \cdot \Delta T \cdot \sin\theta$, e. comparing the signaled numbers $PVA$ and $PVC$ once during each time period $\Delta T$ and signaling if a difference $PVD$ exists between them, f. changing the stored number $PVA$ by a predetermined amount $(\Delta V)/2$ prior to the performance of said step (c) during the first portion of each time period $\Delta T$, if said difference $PVD$ exists, and g. changing the stored number $PVA$ by a predetermined amount $(\Delta V)/2$ prior to the performance of said step (d) during the second portion of each time period $\Delta T$, if said difference $PVD$ exists, whereby said signaled number $PVA$ is changed at a rate of $\Delta V/\Delta T$ and the increments $\Delta X$ and $\Delta Y$ are correspondingly changed to make the path velocity $(\Delta D)/(\Delta T)$ change at a rate of $(\Delta V)/(\Delta T)$ until the path velocity changes from an original value of the desired velocity $PVC$ to a new value of the latter.

28. The method set forth in claim 27 further characterized by the steps of
- e1. signaling the magnitude of said velocity difference $PVD$,
- g1. causing said predetermined amount $(\Delta V)/2$ referred to in steps (f) and (g) to have a first value when said difference $PVD$ exceeds a predetermined threshhold, and
- g2. causing said predetermined amount $(\Delta V)/2$ to have a second value, lower than said first value, when said difference $PVD$ does not exceed said predetermined threshold, whereby the rate of velocity change is reduced as the velocity difference $PVD$ decreases from above to below said threshhold.

29. The method set forth in claim 27 further characterized in that said steps (f) and (g) both include respectively increasing or decreasing the stored number $PVA$ by the predetermined amount $(\Delta V)/2$ when said comparing step (e) indicates that the signaled number $PVA$ is respectively greater or less than said signaled number $PVC$.

30. In a system for moving an element along an axis X from one to the next of successive points $XEP_1, XEP_2 \ldots XEP_n$ and at different controlled feed rates, the successive points $XEP$ being numerically defined in successive blocks of data fed to the system with some of the blocks containing different numerically defined feed rates $F$, such system including
- a. means for storing a number $XCEP$ representing an active block point coordinate, to which the element is to be moved,
- b. means for storing a number $PVC$ representing an active block velocity at which the element is to be moved and which is proportional to the commanded feed rate $FA$ for an active block,
- c. buffer means for storing a number $XEP$ representing a point coordinate for the next succeeding block,
- d. buffer means for storing a number $F_B$ representing a buffer feed rate for the next succeeding block, and
- e. means for measuring off successive equal time periods $\Delta T$, the improvement comprising in combination:
- f. means for storing and signaling an effective velocity number $PVA$,
- g. means for computing and signaling during each period $\Delta T$ a distance increment number $\Delta X$ which is equal to $K \cdot PVA$ where $K$ is a factor of proportionality,
- h. means for storing and signaling a commanded position number $XSC$,
- i. means for incrementally changing the number $XCP$ signaled by said means (h) by the amount of the number $\Delta X$ signaled by said means (g) during each of said periods $\Delta T$,
- j. means for moving said element so as to keep the coordinate position of the latter substantially instantaneously equal to the changing value of said signaled number $XCP$, so that the actual velocity of said element is in effect equal to $(\Delta X)/(\Delta T)$,
- k. means, effective during any period $\Delta T$ when the signaled number $XCP$ becomes approximately equal to said number $XCEP$, for transferring said number $XEP$ from said buffer means (c) into said storing means (a), and for transferring into said storing means (b) a number proportional to said number $F_B$ in said buffer means (d), whereupon said numbers $XCEP$ and $PVC$ take on new values according to said next succeeding block of data,
- l. means for changing said signaled number $PVA$ by a predetermined incremental amount $\Delta V$ during each period $\Delta T$ whenever the signaled numbers $PVC$ and $PVA$ are unequal, so that upon the transfer of a new number into said means (b) the velocity of the element changes at a rate of $(\Delta V)/(\Delta X)$, until the two numbers $PVA$ and $PVC$ become equal,
- m. means for producing a deceleration signal whenever the commanded velocity at the end of execution of one block of data is to be less than that during execution of a preceding block of data,
- n. means responsive to the presence of said deceleration signal for computing and signaling during each period $\Delta T$ a deceleration look ahead number $DLAP$ representing the distance which the element would travel, if deceleration at a rate of $(\Delta V)/(\Delta T)$ were initiated during that time period, before reaching the next commanded velocity proportional to said signaled number $F_B$,
- o. means for comparing the signaled distance number $DLAP$ with the difference between the then-signaled coordinate numbers $XCP$ and $XCEP$ and producing a signal $TAD$ whenever said difference is less than the number $DLAP$, and
- p. means responsive to said $TAD$ signal during any period $\Delta T$ for transferring into said storing means (b) a number proportional to said number $F_B$ held in said buffer means (d), so that said number $PVC$ takes on a new value representing the next commanded velocity, whereby said means (l) becomes effective to change the actual velocity of the element to the next commanded value by the time the element reaches the coordinate point represented by the then active number $XCEP$.

31. The combination set forth in claim 30 further characterized in that said means (m) includes:
- m1. means for comparing the feed rate $FA$ for an active block with the signaled buffer feed rate number $F_B$ stored for the next succeeding block of data, and
- m2. means, responsive to said comparing means finding that said number $F_B$ is less than said number $PVC$, for producing said deceleration signal.

32. The combination set forth in claim 30 further characterized in that said means (m) includes:
- m1. means for producing a control signal $DTZ$ whenever the element velocity is to be reduced to zero by the time that the element reaches the coordinate position represented by the number $XCEP$ then signaled by said means (a),
- m2. means responsive to said signal $DTZ$ for artificially treating the number $F_B$ signaled by said means (d) as if that number had a predetermined low value (e.g., 0.3 in./Min.), and
- m3. means for utilizing said signal $DTZ$ as the said deceleration signal.

33. The combination set forth in claim 32 further characterized in that said means (m1) includes:
- m1a. means for processing each block of data supplied to the system to convert and store such data in usable form and producing a control signal (e.g., x689 · $\overline{ICDTt}$ · DP) only after processing of a newly received block of data has been completed, and m1b. means for producing said signal DTZ for so long as said control signal is not present.

34. The combination set forth in claim 33 further characterized in that means are provided to create said signal DTZ after the execution of each block of data, and means are provided to remove said signal DTZ if and only if a short time later said control signal is present, indicating that processing for the next block of data has been completed.

35. The combination set forth in claim 32 further characterized in that said means (m1) includes m1a. means for producing said signal DTZ in response to a program stop code (e.g., M00) contained in a block of data supplied to the system, m1b. means for producing said signal DTZ in response to a momentary zero velocity code (e.g., G09) contained in a block of data supplied to the system, and m1c. means for processing data received in a block of data supplied to the system and for producing a control signal (e.g., x698 · DP) only after the processing of a newly received block of data has been completed, and m1d. means for producing said signal DTZ for so long as said control signal exists.

36. In a system for moving an element along an axis X from one to the next of successive points $XEP_1$, $XEP_2$ ... $XEP_n$ and at different controlled feed rates during the movement from one point to the next, the successive points XEP being numerically defined in successive blocks of data fed sequentially to the system with some of the blocks containing numerically defined feed rates F, the system holding one block of data in active storage and the succeeding block in buffer storage with the buffer storage data being transferred to active storage and a new block of data being fed to buffer storage at the completion of the execution of the movement commanded by the data in active storage, the system including:

a. means for signaling an effective velocity number PVA, b. means for computing and signaling during each of successive equal time periods $\Delta T$ an increment number $\Delta X$ which is equal to $K \cdot PAV$ where K is a factor of proportionality, c. means for signaling a commanded position number XSC and changing the latter by the amount $\Delta X$ during each said period $\Delta T$, and d. means for moving said element to keep its actual coordinate position instantaneously substantially equal to said number XSC, so that the element moves at a velocity proportional to $(\Delta X)/(\Delta T)$, the improvement comprising in combination e. means for storing and signaling a desired velocity number PVC and constituting active storage of the feed rate $F_1$ contained in a first block of data, f. means for comparing said signaled numbers PVA and PVC and changing the latter by an increment amount $\Delta V$ during each period $\Delta T$ whenever such numbers are unequal, thereby to make PVA change until it equals PVC, whereby the transfer of a second block feed rate $F_2$ from buffer storage into said means (e) results in the gradual changing of the element's velocity after execution of the first block of data at the feed rate $F_1$ and during execution of the second block of data until the actual feed rate reaches the value $F_2$, and g. means, normally disabled but selectively rendered effective, for transferring into said storage means (e) the feed rate $F_2$ held in buffer storage prior to the time that the execution of the first data block is completed, whereby the actual feed rate of the element approaches the second block feed rate value $F_2$ before execution of the second block of data begins.

37. The improvement set forth in claim 36 further comprising:

h. means for comparing the feed rates represented by numbers $F_1$ and $F_2$ held in active and buffer storage, and i. means responsive to said comparing means for rendering effective said means (g) whenever second block feed rate $F_2$ is less than a first block feed rate, so that deceleration will occur prior to complete execution of the first block.

38. The improvement set forth in claim 36 further comprising:

h. means for computing and signaling during each of said periods $\Delta T$ a number representing the distance DLAP which said element will travel while decelerating at the rate $(\Delta V)/T$ from the then existing velocity PVA signaled by said means (a) to a lower velocity $F_2$ then held in buffer storage, i. means for computing and signaling during each period $\Delta T$ a number representing the remaining distance between then existing position of said element and the position it will occupy when the execution of the data block in active storage is completed, j. and means for causing said means (g) to operate at or before the instant when said remaining distance number is reduced to a value which is equal to or only slightly greater than said DLAP number.

39. In a method of controlling the driving of a movable element through successive distances defined by successive points along an axis and controlling its velocity, with the successive points XEP and successive velocities F being numerically defined by blocks of data sequentially received and executed, the method including a. storing a first block of data in active storage means and signaling the end point $XEP_1$ and velocity $F_1$ for the block, as numbers XCEP and FA, b. storing a second block of data in buffer storage and signaling the end point $XEP_2$ and velocity $F_2$ for that block as numbers XEP and FB, c. signaling a number XCP and moving the element to keep its actual coordinate position along said axis dynamically in agreement with the latter number as the latter is changed in small increments, d. signaling a number PVA representing the velocity at which said element is at any instant to be moved, e. signaling a number PVC which is proportional to the number FA and which represents the commanded velocity, and f. measuring off successive equal time periods $\Delta T$, the improvement comprising g. comparing the signaled numbers PVA and PVC during each period $\Delta T$ and changing the former by a predetermined amount $\Delta V$ to make it more nearly equal the latter during any period when such numbers are not equal, h. changing the signaled number $XCP$ by an amount $\Delta X$ which is proportional to the number $PVA$ during each period $\Delta T$, i. transferring the number $XEP$ from the buffer to the active storage during any period $\Delta T$ when the signaled number $XCP$ becomes substantially equal to the number $XCEP$, thereby to cause the latter to take on a new value, j. computing and signaling during each time period $\Delta T$ a number $RD$ representing the remaining distance which the element must move to reach the position represented by the signaled number $XCEP$, k. computing and signaling during each time period $\Delta T$ a number $DLAP$ representing approximately the distance through which the element will move if its velocity is changed at a predetermined rate schedule from the velocity represented by the signaled number $PVA$ to the velocity represented by the signaled number $F$, and l. transferring the number $FB$ from buffer storage to active storage as the new number $FA$ (so that the second block velocity $F_2$ determines the new value of the number $PVC$) during any time period $\Delta T$ when said number $RD$ becomes approximately equal to or less than said number DLAP, whereby the next block velocity $F_2$ is actually reached by acceleration or deceleration during execution of the first block of data and just before the execution of the second block of data begins.

40. The improved method defined in claim 39 further characterized in that said number $RD$ is computed according to the expression $XCEP - XCP - 2\Delta X$ where $XCEP$ and $XCP$ are the numbers signaled during any period $\Delta T$, and $\Delta X$ is the number representing the amount of change to be effected according to step (h) during that period.

41. The method defined in claim 39 further characterized by n. normally rendering ineffective the said step (1), o. transferring the number $FB$ from buffer storage to active storage as the new number $FA$ (so that the second block velocity $F_2$ determines the new value of the number $PVC$) during the same period $\Delta T$ in which the transfer recited in step (i) occurs, so that a change in velocity occurs when execution of a new block of data begins, and p. rendering effective said step (l) when deceleration from a first velocity to a second, lower velocity is to take place.

42. The method defined in claim 41 further characterized in that said step (p) is effected by p1. comparing the number $FA$ representing the first block velocity $F_1$ with the number $FB$ representing the second block velocity $F_2$, and p2. rendering said step (l) effective when said comparison indicates that the second block velocity is less than the first block velocity.

43. The method defined in claim 41 further characterized in that said step (p) is effected by p1. sensing the appearance of a stop code (M00 or G09) in any block of data which is placed in buffer storage and in response to such sensing using a predetermined small number (e.g., 0.3 in./min.) in lieu of any signalled number $F$, and p2. in response to such sensing rendering said step (l) effective.

44. The method defined in claim 41 further characterized in that said step (p) is effected by:

p1. feeding into the system a new block of data after a block of data has been transferred from buffer to active, p2. processing at least a part of the new block of data into a different form prior to placing such data in buffer storage, p3. producing a signal $DTZ$ when data has been transferred from buffer to active and until such time that said processing is complete, p4. rendering said step (l) ineffective so long as said signal $DTZ$ is absent, and p5. in response to said signal $DTZ$ using a predetermined small number (e.g., 0.3 in./min.) in lieu of the signaled second block velocity $F_2$.

45. In a system for iteratively incrementing a signaled number $XSC$ by amounts $\Delta X$ during successive equal time periods $\Delta T$ and causing an element to move dynamically so as to keep its position along an X axis substantially in agreement with such number, the velocity of the element thus being $(\Delta X)/(\Delta T)$ and being controlled by changing the value of the incrementing amount $\Delta X$, the combination comprising a. means for signaling a velocity number $PVA$, b. means responsive to said means (a) for causing said increment amount $\Delta X$ to be proportional to said number $PVA$ so that the actual velocity of the element is controlled by said number, c. means for signaling a second velocity number $PVC$ which represents the desired velocity of the element, d. means for computing and signaling during each period $\Delta T$ a number $PVD$ representing the difference between said numbers $PVA$ ad $PVC$, e. and means for changing, during each period $\Delta T$, the value of the number $PVA$ signaled by said means (a) by an amount $\Delta V$ which is a fraction of the difference $PVD$ signaled during that period, whereby in response to an abrupt change in the value of the signaled number $PVC$, the number $PVA$ is incrementally changed in steps during a succession of periods $\Delta T$ and the velocity of the element gradually changes from a first value of the number $PVA$ to a second value which that number ultimately reaches.

46. The combination set forth in claim 45, further characterized in that said means (d) includes:

d1. means responsive to said means (d) for computing and signaling a number $\Delta V = (PVD)/K$ during each period $\Delta T$, where $K$ is a number greater than 1, d2. means effective during each time period $\Delta T$ for algebraically combining the numbers $PVA$ and $\Delta V$ to produce a sum or difference result number, and d3. means effective during each time period $\Delta T$ for storing said result number in said means (a) so that such result number becomes the new value of the signaled number $PVA$.

47. The method of controlling the velocity of an element movable along an axis X and wherein the desired velocity *PVC* may from time-to-time be abruptly and widely changed, comprising the steps of
   a. signaling a velocity number *PVA*,
   b. signaling a commanded position number *XSC* and causing the position of the element along said axis to be substantially instantaneously equal to the number *XSC* as the latter changes in small increments,
   c. making small changes $\Delta X$ in said number *XSC* during each of successive equal time periods $\Delta T$, where $\Delta X$ is a number proportional to said signaled number *PVA*,
   d. signaling a desired velocity number *PVC* and from time-to-time changing the same,
   e. computing and signaling during each period $\Delta T$ a number *PVD* representing the difference between said signaled numbers *PVA* and *PVD*, and
   f. during each time period $\Delta T$, changing the signaled number *PVA* by an amount which is equal to a fraction of said difference number *PVD* and in a sense which makes the number *PVA* approach being equal to said number *PVC*.

48. The method set forth in claim 47, further characterized in that said step (f) includes
   f1. computing and signaling during each period $\Delta T$ a number $\Delta V$ which is equal to $(PVD)/K$ where $K$ is a number greater than 1,
   f2. computing and signaling during each period $\Delta T$ a number representing the algebraic sum or difference of the numbers *PVA* and $\Delta V$, and
   f3. thereafter signaling and utilizing said sum or difference number as a new value of the number *PVA*.

49. The method of controlling the velocity of an element movable along plural axes X and Y and wherein the desired path velocity *PVC* may from time-to-time be abruptly and widely changed, comprising the steps of
   a. signaling a velocity number *PVA*,
   b. signaling commanded position numbers *XSC* and *YSC* and causing the position of the element along the X and Y axes to be substantially instantaneously equal to such numbers as they change in small increments,
   c. making small changes $\Delta X$ in said number *XSC* and small changes $\Delta Y$ in said number *YSC* at different points in time within each of successive equal time periods $\Delta T$, where $\Delta X$ and $\Delta Y$ are numbers proportional to said signaled number *PVA*,
   d. signaling a desired velocity number *PVC* and from time-to-time changing the same,
   e. signaling a lack of equality between said numbers *PVA* and *PVC*, and
   f. so long as such lack of equality signaling exists, incrementally changing said number *PVA* a plurality of times during each period $\Delta T$, with the aggregate of the plurality of incremental changes equaling a desired total $\Delta V$, whereupon the element accelerates or decelerates until the number *PVA* approximately equals the number *PVC*.

* * * * *

PO-1050
(5/69)

UNITED STATES PATENT OFFICE
CERTIFICATE OF CORRECTION

Patent No. 3,727,191   Dated April 10, 1973'

Inventor(s) John K. McGee    Page 1 of 4

It is certified that error appears in the above-identified patent and that said Letters Patent are hereby corrected as shown below:

In the Abstract, line 3, after "such", --as-- is inserted.

Column 4, line 58, "Corresponding" is changed to --Correspondingly--.

Column 9, line 8, "cells" is changed to --calls--.

Column 13, line 65, "stage" is changed to --stages--.

Column 15, line 62, "fliP-flop" is changed to --flip-flop--.

Column 16, line 12, "V2" is changed to --J2--.

Column 28, line 9, "47G" is changed to --46 --.

Column 28, line 62, "for" is changed to --form--.

Column 30, line 33, "flip-flop" is changed to --flip-flops--. Same line, a comma (,) is inserted after "220X" and "flip-flops" is erased. same line 33, before "I" insert -- $Y_3$ --.
Column 30, line 54, "135" is changed to --235--.

Column 30, line 61, "GATE" is changed to --gate--.

Column 32, line 56, "MOO" is changed to --M00--.

UNITED STATES PATENT OFFICE
CERTIFICATE OF CORRECTION

Patent No. 3,727,191  Dated April 10, 1973

Inventor(s) John K. McGee  Page 2 of 4

It is certified that error appears in the above-identified patent and that said Letters Patent are hereby corrected as shown below:

Column 36, line 17, "43" is changed to --53--.

Column 41, line 34, "$\overline{FUL}$" is changed to --FUL--.

Column 41, line 35, "FUL" is changed to --$\overline{FUL}$--.

Column 44, line 12, "microwave" is changed to --micromove--.

Column 47, line 4, "±0.006" is changed to -- ± 0.0006 --.

Column 49, line 17, " I" " (first occurrence) is erased.

Column 50, line 17, "signal" (first occurrence) is changed to --digital--.

Column 52, line 33, "R26f" is changed to --R26r--.

Column 53, line 43, "Bock" is changed to --Block--.

Column 55, line 58, "as" is changed to --a--.

Column 56, line 45, "PGS" is changed to --PGA--.

Column 57, line 15, "lip-flop" is changed to --flip-flop--.

Column 60, line 31, "1035," (second occurrence) is erased.

Column 62, line 30, "205" is changed to --2.5--.

Column 63, line 29, "Y" is changed to --$\Delta Y$--.

PO-1050
(5/69)

UNITED STATES PATENT OFFICE
CERTIFICATE OF CORRECTION

Patent No. 3,727,191      Dated April 10, 1973

Inventor(s) John K. McGee      Page 3 of 4

It is certified that error appears in the above-identified patent and that said Letters Patent are hereby corrected as shown below:

Column 73, line 33, "different" is changed to --difference--.

Column 77, line 52, "IA" is changed to --FA--. Same line, after "will" --the-- is inserted.

Column 78, line 24, "Moo" is changed to --M00--.

Column 79, line 37, a period is inserted after "/$\Delta$T." A new paragraph begins with the word "The".

Column 80, line 12, after "3.0" a divisional symbol ($\div$) is inserted.

Column 80, line 44, "n" is changed to --$\underline{n}$--.

Column 85, line 10, "laces" is changed to --places--. Same line, "VDA"(first occurrence) is changed to --$\overline{VDA}$--.

Column 85, line 25, "TAD" is changed to ---$\overline{TAD}$---.

Column 85, line 47, "valve" is changed to --values--.

Column 90, line 52, "Ii" is changed to --II--.

Column 92, line 46, "Ii" is changed to --II--.

Column 93, line 57, "$DLAP_{n+}$" is changed to --$DLAP_{n+2}$--.

Column 94, line 3, after "by" the word --which-- is inserted.

PO-1050
(5/69)

UNITED STATES PATENT OFFICE
CERTIFICATE OF CORRECTION

Patent No. 3,727,191   Dated April 10, 1973

Inventor(s) John K. McGee   Page 4 of 4

It is certified that error appears in the above-identified patent and that said Letters Patent are hereby corrected as shown below:

Column 94, line 64, "by" is changed to --of--.

Column 102, line 29, "$\Delta T/\Delta T$" is changed to --$\Delta V/\Delta T$--.

Column 130, line 8, "being" is erased.

Column 133, line 1, "x689" is changed to --x698--.

Column 133, line 46, "PAV" is changed to --PVA--.

Signed and sealed this 26th day of February 1974.

(SEAL)
Attest:

EDWARD M. FLETCHER, JR.
Attesting Officer

C. MARSHALL DANN
Commissioner of Patents